US012735530B2

(12) United States Patent
Becker et al.

(10) Patent No.: US 12,735,530 B2
(45) Date of Patent: Sep. 15, 2026

(54) BIORESORBABLE,STEREOCHEMICALLY DEFINED ELASTOMERS AND METHODS OF MAKING AND USING SAME

(71) Applicants: Matthew L. Becker, Chapel Hill, NC (US); Howard Levinson, Durham, NC (US)

(72) Inventors: Matthew L. Becker, Chapel Hill, NC (US); Howard Levinson, Durham, NC (US)

(73) Assignee: The University of Akron, Akron, OH (US)

( * ) Notice: Subject to any disclaimer, the term of this patent is extended or adjusted under 35 U.S.C. 154(b) by 728 days.

(21) Appl. No.: 18/182,146

(22) Filed: Mar. 10, 2023

(65) Prior Publication Data

US 2023/0383056 A1 Nov. 30, 2023

Related U.S. Application Data

(63) Continuation-in-part of application No. 18/042,270, filed as application No. PCT/US2021/046890 on Aug. 20, 2021, now Pat. No. 12,655,251.

(Continued)

(51) Int. Cl.
*C08G 63/688* (2006.01)
*C08G 63/91* (2006.01)

(52) U.S. Cl.
CPC ................................ *C08G 63/6888* (2013.01)

(58) Field of Classification Search
None
See application file for complete search history.

(56) References Cited

U.S. PATENT DOCUMENTS 3,979,359 A 9/1976 Kugele et al.
5,665,831 A 9/1997 Neuenschwander et al.

(Continued)

OTHER PUBLICATIONS

Kuroda et al., "A Novel Polyaddition of Bifunctional Acetylenes Containing Electron-Withdrawing Groups. 2. Synthesis of Polymers Having β-Alkylmercaptoenoate Moieties by the Reaction with Dithiols," Macromolecules, vol. 28, pp. 6020-6025 (1995). (Year: 1995).*

(Continued)

*Primary Examiner* — Ha S Nguyen

(74) *Attorney, Agent, or Firm* — Renner, Kenner, Greive, Bobak, Taylor & Weber Co., LPA

(57) ABSTRACT

In various embodiments, the present invention relates to a series of anti-fouling zwitterionic biodegradable thiol-yne elastomers that incorporate degradable $C_4$-$C_{14}$ dicarboxylic acid-based monomer units made using a nucleophilic thiol-yne polymerization methodology that targets high cis-content at comparable molar masses to provide excellent mechanical properties and zwitterionic side chains that provide anti fouling properties. As each $C_4$-$C_{14}$ dicarboxylic acid-based monomer unit contains at least two labile ester linkages, altering the stoichiometry of degradable $C_4$-$C_{14}$ dicarboxylic acid-based monomer unit incorporation allows the degradation rate of the material to be tuned precisely, while retaining control over the mechanical properties by maintaining the cis/trans stereochemistry of the double bonds to provide independent tuning of mechanical and degradative properties.

28 Claims, 61 Drawing Sheets

Related U.S. Application Data

(60) Provisional application No. 63/067,957, filed on Aug. 20, 2020.

(56) References Cited

U.S. PATENT DOCUMENTS

| | | | |
|---|---|---|---|
| 8,562,671 B2 | 10/2013 | Neuenschwander | |
| 2018/0244821 A1 * | 8/2018 | Becker | C08F 4/6095 |

OTHER PUBLICATIONS

Ian C. Bonzani, Raju Adhikari, Shadi Houshyar, Roshan Mayadunne, Pathiraja Gunatillake, Molly M.Stevens, "Synthesis of two-component injectable polyurethanes for bone tissue engineering" Biomaterials vol. 28, Issue 3, pp. 423-433.

Worch et al. "Elastomeric polyamide biomaterials with stereochemically tuneable mechanical properties and shape memory", Nature Communications. Jun. 11, 2020:3250. [11 pages, especially: p. 2. col 1, para 2; p. 2, col. 2. para 2; p. 3. Fig 1a; p. 4, col. 1. para 2; p. 5. Fig. 3a; p. 8, Fig. 5b.].

Khalfa et al. "Stereochemistry-Controlled Mechanical Properties and Degradation in 3D-Printable Photosets", J. Am. Chern. Soc. Oct. 2021, 143,42, 17510-17516, entire document.

* cited by examiner

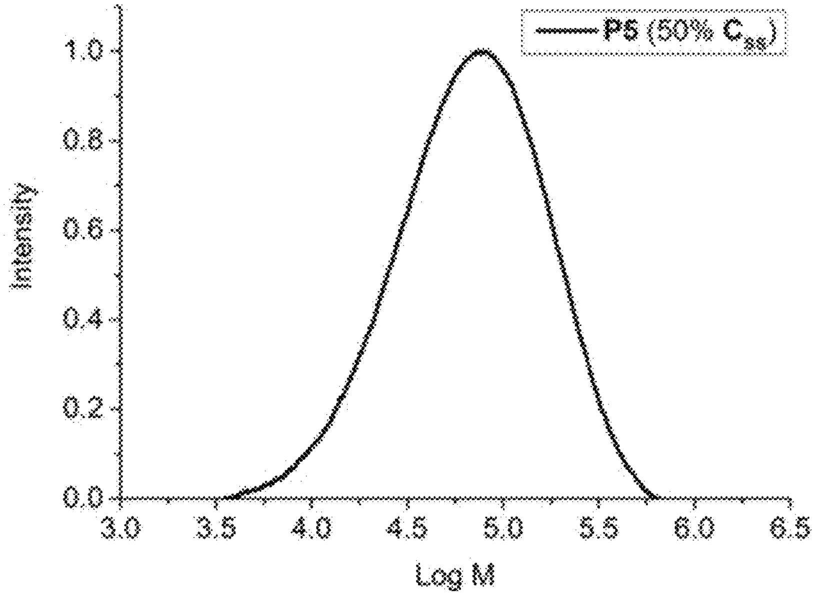
FIG. 11
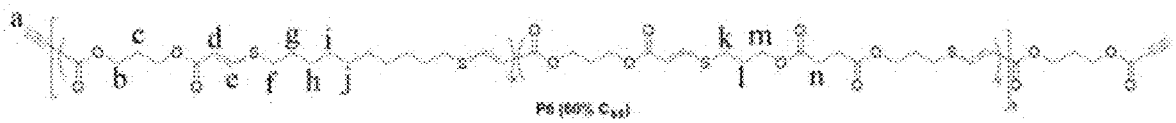
%$C_{SS}$ of incorporation = n/ (n+h) ~60%
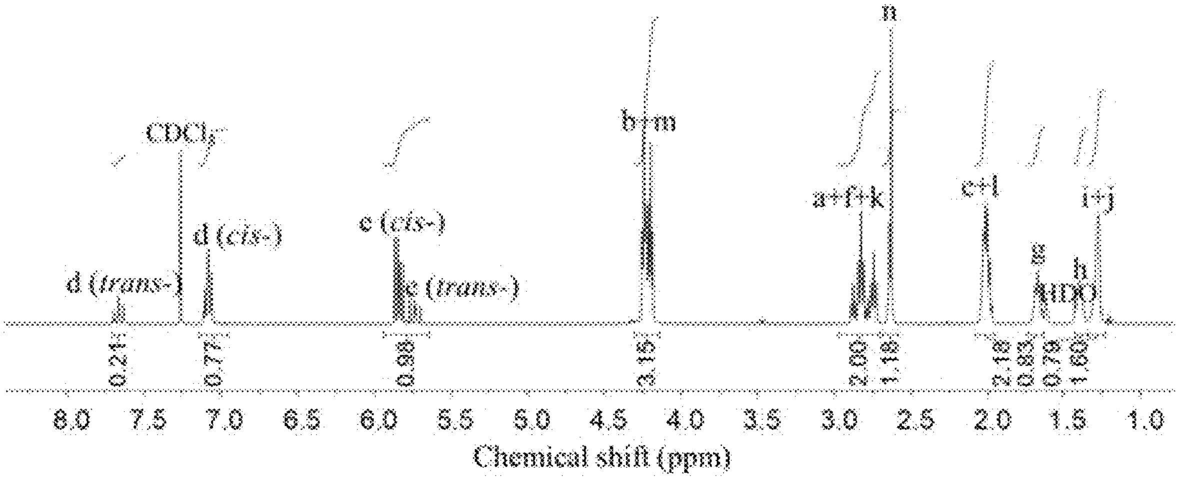
FIG. 12

| Group | Modulus (MPa) | Strain at Break (%) | UTS (MPa) |
|---|---|---|---|
| Mesh | 71.2 ± 9.9 | 53.4 ± 6.2 | 37.6 ± 5.8 |
| Coated-Mesh | 64.2 ± 3.3 | 55.5 ± 4.2 | 34.1 ± 4.0 |

Modified 10993-6 Inflammatory histological Response Analysis

| Cell Type Response | PLLA | | | 62/10 | | | 80/10 | | | 80/50 | | | 80/100 | | |
|---|---|---|---|---|---|---|---|---|---|---|---|---|---|---|---|
| | 1 Month | 2 Month | 4 Month | 1 Month | 2 Month | 4 Month | 1 Month | 2 Month | 4 Month | 1 Month | 2 Month | 4 Month | 1 Month | 2 Month | 4 Month |
| Neutrophils | 0.3±0.5 | 0.6±0.9 | 0.2±0.4 | 0.1±0.3 | 0.6±0.7 | 0.2±0.4 | 0.1±0.2 | 0.7±0.9 | 0.1±0.2 | 0.4±0.5 | 0.9±1.0 | 0.3±0.5 | 0.4±0.5 | 1.1±0.6 | 0.1±0.2 |
| Lymphocytes | 2.5±0.6 | 2.0±0.7 | 2.2±0.7 | 2.8±0.5 | 2.2±0.7 | 2.2±0.8 | 2.7±0.5 | 2.4±0.8 | 2.0±0.6 | 3.7±0.4 | 1.8±0.8 | 1.9±0.8 | 3.7±0.4 | 2.8±0.7 | 3.2±0.7 |
| Plasma Cells | 0.1±0.2 | 0.1±0.3 | 0±0 | 0.1±0.2 | 0.1±0.2 | 0±0 | 0±0 | 0±0 | 0.1±0.2 | 0.6±0.6 | 0.3±0.4 | 0±0 | 0.6±0.6 | 0±0 | 1.4±0.6 |
| Single Macrophages | 1.9±1.2 | 0±0 | 1.5±1.4 | 1.6±1.3 | 1.0±0.9 | 1.1±1.2 | 1.6±1.1 | 1.2±0.9 | 0.5±0.8 | 2.9±0.2 | 1.7±1.1 | 0.5±0.9 | 2.9±0.2 | 1.4±1.0 | 3.8±0.4 |
| Multinucleated Giant Cells | 0±0 | 0±0 | 0±0 | 0±0 | 0±0 | 0±0 | 0±0 | 0±0 | 0±0 | 0.9±0.5 | 0.1±0.2 | 0±0 | 0.9±0.5 | 0.1±0.2 | 2.5±0.9 |
| Necrosis | 0±0 | 0±0 | 0±0 | 0±0 | 0±0 | 0±0 | 0±0 | 0±0 | 0±0 | 0±0 | 0±0 | 0±0 | 0±0 | 0±0 | 0±0 |
| | 4.8±1.6 | 4.0±1.6 | 4.0±2.0 | 4.6±1.7 | 3.8±1.4 | 3.5±1.6 | 4.3±1.2 | 4.2±2.0 | 2.6±1.3 | 4.9±1.8 | 4.7±1.7 | 2.7±1.2 | 8.6±1.5 | 9.1±1.2 | 10.9±1.9 |

FIG. 56

ELASTOMER COATED POLYPROPYLENE MESH

Abdominal Defect

Pre-Abrasion

Post-Abrasion

Mesh Fixation

BIORESORBABLE,STEREOCHEMICALLY DEFINED ELASTOMERS AND METHODS OF MAKING AND USING SAME

CROSS REFERENCE TO RELATED APPLICATIONS

This application is a continuation-in part of U.S. non-provisional patent application Ser. No. 18/042,270 entitled "Bioresorbable, Stereochemically Defined Elastomers and Methods of Making and Using Same," filed Feb. 20, 2023, which claims the benefit of international application number PCT/2021/046890 entitled "Bioresorbable, Stereochemically Defined Elastomers and Methods of Making and Using Same," filed Aug. 20, 2021, which claims the benefit of U.S. provisional patent application Ser. No. 63/067,957 entitled "Bioresorbable, Stereochemically Defined Elastomers and Methods of Making and Using Same," filed Aug. 20, 2020. All of these applications are incorporated herein by reference in their entirety.

FIELD OF THE INVENTION

One or more embodiments of the present invention relates to biodegradable elastomers for medical use. In certain embodiments, the present invention relates to a biodegradable elastomer having degradable succinate, glutarate, or adipate-based monomer units. In one or more embodiments, the present invention relates to zwitterionic biodegradable elastomer coatings having antifouling properties.

BACKGROUND OF THE INVENTION

Biodegradable polymers have attracted tremendous attention as materials for soft tissue engineering, drug delivery or device fabrication. Unfortunately, few materials can meet the targeted needs for long-term implantable applications. Materials that show initial promise are often difficult to scale commercially and operate under rigid synthetic systems which limits the tunability of the thermal and mechanical properties.

Biological tissues are highly viscoelastic and dynamic. These qualities are lacking in synthetic degradable materials that are routinely available and applied to regenerative medicine. Many of the biomaterials that have been used widely for regenerative medicine, such as poly(L-lactic acid) (PLLA) and poly(ε-caprolactone) (PCL), are semi-crystalline and do not replicate the elastic properties of native tissues. These materials also exhibit anisotropic degradation because of the presence of both amorphous and crystalline domains, which lead to limited control over the resorption timelines. Attempts to engineer elastomeric materials with mechanical properties similar to native tissues have been focused on non-degradable systems. While these have been directed towards obtaining materials that possess the elastic properties of natural rubber, they have not followed its design principles, namely the incorporation of cis-1,4 alkene segments, to control the mechanical properties. While synthetic surrogates such as cis-1,4-polyisoprene, cis-1,4-polybutadiene and analogues are available, each of these materials lack degradable units that facilitate resorption and lack the physical chemical or topological properties necessary to recapitulate a wide variety of tissues. In addition, anionic or metallocene-based polymerization synthesis methodologies are functional group intolerant making the incorporation of bioactive groups pre- or post-polymerization that facilitate specific cellular interactions challenging.

Significant efforts have been expended to investigate degradable thermoplastic elastomers for biomaterials applications. However, nearly all elastomer-like materials developed for tissue engineering to date require crosslinking or blending to achieve desirable mechanical and degradation properties. Polyurethanes can be modified to control degradation by altering the hard segments, soft segments, and chain extenders to include varied amounts of hydrolytically degradable esters, orthoesters, amides, anhydrides, or enzymatically degradable units such as elastase-sensitive amino-acid chains The materials are known to degrade heterogeneously on account of anisotropic degradation within the soft block-forming component that leaves non-degraded hard block (typically urethane-based) components and results in exponential decreases in mechanical properties. Beyond this, the resultant degradation byproducts are acidic and often elicit a strong inflammatory response. To overcome the lack of hard block degradation, poly(ester urethane) ureas (PEUUs), which contain biodegradable urea linkages, have also been investigated. These materials however largely retain bulk erosion profiles and like polyurethanes, the hard-soft block ratio dictates both the mechanical and degradative properties in a manner that cannot be decoupled. Chemically crosslinked polymers like poly(glycerol sebacate) (PGS) and similar derivatives can achieve elastic properties that mimic several soft tissues and can achieve varied degradation rates by altering the crosslink density during preparation, but these materials are difficult to synthesize reproducibly, cannot be thermally processed after crosslinking, and are known to degrade too rapidly for long-term regeneration strategies (around 6 weeks in vivo).

The need to change the chemical structure to vary the mechanical properties presents the central dogma in these materials that has made it difficult to decouple the effects of chemistry and mechanical properties on degradation and tissue regeneration. Until now, no synthetic resorbable elastomer or elastomer-like polymer system have afforded independent control of mechanical properties and degradation de novo. A metal-free, stereo controlled step-growth polymerization via a nucleophilic thiol-yne addition which yielded a series of thermally-processable elastomers in which the mechanical properties were controlled by the double bond stereochemistry has recently been reported. (See, e.g., Worch, J. C. eat al. Elastomeric polyamide biomaterials with stereochemically tuneable mechanical properties and shape memory. *Nat Commun* 11, 3250 (2020) and Bell, C. A. et al. Independent Control of Elastomer Properties through Stereocontrolled Synthesis. *Angew Chem Int Ed Engl* 55, 13076-13080, doi:10.1002/anie.201606750 (2016), the disclosures of which are incorporated herein by reference in their entirety). The double bond stereochemistry (% cis) in each thiol-yne step growth polymer was tuned based on solvent polarity and organic base which can preferentially directs the thiol addition to the cis stereochemistry. Truong et al. have shown that low and high % cis can be achieved by changing the base from $Et_3N$ ($pK_a$=10.75) to DBU ($pK_a$=13.5) while maintaining the solvent ($CDCl_3$). Truong, V. X.; Dove, A P., Organocatalytic, Regioselective Nucleophilic "Click" Addition of Thiols to Propiolic Acid Esters for Polymer-Polymer Coupling *Angew. Chem. Int. Ed.* (2013) 52, 4132-4136, the disclosure of which is incorporated herein by reference in its entirety. However, moderately high % cis subunits can be achieved with $Et_3N$ base when a more polar solvent such as DMSO is used. All high % cis polymers were formed using DBU/$CHCl_3$, but lower % cis contents were formed by using $Et_3N$ and varying compositions of DMF and $CHCl_3$ (17:3, 7:3, and 100% DMF). However, the materials were non-degradable and display no significant mass loss over one year in 5 M $KOH_{(aq)}$ solution, most likely a result of resistance to ester hydrolysis due to conjugation.

One potential application for these and similar materials is the prevention of intra-abdominal adhesions after surgery. The formation of infra-abdominal adhesions (IAs) following abdominal surgery remains a major unmet medical need and leads to serious complications in ~5% of cases. IAs can cause small-bowel obstruction, fistula, infection, chronic pain and inflammation, which often require high-risk re-operation with prolonged hospitalization and sometimes leading to chronically debilitated patients. Complications from IAs affect thousands of patients (>100,000) per year in the US with total treatment cost estimated upward of $1 billion. Considering both the health challenges and financial costs, prevention or reduction of postoperative adhesions is a priority.

IAs arise from a complex fibrosis process that is induced singly or in combination by surgical trauma, infections, foreign body reaction and persistent inflammation. In ventral hernia repair (VHR), a myriad of anti-adhesion strategies have been explored and among them, introducing physical barriers between the mesh and viscera has been demonstrated as the most effective method to reduce adhesion. Hernia mesh manufacturers have utilized composite mesh approach consisting of hydrophilic coatings (e.g. collagen, hyaluronic acid, carboxymethyl cellulose, polyethylene glycol, and omega-3 fatty acid) laminated to prosthetic mesh. The smooth degradable film acts a peritoneal interface to prevent adhesions while the prosthetic mesh promotes tissue bio-incorporation. However, these coatings are only minimally effective because they have insufficient properties to resist micro-fractures and delamination, and rapidly degrade (e.g. Proceed™, Sepramesh™, and Parietex™ are completely absorbed in 4 weeks) exposing prosthetic mesh prior to neo-peritoneal formation. Ideally, an anti-adhesive mesh barrier should be biocompatible, possess adequate mechanical properties and have sufficiently long degradation allowing native peritoneum to reform and remodel on the intra-peritoneal surface of the mesh. This is a difficult task in that degradable elastomeric coatings are generally not adherent to polypropylene and it is challenging to independently control degradation timelines appropriate for tissue remodeling and mechanical properties of elastomers. This inextricable link has been a major hurdle in degradable elastomer development. While several approaches have been used to create a mesh to repair hernias and reduce IAs, it is unlikely that a single material will satisfy every aspect of this clinical need leading us to a composite mesh approach.

What is needed in the art is a synthetic resorbable elastomer or elastomer-like polymer system having independent control of mechanical properties and degradation properties of the resorbable elastomer or elastomer-like polymer and/or a degradable elastomer-coated polypropylene mesh functionalized with zwitterions to create an anti-adhesive barrier for use in VHR.

SUMMARY OF THE INVENTION

The Summary is provided to introduce a selection of concepts that are further described below in the Detailed Description. This Summary is not intended to identify key or essential features of the claimed subject matter, nor is it intended to be used as an aid in limiting the scope of the claimed subject matter.

In various embodiments, the present invention builds upon a series of materials created using a nucleophilic thiol-yne polymerization methodology that targets high cis-content at comparable molar masses to provide excellent mechanical properties. To translate the elastomer-like systems described above into regenerative medicine applications, however, a new series of polymers have been developed that incorporates degradable $C_4$-$C_{14}$ dicarboxylic acid-based monomer units, and preferably succinic acid, glutaric acid, or adipic acid-based monomers units. Each of these monomers contain two labile ester linkages and by altering the stoichiometry of degradable $C_4$-$C_{14}$ dicarboxylic acid-based monomer unit incorporation, the degradation rate of the material can be tuned precisely, while retaining control over the mechanical properties by maintaining the cis/trans stereochemistry of the double bonds (FIG. 1). This structural control enables the independent tuning of mechanical and degradative properties and thus overcomes a major hurdle in biomaterials. Moreover, it has been found that these degradable $C_4$-$C_{14}$ dicarboxylic acid-based monomers can be introduced into the nucleophilic thiol-yne polymerization reaction vial one, or both, of the thiol and alkyne functional groups, providing additional flexibility in developing suitable polymer species for a given application.

Further, because they degrade into nontoxic components, they create little, if any, local inflammation and have been found to display excellent in vitro cell viability. Succinic acid, for example, is found naturally within the body and can be metabolized by the Krebs cycle. See, e.g., Benit, P. et al. Unsuspected task for an old team: Succinate, fumarate and other Krebs cycle acids in metabolic remodeling. *Biochimica et Biophvsica Acta—Bioenergetics* 1837, 1330-1337 (2014), the disclosure of which is incorporated herein by reference in its entirety. As such, these degradable $C_4$-$C_{14}$ dicarboxylic acid-based monomer units provide ideal building blocks from which to introduce non-conjugated esters into the elastomer structure and use them to influence biodegradation rates. In addition, because of the highly hydrophobic nature of these materials, they have been shown to exhibit surface erosion behavior, providing a design handle not present in material that exhibit bulk erosion properties. Moreover, the crystallinity of these materials can be tuned by altering the ration of Cis to Trans stereochemistry and the stoichiometry of the degradable units, for enhancement of water barriers in things like in wireless bio-integrated medical electronics. In various aspects, the thiol-yne elastomer materials provided herein are suitable for numerous other applications, including but not limited to, soft tissue engineering, hernia and diagonal wall repair, and as adhesion barriers.

In other embodiments, the present invention is directed to a composite mesh device formed using a macroporous monofilament polypropylene mesh and a degradable elastomer coating designed to meet the requirements of a clinical application. The degradable elastomer is synthesized using an organo-base catalyzed thiol-yne addition polymerization that affords independent control of degradation rate and mechanical properties as set forth above. In these embodiments, however, the elastomeric coating is further enhanced by the covalent tethering of antifouling zwitterionic molecules. Mechanical testing demonstrates that the elastomer forms a robust coating on the polypropylene mesh and does not exhibit micro-fractures, cracks or mechanical delamination under cyclic fatigue testing that exceeds peak abdominal loads (50 N/cm). Further, quartz crystal microbalance measurements have shown the zwitterionic functionalized elastomer further reduced fibrinogen adsorption by 73% in vitro when compared to unfunctionalized elastomer controls. The elastomer exhibited degradation with limited tissue response was demonstrated in a 10-week murine subcutaneous implantation model. The composite mesh has also been evaluated in an 84-day study in a rabbit cecal abrasion hernia adhesion model. The zwitterionic composite mesh of the present invention significantly reduced both the extent and tenacity of IAs by 94% and 90%, respectively, with respect to uncoated polypropylene mesh and is an excellent candidate to reduce complications related to abdominal repair through suppressed fouling and adhesion formation, reduced tissue inflammation, and appropriate degradation rate.

In a first aspect, the present invention is directed to a bioresorbable elastomer composition for biomaterial applications comprising a residue of a substantially linear $C_1$ to $C_{12}$ bis-propiolate, the residue of a $C_4$ to $C_{14}$ dicarboxylic acid-based dithiol, and the residue of a substantially linear dithiol, wherein at least 50% of the double bonds are in a cis configuration. In some embodiments, from about 50% to about 90% of the double bonds are in a cis configuration.

In one or more embodiments, the bioresorbable elastomer composition of the present invention includes any one or more of the above referenced embodiments of the first aspect of the present invention wherein the substantially linear $C_1$ to $C_{12}$ bis-propiolate has the formula:

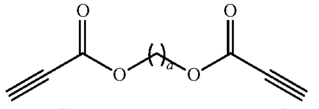

or

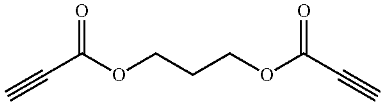

where a is an integer from 1 to 12. In some embodiments, the bioresorbable elastomer composition of the present invention includes any one or more of the above referenced embodiments of the first aspect of the present invention, wherein the substantially linear dithiol is a $C_4$ to $C_{20}$ linear dithiol. In various embodiments, the bioresorbable elastomer composition of the present invention includes any one or more of the above referenced embodiments of the first aspect of the present invention wherein the substantially linear dithiol is selected from a group consisting of poly (ethylene glycol) dithiol, hexa(ethylene glycol) dithiol, tetra (ethylene glycol) dithiol, 2,2'-(ethylenedioxy)diethanethiol, 1,4-benzenedimethanethiol, 2-mercaptoethyl ether, 1,2-mthanedithiol, 1,4-butanedithiol, 1,6-hexanedithiol, 1,8-octanedithiol, 1,10-decanedithiol, 1,12-dodecanedithiol, 1,14-butadecanedithiol, 1,16-hexadecanedithiol, 1,18-octadecanedithiol, L-(−)-dithiothreitol, and combinations thereof.

In one or more embodiments, the bioresorbable elastomer composition of the present invention includes any one or more of the above referenced embodiments of the first aspect of the present invention, wherein the $C_4$ to $C_{14}$ dicarboxylic acid-based dithiol has the formula:

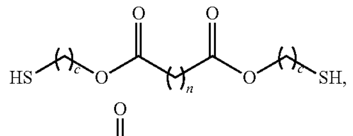

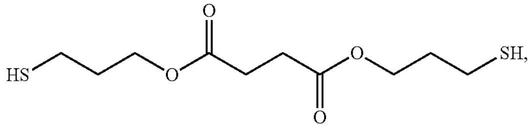

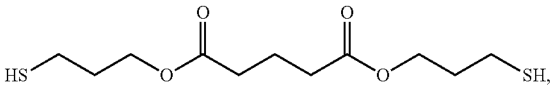

or

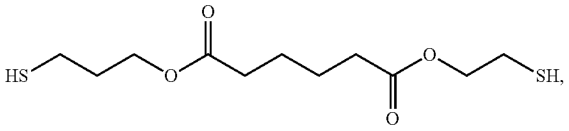

wherein c is an integer from 1 to 5 and n is an integer from 2 to 12.

In various embodiments, the bioresorbable elastomer composition of the present invention will have the formula:

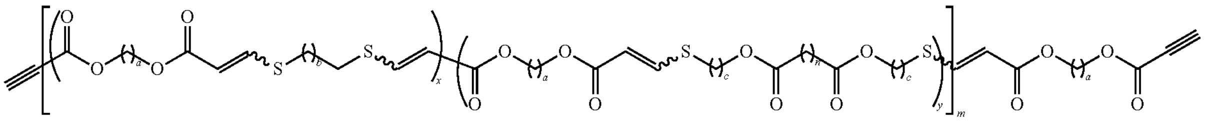

wherein each a is an integer from 1 to 12; each b is an integer from 1 to 19; each c is an integer from 2 to 5; n is an integer from 2 to 12; x and y are mole fractions; ∿∿ indicates a stereochemically controlled bond that could be in a cis or a trans configuration with respect to the adjacent carbon double bond; and m is an integer from 10 to 500. In one or more embodiments, y is a mole fraction from about 0.05 to about 0.95. In some of these embodiments, y is a mole fraction from about 0.20 to about 0.80.

In one or more embodiments, the bioresorbable elastomer composition of the present invention includes any one or more of the above referenced embodiments of the first aspect of the present invention having the formula:

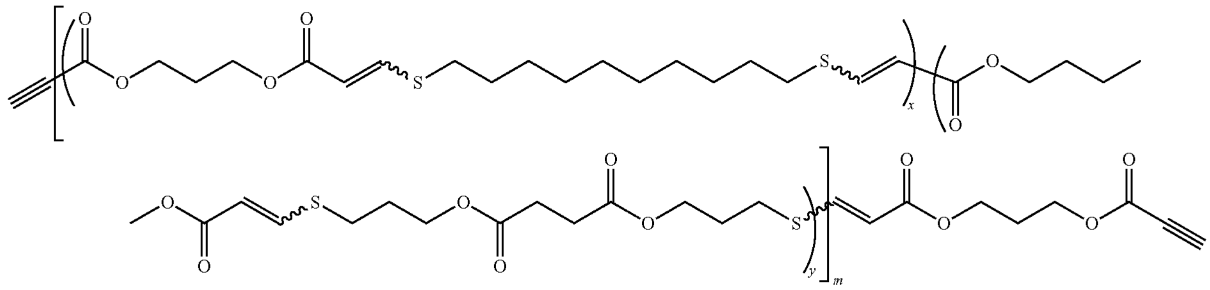

wherein x and y are mole fractions; " " indicates a stereochemically controlled bond that could be in a cis or a trans configuration with respect to the adjacent carbon double bond and m is an integer from 10 to 500. In some of these embodiments, y is a mole fraction from about 0.05 to about 0.95.

In one or more embodiments, the bioresorbable elastomer composition of the present invention comprises the thiol-yne step-growth reaction product of a substantially linear $C_1$ to $C_{12}$ bis-propiolate, a substantially linear $C_4$ to $C_{20}$ linear dithiol, and a succinic acid, glutaric acid, or adipic acid-based dithiol.

In one or more embodiments, the bioresorbable elastomer composition of the present invention includes any one or more of the above referenced embodiments of the first aspect of the present invention having a number average molecular weight ($M_n$) of from about 10 KDa to about 200 KDa. In some embodiments, the bioresorbable elastomer composition of the present invention includes any one or more of the above referenced embodiments of the first aspect of the present invention having an elastic modulus (E) of from about 1 to about 40 MPa. In some embodiments, the bioresorbable elastomer composition of the present invention includes any one or more of the above referenced embodiments of the first aspect of the present invention having an elongation at break ($\varepsilon_{break}$) of from about 1000% or more to about 3200% or less. In one or more embodiments, the bioresorbable elastomer composition of the present invention includes any one or more of the above referenced embodiments of the first aspect of the present invention having a glass transition temperature ($T_g$) of from about −10° C. to about 10° C.

In a second aspect, the present invention is directed to a bioresorbable and functionalizable thiol-yne elastomer for biomaterial applications comprising the residue of a $C_4$ to $C_{14}$ dicarboxylic acid-based bis-propiolate; the reside of a substantially linear dithiol; and an alkyne functionalized bis or tris-propiolate, wherein at least 50% of the double bonds are in a cis configuration.

In one or more embodiments, the bioresorbable and functionalizable thiol-yne elastomer of the present invention includes any one or more of the above referenced embodiments of the second aspect of the present invention wherein the $C_4$ to $C_{14}$ dicarboxylic acid-based bis-propiolate has the formula:

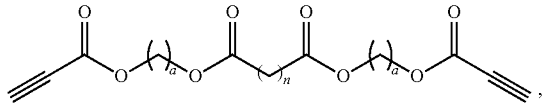

,

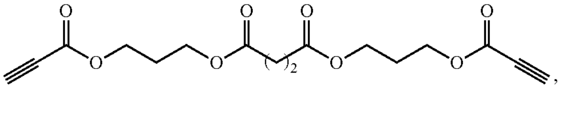

,

-continued

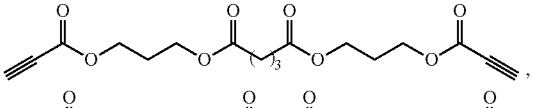

, or

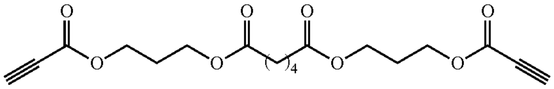

wherein a is an integer from 2 to 5 and n is an integer from 2 to 12.

In one or more embodiments, the bioresorbable and functionalizable thiol-yne elastomer of the present invention includes any one or more of the above referenced embodiments of the second aspect of the present invention wherein the alkyne functionalized bis or tris-propiolate has the formula:

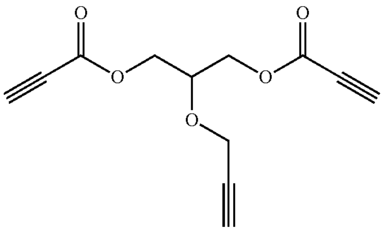

or

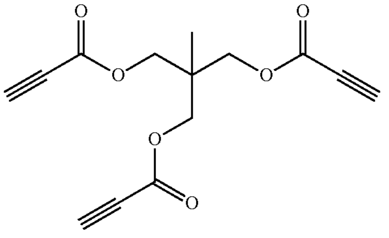

.

In one or more embodiments, the bioresorbable and functionalizable thiol-yne elastomer of the present invention includes any one or more of the above referenced embodiments of the second aspect of the present invention wherein the substantially linear dithiol is a $C_4$ to $C_{20}$ linear dithiol.

In one or more embodiments, the bioresorbable and functionalizable thiol-yne elastomer of the present invention includes any one or more of the above referenced embodiments of the second aspect of the present invention comprising the thiol-yne step-growth reaction product of a $C_4$ to $C_{14}$ succinic acid, glutaric acid, or adipic acid-based bis-propiolate, a $C_4$ to $C_{20}$ linear dithiol, and 2-(prop-2-yn-1-yloxy)propane-1,3-diyl dipropiolate.

In one or more embodiments, the bioresorbable and functionalizable thiol-yne elastomer of the present invention includes any one or more of the above referenced embodiments of the second aspect of the present invention wherein the alkyne functionalized bis or tris-propiolate monomer is 2-(prop-2-yn-1-yloxy)propane-1,3-diyl dipropiolate.

In one or more embodiments, the bioresorbable and functionalizable thiol-yne elastomer of the present invention includes any one or more of the above referenced embodiments of the second aspect of the present invention having the formula:

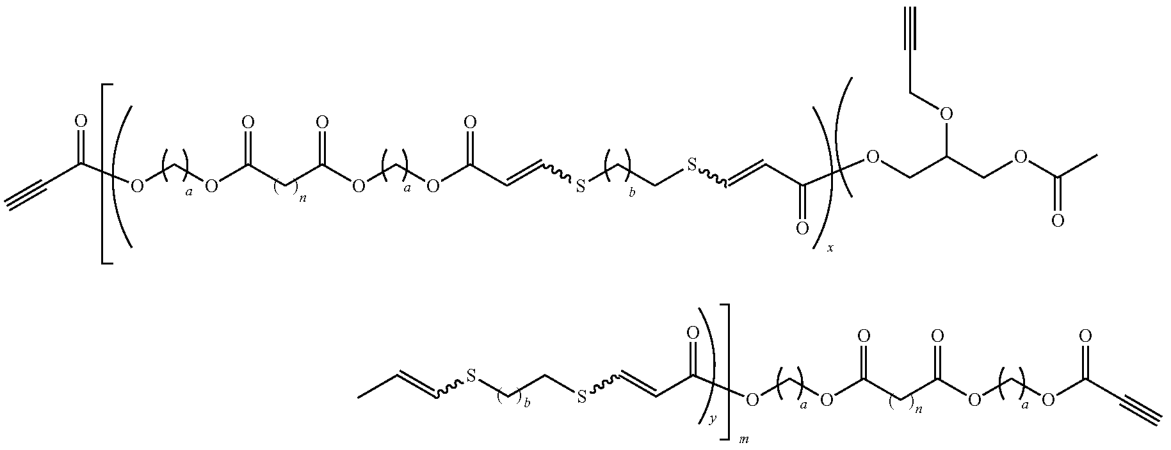

or

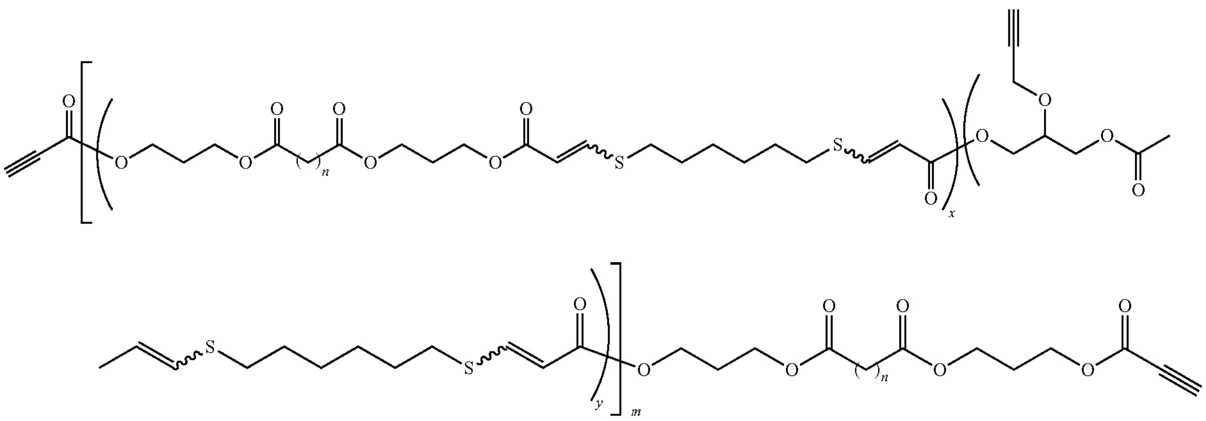

wherein each a is an integer from 2 to 5; each b is an integer from 1 to 19; each n is an integer from 2 to 20; x and y are mole fractions; ∿∿ indicates a stereochemically controlled bond that could be in a cis or a trans configuration with respect to the adjacent carbon double bond; and m is an integer from 10 to 500.

In one or more embodiments, the bioresorbable and functionalizable thiol-yne elastomer of the present invention includes any one or more of the above referenced embodiments of the second aspect of the present invention having the formula:

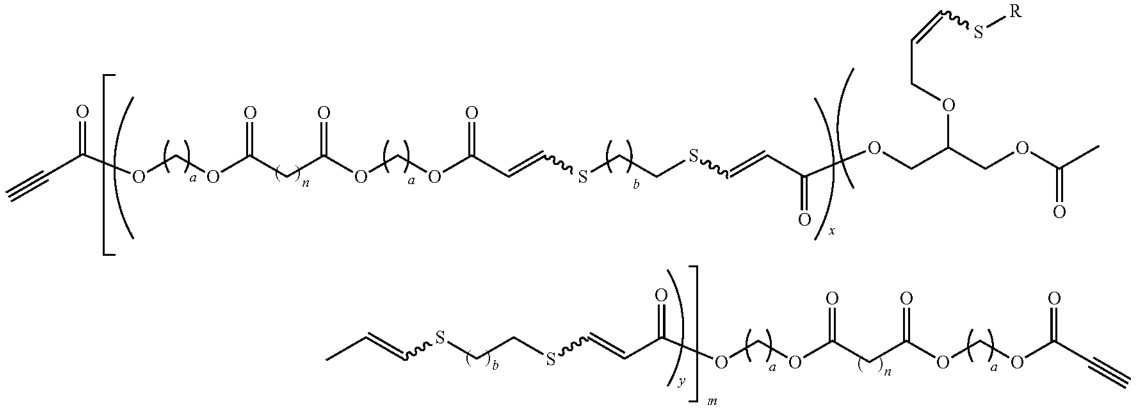

,

-continued

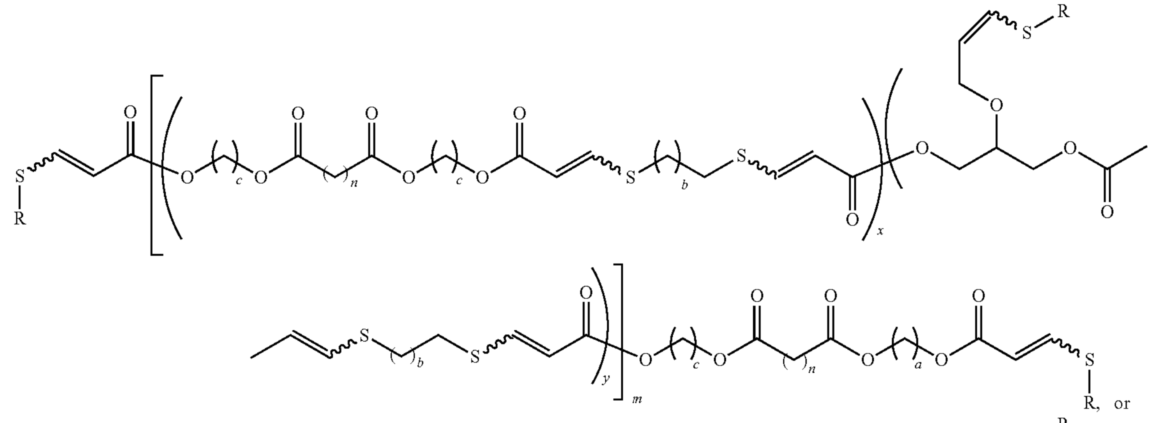

, or

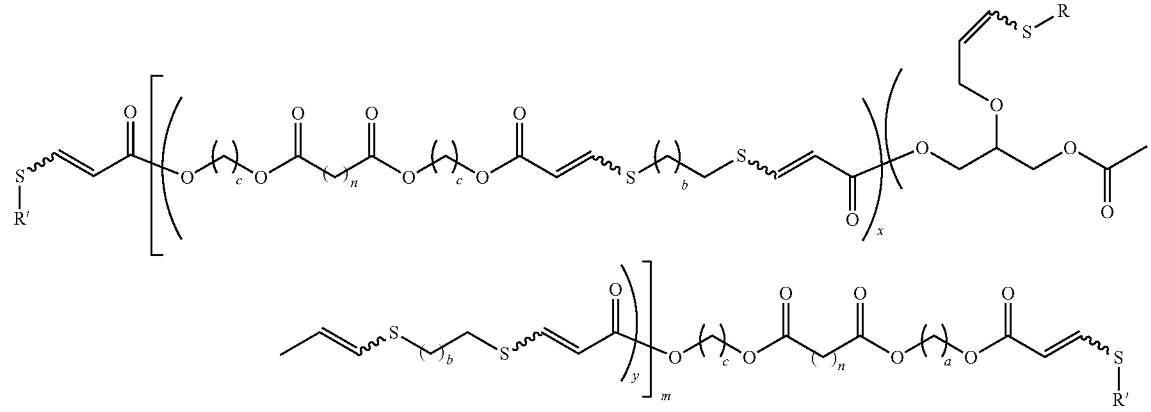

, wherein each a is an integer from 2 to 5; each b is an integer from 1 to 19; each n is an integer from 2 to 20; x and y are mole fractions; ~~~ indicates a stereochemically controlled bond that could be in a cis or a trans configuration with respect to the adjacent carbon double bond; m is an integer from 10 to 500; and R and R' are each a functional group, wherein R and R' may be the same or different. In one or more of these embodiments, R is a zwitterionic compound, peptide, oligonucleotide, thiol containing small molecule drug, protein, or a combination thereof.

In a third aspect, the present invention is directed to a method for making the bioresorbable elastomer composition described above comprising the steps of: combining a linear $C_4$-$C_{14}$ dicarboxylic acid-based dithiol monomer, a linear bis-propiolate monomer, a substantially linear dithiol, with a suitable reaction solvent or solvent combination in a suitable reaction vessel; cooling the combination to a temperature of from about −30° C. to about 10° C., adding an organic base catalyst, and allowing the reaction to continue for from about 1 min to 120 about min to produce a crude biodegradable elastomer composition; adding a second quantity of said linear bis-propiolate monomer to the reaction vessel to react with any available thiol groups in the crude polymer and produce the bioresorbable elastomer composition described above; and collecting and purifying the bioresorbable elastomer composition described above. In some embodiments, the method further comprises diluting the mixture with a suitable solvent or solvent combination and adding one or more radical inhibitors to prevent unwanted side reactions before said steps of collecting and purifying.

In one or more of these embodiments, the linear bis-propiolate monomer is selected from the group consisting of 1,3-propane diyl dipropiolate, 1,4-butane diyl dipropiolate, 1,5-pentane diyl dipropiolate, 1,6-hexane diyl dipropiolate, 1,7-heptane diyl dipropiolate, 1,8-octane diyl dipropiolate, 1,9-nonane diyl dipropiolate, 1,10-decane diyl dipropiolate, 1,12-dodecane diyl dipropiolate and combinations thereof. In some of these embodiments, the linear bis-propiolate monomer has the formula:

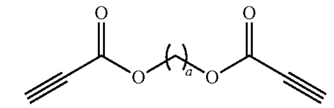

or

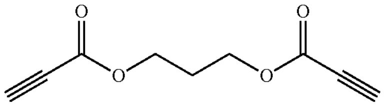

where a is an integer from 2 to 12.

In one or more embodiments, the method for making the bioresorbable elastomer composition of the present invention includes any one or more of the above referenced embodiments of the third aspect of the present invention, wherein said linear $C_4$-$C_{14}$ dicarboxylic acid-based dithiol monomer has the formula:

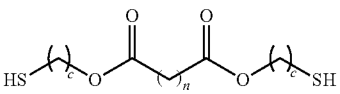

wherein c is an integer from 1 to 5 and n is an integer from 2 to 12. In one or more embodiments, the method for making the bioresorbable elastomer composition of the present invention includes any one or more of the above referenced embodiments of the third aspect of the present invention, wherein said linear $C_4$-$C_{14}$ dicarboxylic acid-based dithiol monomer is a succinic acid, glutaric acid, or adipic acid-based dithiol monomer having the formula:

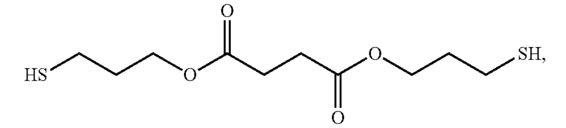

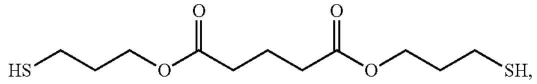

or

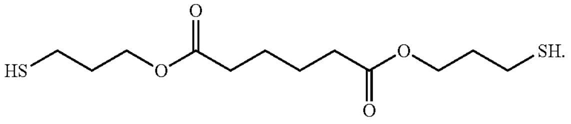

In one or more embodiments, the method for making the bioresorbable elastomer composition of the present invention includes any one or more of the above referenced embodiments of the third aspect of the present invention, wherein said suitable reaction solvent or solvent combination is a polar solvent having a dielectric constant of 4 or more. In one or more embodiments, the method for making the bioresorbable elastomer composition of the present invention includes any one or more of the above referenced embodiments of the third aspect of the present invention, wherein said reaction solvent or solvent combination is a polar solvent having a relative polarity of from about 0.2 or more to about 0.4 or less. In one or more embodiments, the method for making the bioresorbable elastomer composition of the present invention includes any one or more of the above referenced embodiments of the third aspect of the present invention, wherein said reaction solvent or solvent combination is selected from the group consisting of chloroform ($CHCl_3$), N,N-dimethylformamide (DMF), dimethyl sulfoxide (DMSO), N-methylpyrolidone (NMP), $CHCl_3$/DMF) mixtures, $CHCl_3$/NMP mixtures and cosolvent combinations thereof.

In one or more embodiments, the method for making the bioresorbable elastomer composition of the present invention includes any one or more of the above referenced embodiments of the third aspect of the present invention, wherein said organic base catalyst is selected from the group consisting of 1,8-diazabicyclo[5.4.0]undec-7-ene (DBU), trimethylamine ($Et_3N$), triazabicyclodecene (TBD), tetramethyl guanidine (TMG), benzotriazole, dimethylphenylphosphine (DMPP), and combinations thereof.

In a fourth aspect, the present invention is directed to a method for making the bioresorbable and functionalizable thiol-yne elastomer described above comprising the steps of: combining a linear $C_4$ to $C_{20}$ dicarboxylic acid-based bis-propiolate, a $C_4$ to $C_{20}$ linear dithiol, and 2-(prop-2-yn-1-yloxy)propane-1,3-diyl dipropiolate with a suitable reaction solvent or solvent combination in a suitable reaction vessel; cooling the combination to a temperature of from about from about −30° C. to about 10° C., adding an organic base catalyst, and allowing the reaction to continue for from about 1 min to 120 about min to produce a crude bioresorbable and functionalizable thiol-yne elastomer; adding a second quantity of said linear $C_4$ to $C_{20}$ dicarboxylic acid-based bis-propiolate to the reaction vessel to react with any available thiol groups in the crude polymer and produce the bioresorbable and functionalizable thiol-yne elastomer; and collecting and purifying the bioresorbable and functionalizable thiol-yne elastomer described above. In some embodiments, the method further comprises diluting the mixture with a suitable solvent or solvent combination and adding one or more radical inhibitors to prevent unwanted side reactions before said steps of collecting and purifying.

In various embodiments, the method for making the bioresorbable and functionalizable thiol-yne elastomer of the present invention includes any one or more of the above referenced embodiments of the fourth aspect of the present invention, wherein said linear $C_4$ to $C_{20}$ dicarboxylic acid-based bis-propiolate has the formula:

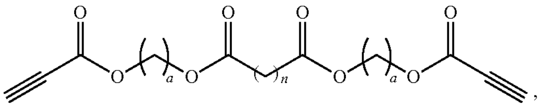

where a is an integer from 2 to 5 and n is an integer from 2 to 12.

In one or more embodiments, the method for making the bioresorbable and functionalizable thiol-yne elastomer of the present invention includes any one or more of the above referenced embodiments of the fourth aspect of the present invention, wherein said suitable reaction solvent or solvent combination is a polar solvent having a dielectric constant of 4 or more. In some embodiments, the method for making the bioresorbable and functionalizable thiol-yne elastomer of the present invention includes any one or more of the above referenced embodiments of the fourth aspect of the present invention, wherein said reaction solvent or solvent combination is a polar solvent having a relative polarity of from about 0.2 or more to about 0.4 or less. In one or more embodiments, the method for making the bioresorbable and functionalizable thiol-yne elastomer of the present invention includes any one or more of the above referenced embodiments of the fourth aspect of the present invention, wherein said reaction solvent or solvent combination is selected from the group consisting of chloroform ($CHCl_3$), N,N-dimethylformamide (DMF), dimethyl sulfoxide (DMSO), N-methylpyrolidone (NMP), $CHCl_3$/DMF) mixtures, $CHCl_3$/NMP mixtures and cosolvent combinations thereof.

In various embodiments, the method for making the bioresorbable and functionalizable thiol-yne elastomer of the present invention includes any one or more of the above referenced embodiments of the fourth aspect of the present invention, wherein said organic base catalyst is selected from the group consisting of 1,8-diazabicyclo[5.4.0]undec-7-ene (DBU), trimethylamine ($Et_3N$), triazabicyclodecene (TBD), tetramethyl guanidine (TMG), benzotriazole, dimethylphenylphosphine (DMPP), and combinations thereof.

In a fifth aspect, the present invention is directed to a $C_4$-$C_{14}$ dicarboxylic acid-based dithiol monomer for use in forming the degradable elastomer composition described above comprising two ester bonds degradable in the presence of bodily fluids and two terminal thiol functional groups. In various embodiments of the fifth aspect of the present invention, the invention comprises a $C_4$-$C_{14}$ dicarboxylic acid-based dithiol monomer having the formula:

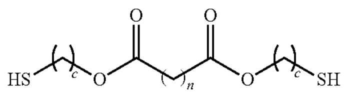

wherein c is an integer from 2 to 5 and n is an integer from 2 to 12, and any salts, esters, and derivatives thereof. In some other embodiments, the $C_4$-$C_{14}$ dicarboxylic acid-based dithiol monomer having the formula:

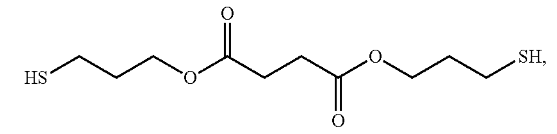

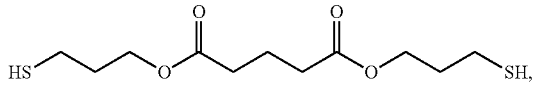

or

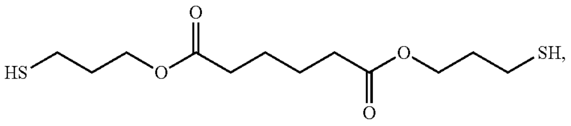

and any salts, esters, and derivatives thereof.

In a sixth aspect, the present invention is directed to a linear $C_4$-$C_{14}$ dicarboxylic acid-based bis-propiolate monomer for use in forming the elastomer described above comprising four or more ester bonds degradable in the presence of bodily fluids and two terminal alkyne functional groups. In some embodiments of this aspect of the present invention, the linear $C_4$-$C_{14}$ dicarboxylic acid-based bis-propiolate monomer will have the formula:

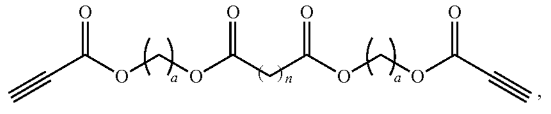

wherein a is an integer from 2 to 5 and n is an integer from 2 to 12. In some other embodiments of this aspect of the invention, the linear $C_4$-$C_{14}$ dicarboxylic acid-based bis-propiolate monomer will have the formula:

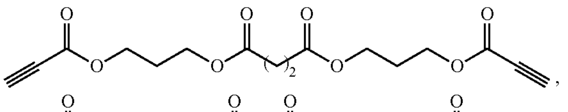

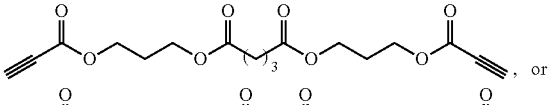

or

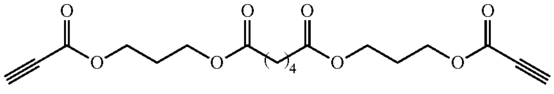

and any salts, esters, and derivatives thereof.

In yet another aspect, the present invention is directed to a bioresorbable compound comprising the general formula:

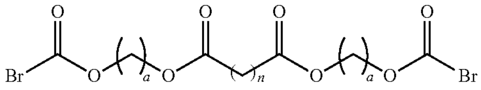

where a is an integer from 2 to 5 and n is 2, 3, or 4, and any salts, esters, and derivatives thereof. In some embodiments of this aspect of the invention, the bioresorbable compound (termed bis(3-bromopropyl)succinate) will have the general formula:

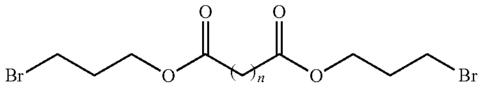

wherein n=2, 3, or 4.

In still another aspect, the present invention is directed to a bioresorbable monomer (termed 2-(prop-2-yn-1-yloxy) propane-1,3-diyl dipropiolate) having the general formula:

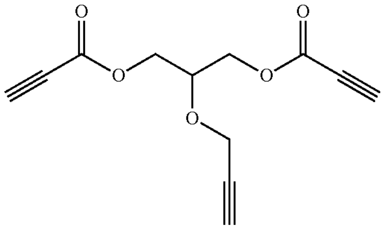

and any salts, esters, and derivatives thereof.

In another aspect, the present invention is directed to a zwitterionic bioresorbable thiol-yne elastomer for biomaterial applications having: a polymer backbone comprising a residue of a $C_4$ to $C_{14}$ dicarboxylic acid-based bis-propiolate; the reside of a substantially linear dithiol; and the residue of an alkyne functionalized bis or tris-propiolate, wherein at least 50% of the double bonds are in a cis configuration; and at least one zwitterionic side chain connected to said polymer backbone at the residue of said alkyne functionalized bis or tris-propiolate via a thiol-ene bond, said zwitterionic side chain comprising the residue of a zwitterionic thiol. In one or more embodiments, the $C_4$ to $C_{14}$ dicarboxylic acid-based bis-propiolate has the formula:

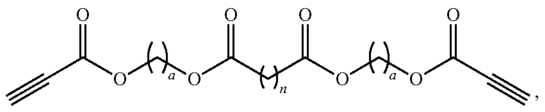

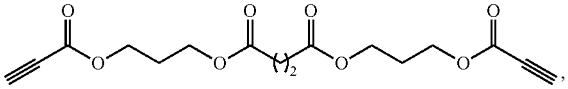

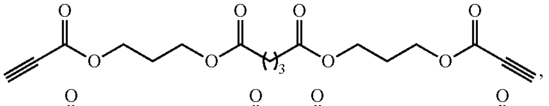

or

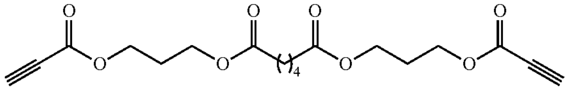

wherein a is an integer from 2 to 5 and n is an integer from 2 to 12.

In some embodiments, the alkyne functionalized bis or tris-propiolate has the formula:

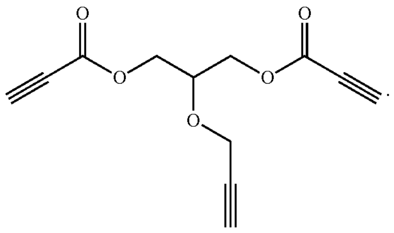 [SMILES: C#CCOC(COC(=O)C#C)COC(=O)C#C]

In some of these embodiments, the alkyne functionalized bis or tris-propiolate monomer is 2-(prop-2-yn-1-yloxy)propane-1,3-diyl dipropiolate. In some embodiments, the substantially linear dithiol is a $C_4$ to $C_{20}$ linear dithiol. In various embodiments, the zwitterionic bioresorbable thiol-yne elastomer of the present invention includes any one or more of the above referenced embodiments of this aspect of the present invention, comprising the thiol-yne step-growth reaction product of a $C_4$ to $C_{14}$ succinic acid, glutaric acid, or adipic acid-based bis-propiolate, a $C_4$ to $C_{20}$ linear dithiol, and 2-(prop-2-yn-1-yloxy)propane-1,3-diyl dipropiolate.

In various embodiments, the zwitterionic bioresorbable thiol-yne elastomer of the present invention includes any one or more of the above referenced embodiments of this aspect of the present invention, wherein said zwitterionic side chains comprise a linear hydrocarbon chain of from about 6 to about 80 atoms in length comprising an ammonium ion. In various embodiments, the zwitterionic bioresorbable thiol-yne elastomer of the present invention includes any one or more of the above referenced embodiments of this aspect of the present invention, wherein said zwitterionic thiol comprises a zwitterionic functional group and a terminal thiol group. In various embodiments, the zwitterionic bioresorbable thiol-yne elastomer of the present invention includes any one or more of the above referenced embodiments of this aspect of the present invention, wherein the zwitterionic functional group comprises an ammonium ion or a sulfonic acid. In various embodiments, the zwitterionic bioresorbable thiol-yne elastomer of the present invention includes any one or more of the above referenced embodiments of this aspect of the present invention, wherein the zwitterionic functional group comprises a zwitterionic sulfobetaine, phosphobetaine, or carboxybetaine moiety.

In various embodiments, the zwitterionic bioresorbable thiol-yne elastomer of the present invention includes any one or more of the above referenced embodiments of this aspect of the present invention, zwitterionic side chains comprise the residue of 3-((3-((3-mercaptopropanoyl)oxy)propyl) dimethylammonio)propane-1-sulfonate. In various embodiments, the zwitterionic bioresorbable thiol-yne elastomer of the present invention includes any one or more of the above referenced embodiments of this aspect of the present invention, wherein said zwitterionic side chains comprise the residue of a zwitterionic thiol having the formula.

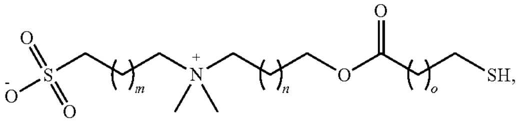

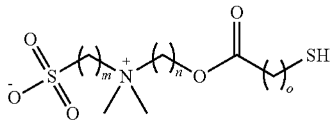

or

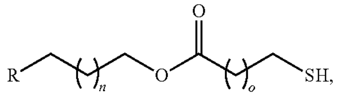

where R comprises a quaternary ammonium compound and a ring opened sultone; and m, n, and o are each an integer from 1 to 20. In various embodiments, the zwitterionic bioresorbable thiol-yne elastomer of the present invention includes any one or more of the above referenced embodiments of this aspect of the present invention, wherein said zwitterionic side chains comprise the residue of a zwitterionic thiol having the formula:

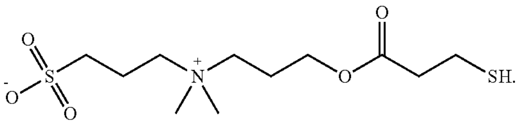

In various embodiments, the zwitterionic bioresorbable thiol-yne elastomer of the present invention includes any one or more of the above referenced embodiments of this aspect of the present invention having the formula:

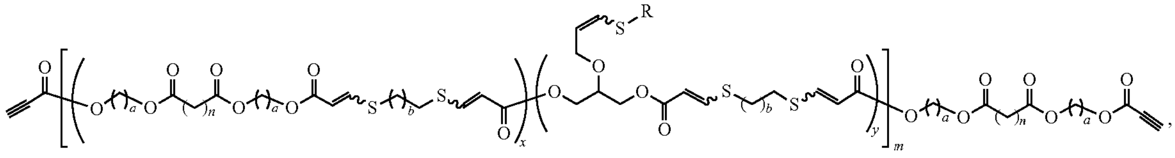

, or

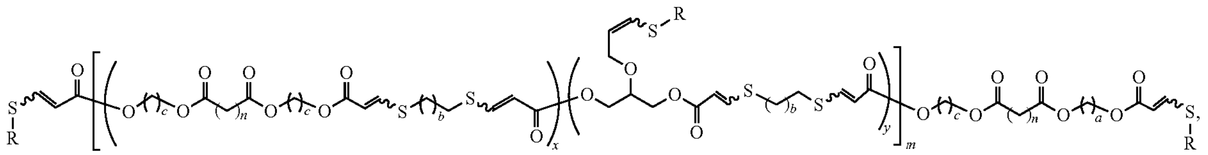

wherein each a is an integer from 2 to 5; each b is an integer from 1 to 19; each n is an integer from 2 to 20; x and y are mole fractions; ∼ indicates a stereochemically controlled bond that could be in a cis or a trans configuration with respect to the adjacent carbon double bond; m is an integer from 10 to 500; and R is a zwitterionic group.

In another aspect, the present invention is directed to a method for making the zwitterionic bioresorbable thiol-yne elastomer described above comprising: combining a linear $C_4$ to $C_{20}$ dicarboxylic acid-based bis-propiolate, a $C_4$ to $C_{20}$ linear dithiol, and 2-(prop-2-yn-1-yloxy)propane-1,3-diyl dipropiolate with a suitable reaction solvent or solvent combination in a suitable reaction vessel; cooling the combination to a temperature of from about from about −30° C. to about 10° C., adding an organic base catalyst, and allowing the reaction to continue for from about 1 min to 120 about min to produce a crude bioresorbable and functionalizable thiol-yne elastomer intermediate; adding a second quantity of said linear $C_4$ to $C_{20}$ dicarboxylic acid-based bis-propiolate to the reaction vessel to react with any available thiol groups in the crude polymer and produce the bioresorbable and functionalizable thiol-yne elastomer intermediate; adding a zwitterionic thiol and a radical initiator to the bioresorbable and functionalizable thiol-yne elastomer intermediate; irradiate the mixture with UV light to produce the zwitterionic bioresorbable thiol-yne elastomer.

In various embodiments, the method of the present invention includes any one or more of the above referenced embodiments of this aspect of the present invention, further comprising collecting and purifying the bioresorbable and functionalizable thiol-yne elastomer intermediate. In various embodiments, the method of the present invention includes any one or more of the above referenced embodiments of this aspect of the present invention wherein the method further comprises diluting the mixture with a suitable solvent or solvent combination and adding one or more radical inhibitors to prevent unwanted side reactions before said steps of collecting and purifying. In various embodiments, the method of the present invention includes any one or more of the above referenced embodiments of this aspect of the present invention wherein said linear $C_4$ to $C_{20}$ dicarboxylic acid-based bis-propiolate has the formula:

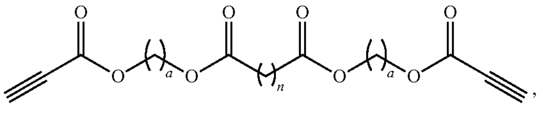

wherein a is an integer from 2 to 5 and n is an integer from 2 to 12.

In various embodiments, the method of the present invention includes any one or more of the above referenced embodiments of this aspect of the present invention wherein said suitable reaction solvent or solvent combination is a polar solvent having a dielectric constant of 4 or more. In various embodiments, the method of the present invention includes any one or more of the above referenced embodiments of this aspect of the present invention wherein said reaction solvent or solvent combination is a polar solvent having a relative polarity of from about 0.2 or more to about 0.4 or less.

In various embodiments, the method of the present invention includes any one or more of the above referenced embodiments of this aspect of the present invention wherein said organic base catalyst is selected from the group consisting of 1,8-diazabicyclo[5.4.0]undec-7-ene (DBU), trimethylamine ($Et_3N$), triazabicyclodecene (TBD), tetramethyl guanidine (TMG), benzotriazole, dimethylphenylphosphine (DMPP), and combinations thereof. In various embodiments, the method of the present invention includes any one or more of the above referenced embodiments of this aspect of the present invention wherein said reaction solvent or solvent combination is selected from the group consisting of chloroform ($CHCl_3$), N,N-dimethylformamide (DMF), dimethyl sulfoxide (DMSO), N-methylpyrolidone (NMP), $CHCl_3$/DMF) mixtures, $CHCl_3$/NMP mixtures and cosolvent combinations thereof.

In various embodiments, the method of the present invention includes any one or more of the above referenced embodiments of this aspect of the present invention wherein said bioresorbable and functionalizable thiol-yne elastomer intermediate the formula:

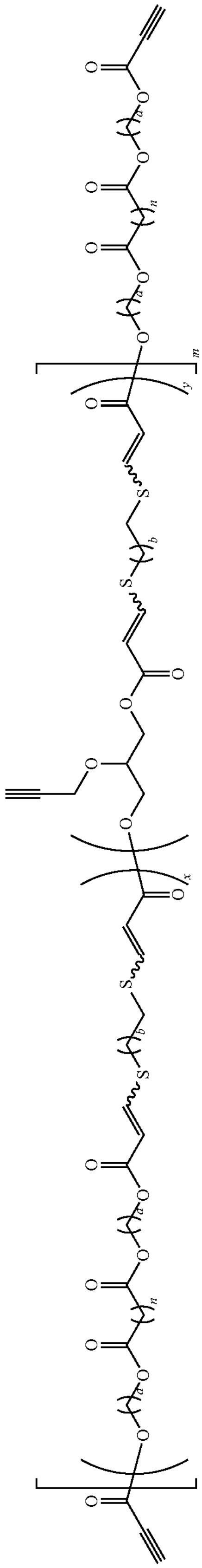
or
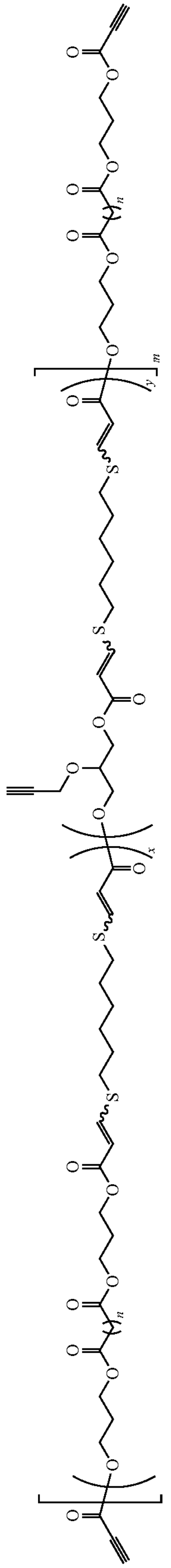

wherein each a is an integer from 2 to 5; each b is an integer from 1 to 19; each n is an integer from 2 to 20; x and y are mole fractions; ∿ indicates a stereochemically controlled bond that could be in a cis or a trans configuration with respect to the adjacent carbon double bond; and m is an integer from 10 to 500.

In another aspect, the present invention is directed to an anti-fouling polymer coating comprising the zwitterionic bioresorbable thiol-yne elastomer described above.

In yet another aspect, the present invention is directed to a macroporous composite mesh prosthesis comprising the anti-fouling polymer coating described above. In one or more of these embodiments, the macroporous composite mesh prosthesis of the present invention comprises a microporous bioresorbable polymer mesh having a first side and a second side, wherein only one of said first and second side comprises the anti-fouling polymer coating. In various embodiments, the macroporous composite mesh prosthesis of the present invention includes any one or more of the above referenced embodiments of this aspect of the present invention wherein said comprises a hernia mesh for use in treating abdominal hernias, having a visceral side comprising said anti-fouling polymer coating and a second side facing away from said visceral side.

In another aspect, the present invention is directed to a method of making the hernia mesh for use in treating abdominal hernias comprising: fabricating or obtaining a suitable microporous hernia mesh sized to fit over an abdominal hernia; prepare a zwitterionic bioresorbable thiol-yne elastomer having: a polymer backbone comprising a residue of a $C_4$ to $C_{14}$ dicarboxylic acid-based bis-propiolate; the reside of a substantially linear dithiol; and the residue of an alkyne functionalized bis or tris-propiolate, wherein at least 50% of the double bonds are in a cis configuration; and at least one zwitterionic side chain connected to said polymer backbone at the residue of said alkyne functionalized bis or tris-propiolate via a thiol-ene bond, said zwitterionic side chain comprising the residue of a zwitterionic thiol; coating one side of said microporous hernia mesh with said zwitterionic bioresorbable thiol-yne elastomer; immersing the coated microporous hernia mesh in an aqueous solution containing a zwitterionic thiol and a radical initiator; and exposing the zwitterionic bioresorbable thiol-yne elastomer to ultraviolet light to form a zwitterionic bioresorbable thiol-yne elastomer coating on one side of said microporous hernia mesh.

BRIEF DESCRIPTION OF THE DRAWINGS

For a more complete understanding of the features and advantages of the present invention, reference is now made to the detailed description of the invention along with the accompanying figures in which:

FIG. 11 is the SEC chromatogram of the P5 (80% cis) thiol-yne step-growth polymer with 50% incorporation of $C_{SS}$; $M_n$=45.4 kDa, $M_w$=94.9 kDa, $Đ_M$=2.09 (SEC $CHCl_3$, based on PS standards).

FIG. 12 is the $^1H$ NMR spectrum of P6 (with 60% $C_{SS}$) shows the 80% cis content for the thiol-yne step-growth copolymer with 60% incorporation of $C_{SS}$ in $CHCl_3$ with 1 mol % DBU. The ratio of resonance n (from $C_{SS}$) to resonance h (from $C_{3A}$) displays 60%: 40% that affords polymer P6 with 60% incorporation of $C_{SS}$ ($CDCl_3$, 500 MHz).

Figure 14A:
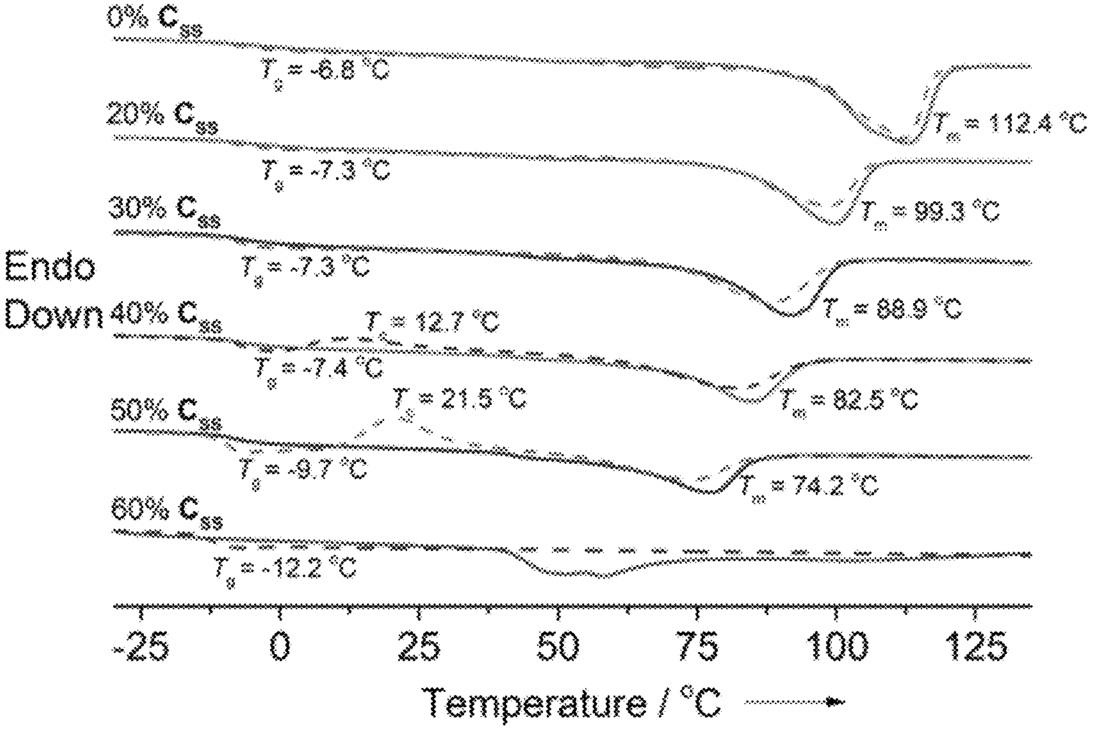
FIGS. 14A-B are a graphs showing the overlapped thermogram of differential scanning calorimetry (DSC) of P1 (0% $C_{SS}$), P2 (20% $C_{SS}$), P3 (30% $C_{SS}$), P4 (40% $C_{SS}$), P5
Figure 14B:
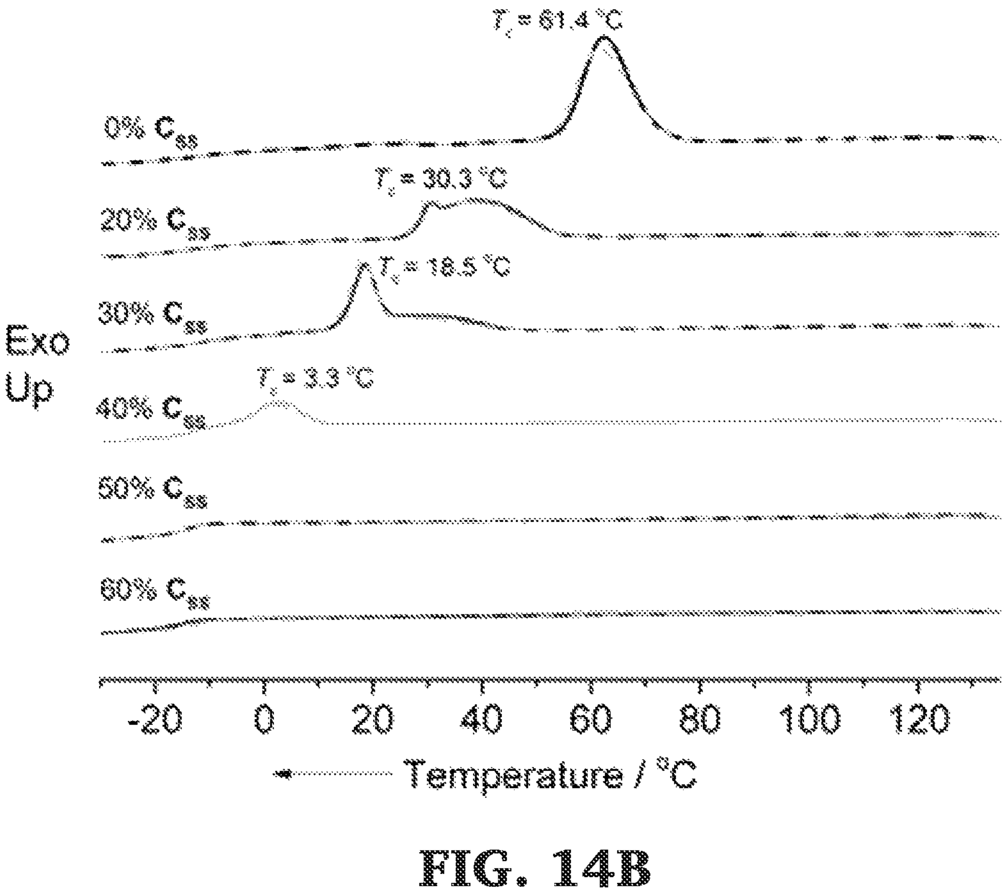
Figure 15A:
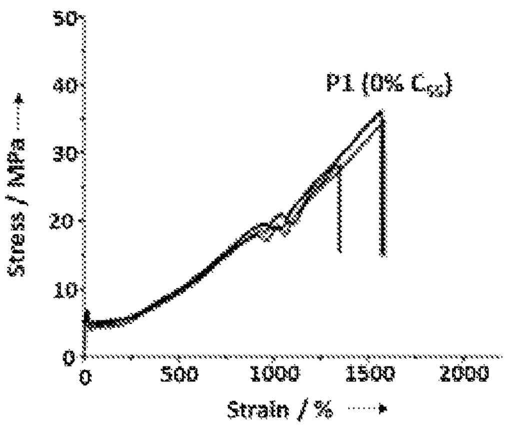
Figure 15B:
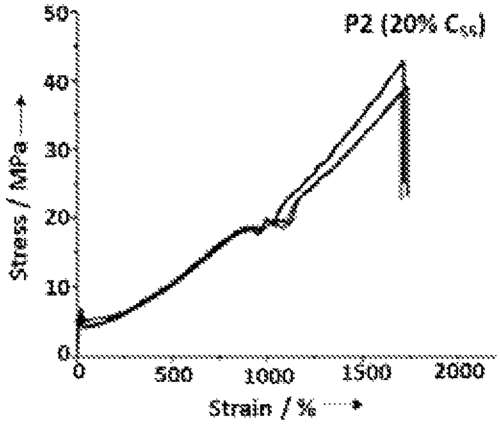
Figure 15C:
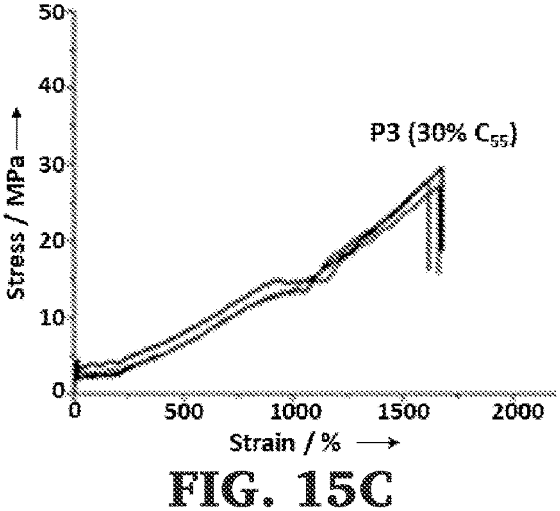
Figure 15D:
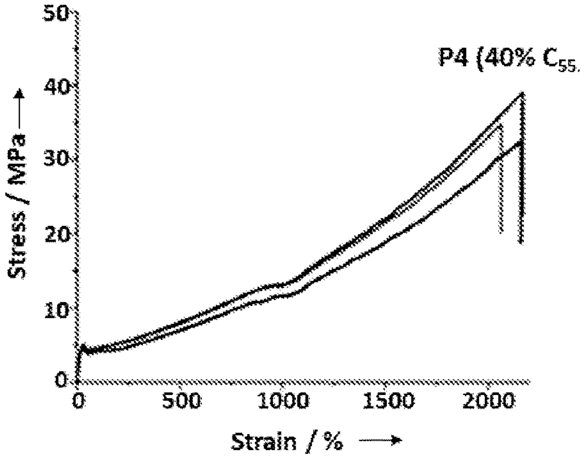
Figure 15E:
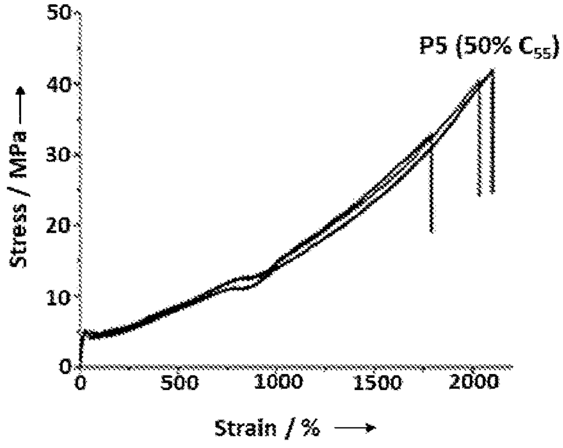
Figure 15F:
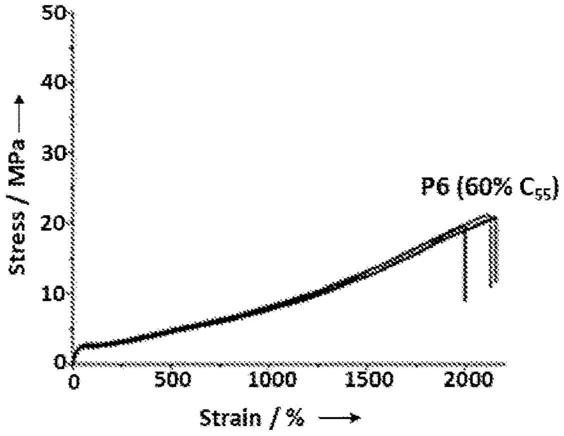

(50% $C_{SS}$), and P6 (60% $C_{SS}$) performed to determine glassy transition, melting, and crystalline temperature for each species by 2 cycles of heating-cooling (solid line: 1' cycle; dash line: $2^{nd}$ cycle) with endo down (FIG. 14A) and exo up (FIG. 14B).

FIG. 15A-F are exemplar stress vs. strain curves for (co)polymers (P1-P6) tested at 10 mm/min. Data for 3 samples are shown to illustrate the reproducibility.

Figure 16:
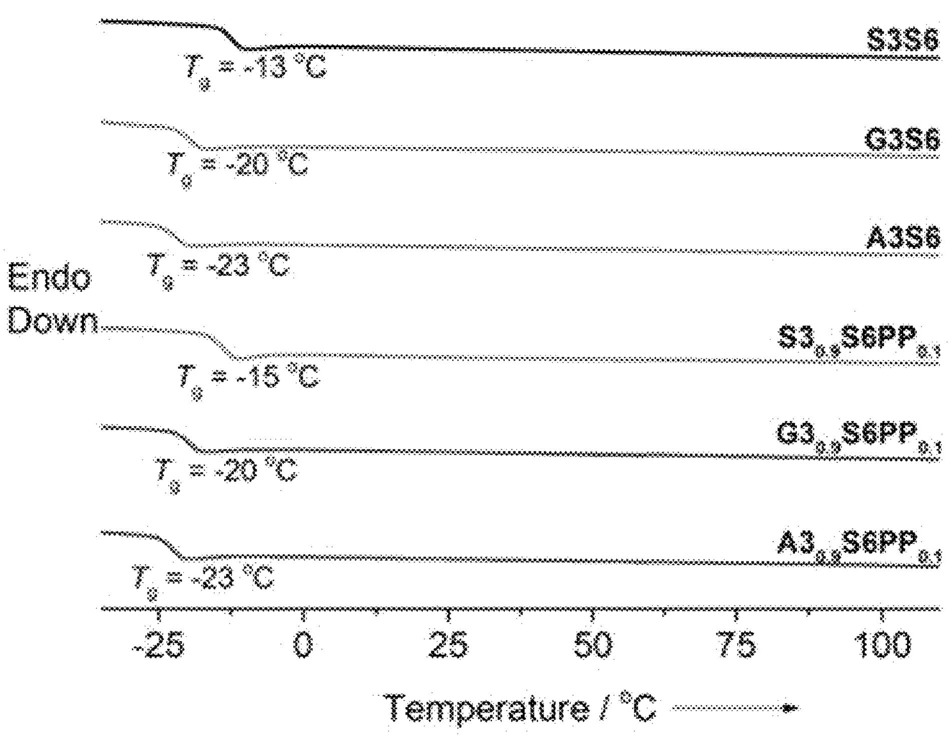

FIG. 16 is a graph showing the thermal properties of P1 (S3S6), P2 (G3S6), P3 (A3S6), P4 ($S3_{0.9}S6PP_{0.1}$), P5 ($G3_{0.9}S6PP_{0.1}$), and P6 ($A3_{0.9}S6PP_{0.1}$), specifically, a graph showing overlapped DSC thermogram data (endo down) for experiments performed to determine the degradation profile and glassy transition for each species.

Figure 17A:
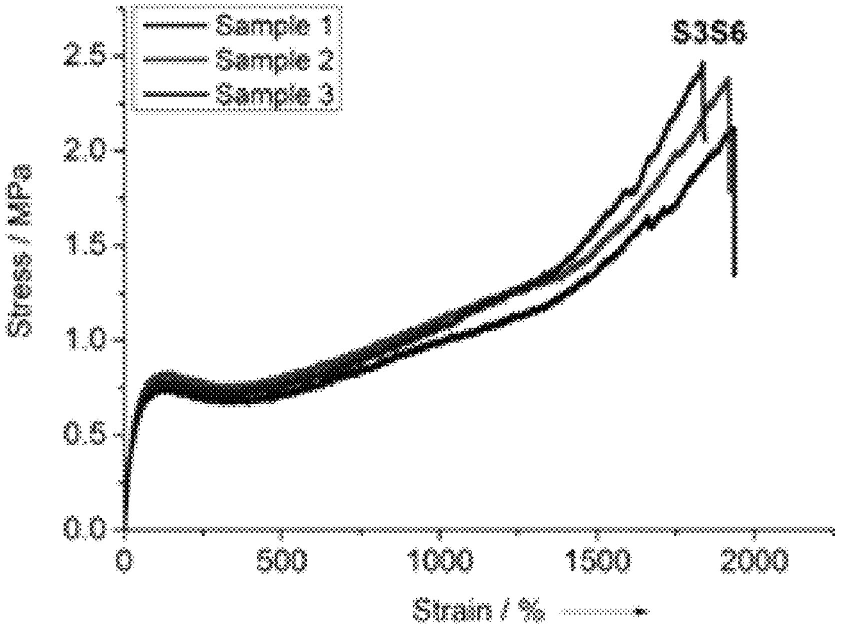
Figure 17B:
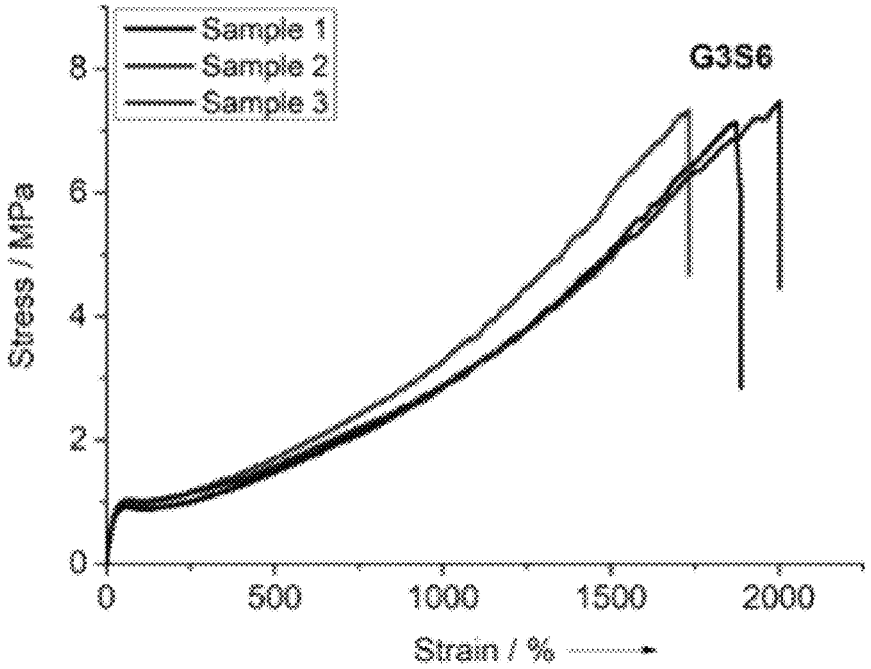
Figure 17C:
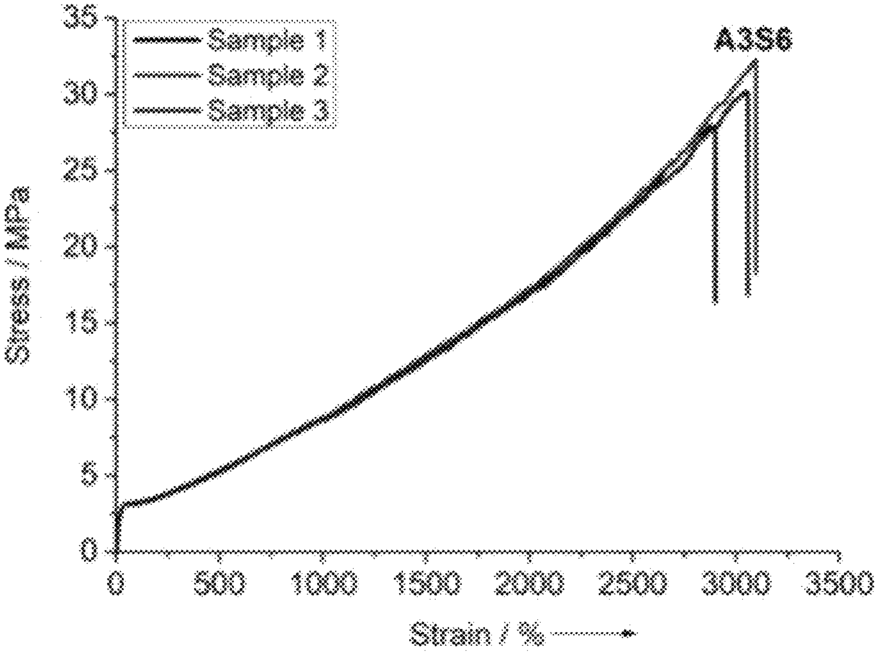

FIGS. 17A-C are complete stress vs. strain curves for P1 (S3S6) (FIG. 17A), P2 (G3S6) (FIG. 17B), and P3 (A3S6) (FIG. 17C). Data for three samples are shown to illustrate their reproducibility.

Figure 18:
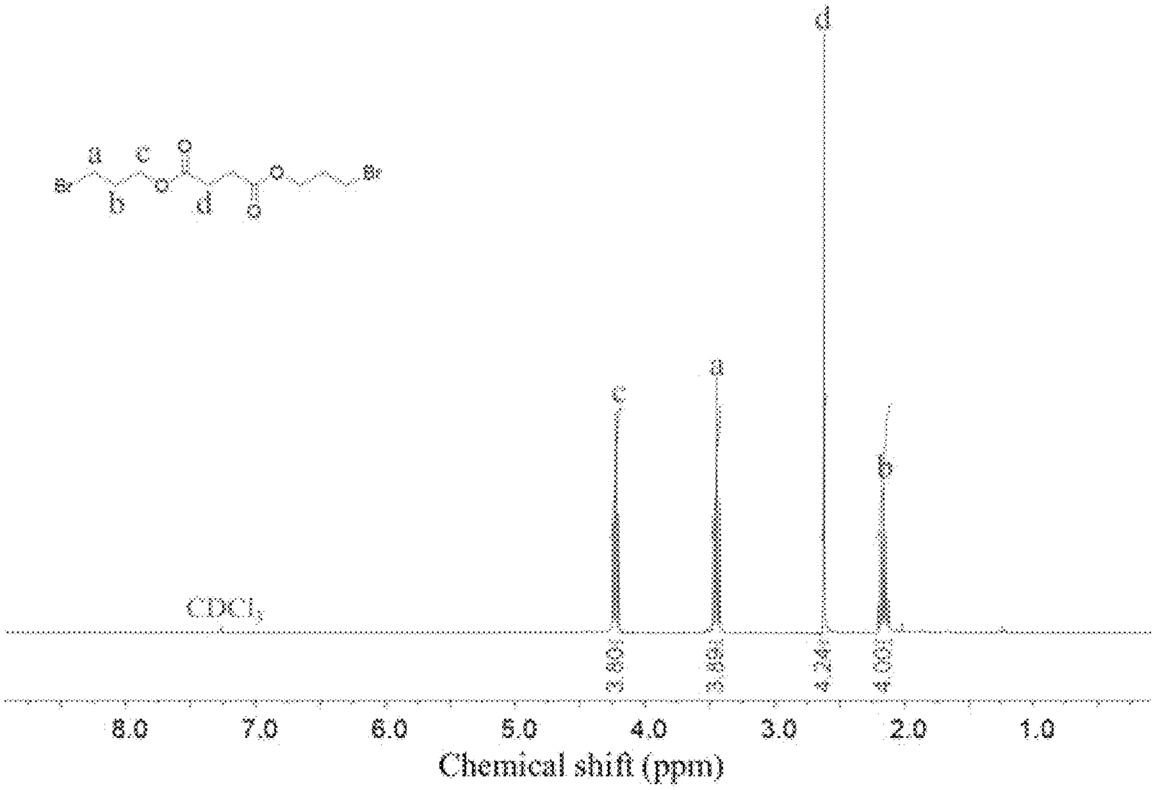

FIG. 18 is the $^1$H NMR spectrum of compound 1 showing resonance c which confirms ester formation and carboxylic groups were converted to ester groups completely ($CDCl_3$, 300 MHz).

Figure 19:
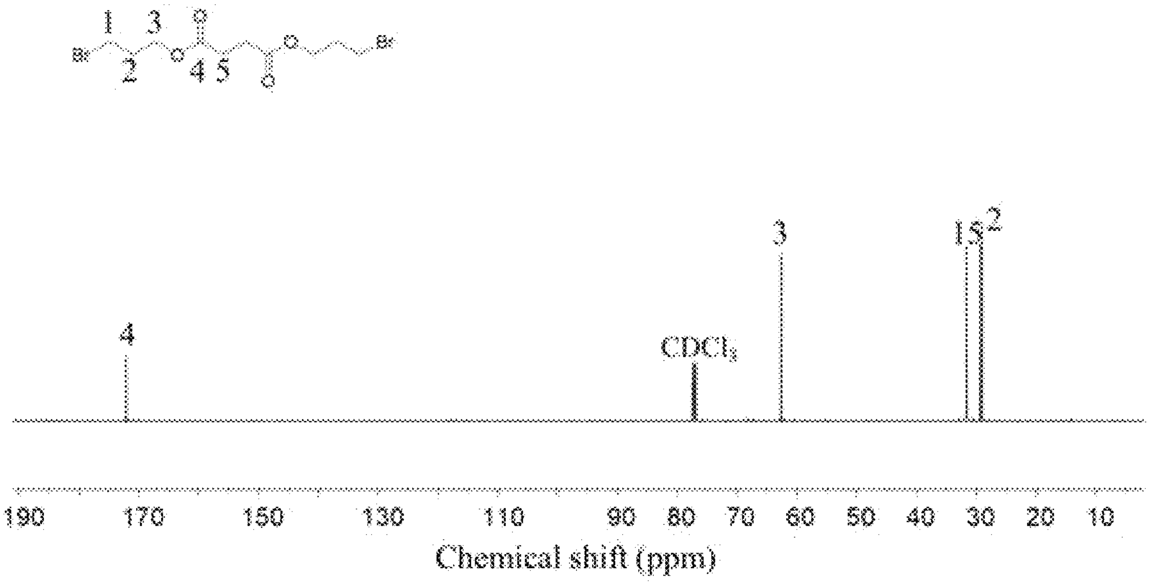

FIG. 19 is the $^{13}$C NMR spectrum of compound 1 displaying resonance 4 at 172.11 ppm corresponding to carbonyl group (C═O) of ester ($CDCl_3$, 75 MHz).

Figure 20:
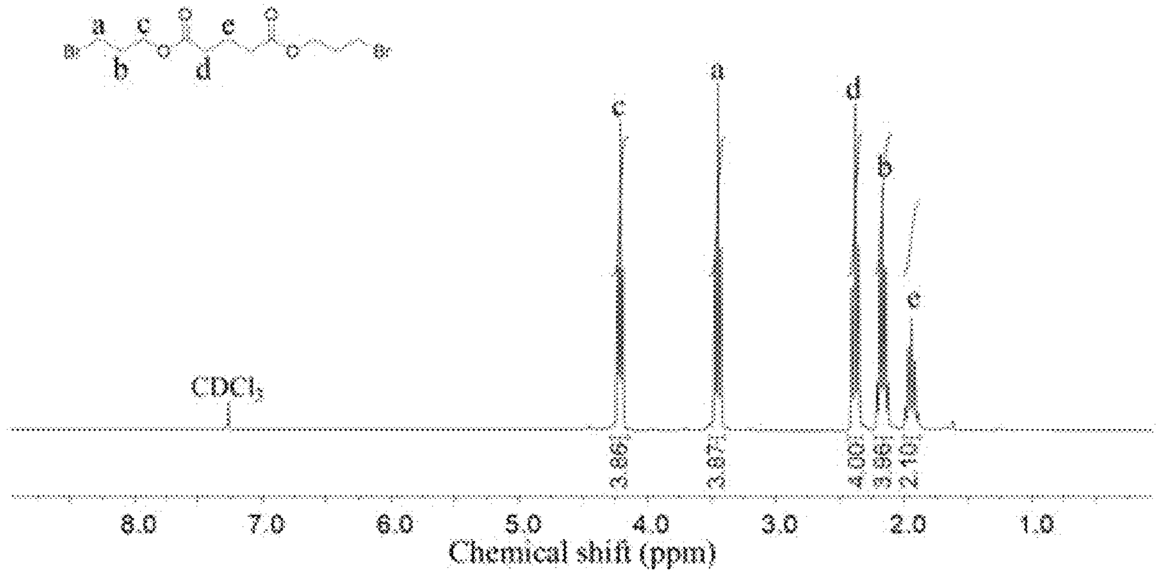

FIG. 20 is the $^1$H NMR spectrum of compound 2 showing resonance c which confirms ester formation and carboxylic groups were converted to ester groups completely ($CDCl_3$, 300 MHz).

Figure 21:
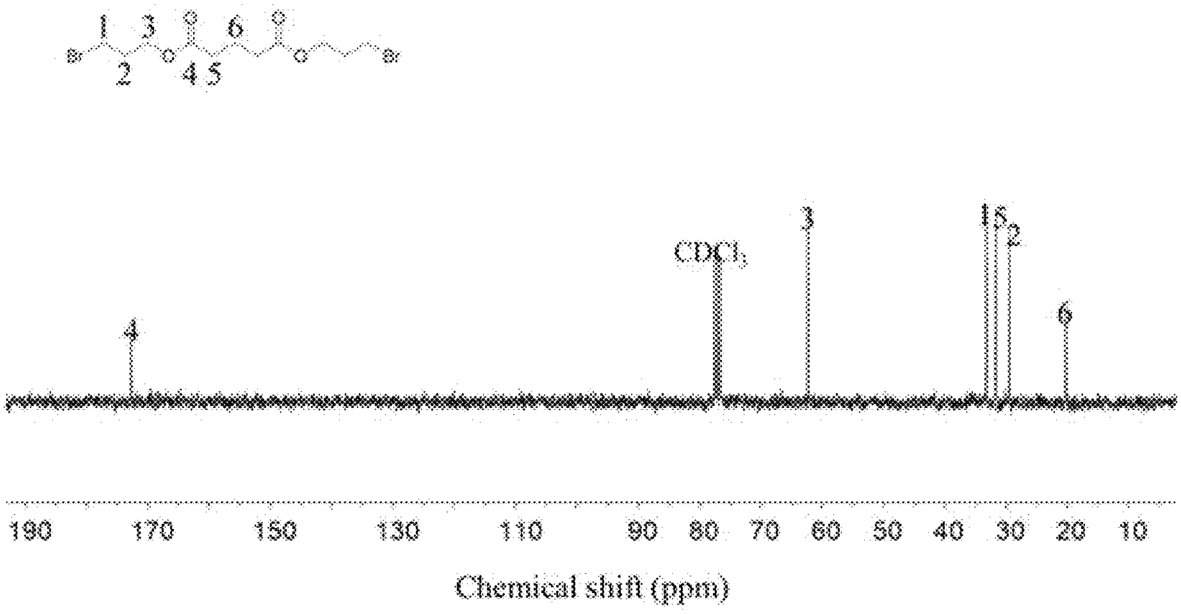

FIG. 21 is the $^{13}$C NMR spectrum of compound 2 displaying resonance 4 at 172.81 ppm corresponding to carbonyl group (C═O) of ester ($CDCl_3$, 75 MHz).

Figure 22:
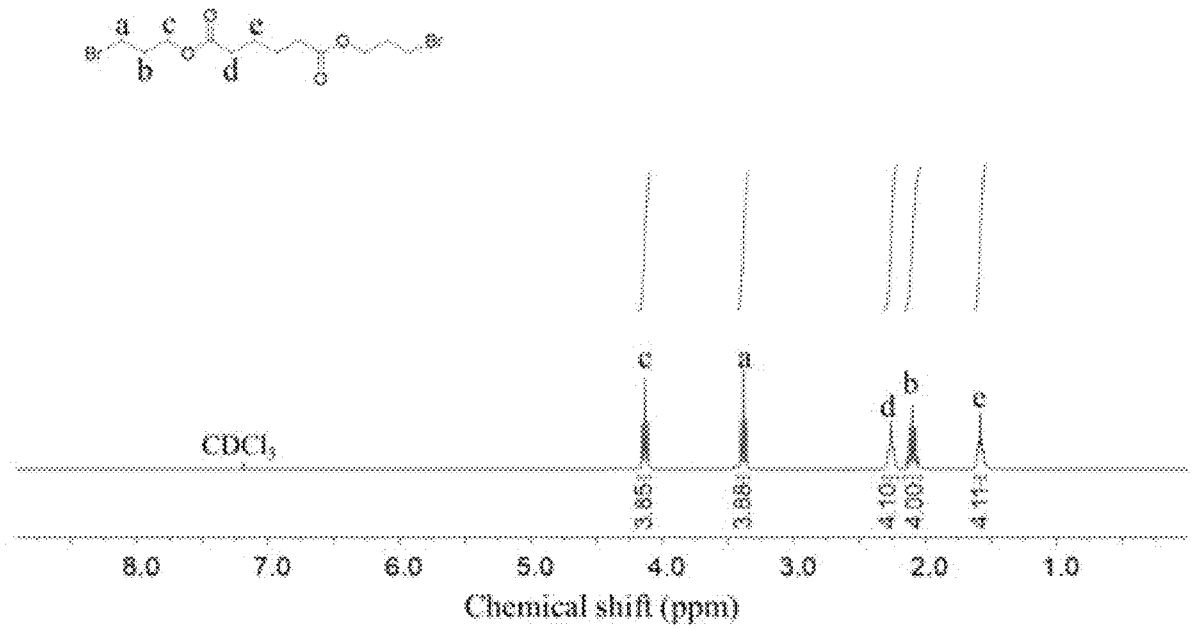

FIG. 22 is the $^1$H NMR spectrum of compound 3 showing resonance c which confirms ester formation and carboxylic groups were converted to ester groups completely ($CDCl_3$, 300 MHz).

Figure 23:
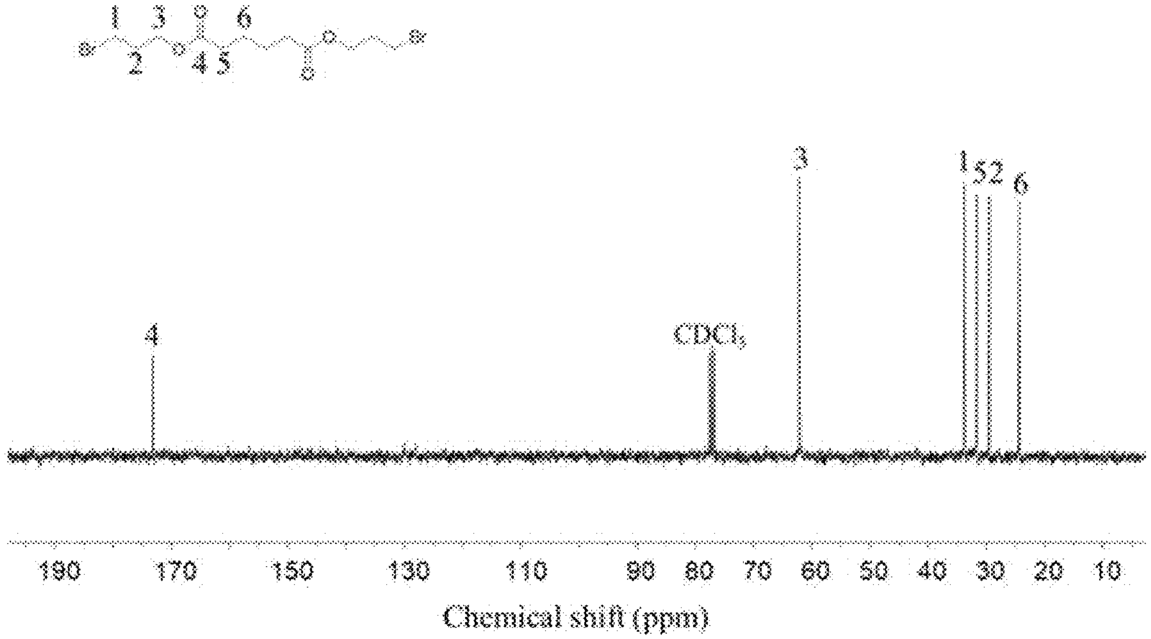

FIG. 23 is the $^{13}$C NMR spectrum of compound 3 displaying resonance 4 at 173.14 ppm corresponding to carbonyl group (C═O) of ester ($CDCl_3$, 75 MHz).

Figure 24:
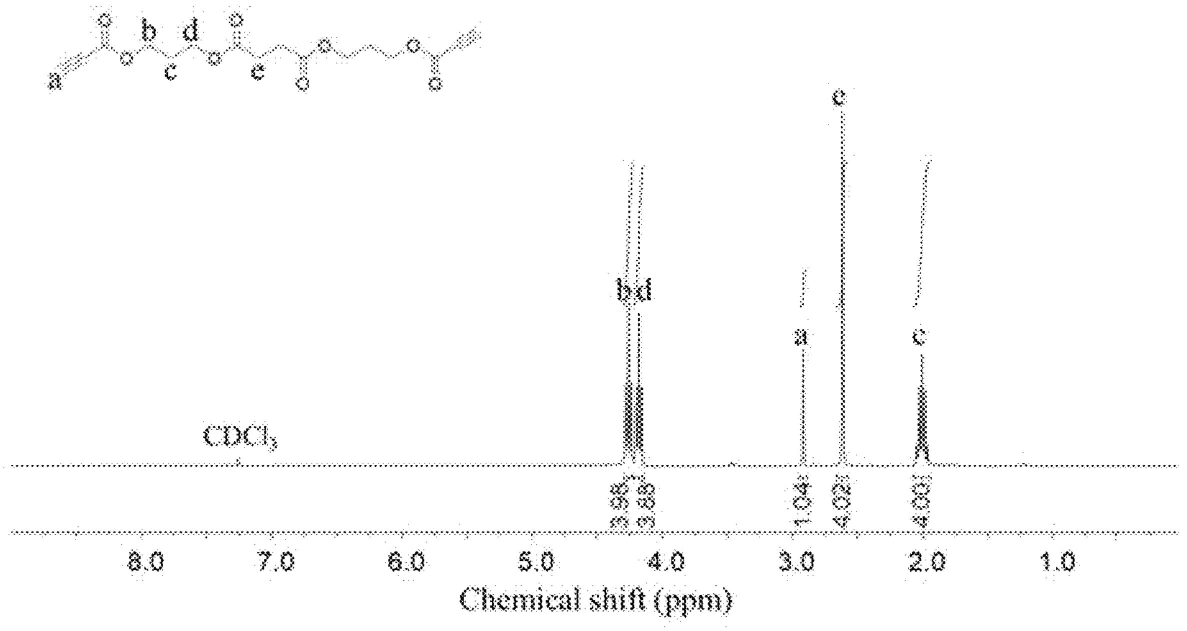

FIG. 24 is the $^1$H NMR spectrum of monomer S3 and demonstrates one singlet resonances a corresponding to terminal alkyne and resonance b, methylene group ($CH_2$), shifted from 3.45 ppm to 4.26 ppm shows the methylene ($CH_2$) is adjacent to ester functional group. These two resonances confirm M1 was synthesized from nucleophilic substitution ($S_N2$) of sodium propiolate for both groups ($CDCl_3$, 300 MHz).

Figure 25:
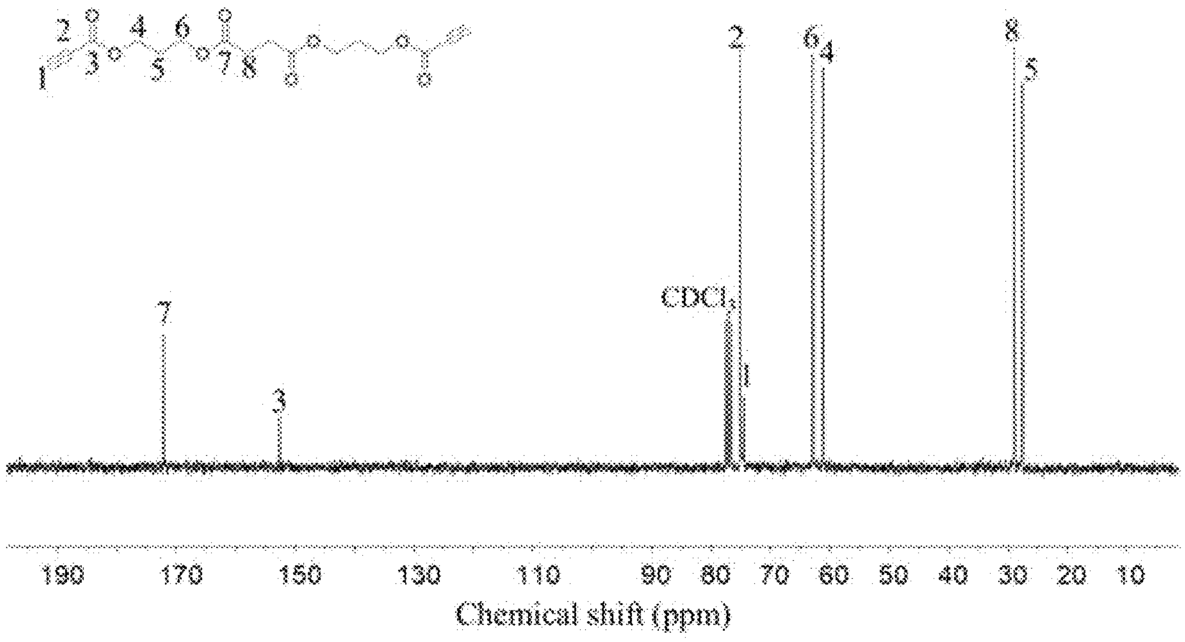

FIG. 25 is the $^{13}$C NMR spectrum of monomer S3 and displays two carbonyl signals, resonance 7 from ester segment of succinate and resonance 3 corresponding to the carbonyl signal from sodium propiolate that confirms the formation of S3 via nucleophilic substitution ($CDCl_3$, 75 MHz).

Figure 26:
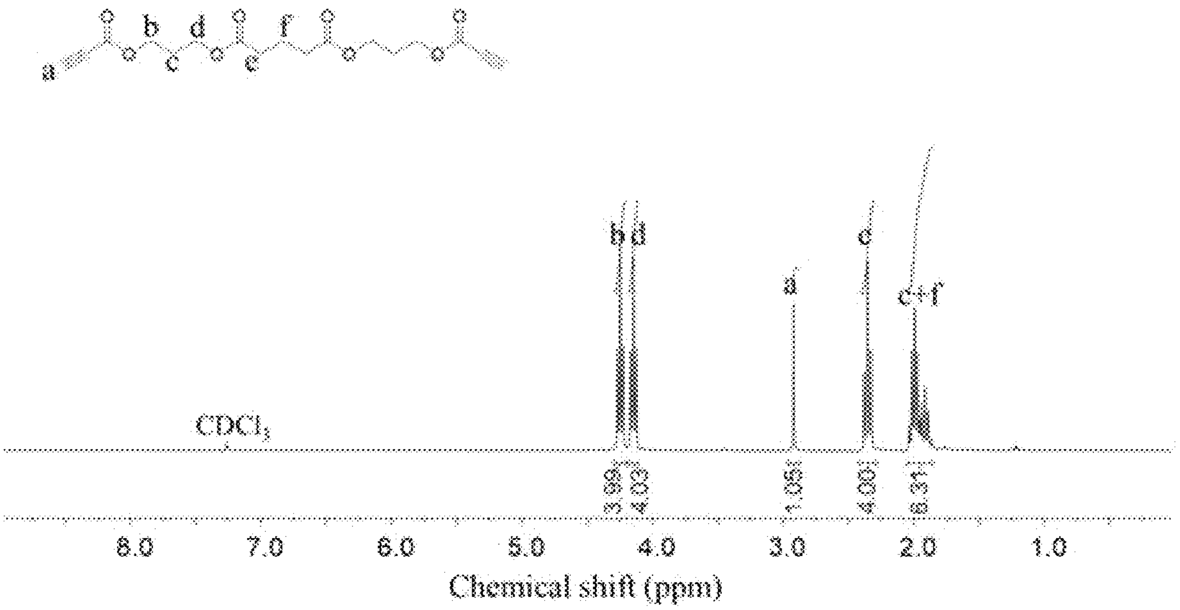

FIG. 26 is the $^1$H NMR spectrum of monomer G3 and demonstrates one singlet resonances a corresponding to terminal alkyne and resonance b, methylene group ($CH_2$), shifted from 3.45 ppm to 4.25 ppm shows the methylene ($CH_2$) is adjacent to ester functional group. These two resonances confirm G3 was synthesized from nucleophilic substitution ($S_N2$) of sodium propiolate for both groups ($CDCl_3$, 300 MHz).

Figure 27:
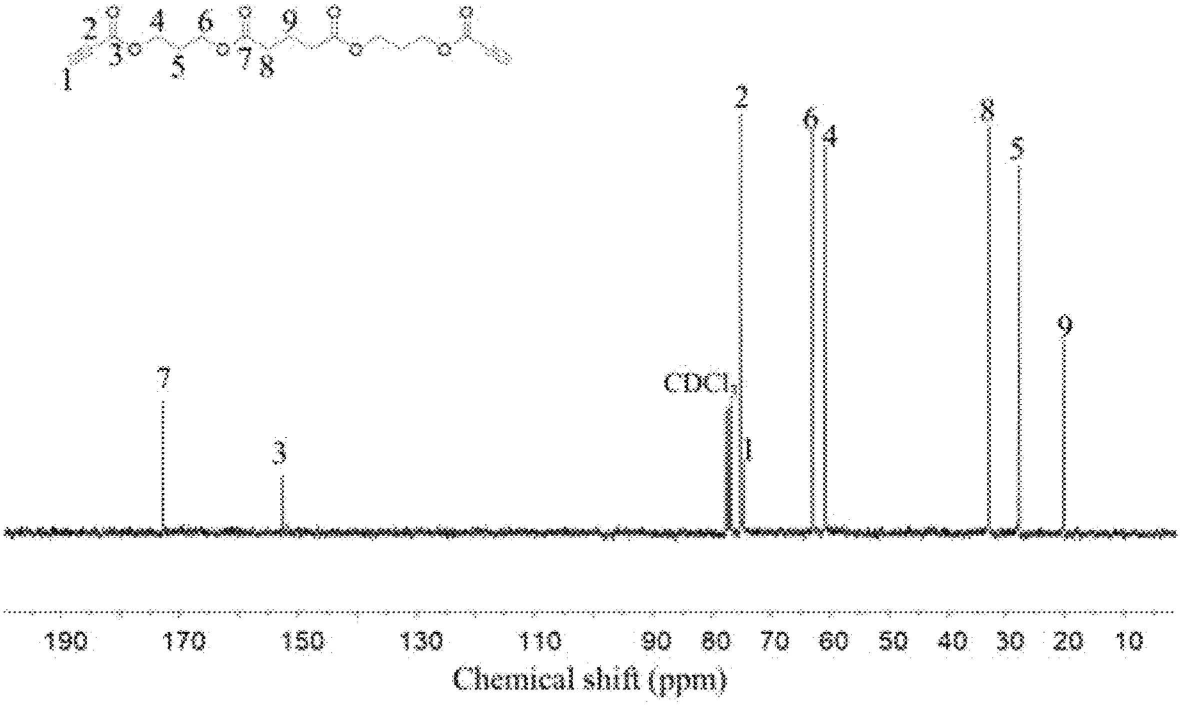

FIG. 27 is the $^{13}$C NMR spectrum of monomer G3 displaying two carbonyl signals, resonance 7 from ester segment of glutarate and resonance 3 corresponding to the carbonyl signal from sodium propiolate that confirms the formation of G3 via nucleophilic substitution ($CDCl_3$, 75 MHz).

Figure 28:
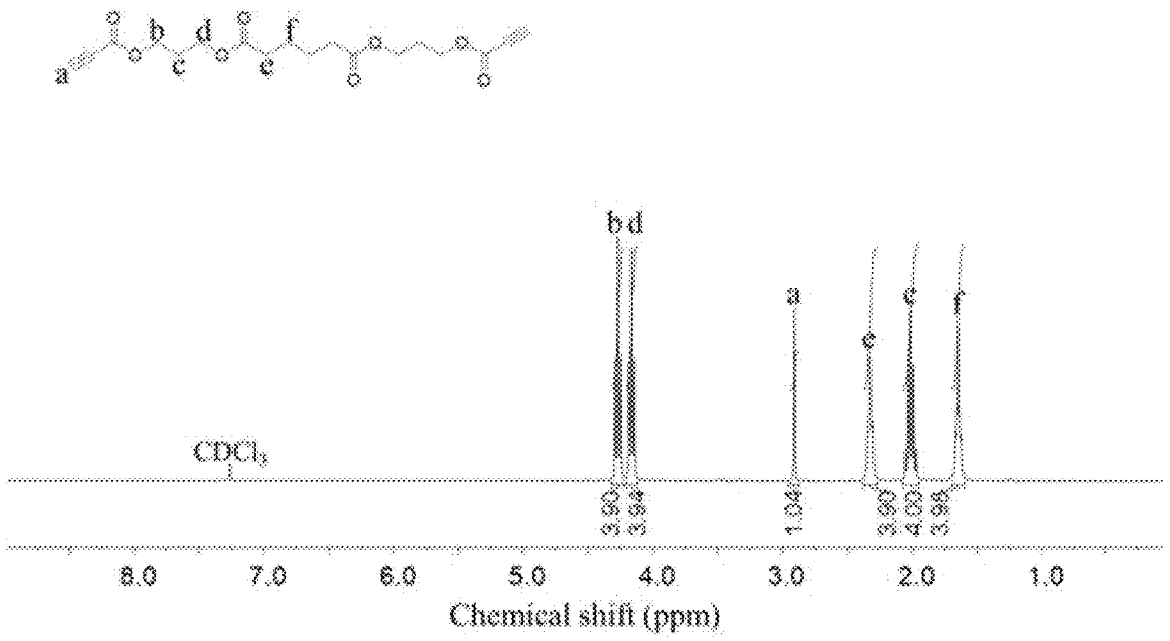

FIG. 28 is the $^1$H NMR spectrum of monomer A3 demonstrating one singlet resonances a corresponding to terminal alkyne and resonance h, methylene group ($CH_2$), shifted from 3.38 ppm to 4.25 ppm shows the methylene ($CH_2$) is adjacent to ester functional group. These two resonances confirm A3 was synthesized from nucleophilic substitution ($S_N2$) of sodium propiolate for both groups ($CDCl_3$, 300 MHz).

Figure 29:
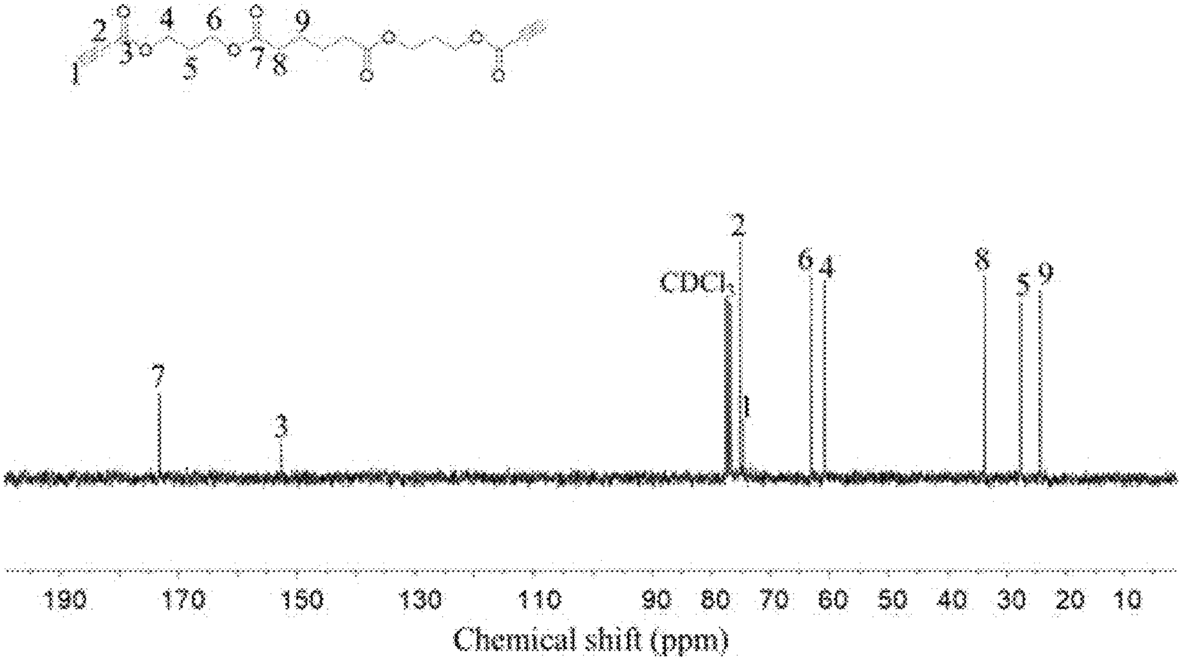

FIG. 29 is the $^{13}$C NMR spectrum of monomer A3 displaying two carbonyl signals, resonance 7 from ester segment of adipate and resonance 3 corresponding to the carbonyl signal from sodium propiolate that confirms the formation of S3 via nucleophilic substitution ($CDCl_3$, 75 MHz).

Figure 30:
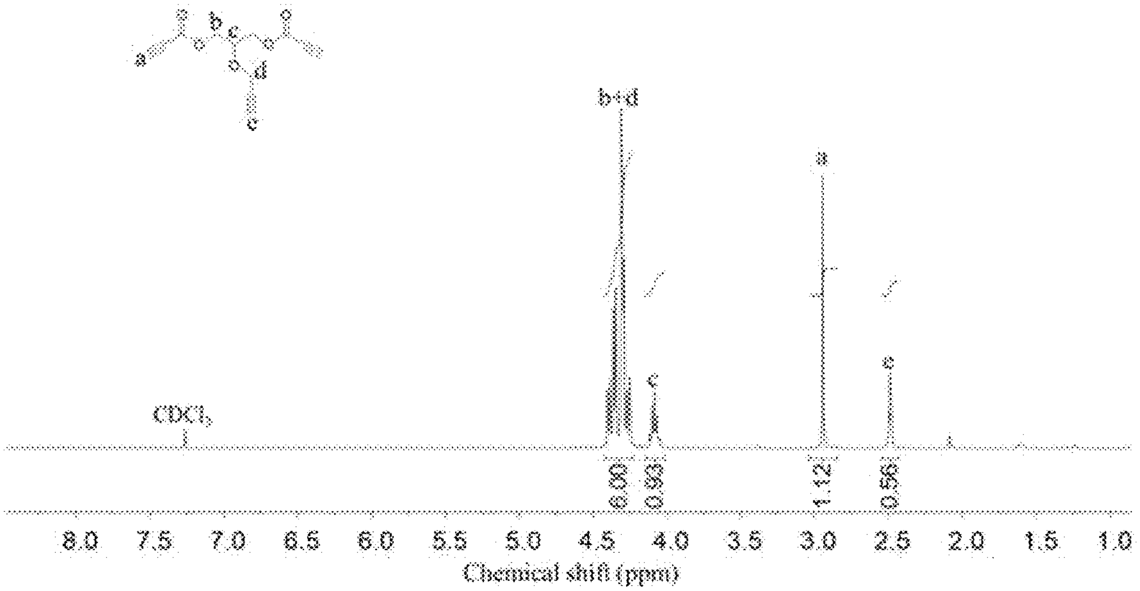

FIG. 30 is the $^1$H NMR spectrum of monomer PP demonstrating one singlet resonances a corresponding to terminal alkyne and resonance b shows the methylene ($CH_2$) is adjacent to ester functional group. These two resonances confirm PP was synthesized from Fischer esterification for both end groups ($CDCl_3$, 300 MHz).

Figure 31:
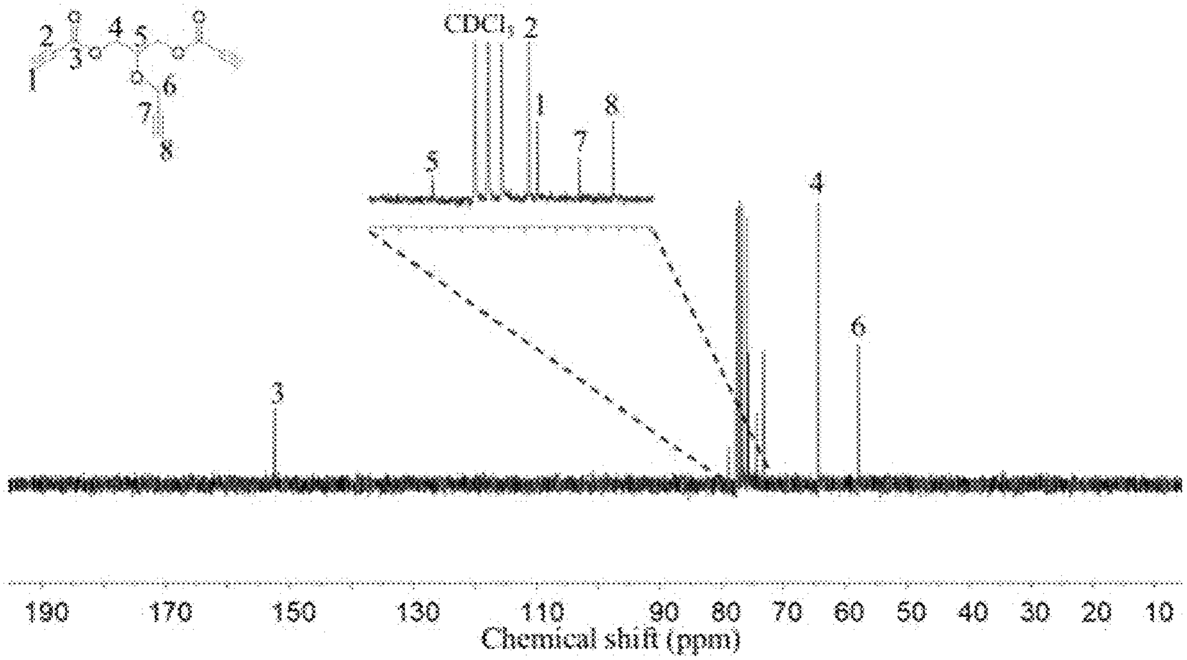

FIG. 31 is the $^{13}$C NMR spectrum of monomer PP displaying resonance 4 at 152.35 ppm corresponding to carbonyl group (C═O) of ester ($CDCl_3$, 75 MHz).

Figure 32:
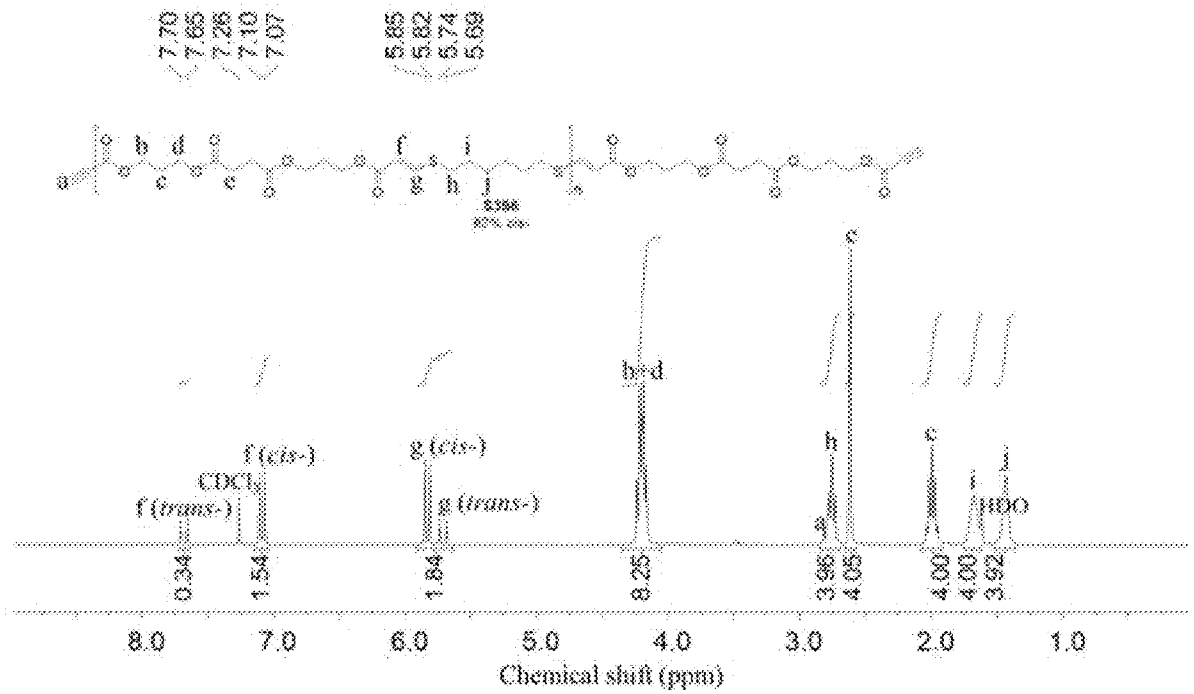

FIG. 32 is the $^1$H NMR spectrum of P1 (S3S6) showing 82% cis-content for the thiol-yne step-growth polymer. Cis-content can be calculated by the J coupling constants (J=9 Hz for cis and J=15 Hz for trans) of the respective resonances. Resonance h, i and j are from the dithiol monomer (S6) and resonance a, b, c, d, and e are from the succinate-based dipropiolate monomer (S3). The polymer P1 reveals cis %/trans %=82%: 18% in $CHCl_3$ with 1 mol % DBU ($CDCl_3$, 300 MHz).

Figure 33:
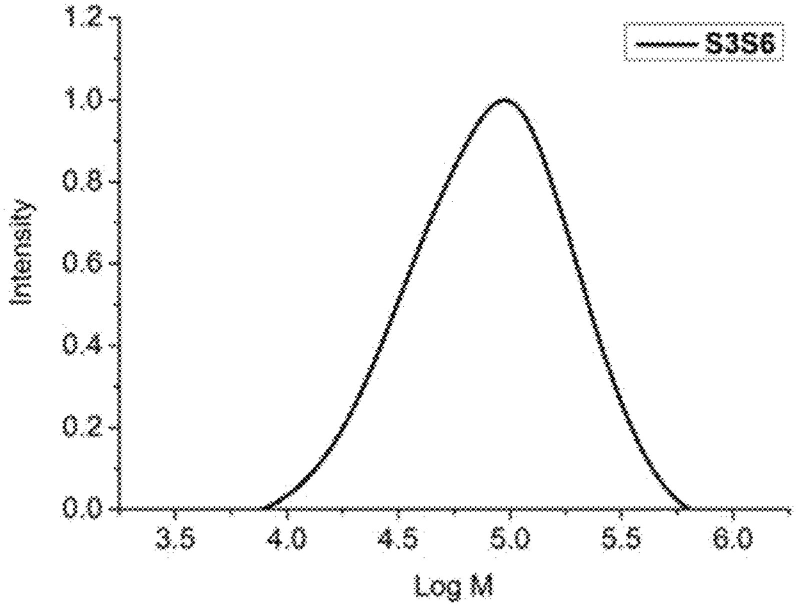

FIG. 33 is the SEC chromatogram of the P1 (82% Cis-) thiol-yne step-growth polymer; $M_n$=59.3 kDa, $M_w$=108.7 kDa, $Đ_M$=1.8 (SEC DMF with 0.1 M LiBr, based on PS standard).

Figure 34:
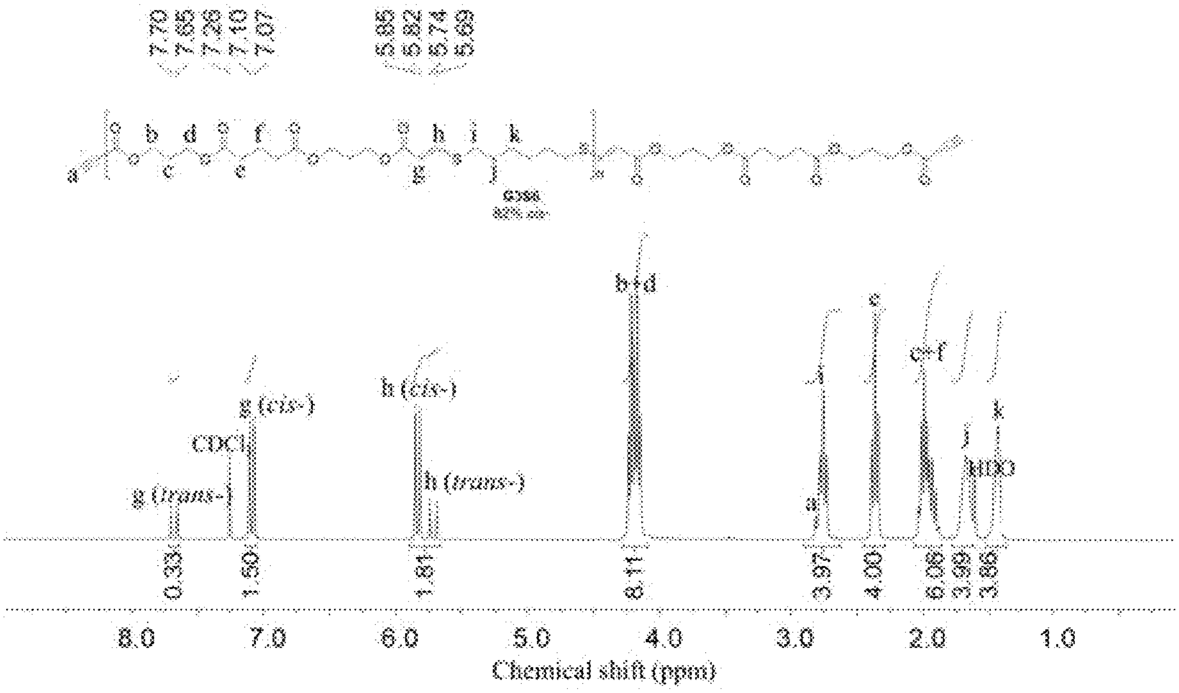

FIG. 34 is the $^1$H NMR spectrum of P2 (G3S6) showing 82% cis-content for the thiol-yne step-growth polymer. Cis-content can be calculated by the J coupling constants (J=9 Hz for cis and J=15 Hz for trans) of the respective resonances. Resonance i, j and k are from the dithiol monomer (S6) and resonance a, b, c, d, e, and fare from the glutarate-based dipropiolate monomer (G3). The polymer P2 reveals cis %/trans %=82%: 18% in $CHCl_3$ with 1 mol % DBU ($CDCl_3$, 300 MHz).

Figure 35:
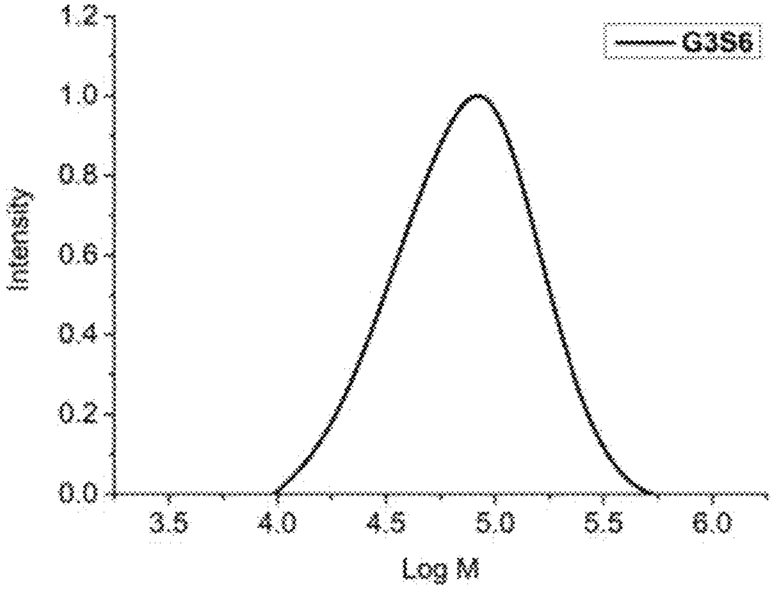

FIG. 35 is the SEC chromatogram of the P2 (82% Cis-) thiol-yne step-growth polymer; $M_n$=56.6 kDa, $M_w$=92.7 kDa, $Đ_M$=1.6 (SEC DMF with 0.1 M LiBr, based on PS standard).

Figure 36:
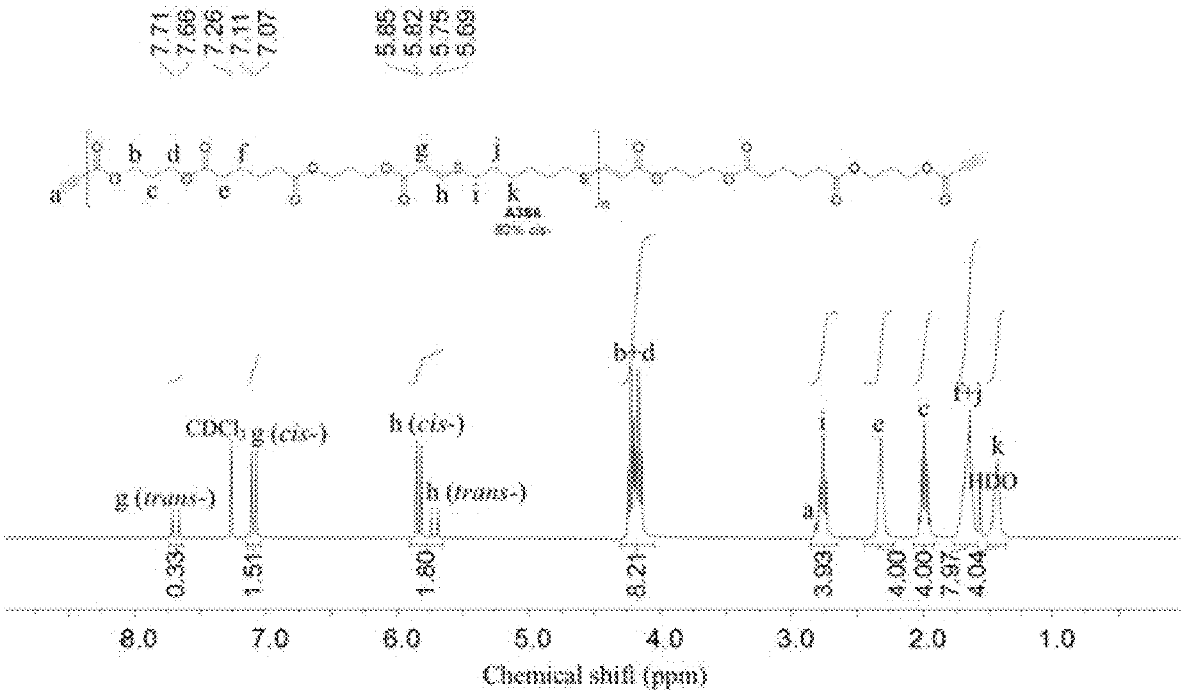

FIG. 36 is the $^1$H NMR spectrum of P3 (A3S6) showing 82% cis-content for the thiol-yne step-growth polymer. Cis-content can be calculated by the J coupling constants (J=9 Hz for cis and J=15 Hz for trans) of the respective resonances. Resonance i, j and k are from the dithiol monomer (S6) and resonance a, b, c, d, e, and f are from the adipate-based dipropiolate monomer (A3). The polymer P3 reveals cis %/trans %=82%: 18% in $CHCl_3$ with 1 mol % DBU ($CDCl_3$, 300 MHz).

Figure 37:
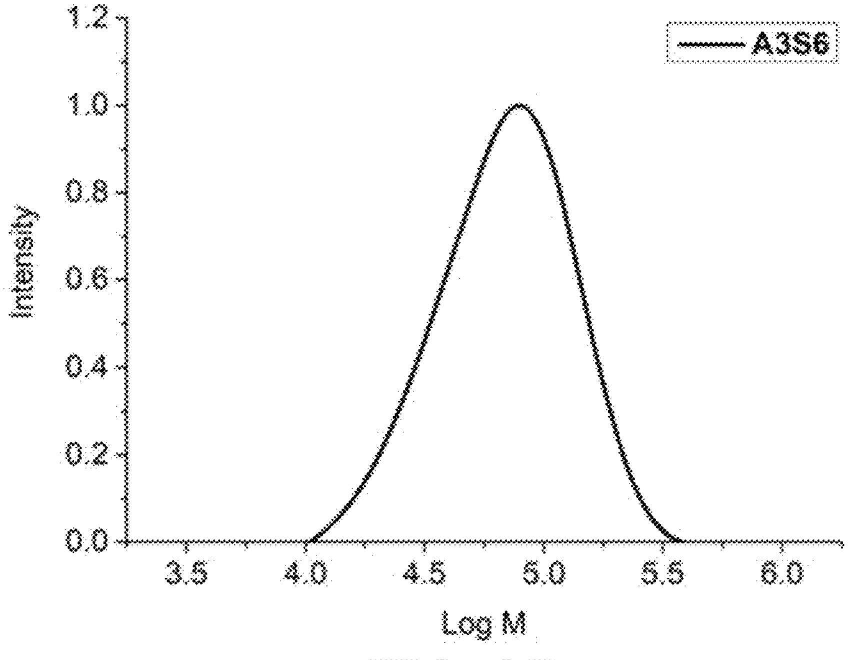

FIG. 37 is the SEC chromatogram of the P3 (82% Cis-) thiol-yne step-growth polymer; $M_n$=56.0 kDa, $M_w$=82.8 kDa, $Đ_M$=1.5 (SEC DMF with 0.1 M LiBr, based on PS standard).

Figure 38:
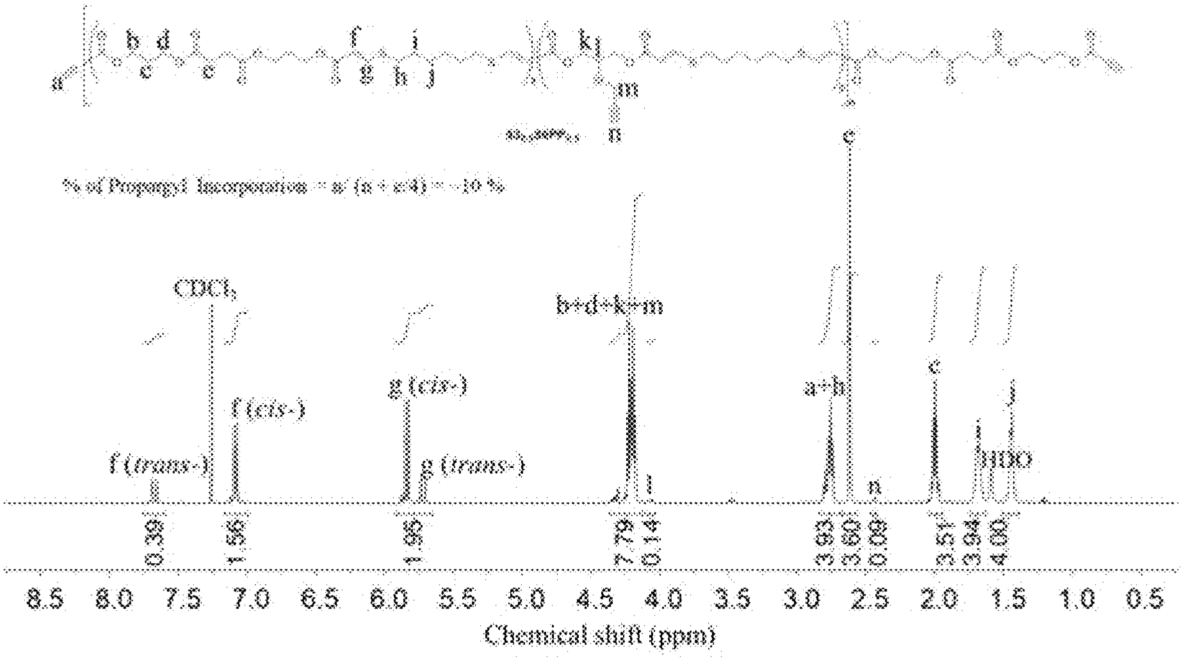

FIG. 38 is the $^1$H NMR spectrum of P4 ($S3_{0.9}S6PP_{0.1}$) showing 81% cis-content for the thiol-yne step-growth copolymer with 10% incorporation of PP. Resonance h, i and j are from the dithiol monomer (S6) and resonance a, h, c, d, and e are from the succinate-based dipropiolate monomer (S3). The resonance n is from terminal alkyne which confirms the monomer PP was incorporated successfully. % of PP monomer can be calculated by ratio of resonance n and resonance e. The polymer P4 reveals cis %/trans %=81%: 19% in $CHCl_3$ with 1 mol % DBU ($CDCl_3$, 300 MHz).

Figure 39:
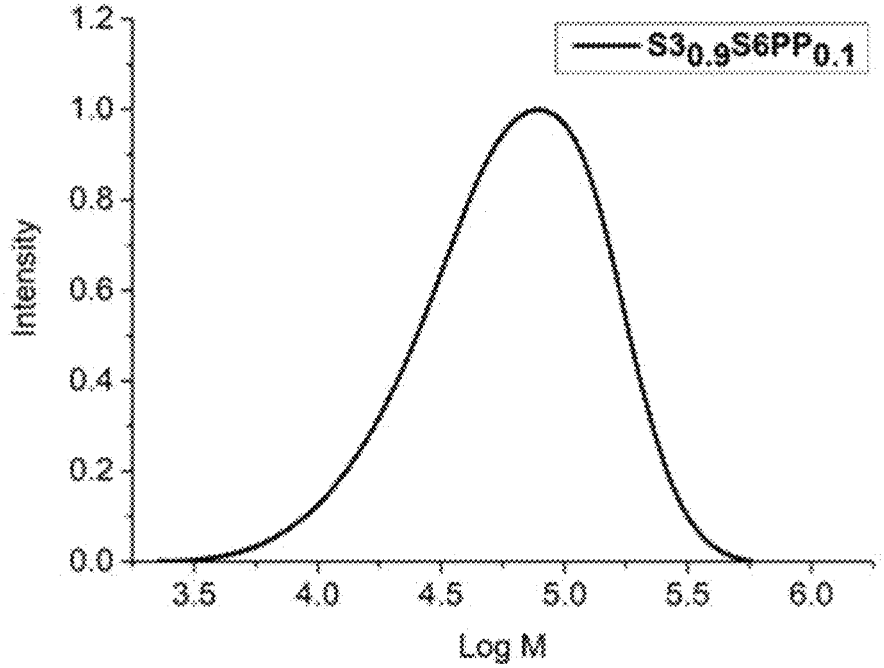

FIG. 39 is the SEC chromatogram of the P4 ($S3_{0.9}S6PP_{0.1}$, 81% Cis-) thiol-yne step-growth copolymer with 10% incorporation of PP; $M_n$=41.9 kDa, $M_\mu$=83.3 kDa, $Đ_M$=2.0 (SEC DMF with 0.1 M LiBr, based on PS standard).

Figure 40:
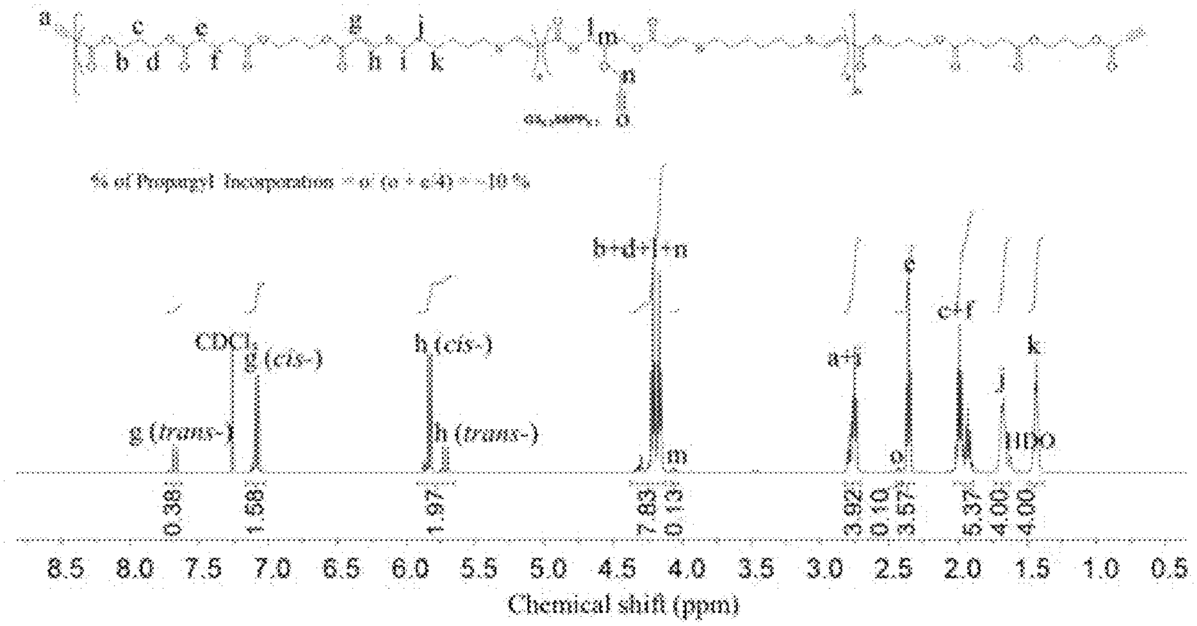

FIG. 40 is the $^1$H NMR spectrum of P5 ($G3_{0.9}S6PP_{0.1}$) showing the 81% cis-content for the thiol-yne step-growth copolymer with 10% incorporation of PP. Resonance i, j and k are from the dithiol monomer (S6) and resonance a, b, c, d, e, and f are from the glutarate-based dipropiolate monomer (G3). The resonance o is from terminal alkyne which confirms the monomer PP was incorporated successfully. % of PP monomer can be calculated by ratio of resonance o and resonance e. The polymer P5 reveals cis %/trans %=81%: 19% in $CHCl_3$ with 1 mol % DBU ($CDCl_3$, 300 MHz).

Figure 41:
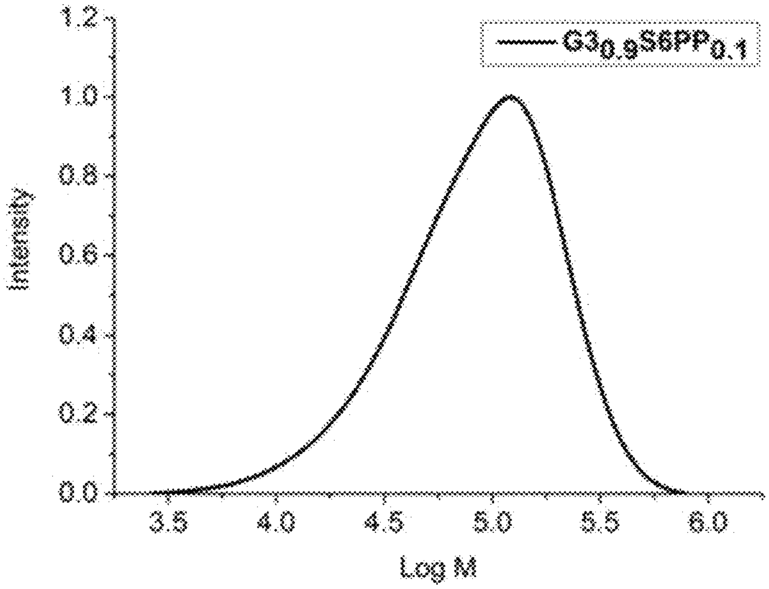

FIG. 41 is the SEC chromatogram of the P5 ($G3_{0.9}S6PP_{0.1}$) 81% Cis-) thiol-yne step-growth copolymer with 10% incorporation of PP; $M_n$=56.5 kDa, $M_w$=116.0 kDa, $Đ_M$=2.1 (SEC DMF with 0.1 M LiBr, based on PS standard).

Figure 42:
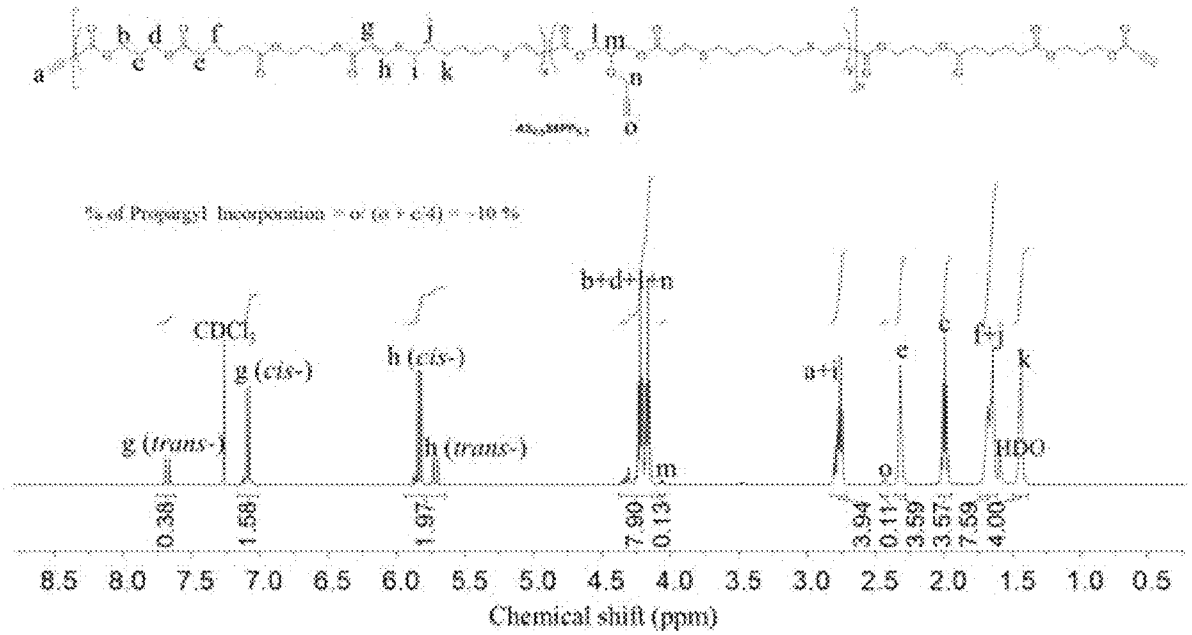

FIG. 42 is the $^1$H NMR spectrum of P6 ($A3_{0.9}S6PP_{0.1}$) showing 81% cis-content for the thiol-yne step-growth copolymer with 10% incorporation of PP. Resonance i, j and k are from the dithiol monomer (S6) and resonance a, h, c, d, e, and f are from the glutarate-based dipropiolate monomer (A3). The resonance o is from terminal alkyne which confirms the monomer PP was incorporated successfully. % of PP monomer can be calculated by ratio of resonance o and resonance e. The polymer P6 reveals cis %/trans %=81%: 19% in $CHCl_3$ with 1 mol % DBU ($CDCl_3$, 300 MHz).

Figure 43A:
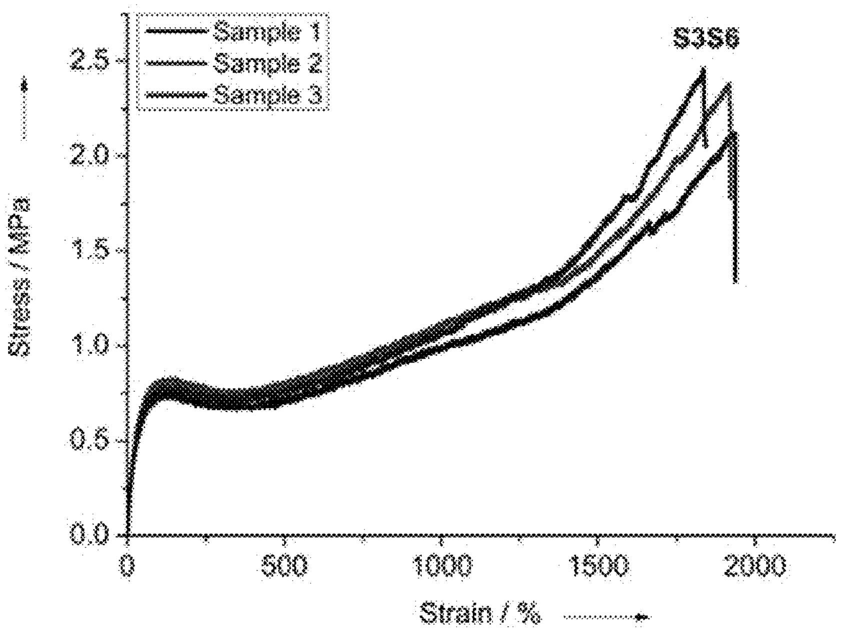
Figure 43B:
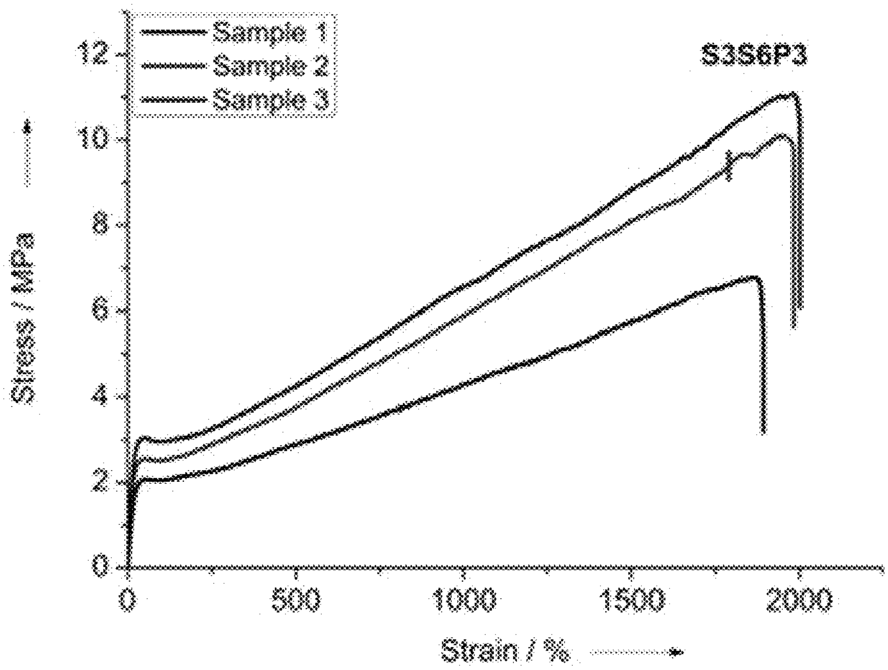

FIGS. 43A-B are complete stress vs. strain curves for S3S6 (FIG. 43A) and S3S6P3 (FIG. 43B). Data for three samples are shown to illustrate their reproducibility.

Figure 44A:
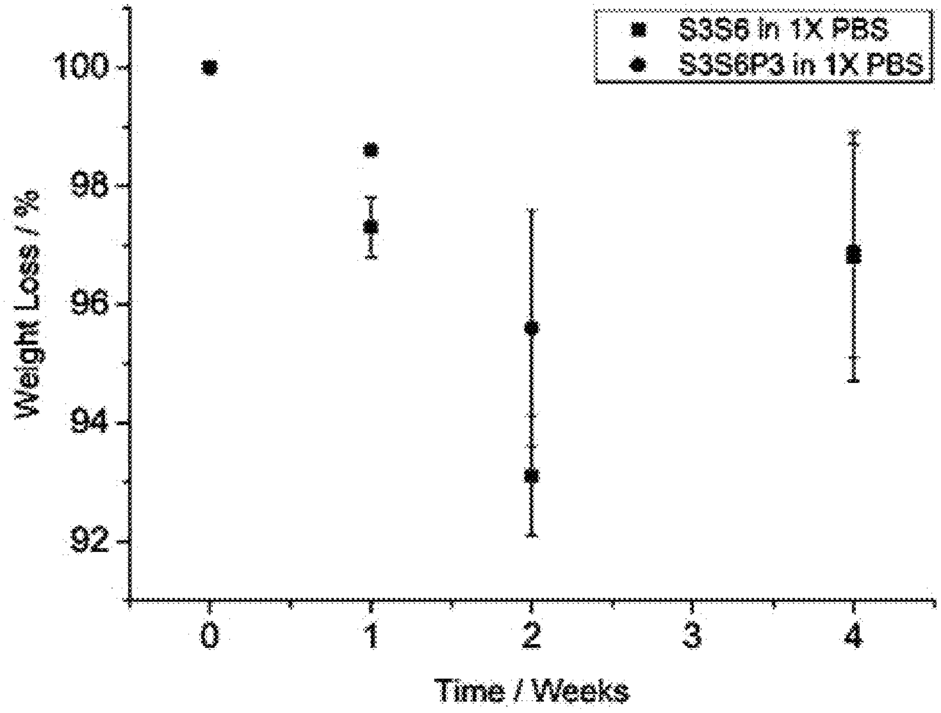
Figure 44B:
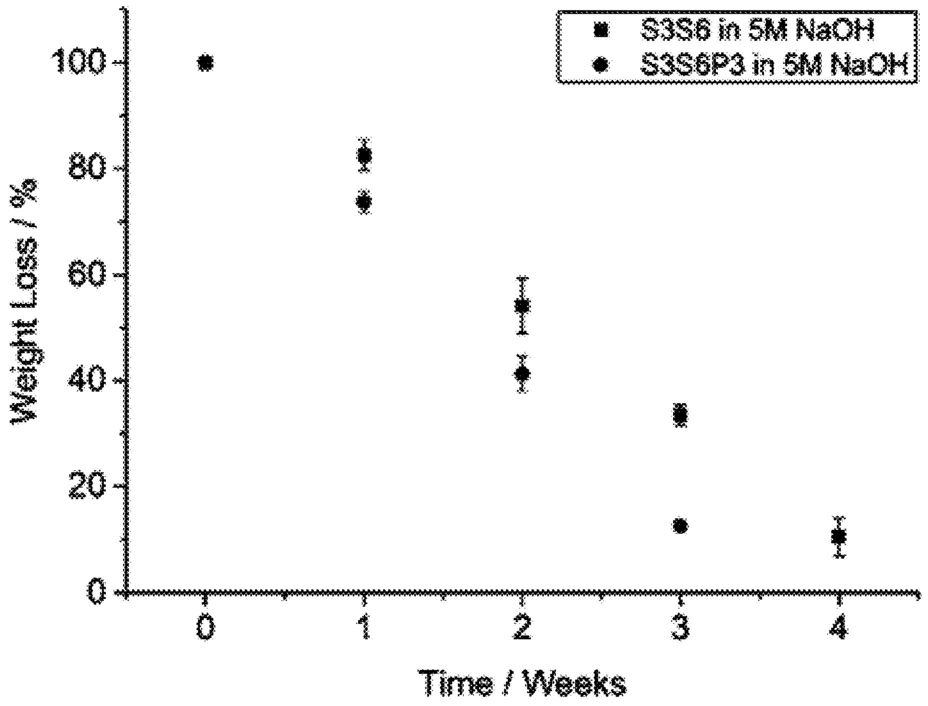

FIGS. 44A-B are graphs showing hi Vitro degradation profiles in 1×PBS (FIG. 44A) and 5M NaOH (FIG. 44B) for S3S6 and S3S6P3.

Figure 45A:
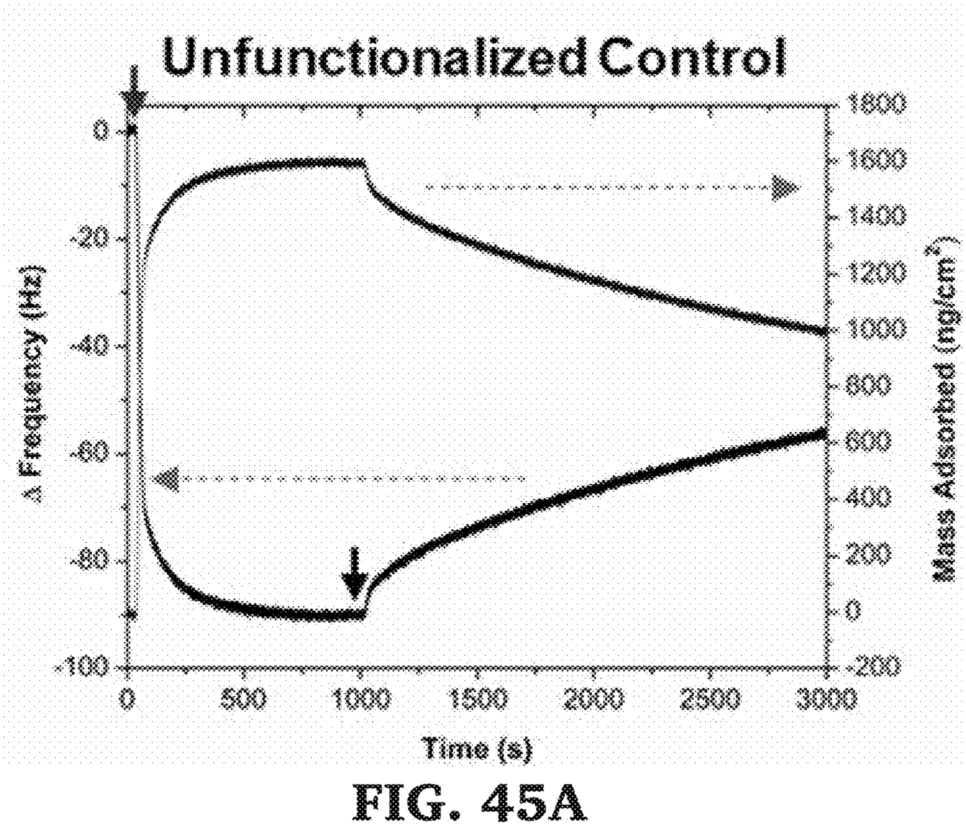
Figure 45B:
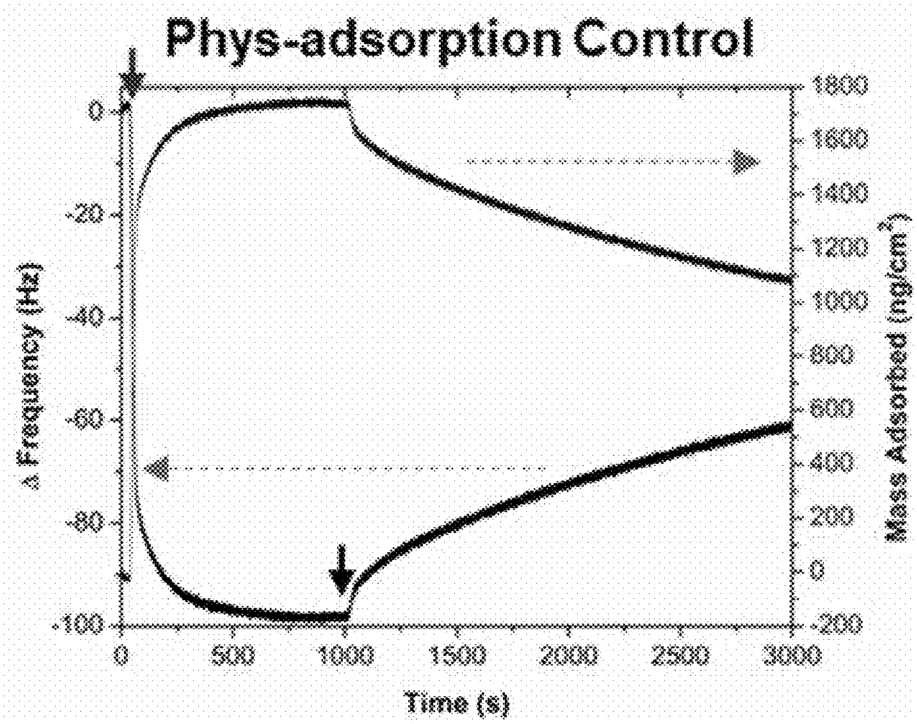
Figure 45C:
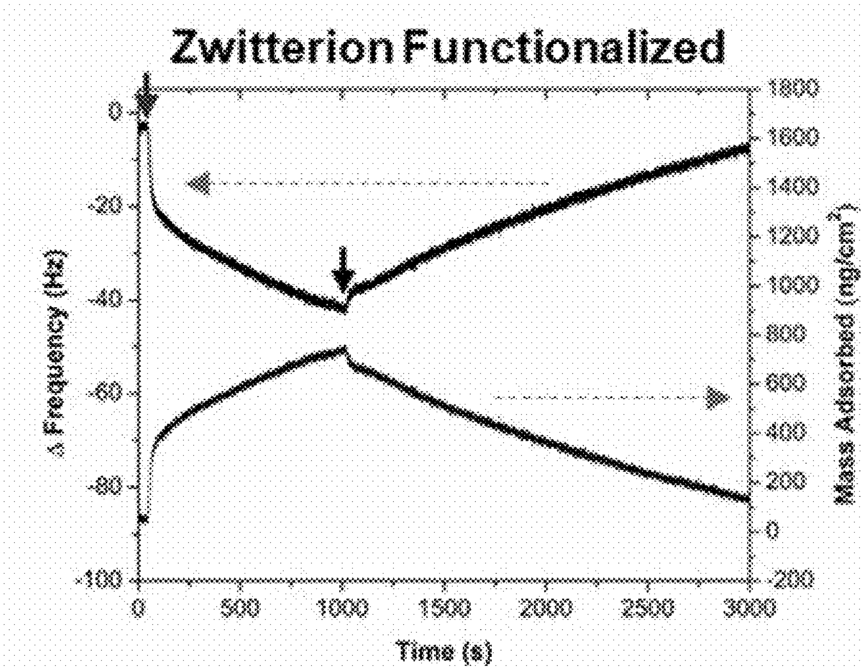
Figure 45D:
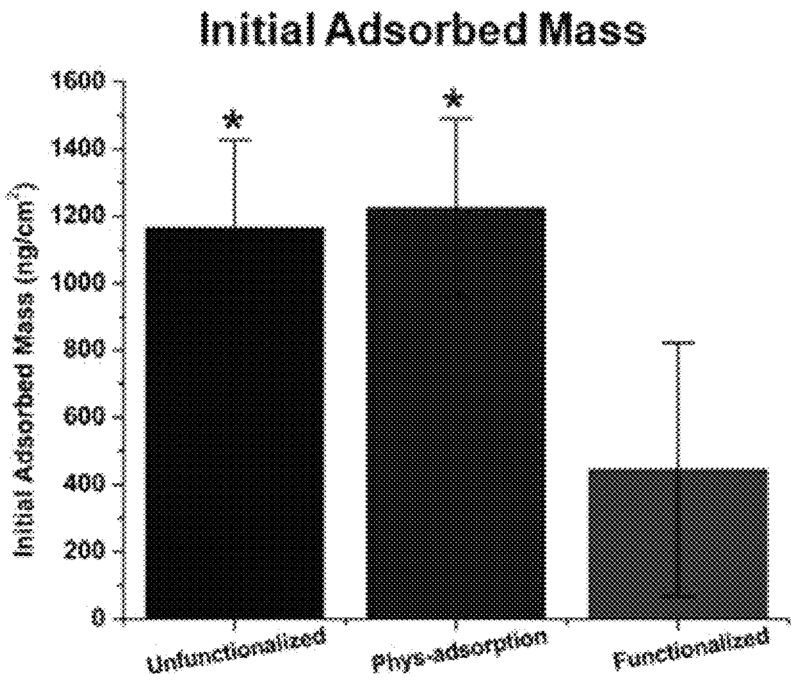
Figure 45E:
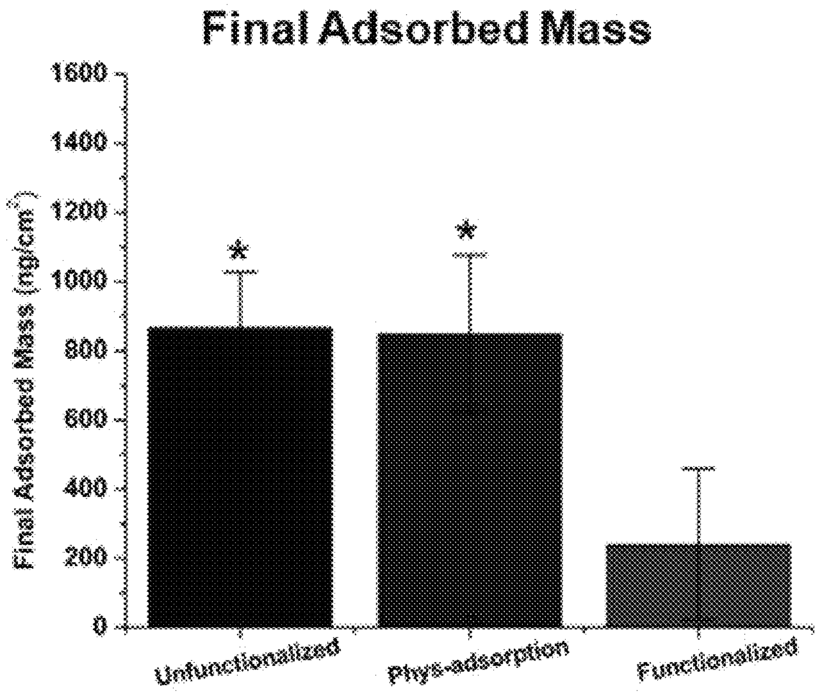

FIGS. 45A-E are graphs showing the results of fibrinogen adsorption assays conducted using a Quartz Crystal Microbalance (QCM). QCM measurements were used for characterizing resistance to protein adsorption. Representative QCM measurements for unfunctionalized control (FIG. 45A), physical adsorption control (FIG. 45B), and zwitterion functionalized coating (FIG. 45C). The red arrow indicates the beginning of fibrinogen flow through QCM chamber, while the black arrow indicates the onset of buffer wash. An initial drop in frequency was observed for all coating surface groups, which is indicative of the adsorption of fibrinogen to their surfaces (FIG. 45A-C). After the adsorption reached equilibrium, unbound fibrinogen was washed from the surface by switching the flow solution to 1×PBS, which resulted in frequency recovery. FIGS. 45D and E are graphs summarizing the initial mass absorbed (FIG. 45D) and final mass absorbed (FIG. 45E) for the unfunctionalized control (FIG. 45A), physical adsorption control (FIG. 5B), and zwitterion functionalized Coating (C) (FIG. 45C).

Figure 46:
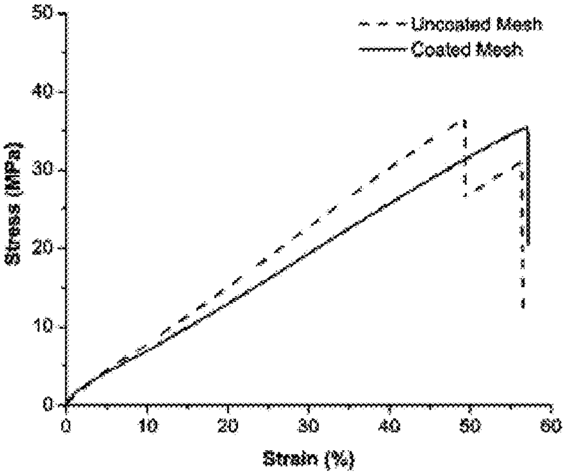

FIG. 46 is a graph showing the results of a mechanical characterization conducted on an uncoated polypropylene mesh (labeled "Mesh") and a S3S6P3 elastomer coated polypropylene mesh (labeled "Coated Mesh"). The coating doesn't have any significant effect on the properties of the polypropylene mesh and the properties of the composite are dictated by the mechanical properties of the mesh.

Figure 47A:
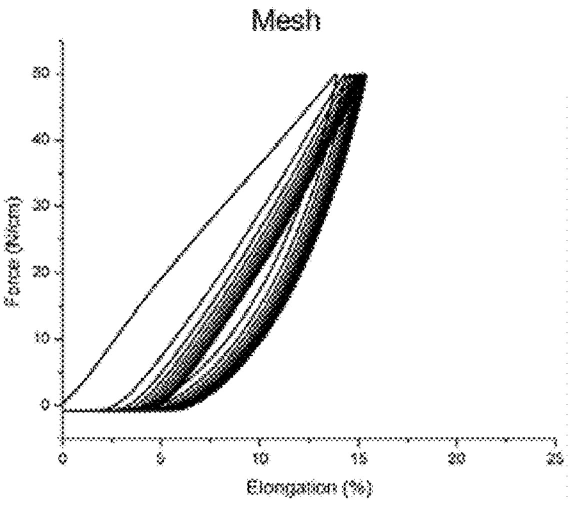
Figure 47B:
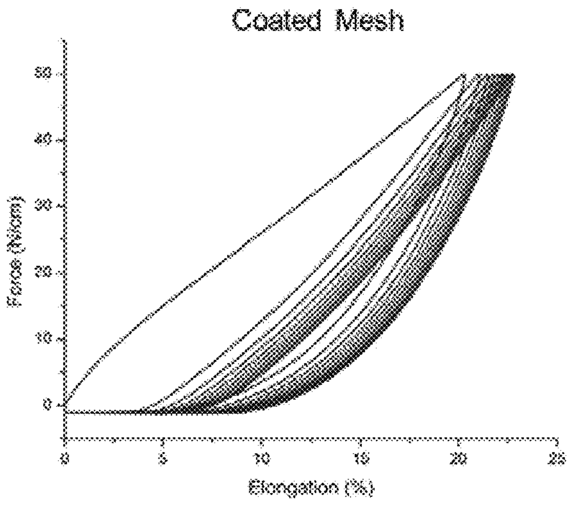

FIGS. 47A-B are graphs showing cyclic mechanical characterization on uncoated polypropylene mesh (labeled 'Mesh') (FIG. 47A) and S3S6P3 elastomer coated polypropylene mesh (labeled 'Coated Mesh') (FIG. 47B). The elastomer coated polypropylene mesh under consideration here is capable of withstanding 50 N/cm (20 cycles). Additionally, the coated mesh undergoes about 18.6% to 22.5% strain which is in the appropriate deformation range to avoid discomfort and prevent hernia recurrence.

Figure 48A:
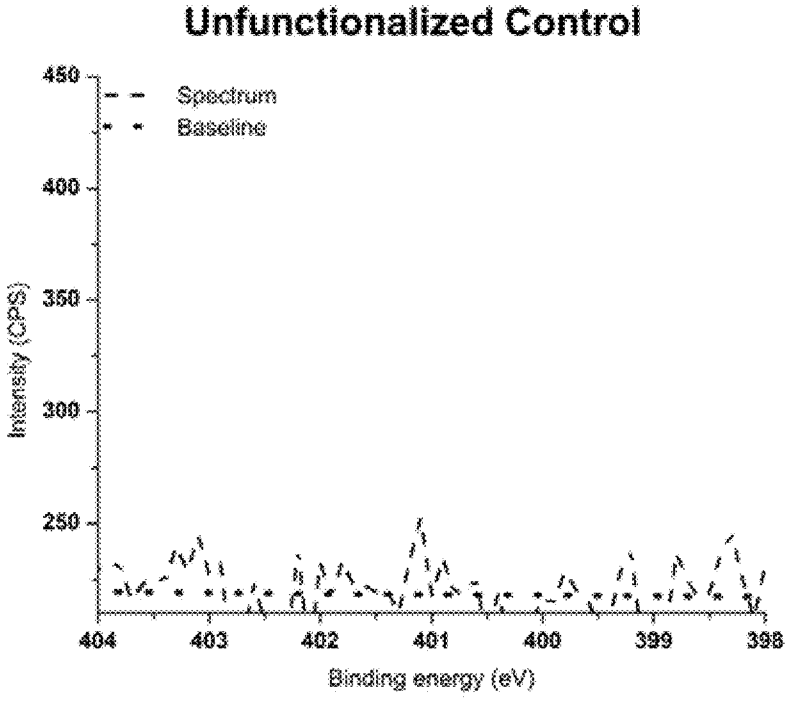
Figure 48B:
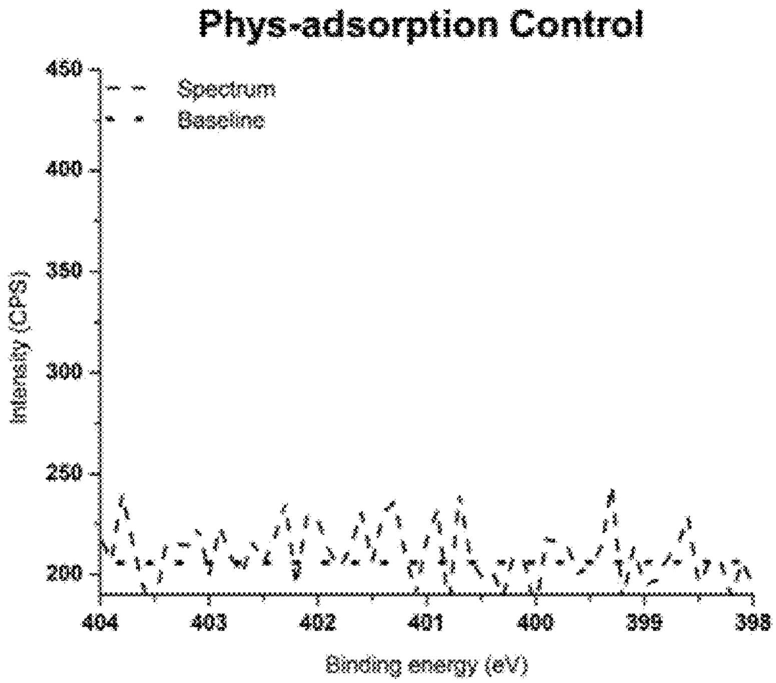
Figure 48C:
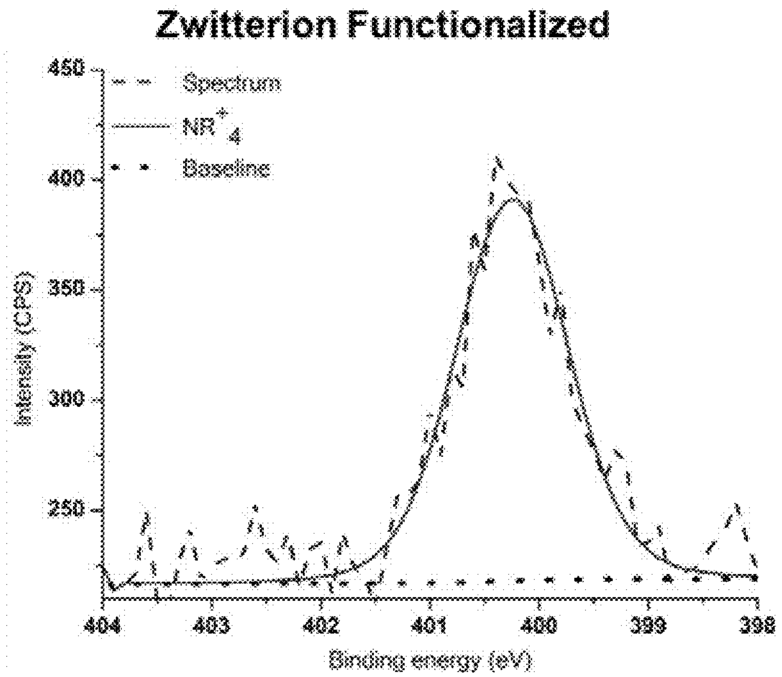
Figure 48D:
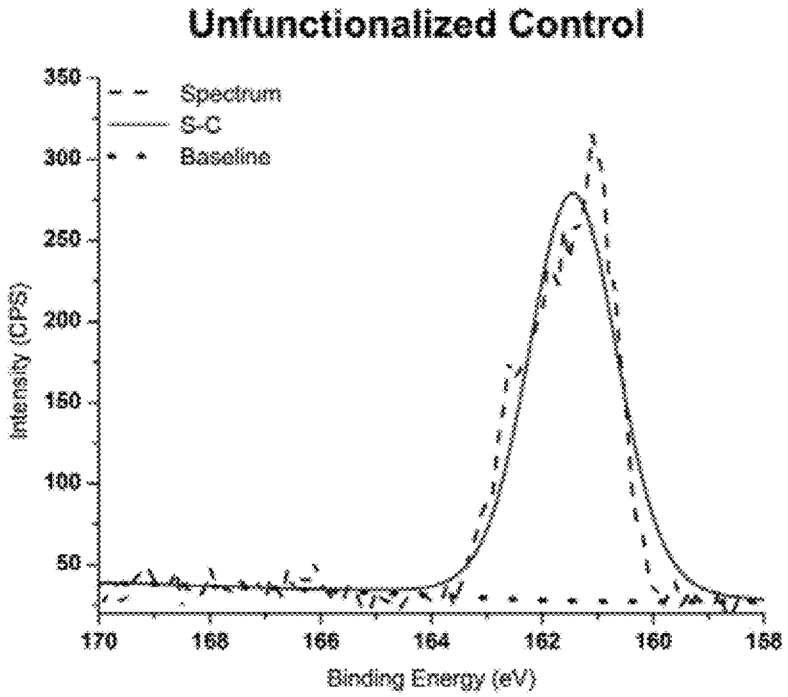
Figure 48E:
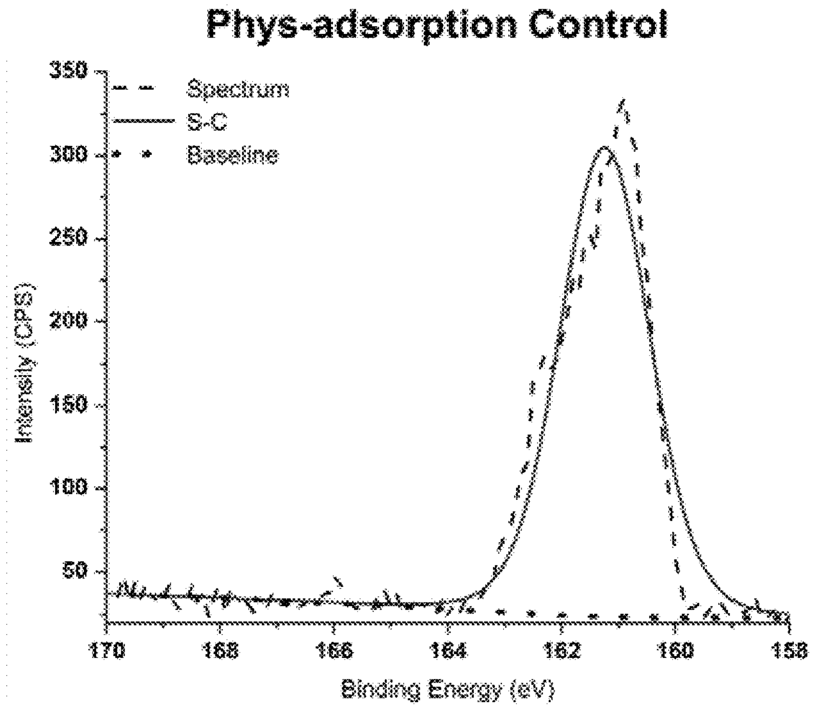
Figure 48F:
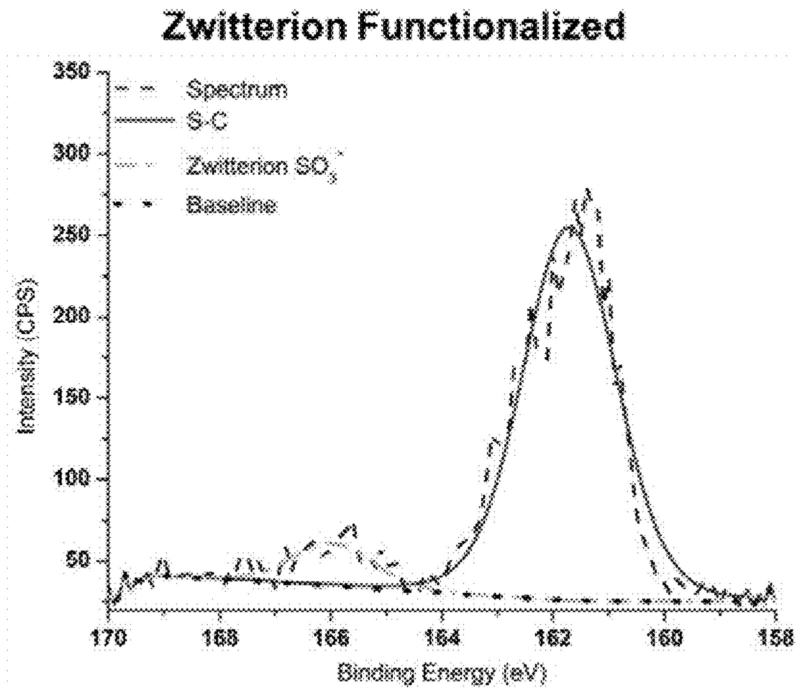

FIGS. 48A-F are graphs showing the results of XPS analysis performed to characterize the surface composition of the elastomeric coating surface after functionalization and showing high resolution XPS of N1s region for Unfunctionalized control (FIG. 48A), Phys-adsorption control (FIG. 48B), and Zwitterionic functionalized coating (FIG. 48C) and XPS analysis showing high resolution XPS of the S2p orbital for the unfunctionalized control (FIG. 48D), Phys-adsorption control (FIG. 48E) and Zwitterionic functionalized coating (FIG. 48F). The sulfonate sulfur content relative to total sulfur species in the Zwitterionic coating (FIG. 48F) was found to be 8.97% which is close to its theoretical value of 8.34% While other groups (FIG. 48E-F) did not show presence of sulfonate sulfur. Calculations were made using Casa XPS program (n=10).

Figure 49A:
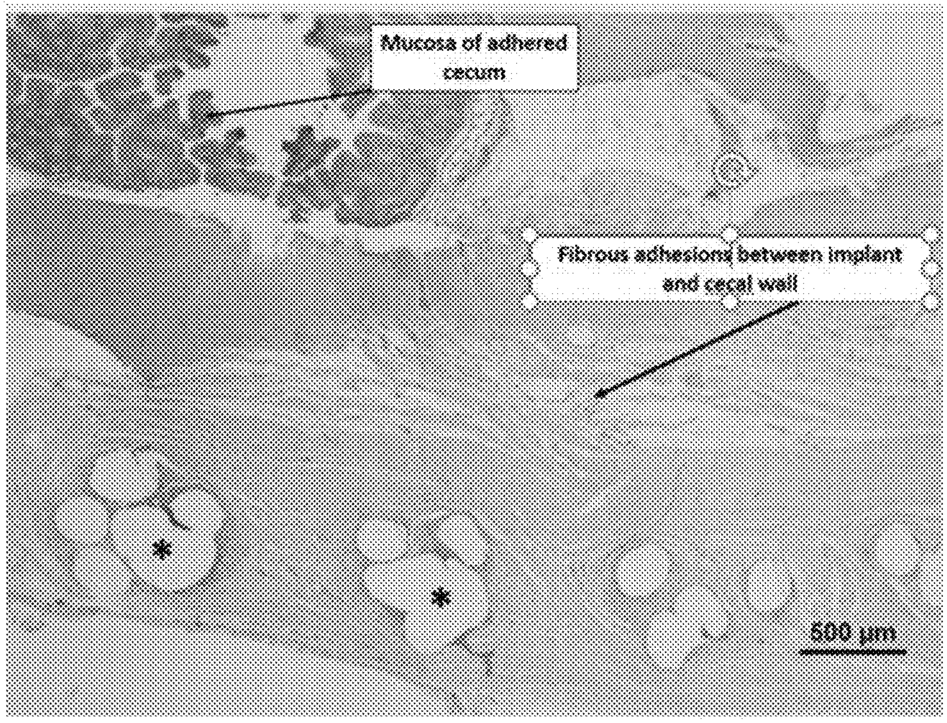
Figure 49B:
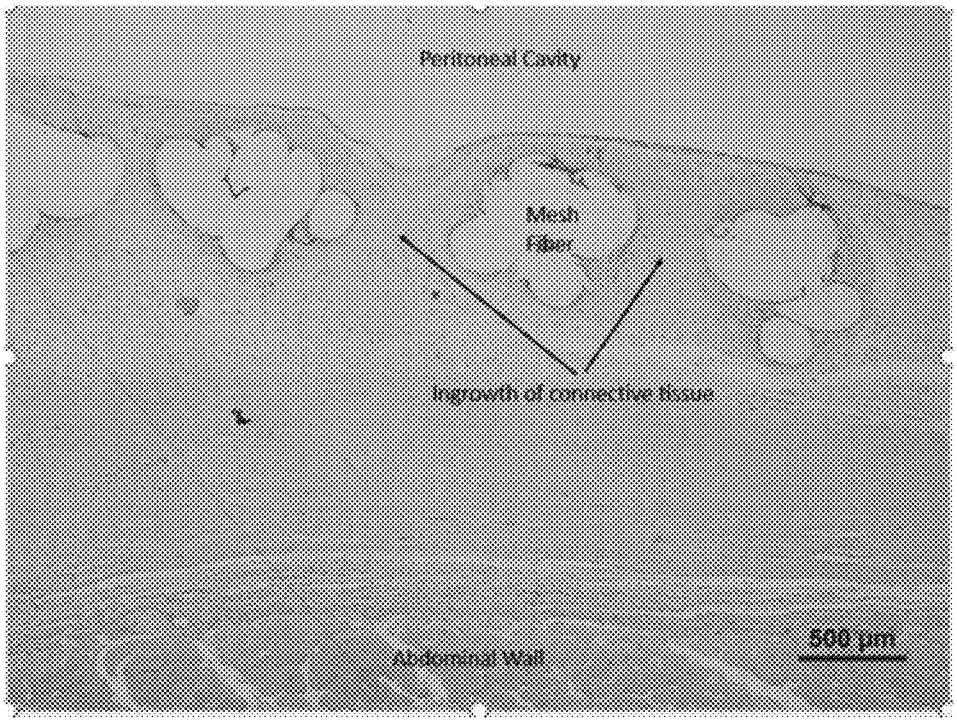
Figure 49C:
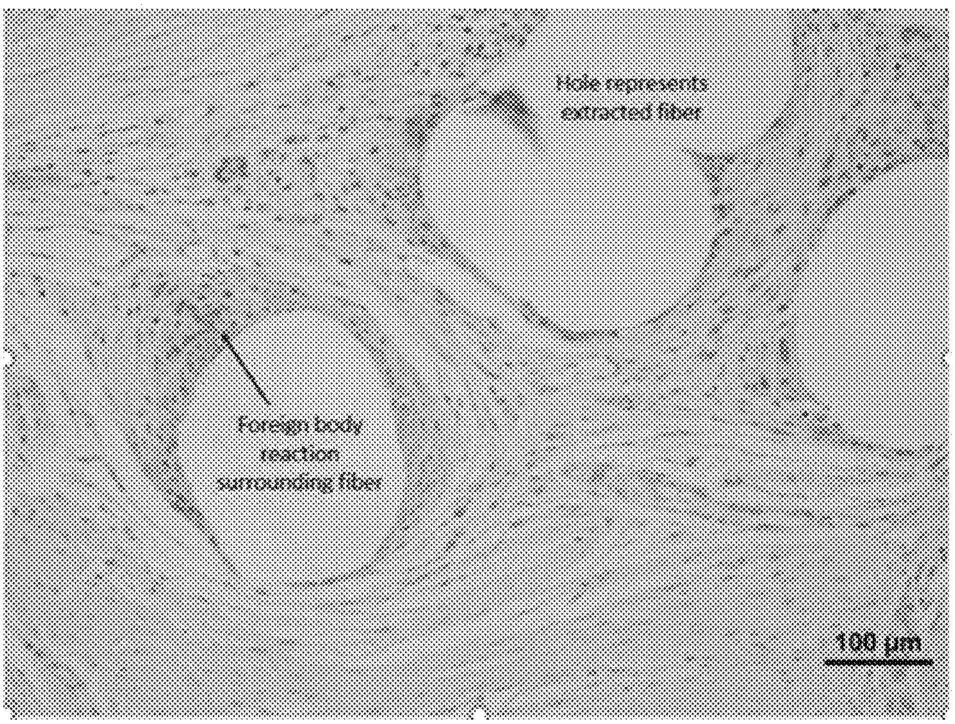

FIGS. 49A-C are photomicrographs of uncoated mesh depicting fibrous adhesions between peritoneal side of implant and muscular wall of cecum showing mesh implant fibers (*) are present in this transverse section and seen as empty holes where the polypropylene has been removed in processing and the fibers are outlined by circumscribing inflammatory cell and fibrous connective tissue response (H&E 40×) (FIG. 49A); a photomicrograph of mesh showing extent of bio-incorporation of mesh fibers in connective tissue encasement. Inflammation and fibrosis are mild surrounding mesh fibers showing ingrowth of connective tissue throughout the mesh with a minimal to mild angiogenic response and moderate encapsulation of the mesh implant (H&E 40×) (FIG. 49B); and a photomicrograph showing average severity of foreign body inflammatory and fibrotic responses surrounding individual fibers in the mesh (H&E 200×) (FIG. 49C).

Figure 50A:
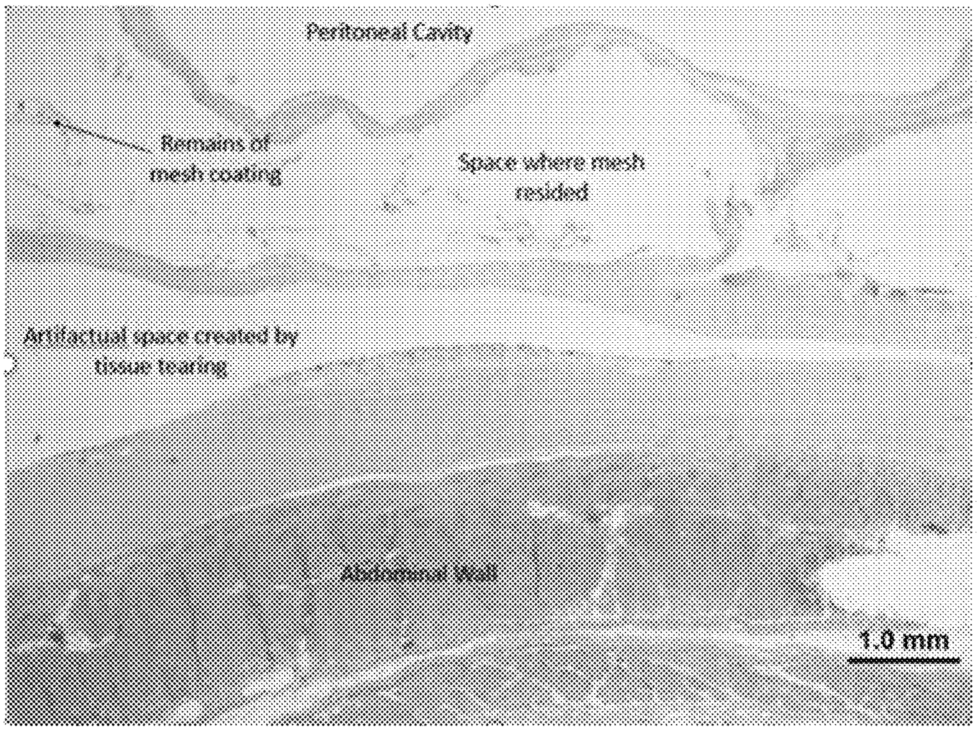
Figure 50B:
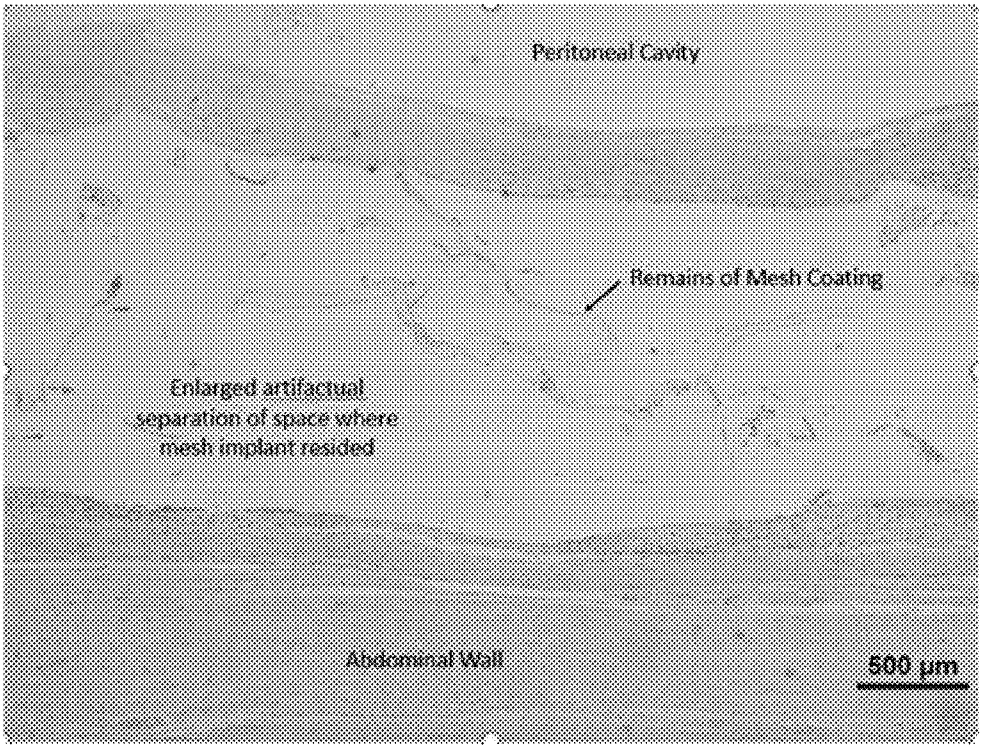
Figure 50C:
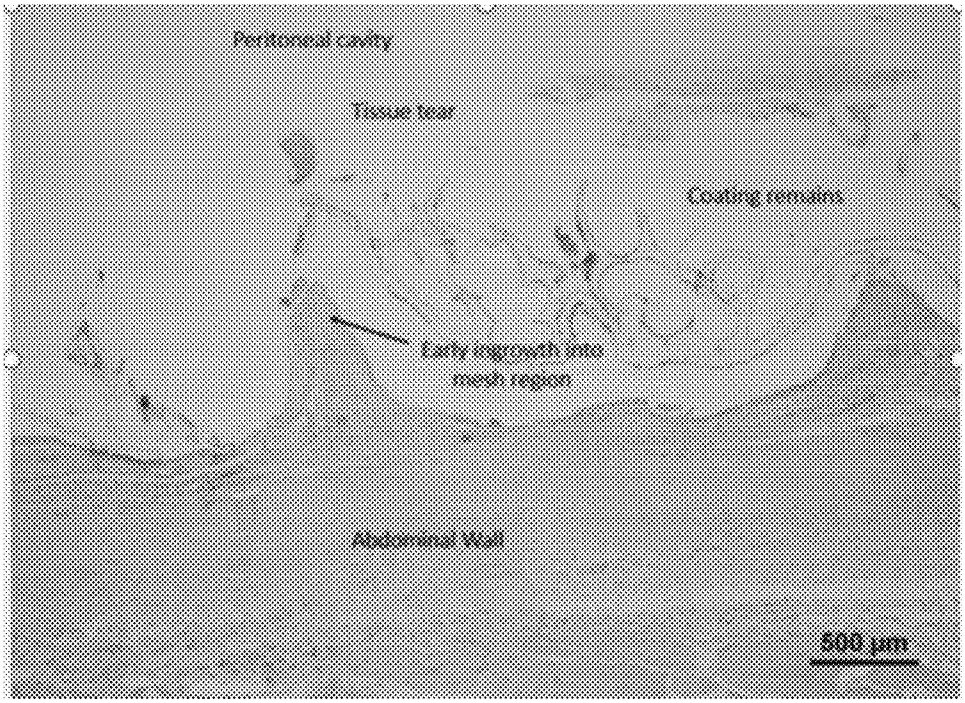
Figure 51A:
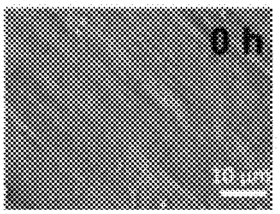
Figure 51B:
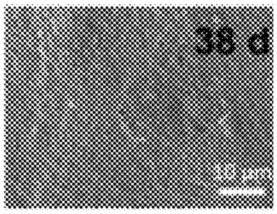
Figure 51C:
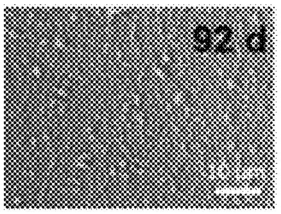
Figure 51D:
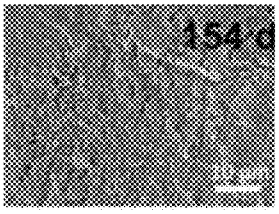

FIGS. 50A-C are a photomicrograph of mesh coated unfunctionalized mesh showing the challenges of making quantitative assessment of the preparation due to tearing artifact (H&E 20×) (FIG. 50A); a photomicrograph of coated unfunctionalized mesh appearance (H&E 40×) (FIG. 50B); and a photomicrograph of coated functionalized mesh showing early ingrowth of mesenchymal tissue into area of mesh (FIG. 50C).

FIGS. 51A-D are a series of SEM micrographs taken at 0 hours (FIG. 51A), 38 days (FIG. 52B), 92 days (FIG. 52C), and 154 days (FIG. 52D) showing surface erosion of the respective test coupons exposed to accelerated degradation conditions indicating uniform degradation and pitting indicative of surface erosion processes. Scale bars=10 mm.

Figure 52A:
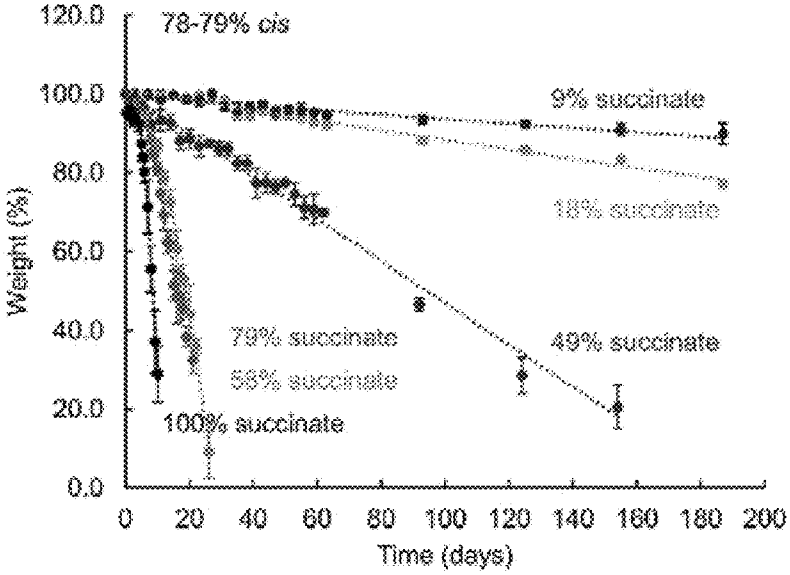
Figure 52B:
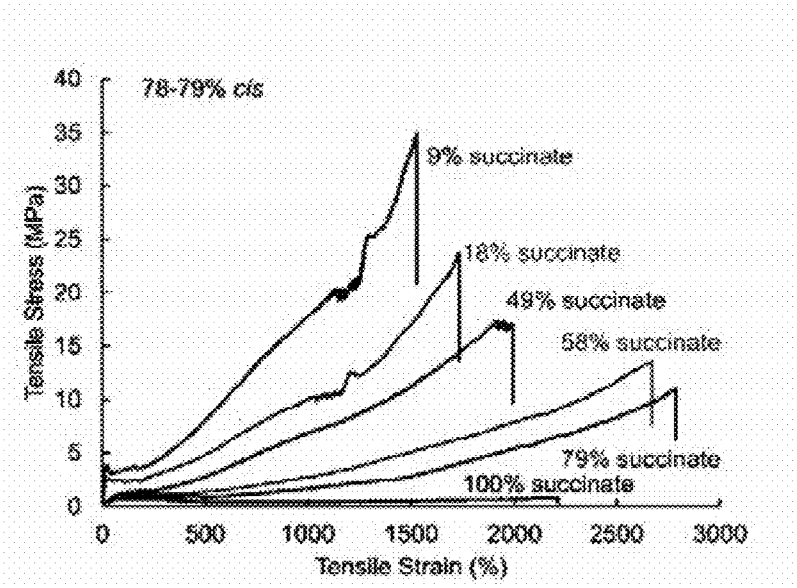

FIGS. 52A-D are graphs showing the compositional-dependent mechanical properties of the resorbable polymers (FIG. 52A is a graph showing mass loss over time as a function of bis(3-mercaptopropyl) succinate (2) stoichiometry over time in a series of high cis (78-79%) thiol-yne elastomers according to the present invention showing compositionally dependent linear surface erosion behavior. FIG. 52B is a stress vs. strain graph of several thiol-yne elastomers according to the present invention showing that increasing the amount of bis(3-mercaptopropyl) succinate (2), which is a longer, bulkier comonomer, reduced the ultimate tensile strength (UTS) of the resulting elastomers.

Figure 52C:
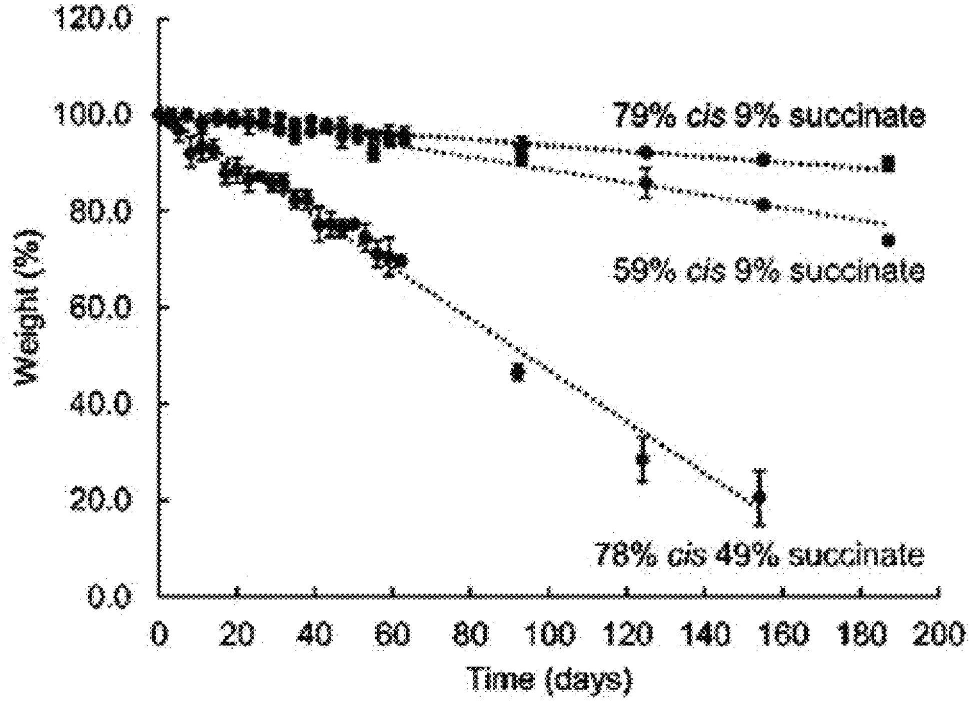
Figure 52D:
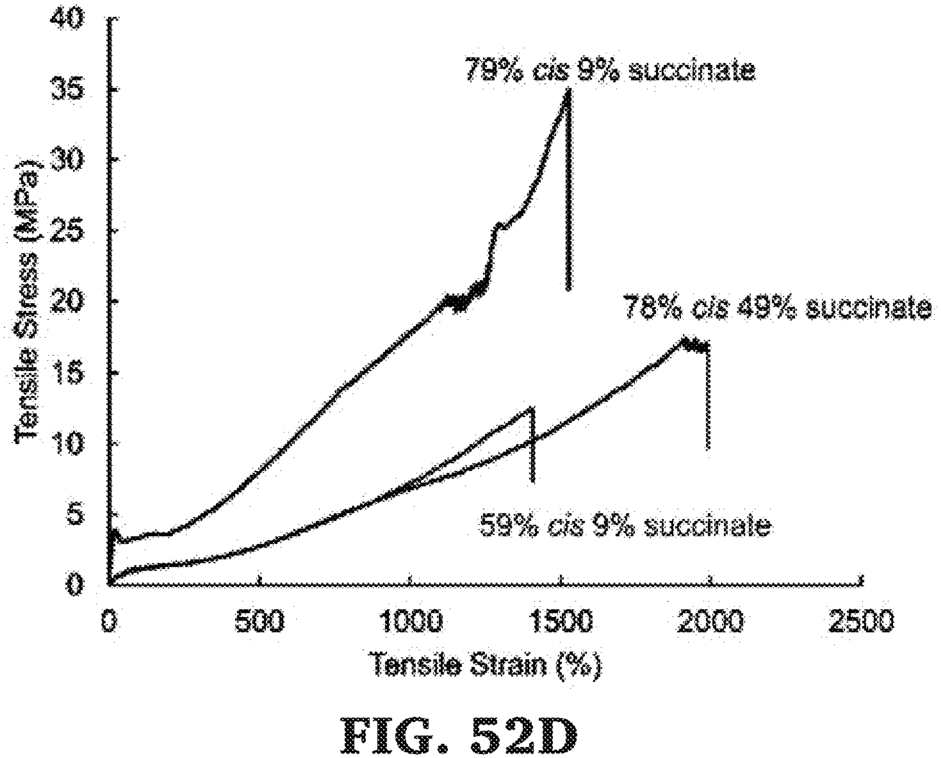

Mechanical properties and degradation rates are highly tunable depending on the amount of cis-alkene bonds in the backbone and stoichiometric control of succinate content. Succinate groups in the chemical structure provide flexibility and hydrophilicity to the polymer chains and facilitate the degradation process. FIG. 52C is a graph showing mass loss over time for several thiol-yne elastomers according to the present invention indicating that the increase in chain mobility and hydrophilicity results in an increase of the number of degradable ester groups and hence the degradation rates; and FIG. 52D is a stress vs. strain graph of several thiol-yne elastomers according to the present invention showing that the increase in chain mobility and hydrophilicity results in a decrease of Young's modulus. As can be seen, increasing the cis-alkene content resulted in slower degradation rates and higher Young's moduli values, decreased ultimate strain. Error bars represent one standard deviation of the mean (n=3).

Figure 53A:
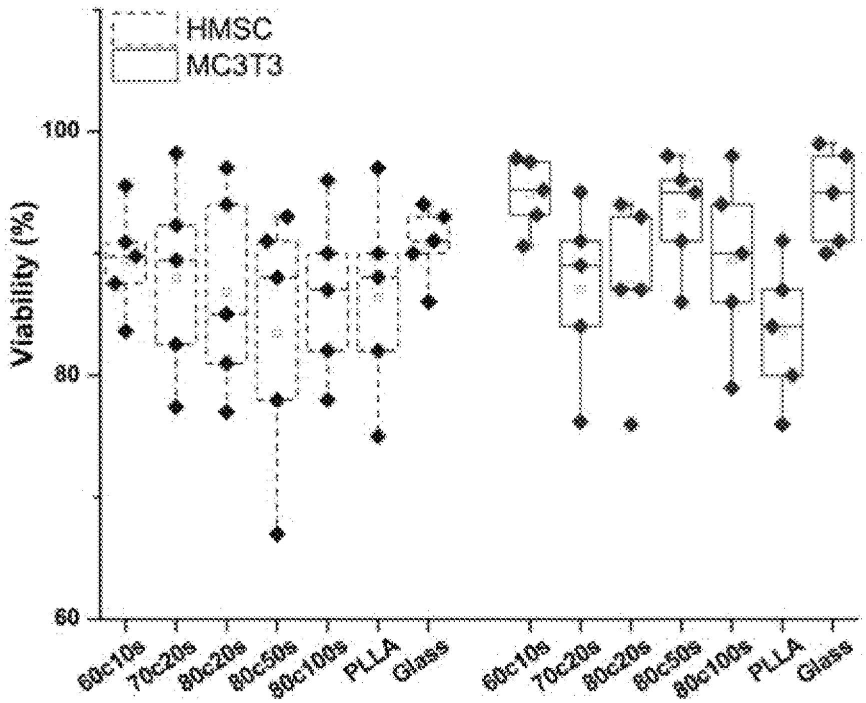

FIG. 53A is a graph showing quantitative cell viability data for hMSCs and MC3T3 fibroblasts on a wide variety of different substrates including one or more substrate comprising thiol-yne elastomers according to the present invention. The data showed >95% viability after 24 hours in both hMSCs and MC3T3 fibroblasts. Error bars represent one standard deviation of the mean (n=5).

Figure 53B:
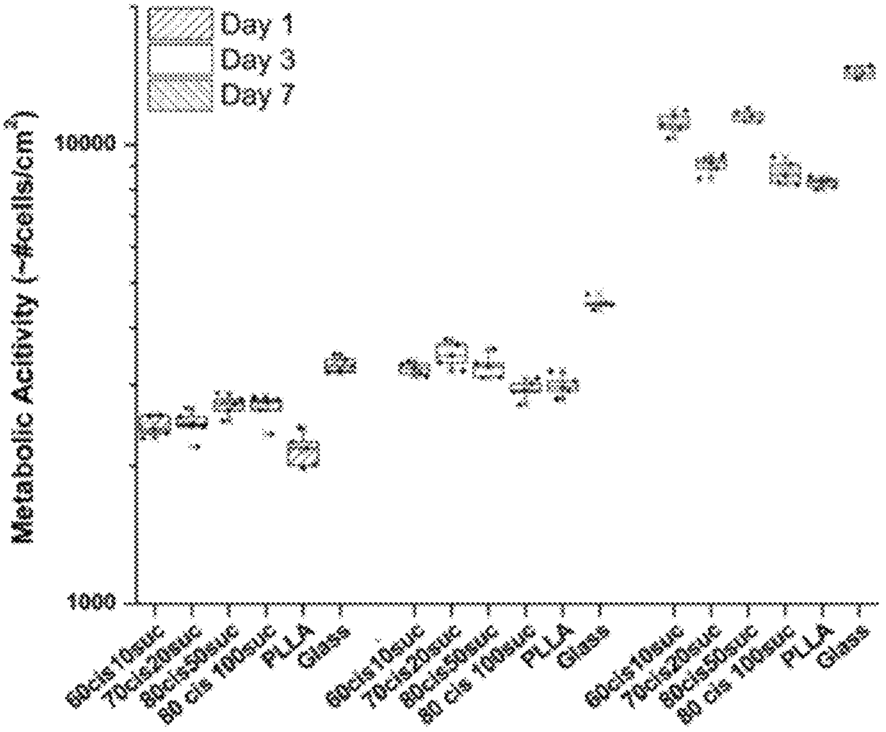

FIG. 53B is a graph showing cell metabolic activity at day 1, day 3, and day 7 on a wide variety of different substrates (including one or more substrate comprising thiol-yne elastomers according to the present invention) and showing an increase in approximate cell number on degradable polymer substrates over 7 days. Error bars represent one standard deviation of the mean (n=5).

Figure 54A:
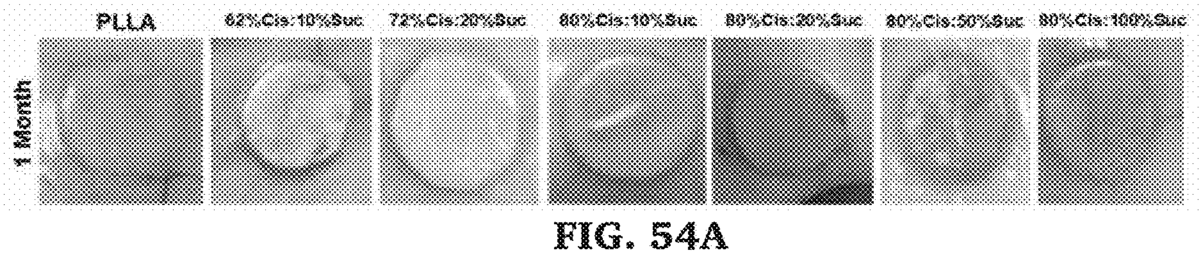
Figure 54B:
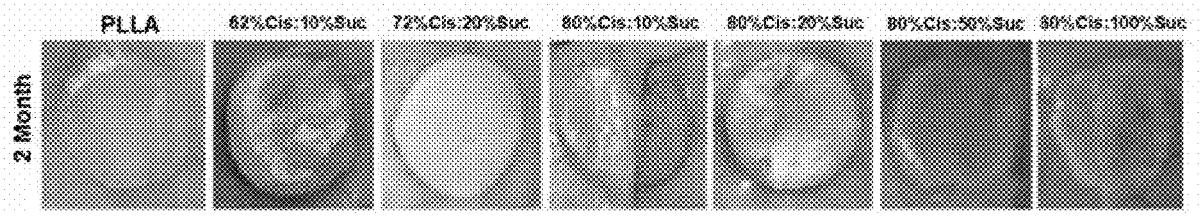
Figure 54C:
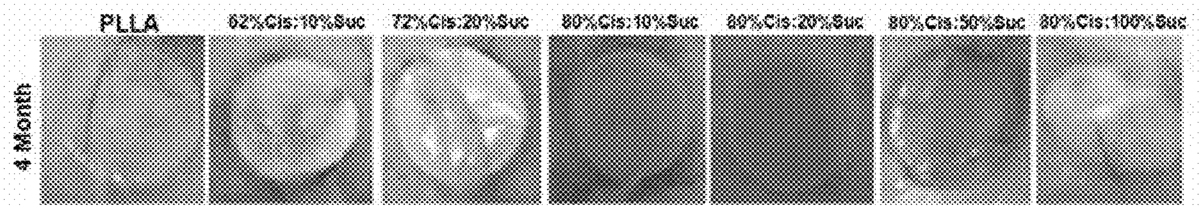

FIG. 54A-C are images of subcutaneous in vivo degradation of Poly(L-lactic acid) (PLLA), 80% cis/50% succinate and 80% cis/100% succinate subgroups over a 1-month (FIG. 54A), 2-month (FIG. 54B), and 4-month timeframe (FIG. 54C). Surgical procedures with subcutaneous implantation involved a small incision, polymer disc insertion, and incision closure with Michel-clips. Four samples were implanted per animal. As seen, there are almost no macroscopic indications of an inflammatory response Following extraction, the implants can be visualized in the host tissue using Hematoxylin and Eosin (H&E) and Masson's Trichrome staining. Whole-mount cross-section images showing thick fibrous encapsulation surrounding PLLA after 4 months of incubation in vivo are observed.

Figure 55A:
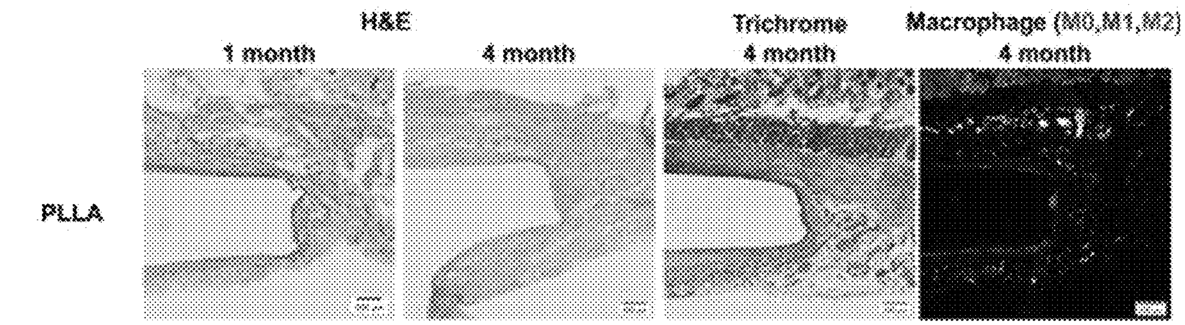
Figure 55B:
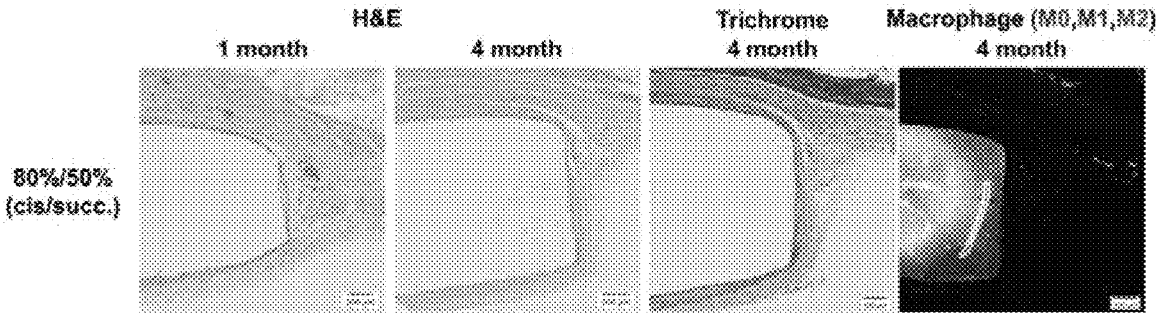
Figure 55C:
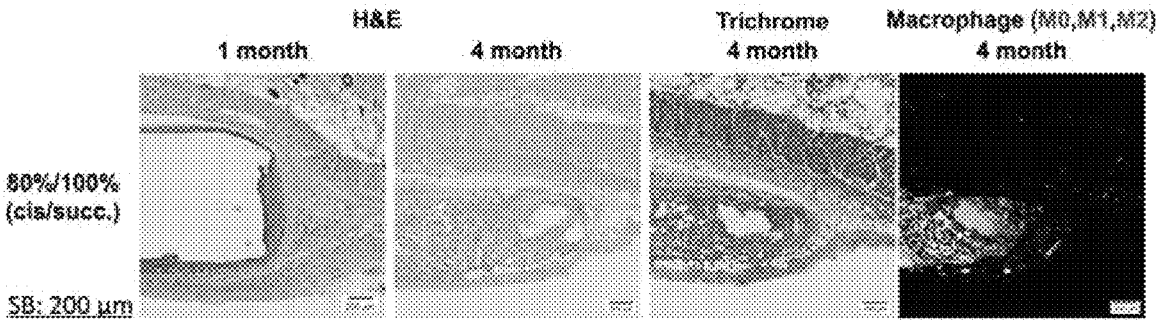

FIG. 55A-C are cross sectional images of the subcutaneous in vivo implants in FIG. 54 with Hematoxylin and Eosin (H&E) staining (at 1 and 4 months), Masson's Trichrome staining, and immunohistochemistry staining macrophages for pro-inflammatory (M1), non-activated (M0) and anti-inflammatory (M2) macrophages for Poly(L-lactic acid) (PLLA) (FIG. 55A), 80% cis/50% succinate (FIG. 55B) and 80% cis/100% succinate (FIG. 55C) subgroups. Similar behavior to PLLA is observed for 80% cis/50% succinate at 1- and 4-months implantation. Early stages of cellular infiltration are noticed in 80% cis/100% succinate after only 1 month (I). After 2- and 4-months, noticeable shrinking/resorption of the polymer was seen with continued cellular infiltration. Degradation after 4 months is nearly complete with cells, deposited collagen and tissue fully encompassing the polymer area. Blood vessel sprouts and multinucleated giant cells are noticeable throughout the polymer space that has been resorbed. Trichome images show collagen deposition and immunohistochemistry staining macrophages for pro-inflammatory (M1), non-activated (M0) and anti-inflammatory (M2) macrophages show degradation induced inflammation and remodeling. Inset scale bar=200 mm. Shown micrographs are representative of histology specimens (n=4) from each of six independent implants (n=6) for each material.

FIG. 56 is a table reporting the results of a modified 10993-6 Inflammatory Histological Response Analysis.

Figure 57A:
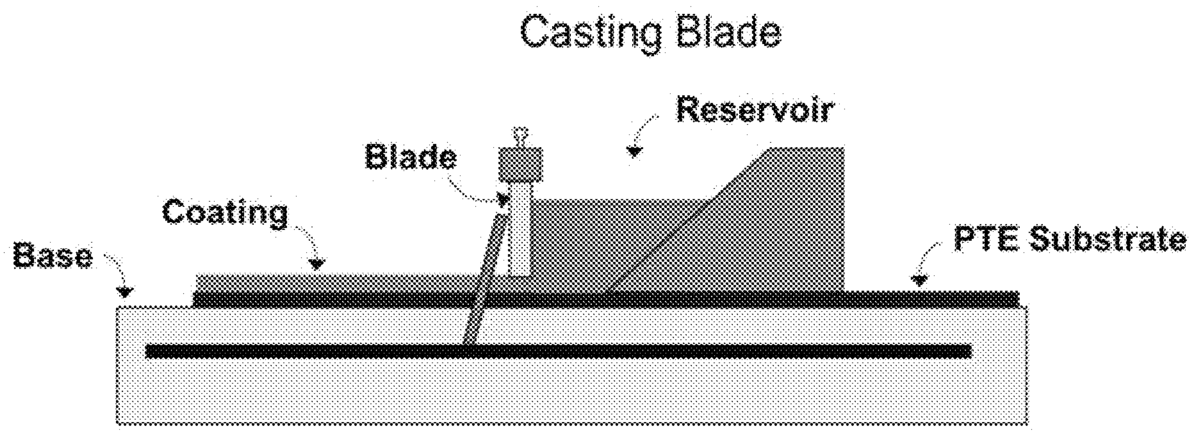
Figure 57B:
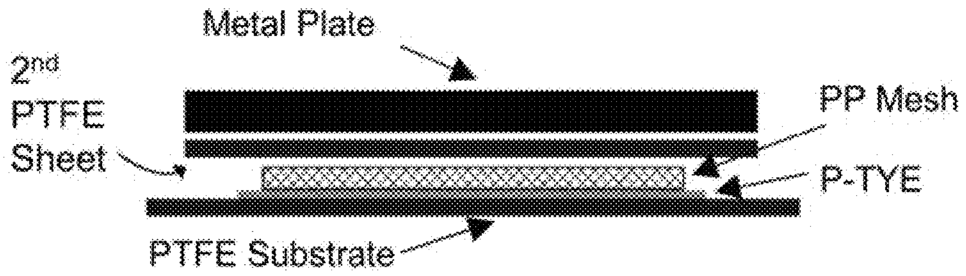
Figure 57C:
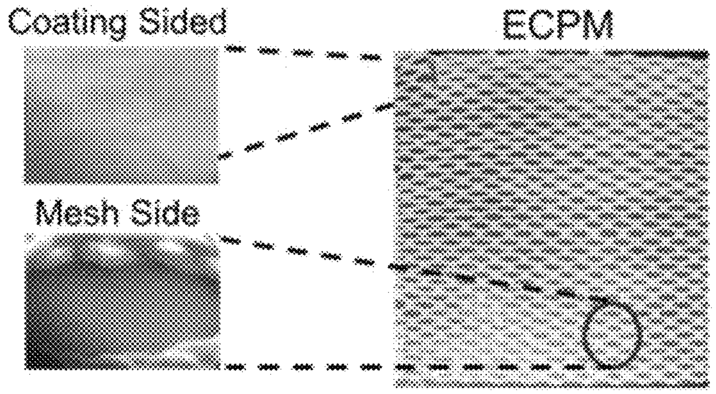
Figure 57D:
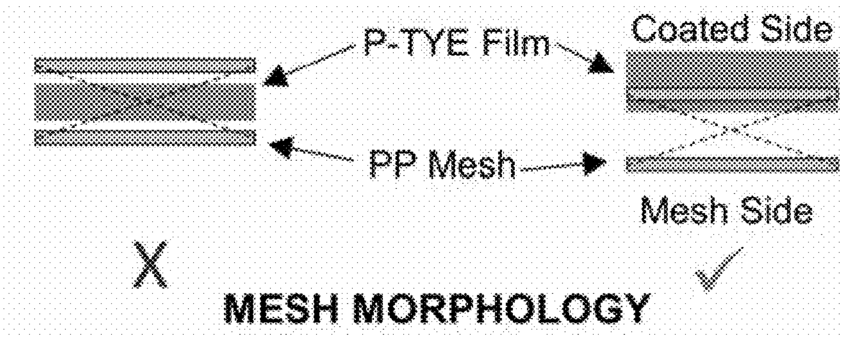

FIGS. 57A-E are schematic drawings and images showing fabrication of composite mesh with a degradable anti-adhesive coating on one side including: solution casting setup to fabricate elastomer-coated meshes (FIG. 57A); a mesh fabrication scheme (FIG. 57B); SEM micrographs confirming the topography of composite mesh with the coating dominant side and mesh dominant side (FIG. 57C); schematic illustrations depicting a failed or defective fabrication on the left and the desired mesh fabrication on the right (FIG. 57D); and a schematic drawing showing a functionalization process for fabricating a functionalized Z-ECPM from ECPM according to the present invention (FIG. 57D). This setup prevents the reagent bath from coming in contact with mesh side and thus preventing functionalizing elastomer on that side.

Figure 58A:
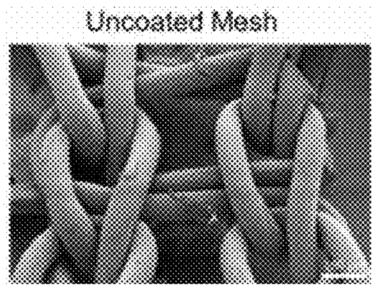
Figure 58B:
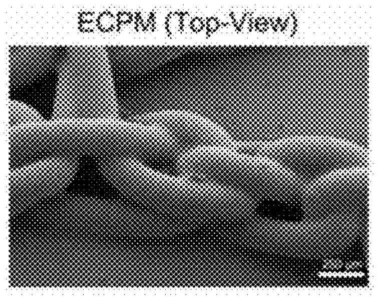
Figure 58C:
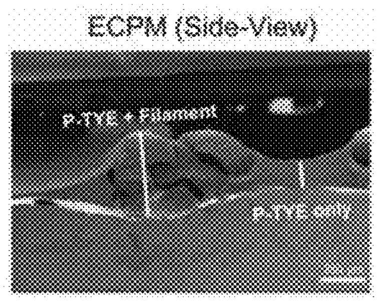

FIGS. 58A-C are SEM micrographs showing: of uncoated polypropylene mesh (FIG. 58A); a top view of elastomer-coated mesh (FIG. 58B); and a side view of elastomer-coated polypropylene mesh (FIG. 58C).

Figure 59A:
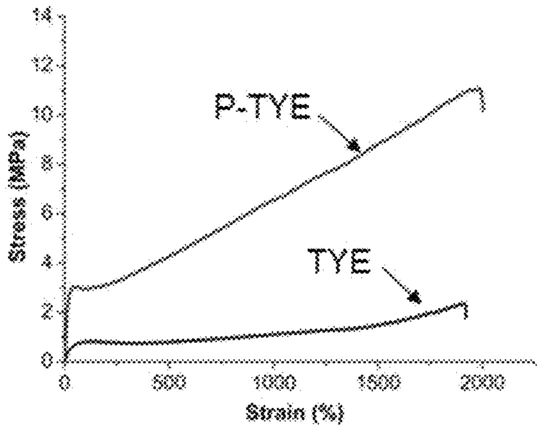
Figure 59B:
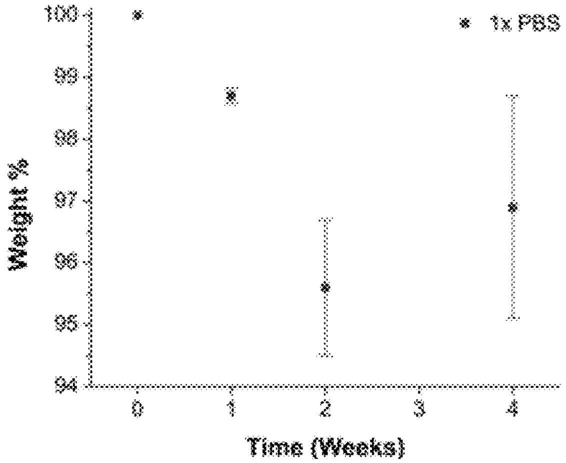

FIGS. 59A-F are graphs showing: (FIG. 59A) uni-axial tensile test on TYE (thiol-yne stereo-elastomer) and P-TYE (propargyl derivatized thiol-yne stereo-elastomer) (FIG. 59B). In vitro degradation of P-TYE in 1×PBS (FIG. 59C) and accelerated 5 M NaOH at 37° C. conditions. (FIG. 59D) Mechanical characterization of PPM (uncoated polypropylene mesh) and (FIG. 59E) ECPM (P-TYE elastomer-coated polypropylene mesh). The zwitterionic coating does not have a significant effect on the properties of the composite mesh. (FIG. 59F) Cyclic mechanical characterization on PPM and ECPM meshes show little influence on the integrity of the composite mesh. The elastomer-coated mesh, ECPM withstands 50 N/cm force (20 cycles) without failure or delamination of the degradable elastomer coating.

Figure 60A:
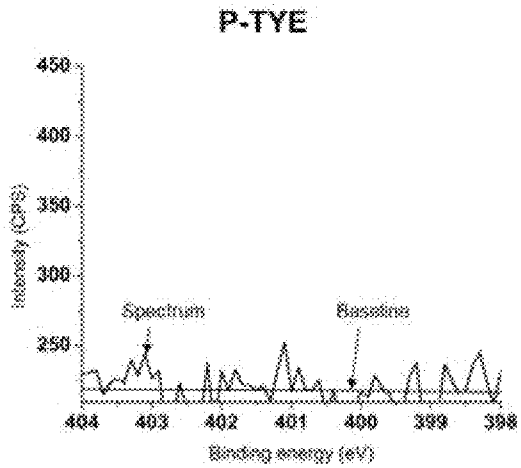
Figure 60B:
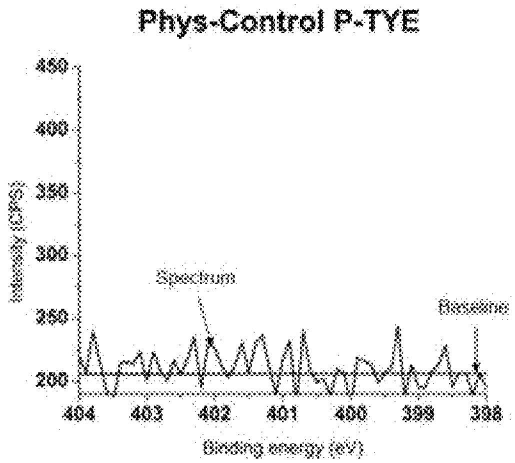
Figure 60C:
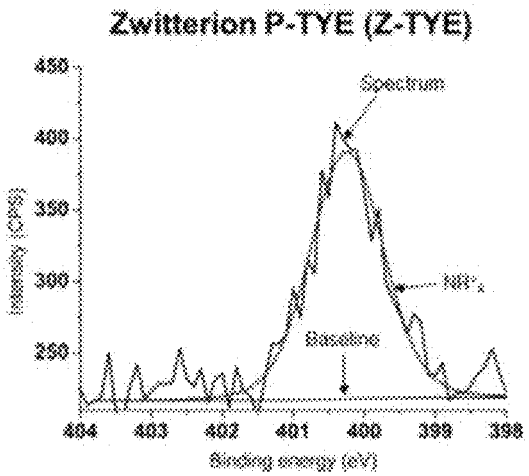
Figure 60D:
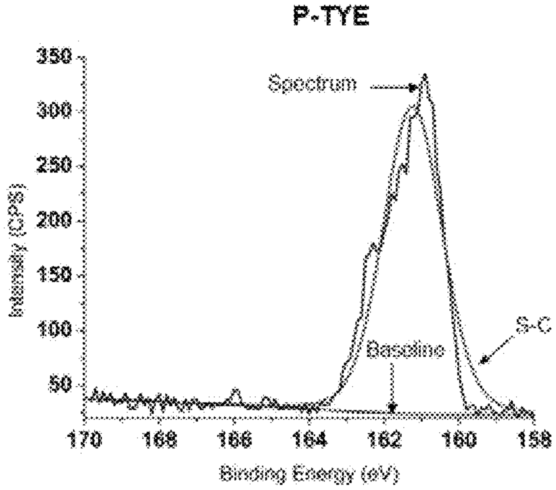
Figure 60E:
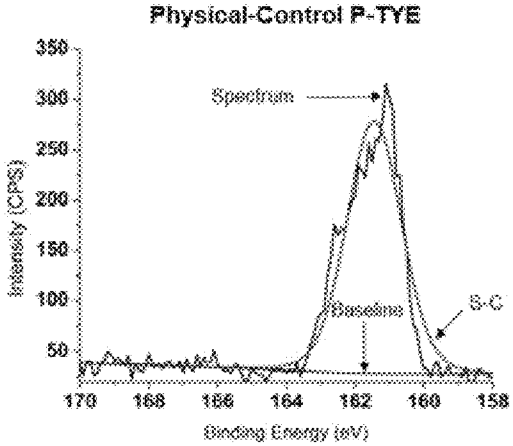
Figure 60F:
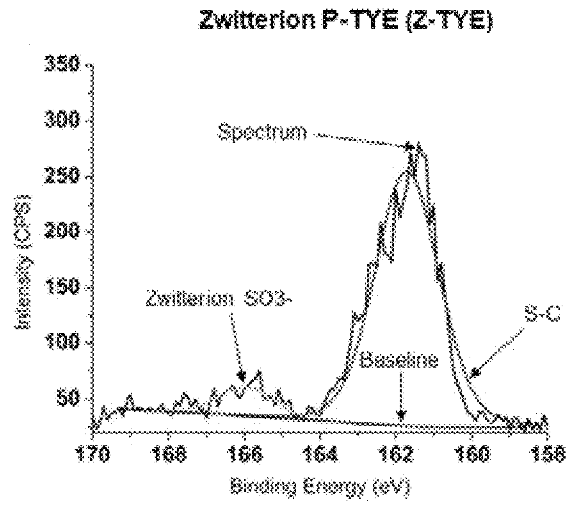

FIGS. 60A-F are high resolution XPS of Nis region for Unfunctionalized control, P-TYE (FIG. 60A); physical adsorption control Phys-control P-TYE (FIG. 60B), and Zwitterionic functionalized, Z-TYE (FIG. 60C) as well as high resolution XPS of the S2p orbital for P-TYE (FIG. 60D), Phys-control P-TYE (FIG. 60E), and Z-TYE (FIG. 60F). The sulfonate sulfur content relative to total sulfur species in the Z-TYE (FIG. 60F) was found to be 8.9±2.4% which is close to its theoretical value of 8.34% While other groups (FIGS. 60D, 60E) did not show presence of sulfonate sulfur. Calculations were made using Casa XPS program (n=10).

Figure 61A:
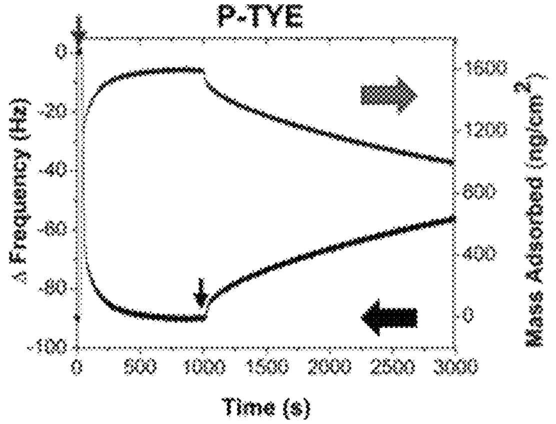
Figure 61B:
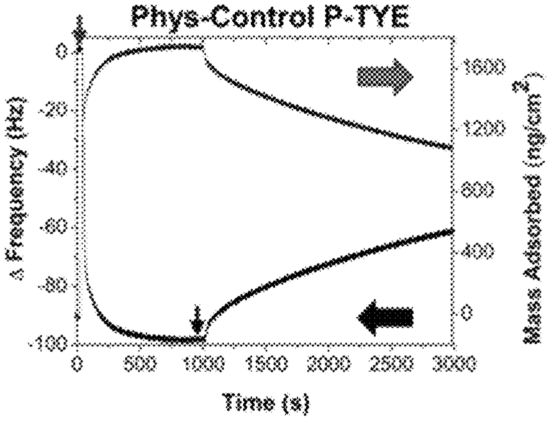
Figure 61C:
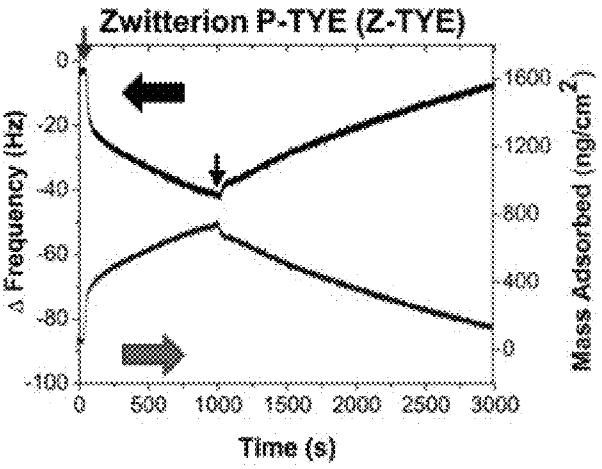
Figure 61D:
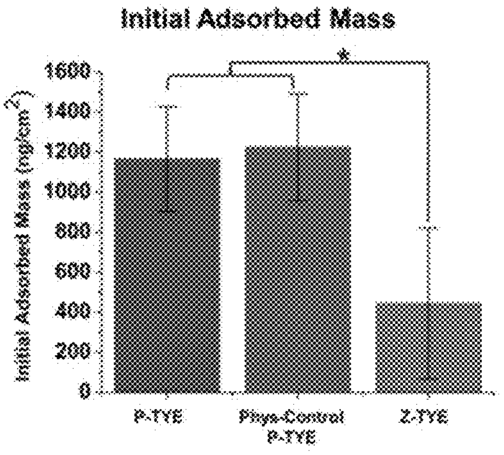
Figure 61E:
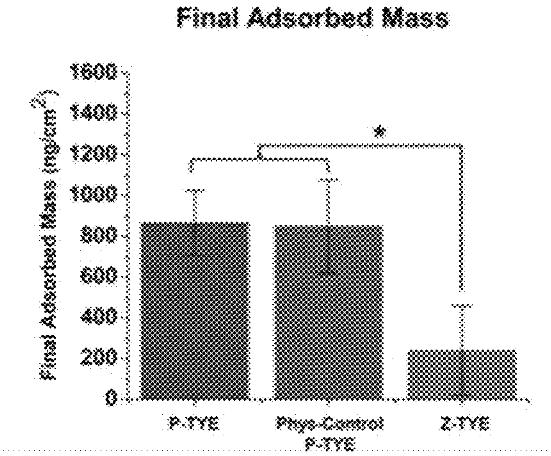
Figure 62A:
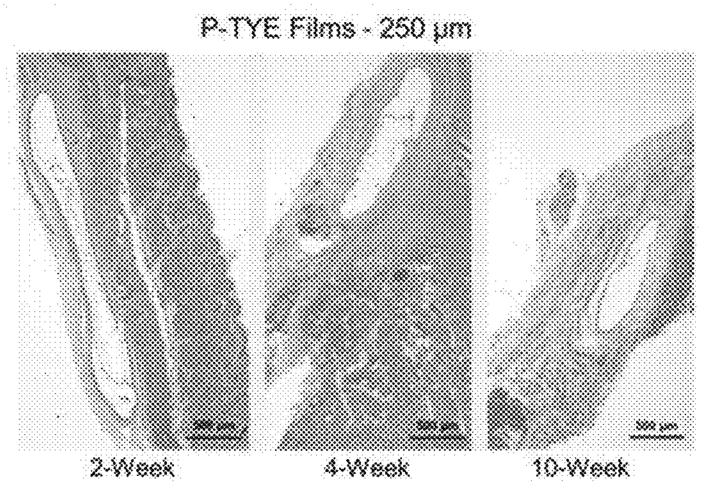
Figure 62B:
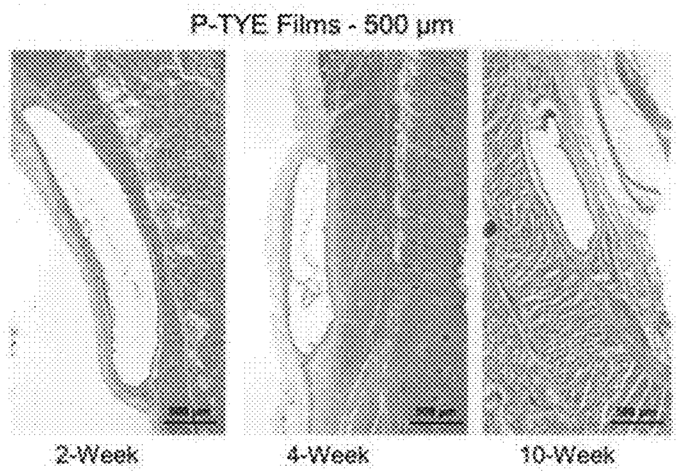
Figure 62C:
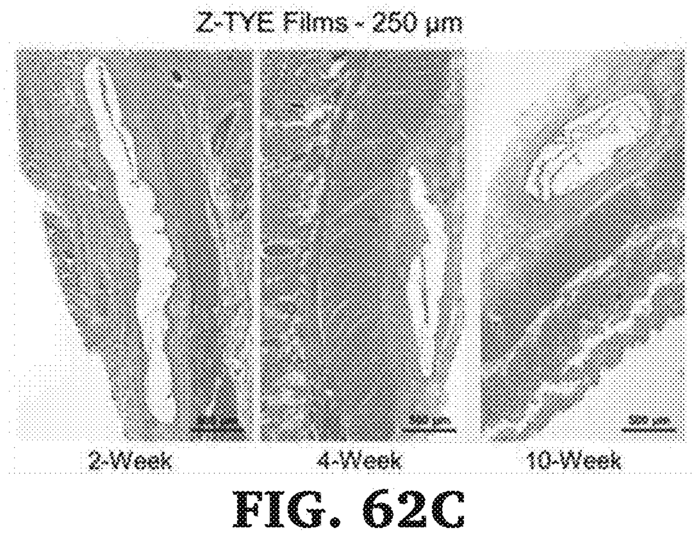
Figure 62D:
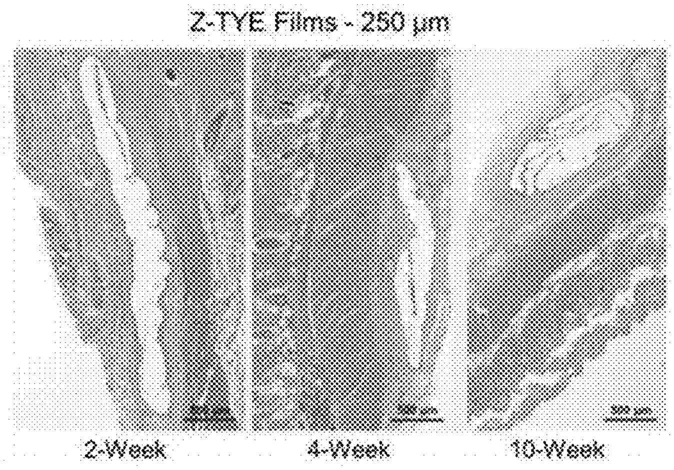

FIGS. 61A-E are graphs reporting the results of a fibrinogen adsorption assay for characterizing resistance to protein adsorption performed using a Quartz Crystal Microbalance (QCM) showing representative QCM measurements for P-TYE (Unfunctionalized control) (FIG. 61A), Phys-control P-TYE (FIG. 61B), and Z-TYE (zwitterion functionalized P-TYE elastomer) (FIG. 61C). The upper arrow indicates the introduction of fibrinogen flow through QCM chamber, while the lower arrow indicates the onset of 1×PBS wash. FIG. 61D is a comparison of the initially adsorbed mass as calculated at the position of black arrow and FIG. 61E is a comparison of the final adsorbed mass as calculated at the endpoint of measurement. The Z-TYE elastomer group showed significantly lower initial and final adsorbed mass when compared to Phys-adsorption and Unfunctionalized. * Indicates statistical significance (P<0.00001).

FIGS. 62A-D are images from an in vivo tissue compatibility studies performed on P-TYE stereo-elastomer samples in a murine subcutaneous implantation model showing the P-TYE (FIGS. 62A-B) and Z-TYE (FIGS. 62C-D) elastomer disc samples with two different thicknesses (250 μm (FIGS. 62A and 62C) and 500 μm (FIGS. 62B and 62D) that were implanted subcutaneously for 10 weeks to observe their degradation behavior and tissue inflammatory responses in vivo.

Figure 63A:
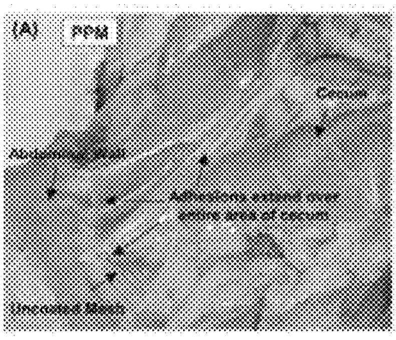
Figure 63B:
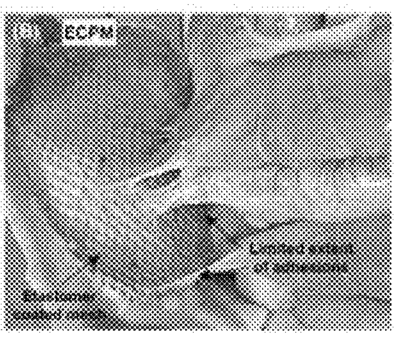
Figure 63C:
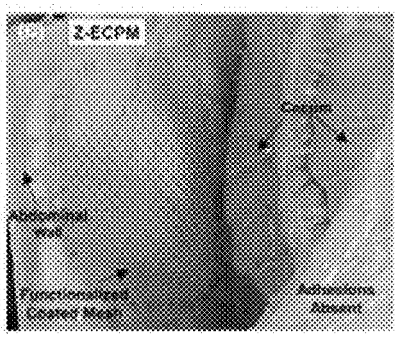
Figure 63D:
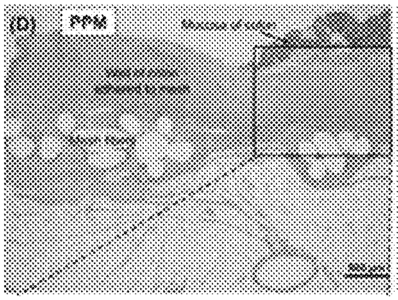
Figure 63E:
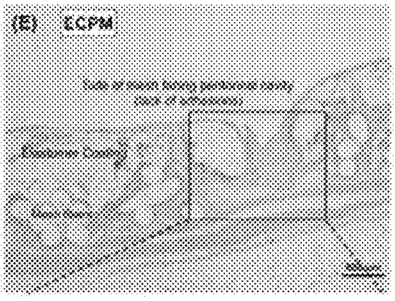
Figure 63F:
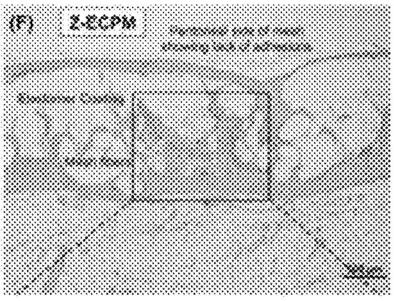
Figure 63G:
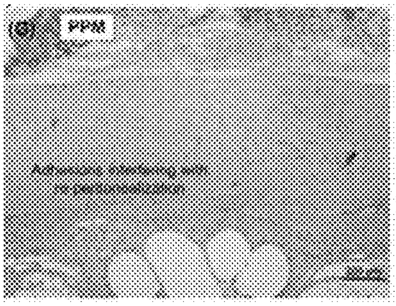
Figure 63H:
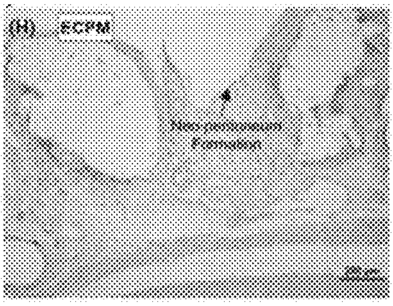
Figure 63I:
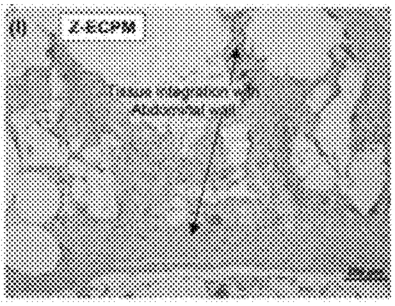
Figure 63J:
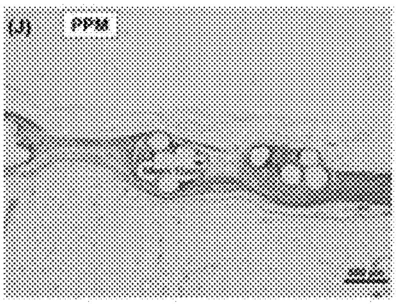
Figure 63K:
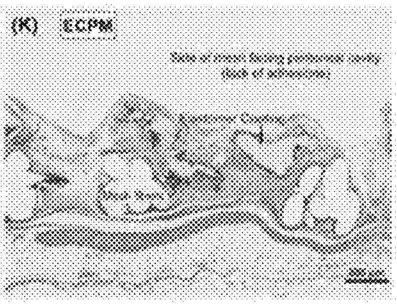
Figure 63L:
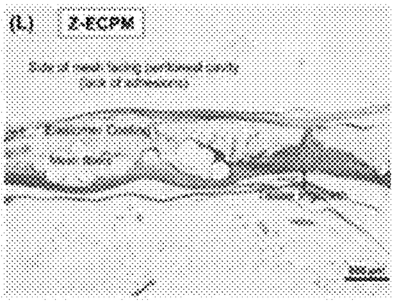

FIGS. 63A-L are images are images showing macroscopic and microscopic histology findings from Rabbit cecal abrasion hernia adhesion Model studies depicting numerous robust fibrous adhesions that form between the surface of the uncoated mesh and the serosal surface of the cecum and omentum for PPM (Uncoated polypropylene mesh) (FIG. 63A). a significantly reduced fibrous adhesion example between the surface of the ECPM (unfunctionalized coated mesh) and the serosal surface of the cecum (FIG. 63B), and the absence of adhesions in Z-ECPM population group (zwitterion-functionalized elastomer-coated) (FIG. 63C). All of the animals in Z-ECPM cohort were devoid of adhesions between mesh and cecum and only occasionally showed adhesions associated with suture line. FIGS. 63D-F show H&E stained histology sections for each of the three mesh groups and FIGS. 63J-L show Masson's Trichrome stained histology sections for mesh groups. Higher magnification images are shown in FIGS. 63G-I. The adhesions are clearly visible in the PPM cohort, shown in FIGS. 63D and 63G.

Figure 64:
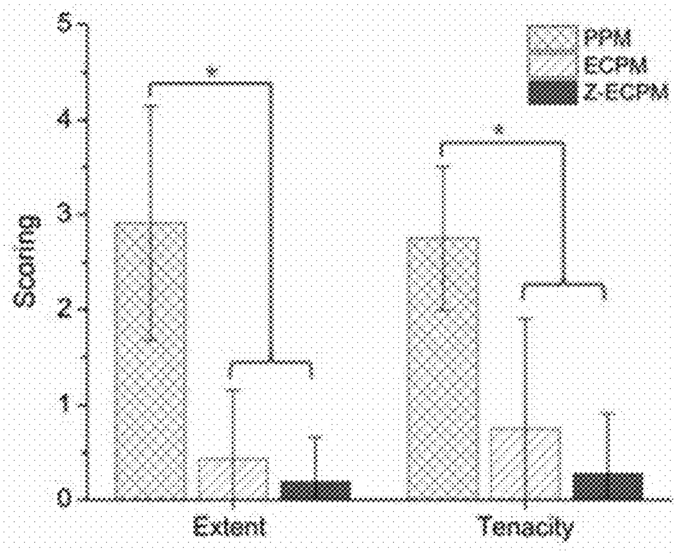

FIG. 64 is a graph comparing scoring of extent and severity (tenacity) of adhesions through gross evaluation in a spanning defect rabbit hernia. Reduction in extent of adhesions was seen with both ECPM and Z-ECPM relative to PPM (85% and 94% respectively). Adhesion tenacity reduction was also seen with both ECPM and Z-ECPM relative to PPM (73% and 90% respectively) * Indicates statistical significance ($P<0.00001$).

Figure 65:
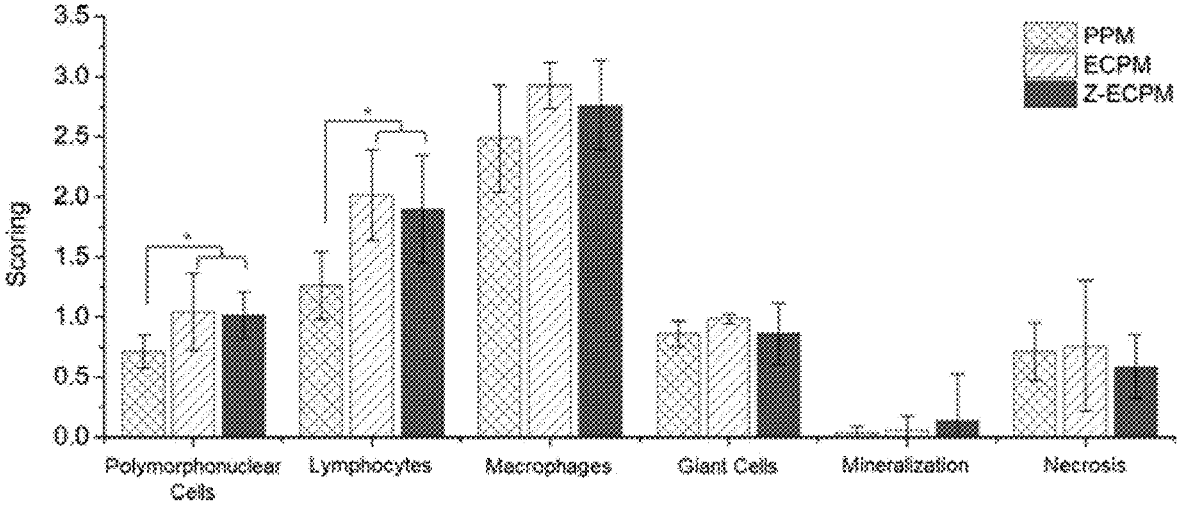

FIG. 65 is a graph comparing ISO 10993-6 scoring of inflammatory cells in a spanning defect rabbit hernia model with commercially available PPM (uncoated polypropylene mesh), ECPM (unfunctionalized elastomer-coated polypropylene mesh), and Z-ECPM (zwitterion functionalized elastomer-coated mesh). Differences in inflammatory scores between the uncoated and laminated meshes were primarily due to increased numbers of polymorphonuclear leukocytes and lymphoid cells. Other inflammatory indicators were very similar between all three groups. *Indicates statistical significance ($P<0.05$, n=8).

Figure 66:
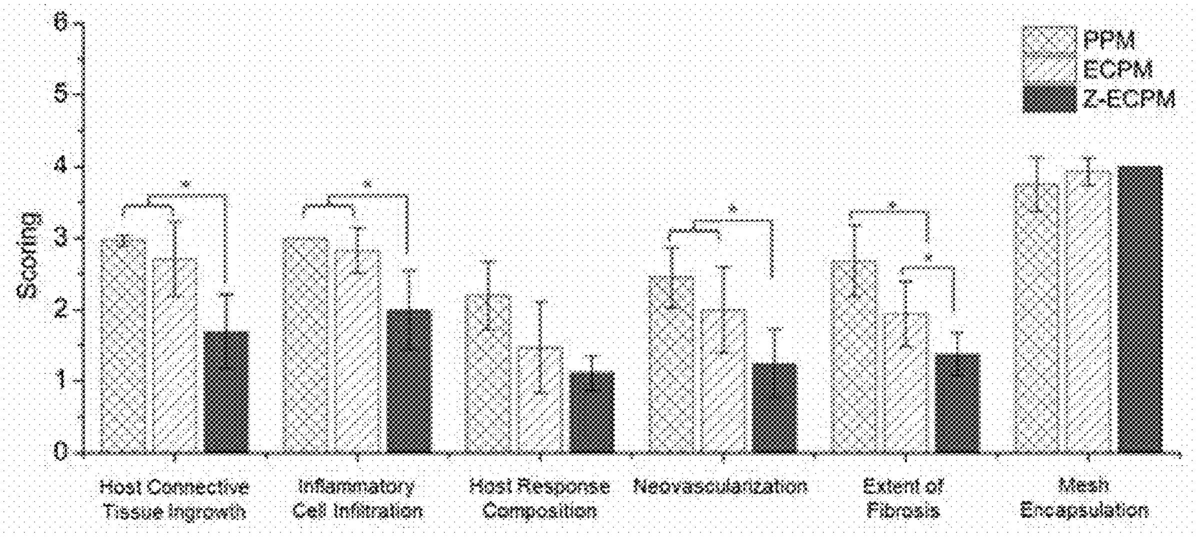

FIG. 66 is a graph comparing ISO 10993-6 scoring of bioincorporation and fibrosis in a spanning defect rabbit hernia model. *Indicates statistical significance ($P<0.05$, n=8).

Figure 67:
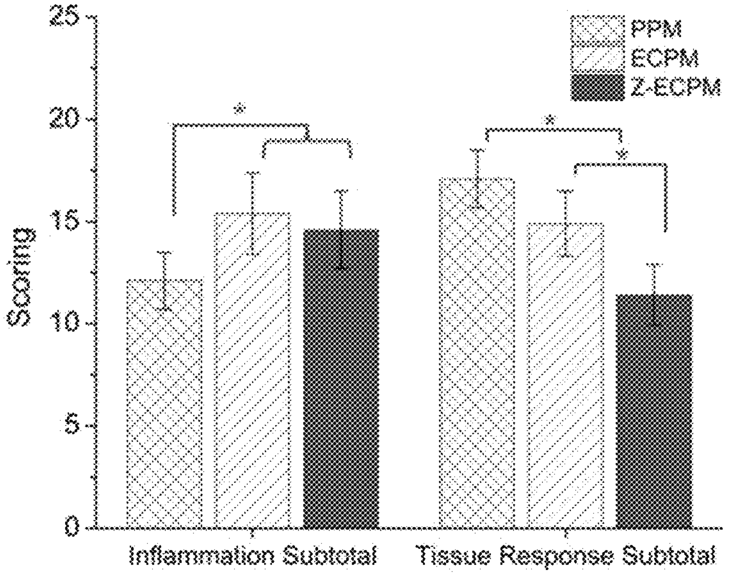

FIG. 67 is a graph comparing ISO 10993-6 scoring for inflammation (cumulative inflammatory cells) and tissue response (bioincorporation+fibrosis) in a spanning defect rabbit hernia model ($P<0.05$, n=8)

Figure 68:
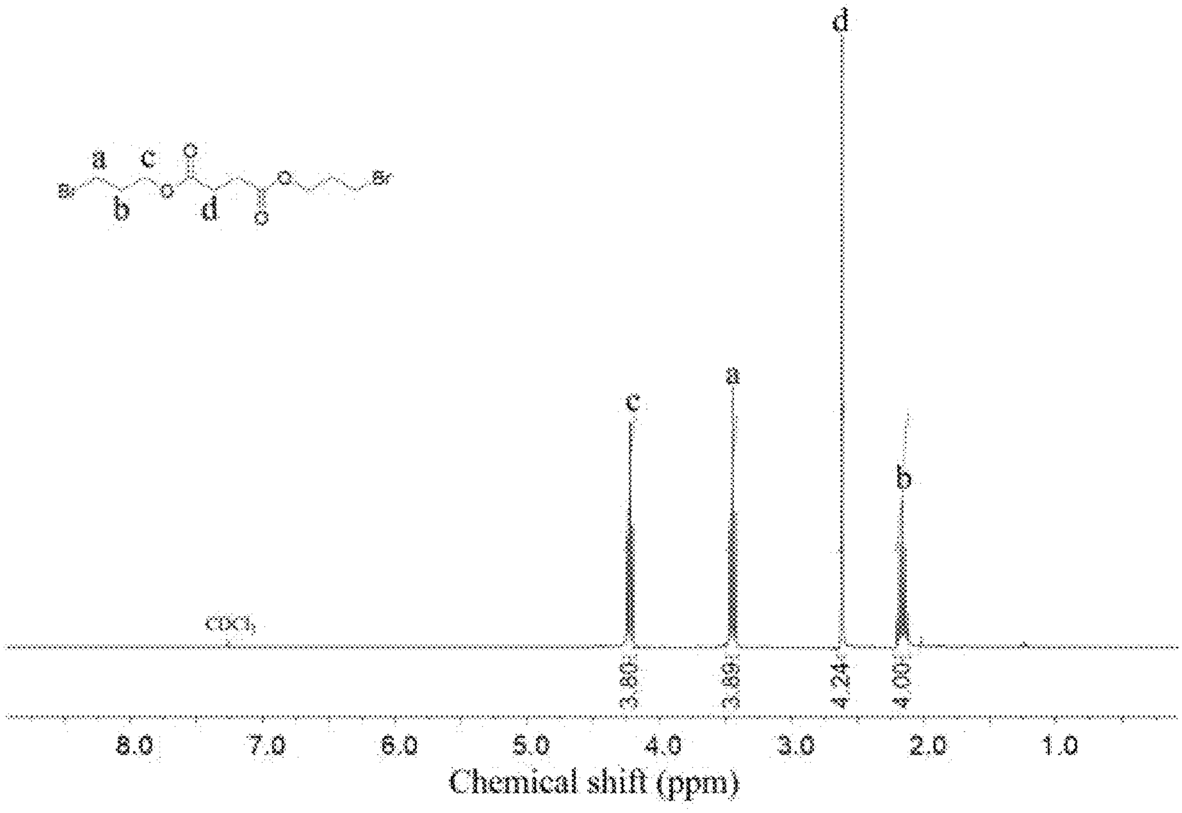

FIG. 68 a $^1$H NMR spectrum of compound 1 shows resonance c which confirms ester formation and carboxylic groups were converted to ester groups completely.

Figure 69:
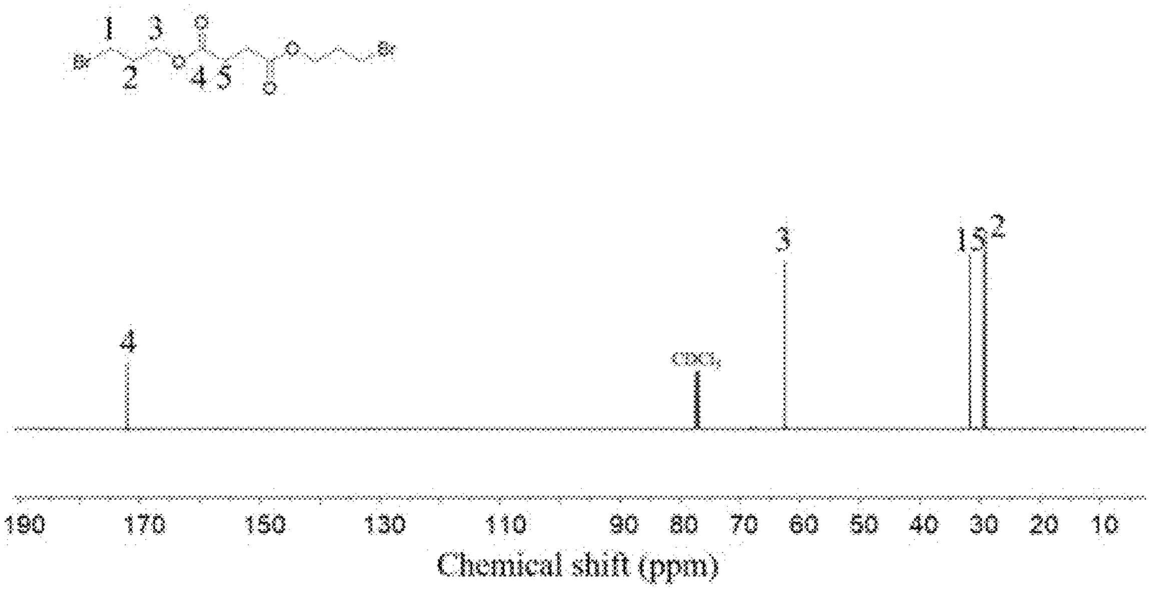

FIG. 69 is a $^{13}$C NMR spectrum of compound 1 displayed resonance 4 at 172.11 ppm corresponding to carbonyl group (C═O) of ester.

Figure 70:
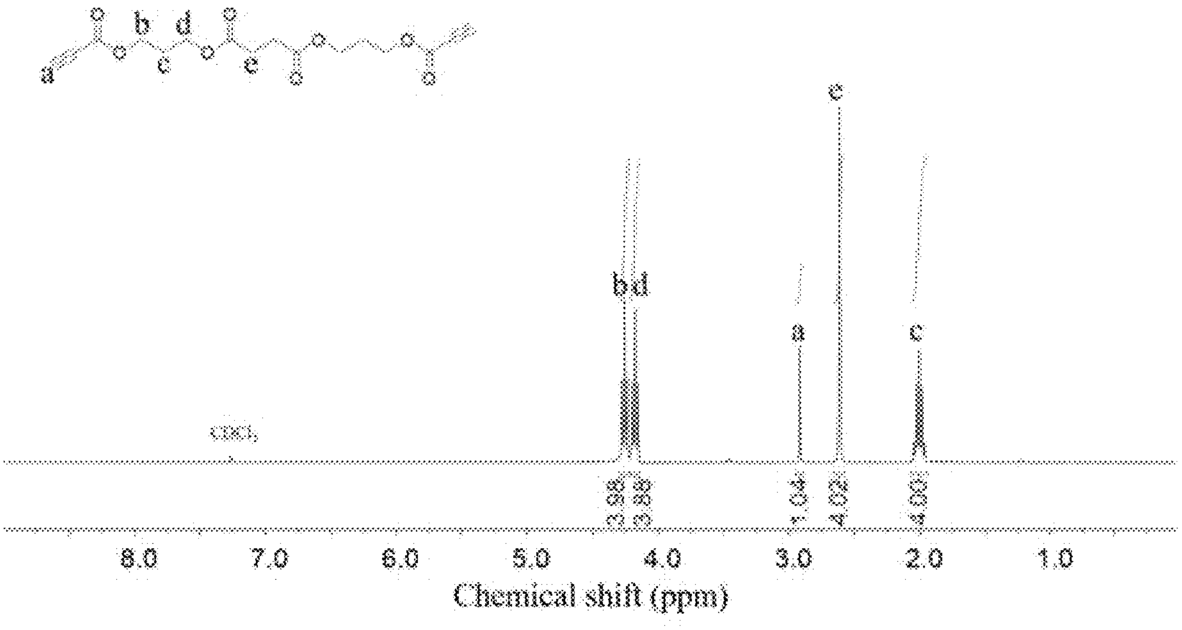

FIG. 70 is a $^1$H NMR spectrum of monomer S3 demonstrates one singlet resonances a corresponding to terminal alkyne and resonance b, methylene group ($CH_2$), shifted from 3.45 ppm to 4.26 ppm shows the methylene ($CH_2$) is adjacent to ester functional group. These two resonances confirm synthesis from nucleophilic substitution ($S_N2$) of sodium propiolate for both groups.

Figure 71:
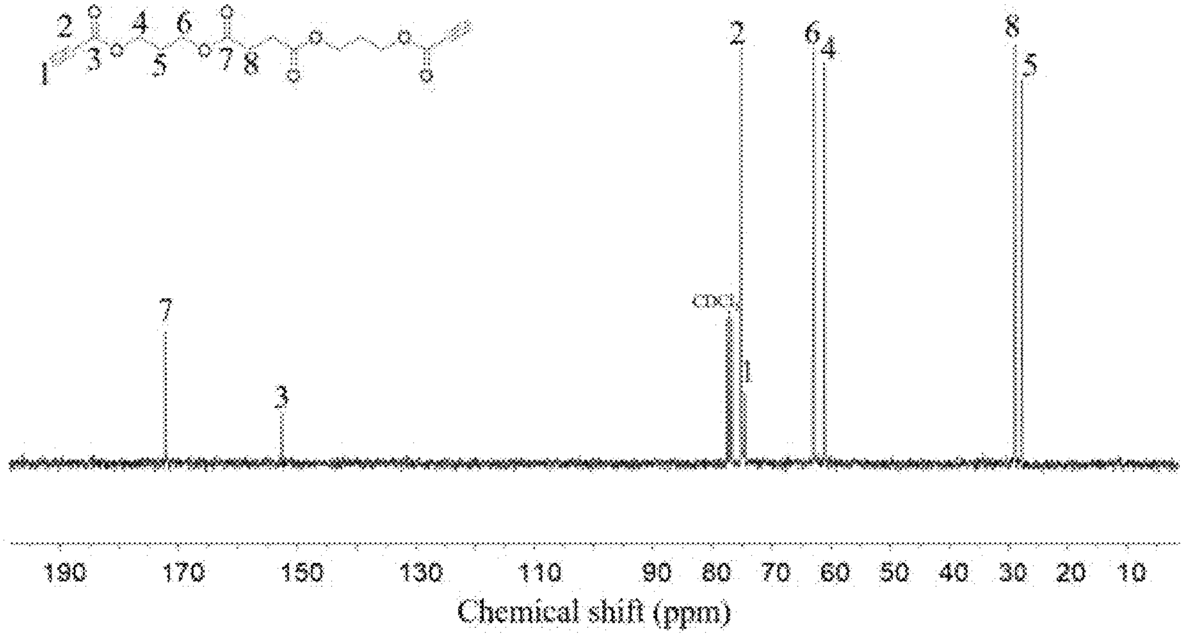

FIG. 71 is a $^{13}$C NMR spectrum of monomer S3 displays two carbonyl signals, resonance 7 from ester segment of succinate and resonance 3 corresponding to the carbonyl signal from sodium propiolate that confirms the formation of S3 via nucleophilic substitution.

Figure 72:
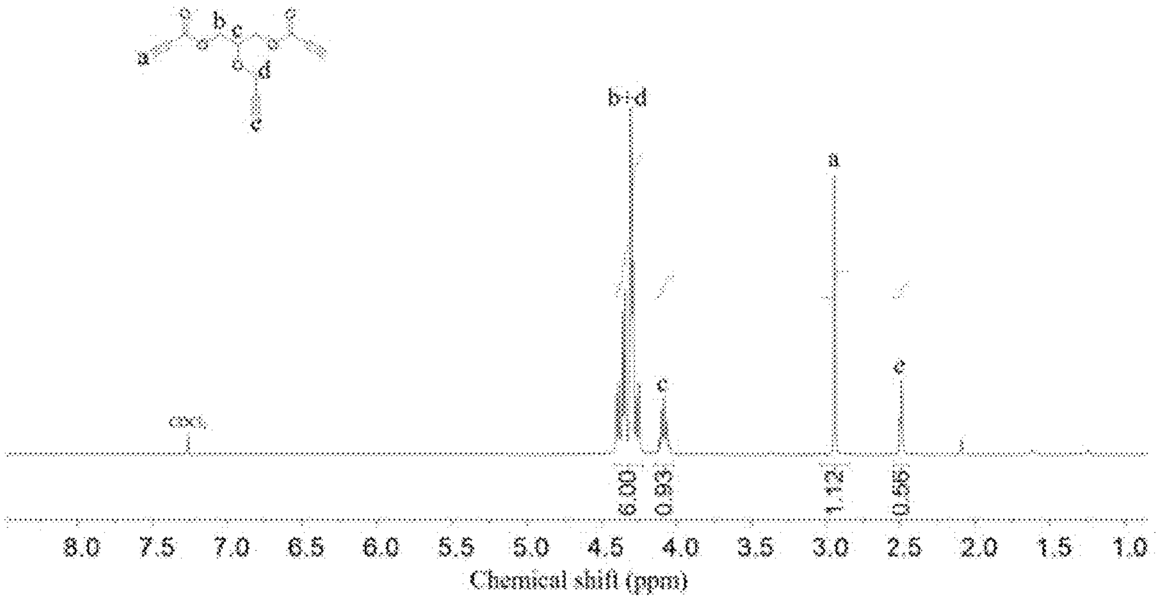

FIG. 72 is a $^1$H NMR spectrum of monomer P3 demonstrates one singlet resonances a corresponding to terminal alkyne and resonance b shows the methylene ($CH_2$) is adjacent to ester functional group. These two resonances confirm P3 was synthesized from Fischer esterification for both end groups.

Figure 73:
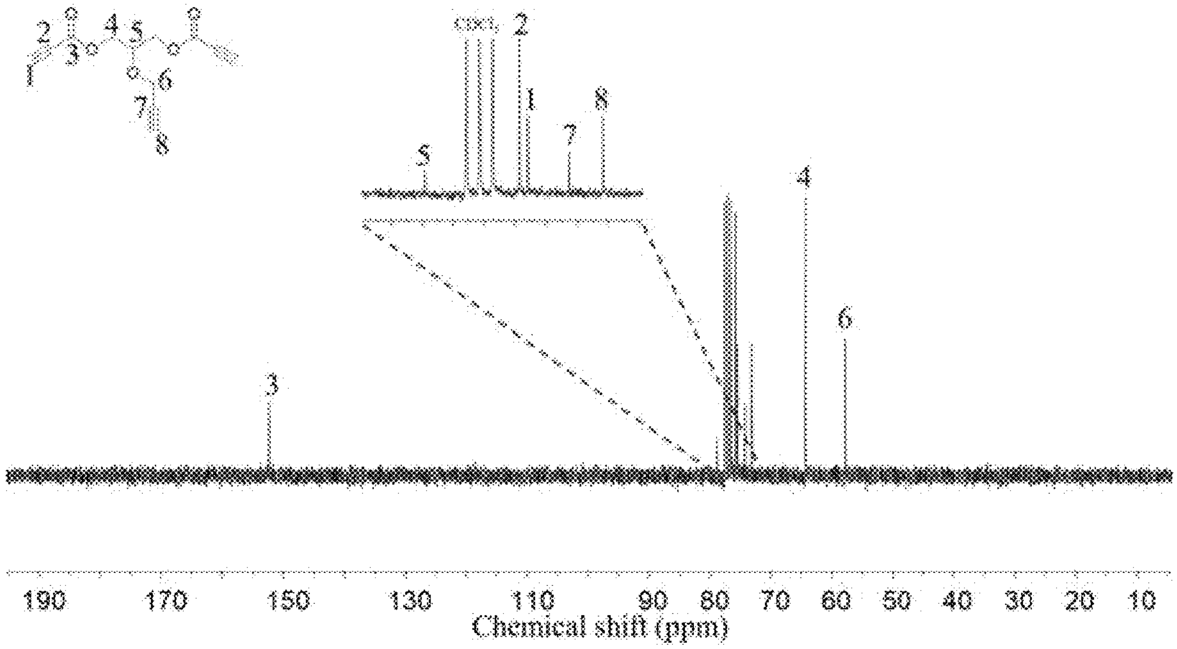

FIG. 73 is a $^{13}$C NMR spectrum of monomer P3 displayed resonance 4 at 152.35 ppm corresponding to carbonyl group (C═O) of ester.

Figure 74:
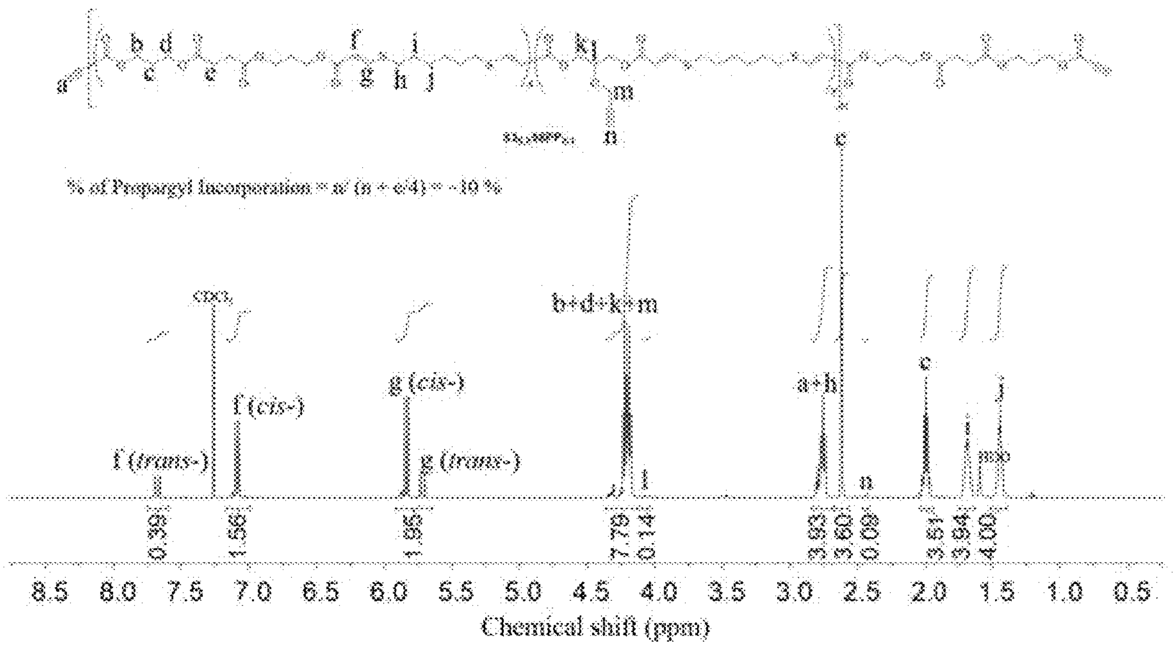

FIG. 74 is a $^1$H NMR spectrum of P-TYE shows the 81% cis-content for the thiol-yne step-growth copolymer with 10% incorporation of P3. Resonance h, i and j are from the dithiol monomer (S6) and resonance a, b, c, d, and e are from the succinate-based dipropiolate monomer (S3). The resonance n is from terminal alkyne which confirms the monomer P3 was incorporated successfully. % of P3 monomer can be calculated by ratio of resonance n and resonance e. The polymer P-TYE reveals cis %/trans %=81%: 19% in $CHCl_3$ with 1 mol % DBU.

Figure 75:
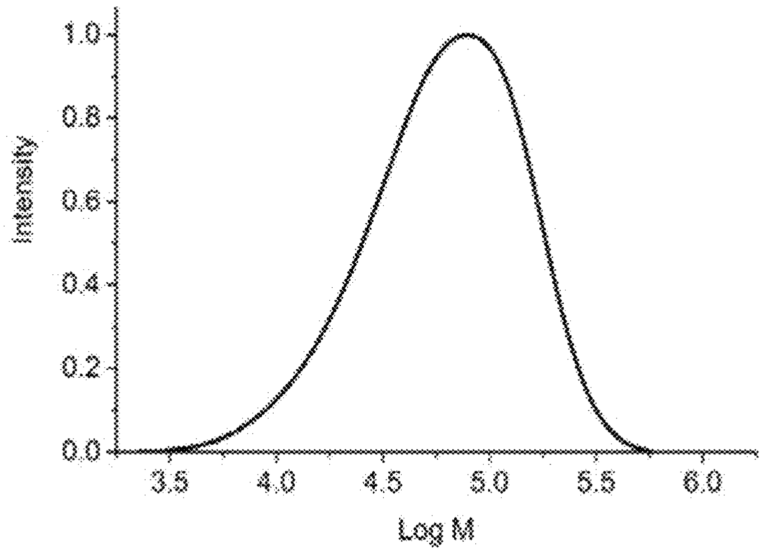

FIG. 75 is a SEC chromatogram for P-TYE, 81% Cis-) of thiol-yne step-growth copolymer with 10% incorporation of P3; $M_n$=41.9 kDa, $M_w$=83.3 kDa, $Đ_M$=2.0 (SEC DMF with 0.1 M LiBr, based on PS standard).

Figure 76A:
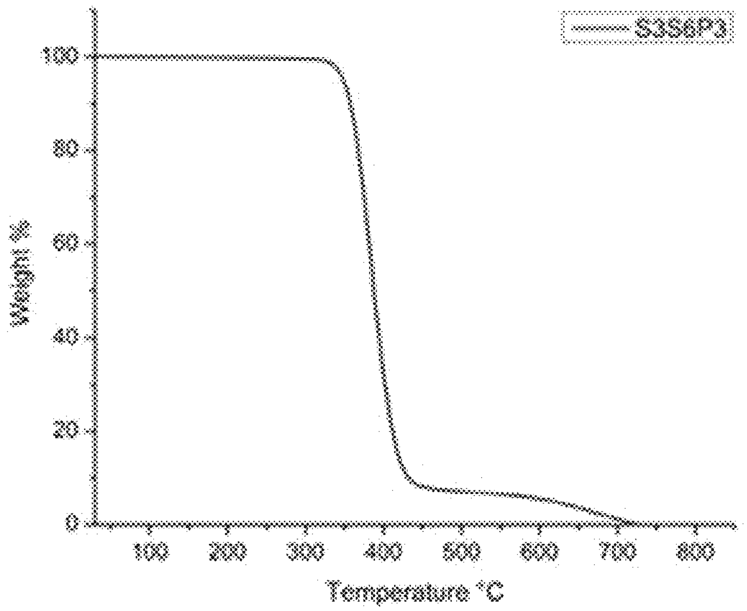
Figure 76B:
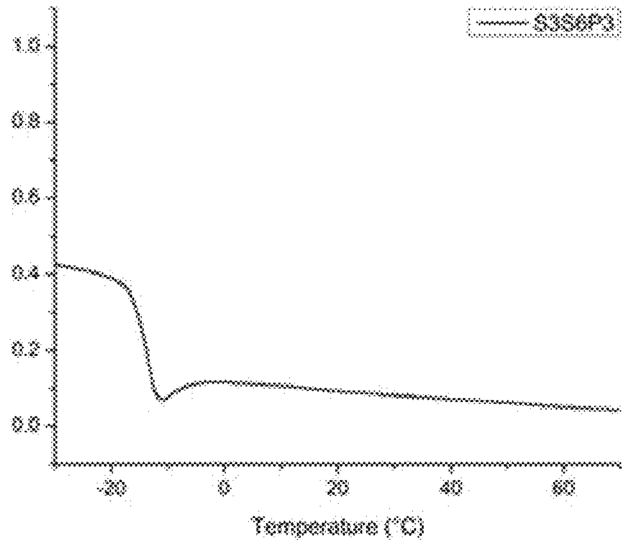

FIGS. 76A-B are thermal characterizations of P-TYE performed to determine the degradation profile and glass transition temperature by TGA thermogram (FIG. 76A) and DSC endogram (FIG. 76B).

Figure 77A:
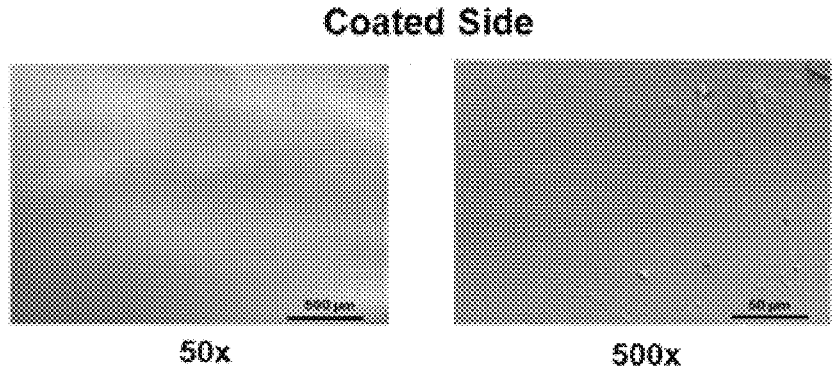
Figure 77B:
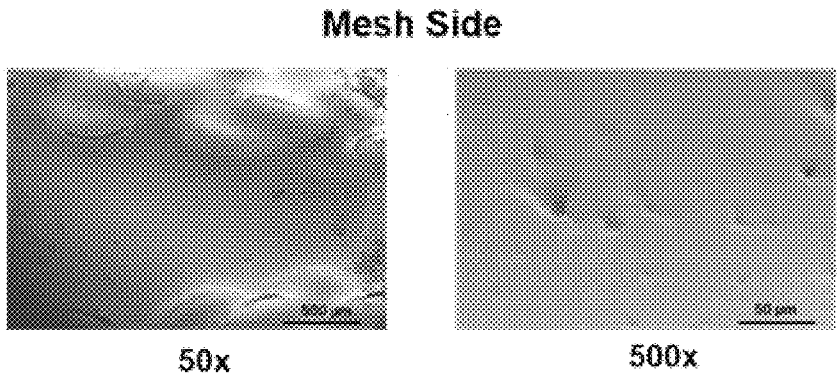

FIGS. 77A-B are SEM micrographs of composite mesh post cyclic testing at 50× and 500× showing the coated side (FIG. 77A) and the mesh side FIG. 77B) of the composite mesh. No micro-cracks or defects in the structure were seen on either side of the mesh.

Figure 78A:
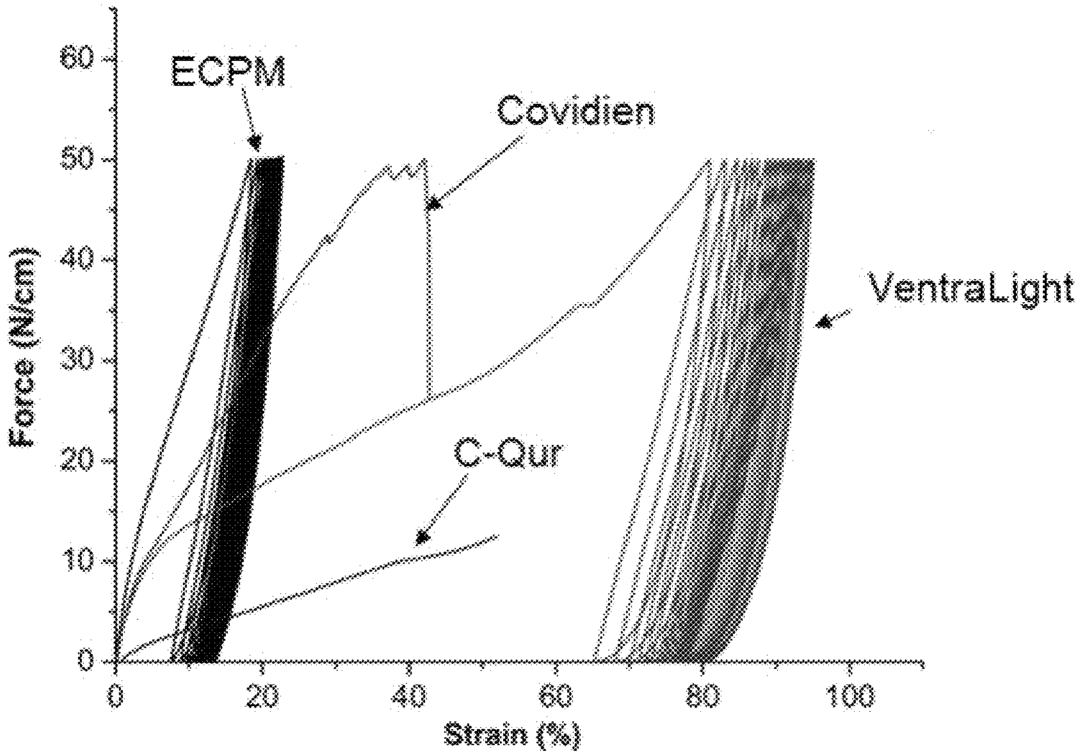
Figure 78B:
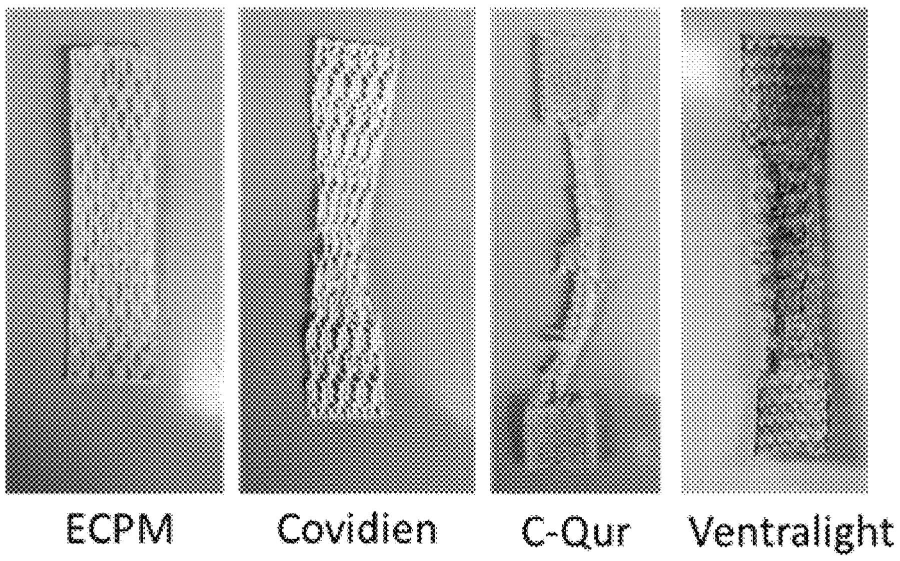

FIGS. 78A-B a graph (FIG. 78A) and an image (FIG. 78B) showing the results of cyclic testing done on ECPM and other commercial products. The Covidien™ and C-QUR™ underwent failure during first cycle, whereas Ventralight™ and ECPM withstood 50 N/cm (20 cycles) of cyclic strain with ECPM undergoing significantly lower strain, least deformation and no signs of delamination or rupture of coating.

Figure 79A:
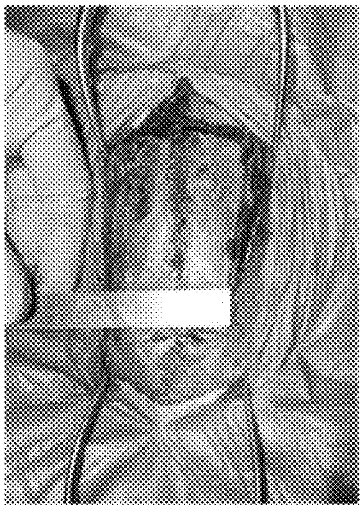
Figure 79B:
Figure 79C:
Figure 79D:

FIG. 79A-D are surgical images for rabbit abdominal hernia adhesion model, showing incisions made to create a 5 cm×8 cm spanning hernia defect (FIG. 79A), the cecum before abrasion (FIG. 79B), the large cecum after being abraded with a scalpel and sterile dry gauze and allowed to desiccate for 15 minutes to promote adhesion formation (FIG. 79C), and the composite mesh (7×10 cm) after it was placed so that the anti-adhesive coated side faces viscera and uncoated mesh faces the skin (FIG. 79D).

DETAILED DESCRIPTION OF THE ILLUSTRATIVE EMBODIMENTS

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

Figure 1:
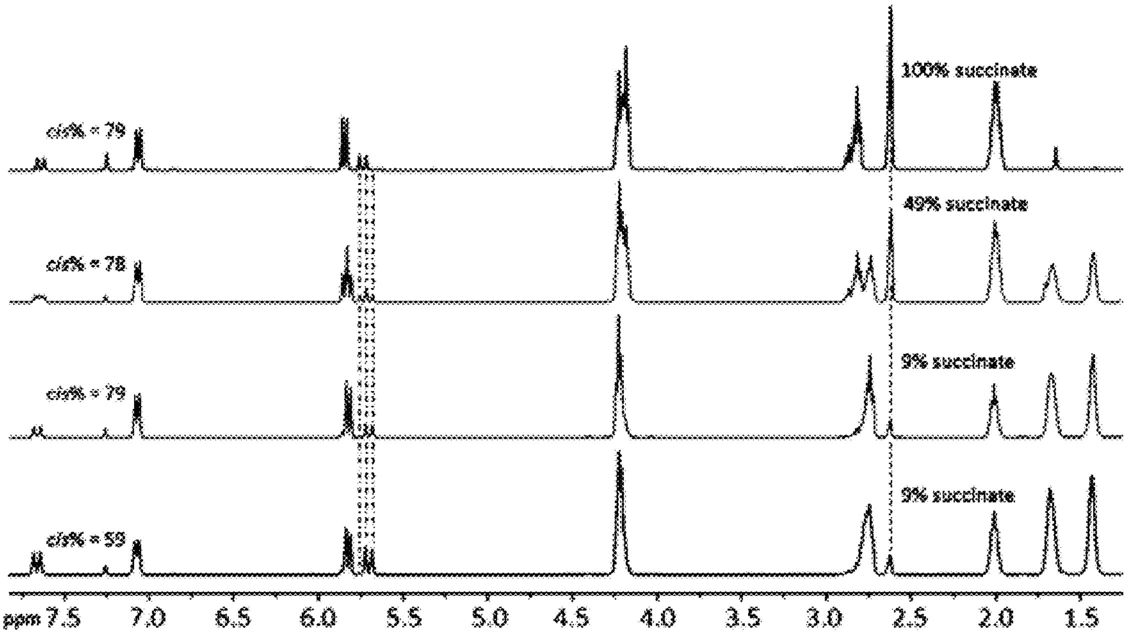
FIG. 1 is a schematic comparing $^1H$ NMR spectra of biodegradable thiol-yne elastomer compositions according to the present invention comprising the reaction product of a one-pot thiol-yne step-growth polymerization of propane-1,3-diyl dipropiolate ($C_{3A}$, 1) with bis(3-mercaptopropyl) succinate (2) and with 1,6-hexane dithiol ($C_{6S}$), having varied cis % and succinate contents. The stereochemistry is easily determined by the vinyl proton doublets at δ=5.7 and 7.7 ppm (trans, 15 Hz) and 8=5.8 and 7.1 ppm (cis, 9 Hz), respectively. As set forth in detail herein, the extent of succinate incorporation will determine both the rate and extent of degradation.

As set forth above, the present invention builds upon a series of materials created using a nucleophilic thiol-yne polymerization methodology that targets high cis-content at comparable molar masses to provide excellent mechanical properties In order to translate these elastomer-like systems into regenerative medicine applications, however, a new series of polymers have been developed that incorporates degradable $C_4$-$C_{14}$ dicarboxylic acid-based monomer units, and preferably succinic acid, glutaric acid, or adipic acid-based monomers units. Each of these monomer units contain two labile ester linkages and by altering the stoichiometry of degradable $C_4$-$C_{14}$ dicarboxylic acid-based monomer unit incorporation, the degradation rate of these material can be tuned precisely, while retaining control over the mechanical properties by maintaining the cis/trans stereochemistry of the double bonds (FIG. 1). Advantageously, and unlike any other degradable biomaterials, it has been found that the mechanical and degradation properties of these elastomer-like polymers can be controlled independently. This is a distinct difference from known polyesters. Moreover, it has been found that these degradable $C_4$-$C_{14}$ dicarboxylic acid-based monomers can be introduced into the nucleophilic thiol-yne polymerization reaction vial one or both of the thiol and alkyne functional groups, providing additional flexibility in developing suitable polymer species for a given application.

Further, because they degrade into nontoxic components, they create little, if any, local inflammation and have been found to display excellent in vitro cell viability. Succinic acid, for example, is found naturally within the body and can be metabolized by the Krebs cycle. (See, Benit, P. el al. Unsuspected task for an old team. Succinate, fumarate and other Krebs cycle acids in metabolic remodeling. *Biochimica et Biophvsica Acta—Bioenergetics* 1837, 1330-1337 (2014), the disclosure of which is incorporated herein by reference in its entirety). As such, these degradable $C_4$-$C_{14}$ dicarboxylic acid-based monomer units provide ideal building blocks from which to introduce non-conjugated esters into the elastomer structure and use them to influence biodegradation rates. In addition, as a consequence of the highly hydrophobic nature of these materials, they have been shown to exhibit surface erosion behavior, providing a design handle not present in material that exhibit bulk erosion properties. Moreover, the crystallinity of these materials can be tuned by altering the ratio of cis to trans stereochemistry and the stoichiometry of the degradable units, for enhancement of water barriers in things like in wireless bio-integrated medical electronics. In various aspects, the thiol-yne elastomer materials provided herein are suitable for numerous other applications, including but not limited to, soft tissue engineering, hernia and diagonal wall repair, and as adhesion barriers.

In some other embodiments, the degradable elastomer composition is modified by the addition of zwitterionic side chains at one or more of the alkyne functional groups by means of a thiol functionalized zwitterionic molecule. In other embodiments, the present invention provides a composite mesh device formed using a macroporous monofilament polypropylene mesh having a coating comprising the degradable zwitterionic elastomer, which is designed to meet the requirements of clinical applications, such as an antifouling coating on a hernia mesh. As set forth above, the degradable elastomer is synthesized using an organo-base catalyzed thiol-yne addition polymerization that affords independent control of degradation rate and mechanical properties as set forth above. In these embodiments, however, the elastomeric coating is further enhanced by the covalent tethering of antifouling zwitterionic molecules. Mechanical testing demonstrates that the zwitterionic elastomer forms a robust coating on the polypropylene mesh and does not exhibit micro-fractures, cracks or mechanical delamination under cyclic fatigue testing that exceeds peak abdominal loads (50 N/cm). Further, quartz crystal microbalance measurements have shown the zwitterionic functionalized elastomer further reduced fibrinogen adsorption by 73% in vitro when compared to unfunctionalized elastomer controls. The elastomer exhibited degradation with limited tissue response was demonstrated in a 10-week murine subcutaneous implantation model. The composite mesh has also been evaluated in an 84-day study in a rabbit cecal abrasion hernia adhesion model. The zwitterionic composite mesh of the present invention significantly reduced both the extent and tenacity of IAs by 94% and 90%, respectively, with respect to uncoated polypropylene mesh and is an excellent candidate to reduce complications related to abdominal repair through suppressed fouling and adhesion formation, reduced tissue inflammation, and appropriate degradation rate.

The following terms may have meanings ascribed to them below, unless specified otherwise. As used herein, the terms "comprising" "to comprise," "including," "having" and the like do not exclude the presence of further elements or steps in addition to those listed in a claim. Similarly, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the terms "a," "an" or "the" before an element or feature does not exclude the presence of a plurality of these elements or features, unless the context clearly dictates otherwise. And as used herein, the term "and/or" refers to and encompasses any and all possible combinations of one or more of the associated listed items, as well as the lack of combinations where interpreted in the alternative ("or").

Unless specifically stated or obvious from context, as used herein, the term "about" is understood as within a range of normal tolerance in the art, for example within 2 standard deviations of the mean. "About" is used to provide flexibility to a numerical range endpoint by providing that a given value may be "slightly above" or "slightly below" the endpoint without affecting the desired result. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination. Further, any compositions or methods provided herein can be combined with one or more of any of the other compositions and methods provided herein. The fact that given features, elements or components are cited in different dependent claims does not exclude the possibility that that at least some of these features, elements or components may be used in combination together.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are considered to be expressly stated in this disclosure.

Further, as used herein, the terms “aliphatic” or “aliphatic group” are used to refer to an optionally substituted, non-aromatic hydrocarbon moiety, unless otherwise indicated. The moiety may be, for example, linear, branched, or cyclic (e.g., mono or polycyclic such as fused, bridging, or spiro-fused polycyclic), or a combination thereof. Unless otherwise specified, aliphatic groups contain 1-20 carbon atoms. As used herein, the term “alkyl” or “alkyl group” refers to both branched and straight-chain saturated aliphatic hydrocarbon chains or groups. These groups can have a stated number of carbon atoms, expressed as $C_{x-y}$ or $C_x$-$C_y$, where x and y typically are integers. For example, $C_{5-10}$ or $C_5$-$C_{10}$, includes $C_5$, $C_6$, $C_7$, $C_8$, $C_9$, and $C_{10}$. As used herein, the terms “alkanediyl” and “alkandiyl group” refer to a series of divalent radicals of the general formula —CnH2n— derived from aliphatic hydrocarbons.

Similarly, the terms “alkene” or “alkene group” are used herein to refer to both straight- and branched-chain alkyl groups having one or more carbon-carbon double bonds. The terms “alkyne” or “alkyne group” refer to a group having a carbon-carbon triple bond and the terms “alkynyl” is used herein to refer to both straight- and branched-chain alkyl groups having one or more carbon-carbon triple bonds. As used herein, the term “alkyne functionalized” refers a compound having one or more chemically active alkyne bonds.

The term “aryl” as used herein refers to an aromatic, carbocyclic system, e.g., of about 6 to 14 carbon atoms, which can include a single ring or multiple aromatic rings fused or linked together where at least one part of the fused or linked rings forms the conjugated aromatic system. The aryl groups include, but are not limited to, phenyl, naphthyl, biphenyl, anthryl, tetrahydronaphthyl, phenanthryl, indene, benzonaphthyl, and fluorenyl.

The terms “substituted aliphatic,” “substituted alkyl”, “substituted alkenyl”, “substituted alkynyl” and “substituted aryl” refer to aliphatic, alkyl, alkenyl, alkynyl and aryl groups, respectively, having one or more substituents including, without limitation, hydrogen, halogen, CN (cyano), OH (hydroxyl), $NO_2$ (nitro), amino, aryl, ester, carboxyl, alkoxy, aryloxy, carbonyl, carboxy, amino, and thiol groups.

As used herein to refer to a molecule or functional group, the term “linear” refers to a molecule or functional group that does not possess branching units; similarly, a molecule or functional group may be referred to herein as “substantially linear” where the mole fraction of branching units does not exceed 2% of the molecule or functional group.

As used herein, the term “residue” refers generally to the part of a monomer or other chemical unit that has been incorporated into a polymer or large molecule. Similarly, polymer “comprises” or is “derived from” a stated monomer if that monomer is incorporated into the polymer. Thus, the incorporated monomer that the polymer comprises is not the same as the monomer prior to incorporation into a polymer, in that at the very least, certain terminal groups are incorporated into the polymer backbone. However, the polymer may be said to include or comprise the residue of that monomer. A polymer is said to comprise a specific type of linkage if that linkage is present in the polymer.

As used herein, a “side chain” is a chemical group, generally a linear or substantially linear hydrocarbon chain that is attached to a core part of the polymer molecule called the “main chain” or “backbone” of the polymer (the “polymer backbone”).

As used herein; the term “bioresorbable” refers to a material that breaks down over a finite period of time due to the chemical/biological action of the body. The polymers described herein are also said to be “bioerodible” or “biodegradable.” By that, it is meant that the polymer, once implanted and placed in contact with bodily fluids and tissues will degrade either partially or completely through chemical reactions, typically and often preferably, over a time period of hours, days, weeks or months into components which can be metabolized or excreted. Non-limiting examples of such chemical reactions include acid/base reactions, hydrolysis reactions, and enzymatic cleavage. The polymers described herein contain labile ester linkages.

As used herein, the terms “click reaction,” “click chemistry,” “click chemistry methods,” and “click chemistry reactions,” are used interchangeably to refer to a group of orthogonal conjugation reactions, generally referred to in the art as “click” reactions, that fulfill the following prerequisites: (i) high yield, nearly quantitative conversion; (ii) biologically benign conditions (aqueous solution, ambient temperature, and near physiologic pH); (iii) limited or no residual byproduct. These reactions are typically simple to perform, high yielding, stereospecific, wide in scope, create only byproducts that can be removed without chromatography, and can be conducted in easily removable or benign solvents. Similarly, the term “clickable” refers to a molecule or functional group capable of bonding via a click reaction. By way of example, alkyne and thiol functional groups will react to form a thiol-yne bond quantitatively in the presence of an organic base catalyst under biologically benign conditions.

Unless otherwise indicated, the terms “zwitterion” or “zwitterionic material” refers to a macromolecule, material, or moiety possessing both cationic and anionic groups. In most cases, these charged groups are balanced, resulting in a material with zero net charge. Similarly, the terms “zwitterionic thiol” or “zwitterion thiol” are used interchangeably to refer to a molecule having a zwitterionic moiety and a terminal thiol group capable of entering into a thiol-ene or thiol-yne “click” reaction. As follows, the term “zwitterionic side chain” refers to a side chain connected to the polymer backbone that comprises a zwitterionic moiety.

All publications, patent applications, patents, and other references mentioned herein are expressly incorporated by reference in their entirety, which means that they should be read and considered by the reader as part of this text. That the document, reference, patent application, or patent cited in this text is not repeated in this text is merely for reasons of conciseness. In the case of conflict, the present disclosure, including definitions, will control. All technical and scientific terms used herein have the same meaning.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein.

In a first aspect, the present invention is directed to a bioresorbable elastomer composition for biomaterial applications comprising the residue of a linear bis-propiolate monomer, the residue of a $C_4$ to $C_{20}$ linear dithiol, and the residue of a linear di thiol monomer having one or more ester linkages, where at least 50% of the double bonds are in a cis configuration. As will be apparent, the bioresorbable elastomer composition of the present invention will be the thio-yne step growth reaction product of a linear bis-propiolate monomer, a $C_4$ to $C_{20}$ linear dithiol monomer, and a linear di thiol monomer having one or more ester linkages in the presence of a suitable catalyst, as discussed below. The polymerization reaction creates a series of alkene-thiol linkages that are stereochemically controlled linkage between the residues of the various monomers that can be in a cis or a trans configuration with respect to the carbon double bond. As will discussed in more detail below, it has been found that by controlling the polarity of the reaction solvent or solvent combination, it is possible to obtain bioresorbable elastomer compositions where in 50% or more of the stereochemically controlled linkages are in the cis configuration.

In some embodiments, from about 50% to about 90%, in other embodiments, from about 50% to about 85%, in other embodiments, from about 50% to about 80%, in other embodiments, from about 50% to about 70%, in other embodiments, from about 50% to about 65%, in other embodiments, from about 50% to about 60%, in other embodiments, from about 55% to about 85%, in other embodiments, from about 60% to about 85%, and in other embodiments, from about 70% to about 85% of these stereochemically controlled linkages are in the cis configuration. In some embodiments, from about 80% to about 82% of these stereochemically controlled linkages are in the cis configuration.

As will be apparent to those of skill in the art, the linear bis-propiolate is an organic compound having two reactive propiolate groups. The propiolate groups provide both the necessary alkyne group for the thiol-yne step growth reaction that forms the polymer and labile ester linkages that facilitate controlled degradation of the elastomer. In some embodiments, the linear bis-propiolate will comprise two propiolate groups separated by a linear $C_2$ to $C_{12}$ hydrocarbon chain. In some on these embodiments, the two propiolate groups will be separated by a linear $C_2$ to $C_{10}$, in other embodiments, a linear $C_2$ to $C_8$, in other embodiments, a linear $C_2$ to $C_6$, in other embodiments, a linear $C_2$ to $C_4$, in other embodiments, a linear $C_3$ to $C_{12}$, in other embodiments, a linear $C_5$ to $C_{12}$, in other embodiments, a linear $C_7$ to $C_{12}$, in other embodiments, a linear $C_9$ to $C_{12}$, and in other embodiments, a linear $C_{10}$ to $C_{12}$, linear alkanediyl ($C_nH_{2n}$) group.

In various embodiments, the linear bis-propiolate will have the general formula:

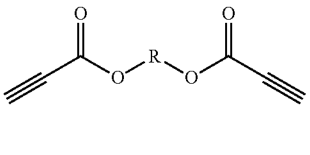

where R is a generally linear organic chain. In some embodiments, R is an aliphatic or substituted aliphatic group having from 2 to 12 carbon atoms. In some embodiments, R may be from 2 to 10, in other embodiments, from about 2 to about 8, in other embodiments, from about 2 to about 6, in other embodiments, from about 2 to about 4, in other embodiments, from about 4 to about 12, in other embodiments, from about 6 to about 12, in other embodiments, from about 8 to about 12, and in other embodiments, from about 10 to about 12 carbon atoms.

In one or more embodiment, the linear bis-propiolate monomer may be, without limitation, propane-1,3-diyl dipropiolate, butane-1,4-diyl dipropiolate, and/or hexane-1,6-diyl dipropiolate. In various embodiments, the linear bis-propiolate will a monomer having the general formula:

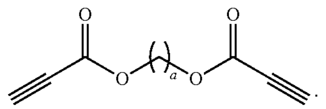

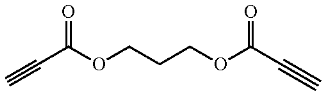

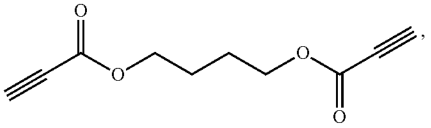

, or

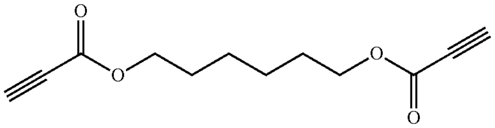

where a is an integer from 1 to 12, or any salt, ester, or derivative thereof.

In various embodiments, 50 mole %, or slightly more than 50 mole %, of the biodegradable elastomer compositions according to the present invention will be linear bis-propiolate monomer residues.

As set forth above, the bioresorbable elastomer composition also comprises the residue of a linear dithiol monomer. In some embodiments, the linear di-thiol monomer will comprise two terminal thiol groups separated by a $C_4$-$C_{20}$ alkyl, $C_4$-$C_{20}$ alkoxy, or $C_4$-$C_{20}$ aryl group. In one or embodiments, the linear di-thiol monomer may be, without limitation, that of poly(ethylene glycol) dithiol, hexa(ethylene glycol) dithiol, tetra(ethylene glycol) dithiol, 2,2'-(ethylenedioxy)diethanethiol, 1,4-benzenedimethanethiol, 2-mercaptoethyl ether, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,11-undecanedithiol, 1,12-dodecanedithiol, 1,13-tridecanedithiol 1,14-butadecanedithiol, 1,15-pentadecanedithiol 1,16-hexadecanedithiol, 1,17-heptadecanedithiol 1,18-octadecanedithiol, 1,19-nonadecanedithiol, L-(−)-dithiothreitol, and combinations thereof.

In one or more embodiments, the linear di-thiol monomer may have the formula:

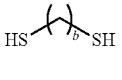

wherein b is an integer from 4 to 20. In one or more embodiments, the linear di-thiol monomer may have a formula selected from:

,

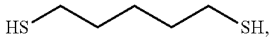,

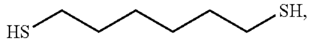,

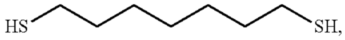,

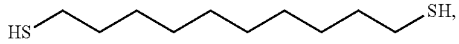,

,

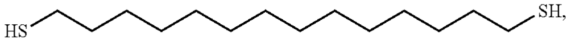,

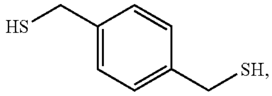,

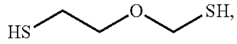,

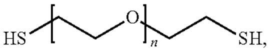, and

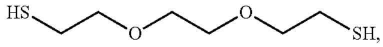, where n is an integer from 2 to 20.

As also set forth above, the bioresorbable elastomer composition also comprises the residue of a linear di-thiol monomer having one or more ester linkages. While these monomers will also have terminal thiol groups as discussed above, it is intended that these monomers have one or more ester linkages to further facilitate degradation of the elastomer. In some embodiments, the linear di thiol monomer having one or more ester linkages will be a $C_4$ to $C_{14}$ dicarboxylic acid-based dithiol. In some embodiments, the linear di thiol monomer having one or more ester linkages will be a succinic acid, glutaric acid, or adipic acid-based dithiol.

In some embodiments, the ester containing linear di-thiol monomer will be a $C_4$-$C_{14}$ dicarboxylic acid based di thiol having the formula:

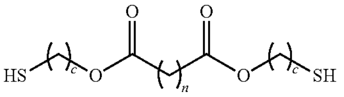

wherein c is an integer from 1 to 5 and n is an integer from 2 to 12. In some of these embodiments, c is an integer from 1 to 4, in other embodiments. from 1 to 3, in other embodiments. from 1 to 2, in other embodiments. from 2 to 5, in other embodiments. from 3 to 5, and in other embodiments. from 4 to 5. In some embodiments, n is an integer from about 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, and in other embodiments, from about 9 to about 12. In some embodiments, c is 3 and n is an integer from 2 to 4.

In some of these embodiments, the ester containing linear di-thiol monomer will be a succinic acid-based dithiol having the general formula:

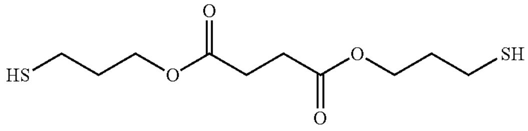

or a salt, ester, and/or derivative thereof.

In some of these embodiments, the ester containing linear di-thiol monomer will be a glutaric acid-based di-thiol having the general formula:

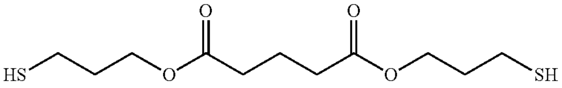

or a salt, ester, and/or derivative thereof.

In some of these embodiments, the ester containing linear di-thiol monomer will be an adipic acid-based di-thiol having the general formula:

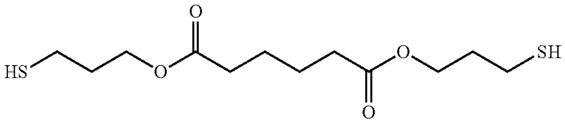

or a salt, ester, and/or derivative thereof.

During the thiol-yne step growth polymerization process, the linear bis-propiolate monomers will react randomly with both di-thiol monomer species described above and, as a result, the elastomers produced will have two different types of subunits: those comprising residues of the linear bis-propiolate and the linear dithiol and those comprising residues of the linear bis-propiolate and the ester containing linear dithiols. For example, each of the first polymer subunits comprising residues of the linear bis-propiolate and the linear dithiol, will contain two labile ester bonds, whereas each of the second polymer subunits comprising residues of the linear bis-propiolate and the ester containing linear dithiols, will contain four labile ester bonds. Both types of polymer subunits contain labile ester bonds and will degrade, but the second type of polymer subunit will have twice as many and would be expected to degrade faster. By controlling the relative amount of these polymer subunits, it is possible to tune the degradation properties of these degradable elastomers.

In some embodiments, ester containing linear di-thiol monomer residues will comprise from about 5 mole % to about 50 mole % of the biodegradable elastomer compositions of the present invention. In some embodiments, ester containing linear di-thiol monomer residues will comprise from about 5 mole % to about 45 mole %, in other embodiments, from about 5 mole % to about 40 mole %, in other embodiments, from about 5 mole % to about 30 mole %, in other embodiments, from about 5 mole % to about 25 mole %, in other embodiments, from about 5 mole % to about 20 mole %, in other embodiments, from about 5 mole % to about 20 mole %, in other embodiments, from about 5 mole % to about 15 mole %, in other embodiments, from about 10 mole % to about 50 mole %, in other embodiments, from about 20 mole % to about 50 mole %, in other embodiments, from about 30 mole % to about 50 mole %, in other embodiments, from about 40 mole % to about 50 mole %, of the biodegradable elastomer compositions of the present invention.

In various embodiments, bioresorbable elastomer composition will have the formula:

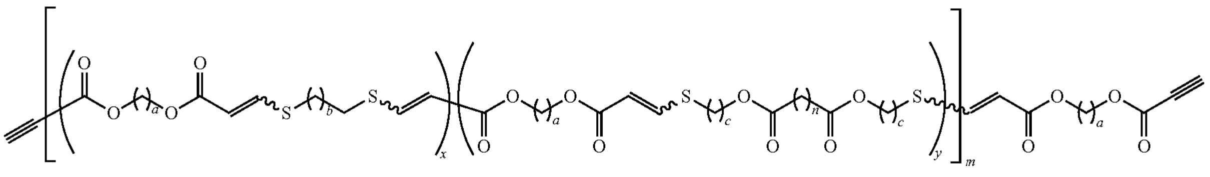

wherein each a is an integer from 1 to 12; each b is an integer from 1 to 19; each c is an integer from 2 to 5; n is an integer from 2 to 12; x and y are mole fractions; ∿∿ indicates a stereochemically controlled bond that could be in a cis or a trues configuration with respect to the adjacent carbon double bond; and m is an integer from 10 to 500. In some of these embodiments, each a is an integer from 1 to 10, in other embodiments, from about 1 to about 8, in other embodiments, from about 1 to about 6, in other embodiments, from about 1 to about 4, in other embodiments, from about 1 to about 2, in other embodiments, from about 3 to about 12, in other embodiments, from about 5 to about 12, in other embodiments, from about 7 to about 12, and in other embodiments, from about 9 to about 12. In some embodiments a is an integer from 2 to 4. In some embodiments a is 2. In some embodiments a is 3. In some embodiments a is 4. Here, as well as elsewhere in the specification and claims, individual range values can be combined to form additional non-disclosed ranges.

In some of these embodiments, each b is an integer from 1 to 17, in other embodiments, from about 1 to about 15, in other embodiments, from about 1 to about 13, in other embodiments, from about 1 to about 11, in other embodiments, from about 1 to about 9, in other embodiments, from about 1 to about 7, in other embodiments, from about 1 to about 5, in other embodiments, from about 1 to about 3, in other embodiments, from about 2 to about 19, in other embodiments, from about 4 to about 19, in other embodiments, from about 6 to about 19, in other embodiments, from about 8 to about 19, in other embodiments, from about 10 to about 19, in other embodiments, from about 12 to about 19, in other embodiments, from about 14 to about 19, and in other embodiments, from about 16 to about 19. In some embodiments, b is 9. Here, as well as elsewhere in the specification and claims, individual range values can be combined to form additional non-disclosed ranges.

In some of these embodiments, each c is an integer from 2 to 4, in other embodiments, from about 2 to about 3, in other embodiments, from about 3 to about 5, and in other embodiments, from about 4 to about 5. In one or more embodiments, c is 3. In some of these embodiments, each n is an integer from 2 to 10, in other embodiments, from about 2 to about 8, in other embodiments, from about 2 to about 6, in other embodiments, from about 2 to about 4, in other embodiments, from about 4 to about 12, in other embodiments, from about 6 to about 12, in other embodiments, from about 8 to about 12, and in other embodiments, from about 10 to about 12. In some embodiments n is an integer from 2 to 4. In some embodiments n is 2. In some embodiments n is 3. In some embodiments n is 4. Here, as well as elsewhere in the specification and claims, individual range values can be combined to form additional non-disclosed ranges.

In various embodiments, x is a mole fraction from about 0.05 to about 0.95. In some embodiments, x is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95. In some other embodiments, x is 0 and the mole fraction of y is 1.00. Here, as well as elsewhere in the specification and claims, individual range values can be combined to form additional non-disclosed ranges.

In one or more embodiments, y is a mole fraction from about 0.05 to about 0.95. In some embodiments, y is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95. In some of these embodiments, y is a mole fraction from about 0.20 to about 0.80. In some other embodiments, x is 0 and the mole fraction of y is 1.00. Here, as well as elsewhere in the specification and claims, individual range values can be combined to form additional non-disclosed ranges.

In various embodiments, the ratio of the linear dithiol-based (x) subunits to the ester containing linear dithiol-based (y) subunits is from about 0:100 to about 90:10. In some embodiments, the ratio of the linear dithiol-based (x) subunits to the ester containing linear dithiol-based (y) subunits is from about 0:100 to about 10:90, in other embodiments, from about 0:100 to about 20:80, in other embodiments, from about 0:100 to about 30:70, in other embodiments, from about 0:100 to about 40:60, in other embodiments, from about 0:100 to about 50:50, in other embodiments, from about 0:100 to about 60:40, in other embodiments, from about 0:100 to about 70:30, in other embodiments, from about 0:100 to about 80:20, and in other embodiments, from about 0:100 to about 90:10.

In various embodiments, each m is an integer from 10 to 400, in other embodiments, from about 10 to about 300, in other embodiments, from about 10 to about 200, in other embodiments, from about 10 to about 100, in other embodiments, from about 10 to about 50, in other embodiments, from about 50 to about 500, in other embodiments, from about 100 to about 500, in other embodiments, from about 200 to about 500, in other embodiments, from about 300 to about 500, and in other embodiments, from about 400 to about 500.

In some embodiments, the bioresorbable elastomer composition of the present invention will have the general formula:

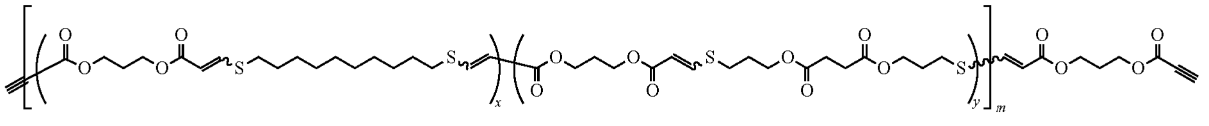

wherein x and y are mole fractions, as set forth above; ∿∿ indicates a stereochemically controlled bond that could be in a cis or a trans configuration with respect to the adjacent carbon double bond and m is an integer from 10 to 500. In various other embodiments, m may be as set forth above.

In one or more embodiments, the bioresorbable elastomer composition of the present invention will comprise the thiol-yne step-growth reaction product of a linear bis-propiolate as described above, a $C_4$ to $C_{20}$ linear dithiol, and a succinic acid-based dithiol. In some other embodiments, the bioresorbable elastomer composition of the present invention will comprise the thiol-yne step-growth reaction product of a linear bis-propiolate as described above, a $C_4$ to $C_{20}$ linear dithiol, and a glutaric acid-based dithiol. In still other embodiments, the bioresorbable elastomer composition of the present invention will comprise the thiol-yne step-growth reaction product of a linear bis-propiolate as described above, a $C_4$ to $C_{20}$ linear dithiol, and an adipic acid-based dithiol.

In some embodiments, all of the dithiols used to form the bioresorbable elastomer composition of the present invention are the ester containing dithiols in an effort to maximize the speed of degradation by maximizing the number of labile ester groups in the elastomer. In one or more embodiment, the bioresorbable elastomer composition of the present invention may have the general formula:

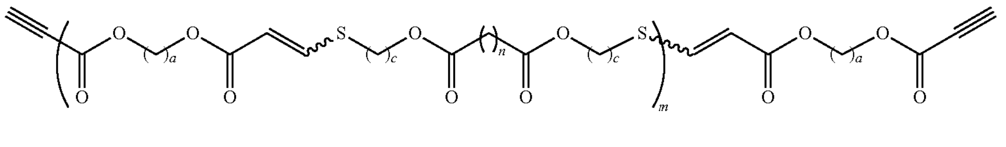

where a, c, n, and m as set forth above.

In various embodiments, the bioresorbable elastomer composition of the present invention will have a number average molecular weight ($M_n$) of from about 10 KDa to about 200 KDa as measured by size exclusion chromatography (SEC). In some embodiments, the bioresorbable elastomer composition will have an $M_n$ of from about 10 KDa to about 180 KDa, in other embodiments, from about 10 KDa to about 150 KDa, in other embodiments, from about 10 KDa to about 125 KDa, in other embodiments, from about 10 KDa to about 100 KDa, in other embodiments, from about 10 KDa to about 50 KDa, in other embodiments, from about 30 KDa to about 200 KDa, in other embodiments, from about 60 KDa to about 200 KDa, in other embodiments, from about 90 KDa to about 200 KDa, in other embodiments, from about 120 KDa to about 200 KDa, and in other embodiments, from about 150 KDa to about 200 KDa.

In various embodiments, the bioresorbable elastomer composition of the present invention will have an elastic modulus (E) of from about 1 to about 40, as measured by tensometer. In some embodiments, the bioresorbable elastomer composition of the present invention will have an elastic modulus (L) of from about 1 to about 35, in other embodiments, from about 1 to about 30, in other embodiments, from about 1 to about 25, in other embodiments, from about 1 to about 20, in other embodiments, from about 1 to about 10, in other embodiments, from about 5 to about 40, in other embodiments, from about 10 to about 40, in other embodiments, from about 15 to about 40, in other embodiments, from about 20 to about 40, in other embodiments, from about 25 to about 40, and in other embodiments, from about 30 to about 40.

In various embodiments, the bioresorbable elastomer composition of the present invention will have an elongation at break ($\varepsilon_{break}$) of from about 1000% or more to about 3200% or less, as measured by tensometer. In some embodiments, the bioresorbable elastomer composition of the present invention will have an elongation at break ($\varepsilon_{break}$) of from about 1300% or more to about 3200% or less, in other embodiments, from about 1600% to about 3200%, in other embodiments, from about 1900% to about 3200%, in other embodiments, from about 2200% to about 3200%, in other embodiments, from about 2500% to about 3200%, in other embodiments, from about 2800% to about 3200%, in other embodiments, from about 1000% to about 3000%, in other embodiments, from about 1000% to about 2700%, in other embodiments, from about 1000% to about 2300%, in other embodiments, from about 1000% to about 2000%, in other embodiments, from about 1000% to about 1700%, and in other embodiments, from about 1000% to about 1400%.

In various embodiments, the bioresorbable elastomer composition of the present invention will have a glass transition temperature ($T_g$) of from about −10° C. to about 10° C., as measured by DSC. In some embodiments, the bioresorbable elastomer composition of the present invention will have a $T_g$ of from about −10° C. to about 8° C., in other embodiments, from about −10° C. to about 5° C., in other embodiments, from about −10° C. to about 2° C., in other embodiments, from about −10° C. to about 0° C., in other embodiments, from about −10° C. to about −4° C., in other embodiments, from about −8° C. to about 10° C., in other embodiments, from about −5° C. to about 10° C., in other embodiments, from about 0° C. to about 10° C., and in other embodiments, from about 5° C. to about 10° C.

In one or more embodiments, thiol functionalized end groups may be added to the terminal alkyne groups of the bioresorbable elastomer composition by means of a thiol-alkyne click reaction. Any reactive group that contains or can be functionalized with a thiol group may be added to the biodegradable elastomer composition described above. These end groups may be added directly after the polymerisation reaction or in a subsequent post-polymerisation step.

In one or more embodiments, the bioresorbable elastomer composition of the present invention mat have the general formula:

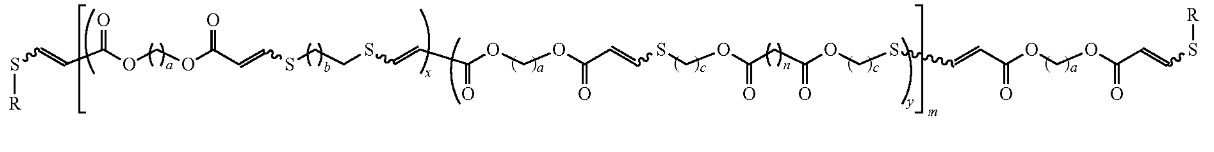

where R is a functional group and a, b, c, n, m, x, and y are as set forth above. In one or more embodiments, R may be a zwitterionic compound, peptide, oligonucleotide, thiol containing small molecule drug, protein, or a combination thereof.

In some other embodiments, the thiol functionalized end groups may be added to the thiol-yne elastomer material in a subsequent post-polymerisation step. In these embodiments, the thiol-yne elastomer material formed as set forth above, is re-dissolved in a suitable solvent. The thiol functionalized end group is then added, and the solution stirred to permit the thiol functionalized end group to dissolve therein. As will be apparent to those of skill in the art, both the thiol-yne elastomer material and the thiol functionalized end groups should be miscible in the selected solvent at the relevant concentrations. As will be apparent, the particular solvent chosen will depend on the molecular weight of the thiol-yne elastomer material and the characteristics of the particular thiol functionalized end group being used. In one or more embodiments, suitable solvents may include, without limitation, chloroform ($CHCl_3$), N,N-dimethylformamide (DMF), dioxane, methylene chloride ($CH_2Cl_2$), N-methylpyrolidone (NMP), and combinations thereof. Next, a suitable base catalyst is added and the solution stirred for from about 10 hours to about 24 hours. In one or more embodiment, the base catalyst may be $Et_3N$.

In a second aspect, the present invention is directed to a bioresorbable and functionalizable thiol-yne elastomer for biomaterial applications comprising the residue of a linear bis-propiolate monomer having one or more additional ester groups; the residue of a $C_4$ to $C_{20}$ linear dithiol; and an alkyne functionalized bis or tris-propiolate, which is preferably the 2-(prop-2-yn-1-yloxy)propane-1,3-diyl dipropiolate monomer (PP), wherein at least 50% of the double bonds are in a cis configuration. Like the bioresorbable elastomer compositions discussed above, the monomers are connected stereochemically controlled linkages formed during the thiol-yne step growth polymerization reaction that formed the elastomer. Unlike the bioresorbable elastomer compositions discussed above, these elastomers contain side chains comprising a chemically active alkyne group that can be used to add useful materials, such as peptides, thiol containing small molecule drugs, proteins, zwitterionic compound, or oligonucleotide into the elastomer. In addition, instead of using an ester containing dithiols to introduce labile ester bonds into the polymer, these bioresorbable and functionalizable thiol-yne elastomers use novel ester containing linear bis-propiolate monomers as described below.

In various embodiments, the bioresorbable and functionalizable thiol-yne elastomer compositions of the present invention will comprise the thiol-yne step-growth reaction product of one or more ester containing linear bis-propiolate monomers, a $C_4$ to $C_{20}$ linear dithiol monomer, and 2-(prop-2-yn-1-yloxy)propane-1,3-diyl dipropiolate monomer in the presence of a suitable catalyst. In some of these embodiments, the bioresorbable and functionalizable thiol-yne elastomer compositions of the present invention will comprise the thiol-yne step-growth reaction product of a succinic acid-based linear bis-propiolate monomers, a $C_4$ to $C_{20}$ linear dithiol monomer, and 2-(prop-2-yn-1-yloxy)propane-1,3-diyl dipropiolate monomer in the presence of a suitable catalyst. In some of these embodiments, the bioresorbable and functionalizable thiol-yne elastomer compositions of the present invention will comprise the thiol-yne step-growth reaction product of a glutaric acid-based linear bis-propiolate monomers, a $C_4$ to $C_{20}$ linear dithiol monomer, and 2-(prop-2-yn-1-yloxy)propane-1,3-diyl dipropiolate monomer in the presence of a suitable catalyst. In some of these embodiments, the bioresorbable and functionalizable thiol-yne elastomer compositions of the present invention will comprise the thiol-yne step-growth reaction product of an adipic acid-based linear bis-propiolate monomers, a $C_4$ to $C_{20}$ linear dithiol monomer, and 2-(prop-2-yn-1-yloxy)propane-1,3-diyl dipropiolate monomer in the presence of a suitable catalyst.

In various embodiments, the ester containing linear bis-propiolate monomers will have the following general formula:

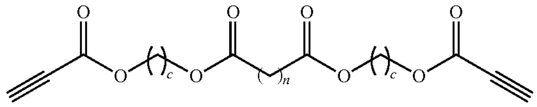

where c is an integer from 2 to 5 and n is an integer from 2 to 12. In some of these embodiments, each c is an integer from 2 to 4, in other embodiments, from about 2 to about 3, in other embodiments, from about 3 to about 5, and in other embodiments, from about 4 to about 5. In some embodiments, c is 2. In some embodiments, c is 3. In some embodiments, c is 4. In some of these embodiments, n is an integer from 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, in other embodiments, from about 9 to about 12, in other embodiments, from about 3 to about 5, and in other embodiments, from about 4 to about 5. In one or more embodiments, n is 2. In other embodiments, n is 3. In yet other embodiments, n is 4.

In one or more of these embodiments, the ester containing linear bis-propiolate monomer will be a succinic acid (n=2), glutaric acid (n=3), or adipic acid (n=4), pimelic (heptanedioic) acid (n=5), suberic (octanedioic) acid (n=6), azelaic (nonanedioic) acid (n=7), sebacic (decanedioic) acid (n=8), undecanedioic acid (n=9), dodecanedioic acid (n=10), brassylic (tridecanedioic) acid (n=11), tetradecanedioic acid (n=12) based bis-propiolate monomer having the formula:

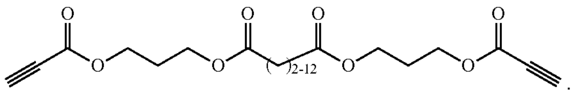

The $C_4$ to $C_{20}$ linear dithiol monomer used to form the bioresorbable and functionalizable thiol-yne elastomers may be any of the $C_4$ to $C_{20}$ linear dithiol monomer described above with respect to the bioresorbable elastomer composition. As will be apparent, The alkyne functionalized bis or tris-propiolate monomer is preferably the 2-(prop-2-yn-1-yloxy)propane-1,3-diyl dipropiolate monomer (PP), but the invention is not so limited and other compounds having at least two propiolate functional groups to allow incorporation of the monomer into the elastomer backbone and one or more side chains comprising a chemically active alkyne group may be used. In one or more embodiments, the alkyne functionalized bis or tris-propiolate monomers used will have the formula:

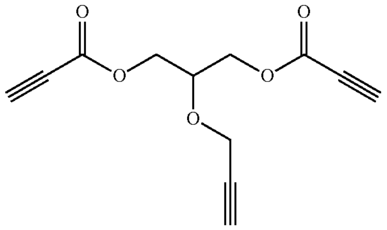

or

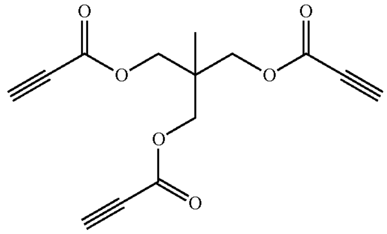

In one or more embodiments, the bioresorbable and functionalizable thiol-yne elastomer of the present may have the formula:

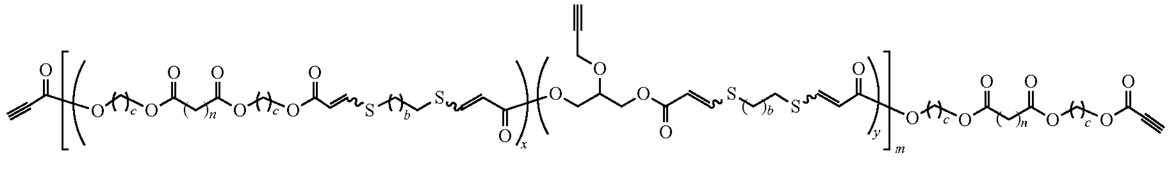

or

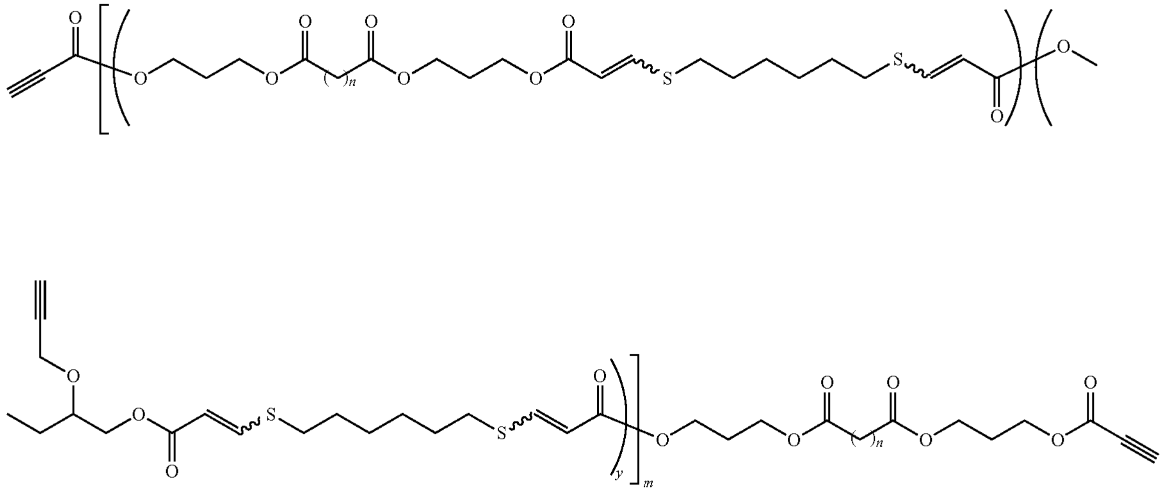

wherein each c is an integer from 2 to 5; each b is an integer from 1 to 19; each n is an integer from 2 to 20; x and y are mole fractions; ∿ indicates a stereochemically controlled bond that could be in a cis or a trans configuration with respect to the adjacent carbon double bond; and m is an integer from 10 to 500. In some of these embodiments, each c is an integer from 2 to 4, in other embodiments, from about 2 to about 3, in other embodiments, from about 3 to about 5, and in other embodiments, from about 4 to about 5. In some embodiments, c is 2. In some embodiments, c is 3. In some embodiments, c is 4.

In some of these embodiments, each b is an integer from 1 to 17, in other embodiments, from about 1 to about 15, in other embodiments, from about 1 to about 13, in other embodiments, from about 1 to about 11, in other embodiments, from about 1 to about 9, in other embodiments, from about 1 to about 7, in other embodiments, from about 1 to about 5, in other embodiments, from about 1 to about 3, in other embodiments, from about 2 to about 19, in other embodiments, from about 4 to about 19, in other embodiments, from about 6 to about 19, in other embodiments, from about 8 to about 19, in other embodiments, from about 10 to about 19, in other embodiments, from about 12 to about 19, in other embodiments, from about 14 to about 19, and in other embodiments, from about 16 to about 19. In some embodiments, b is 9.

In some embodiments, In some of these embodiments, n is an integer from 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, in other embodiments, from about 9 to about 12, in other embodiments, from about 3 to about 5, and in other embodiments, from about 4 to about 5. In one or more embodiments, n is 2. In some embodiments, n is 2. In other embodiments, n is 3. In yet other embodiments, n is 4.

In various embodiments, x is a mole fraction from about 0.05 to about 0.95. In some embodiments, x is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95.

In one or more embodiments, y is a mole fraction from about 0.05 to about 0.95. In some embodiments, y is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95. In some of these embodiments, y is a mole fraction from about 0.20 to about 0.80.

In various embodiments, each m is an integer from 10 to 400, in other embodiments, from about 10 to about 300, in other embodiments, from about 10 to about 200, in other embodiments, from about 10 to about 100, in other embodiments, from about 10 to about 50, in other embodiments, from about 50 to about 500, in other embodiments, from about 100 to about 500, in other embodiments, from about 200 to about 500, in other embodiments, from about 300 to about 500, and in other embodiments, from about 400 to about 500.

As set forth above, these thiol-yne elastomers may be functionalized via the alkyne side chains. In various embodiments, a biologically active and other functional groups/materials like peptides, proteins, oligonucleotides, thiol containing small molecule drugs and zwitterionic compounds having an available thiol group, or which have been functionalized to contain an available thiol group can be added to these thiol-yne elastomers by means of a thiol-yne click reaction between the available alkyne groups on the elastomer side chains and the available thiol on the functional group to be added. In some embodiments, these biologically active and other functional groups/materials may also be added to the ends of these thiol-yne elastomers via a thiol-yne click reaction between the available thiol on the functional group to be added and the terminal alkyne groups on the thiol-yne elastomers, as set forth above. In some embodiments, biologically active and other functional groups/materials may also be added via the alkyne functional groups on both the ends and the side chains of the thiol-yne elastomers of the present invention.

Accordingly, in one or more embodiments, the bioresorbable and functionalizable thiol-yne elastomer will have the formula:

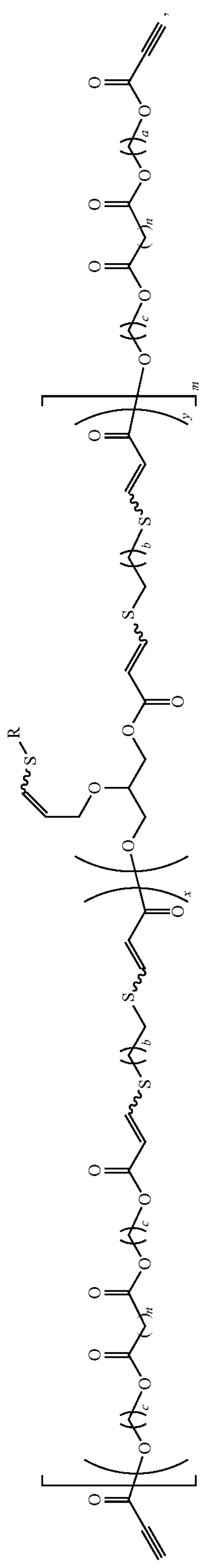
,
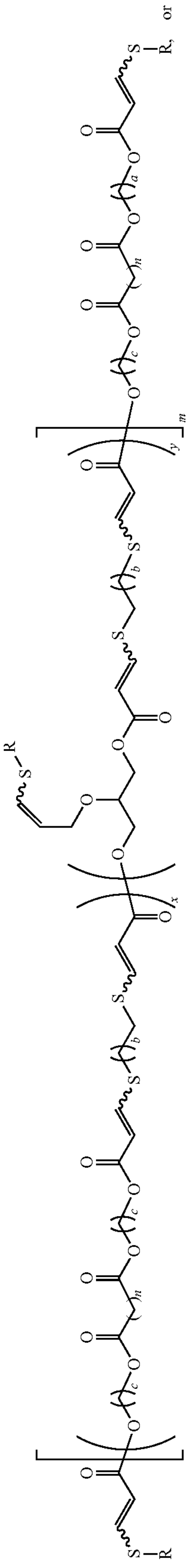
or
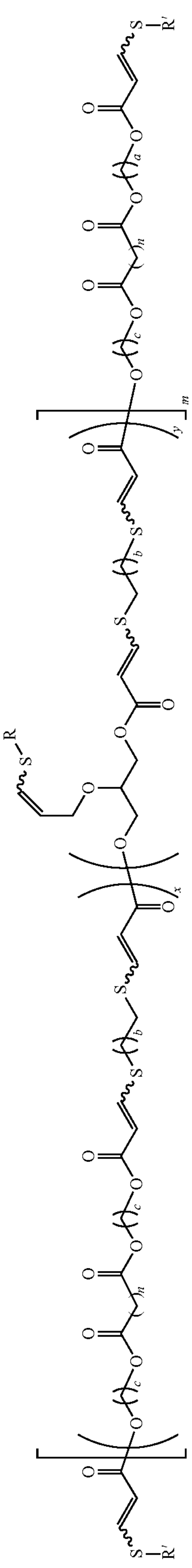

wherein each c is an integer from 2 to 5; each b is an integer from 1 to 19; each n is an integer from 2 to 20; x and y are mole fractions; ∿ indicates a stereochemically controlled bond that could be in a cis or a Grans configuration with respect to the adjacent carbon double bond; m is an integer from 10 to 500; R and R' are a functional groups. In one or more embodiments, R and R' may be a zwitterionic compound, peptide, oligonucleotide, thiol containing small molecule drug, protein, or a combination thereof. In various embodiments, a, b, n, m, x, and y are as set forth above.

In some of these embodiments, the functional group (R) may be added to the bioresorbable and functionalizable thiol-yne elastomer as shown in Scheme 1 below.

Scheme 1

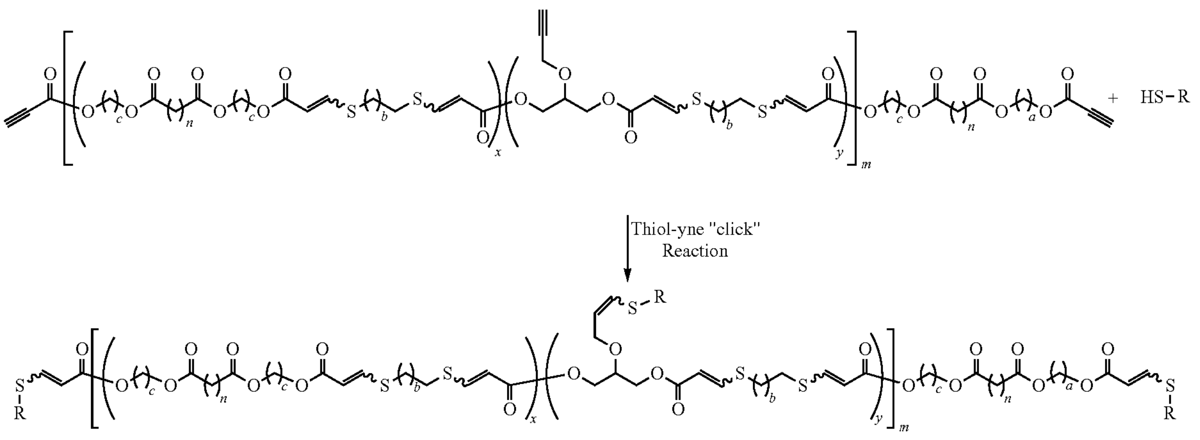

where a, b, c, n, m, x, y, and R are all as set forth above.

In some other embodiments, the thiol functionalized end groups may be added to the bioresorbable and functionalizable thiol-yne elastomer material in a subsequent post-polymerisation step, as set forth above. In these embodiments, the bioresorbable and functionalizable thiol-yne elastomer material is formed as set forth above, is re-dissolved in a suitable solvent. The thiol functionalized end group is then added, and the solution stirred to permit the thiol functionalized end group to dissolve therein. As will be apparent to those of skill in the art, both the thiol-yne elastomer material and the thiol functionalized end groups should be miscible in the selected solvent at the relevant concentrations. As will be apparent, the particular solvent chosen will depend on the molecular weight of the thiol-yne elastomer material and the characteristics of the particular thiol functionalized end group being used. In one or more embodiments, suitable solvents may include, without limitation, chloroform ($CHCl_3$), N,N-dimethylformamide (DMF), dioxane, methylene chloride ($CH_2Cl_2$), N-methylpyrolidone (NMP), and combinations thereof. Next, a suitable base catalyst is added and the solution stirred for from about 10 hours to about 24 hours. Any of the organic base catalysts described above may be used. In one or more embodiment, the base catalyst may be $Et_3N$.

In a third aspect, the present invention includes a method for making the bioresorbable elastomer composition discussed above. In one or more embodiments, bioresorbable elastomer composition of the present invention may be formed as shown in Scheme 2, below.

Scheme 2

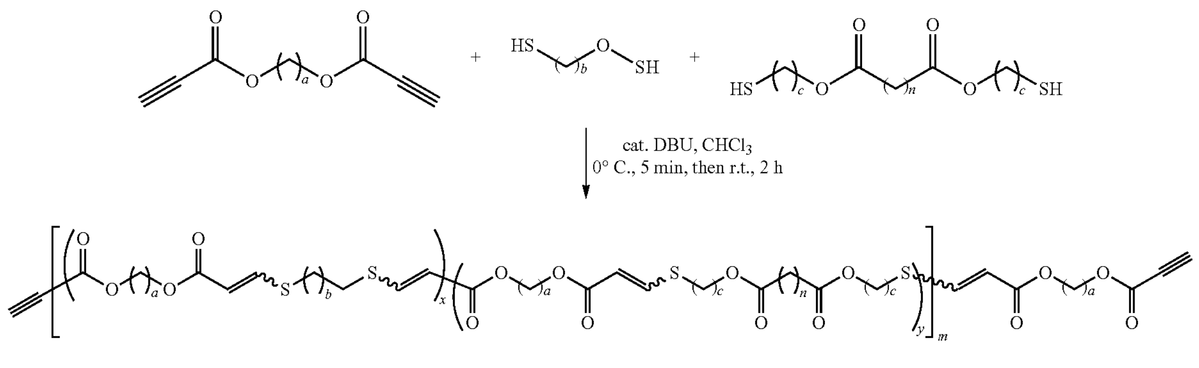

where a, b, c, x, y, m, and n are all as set forth above.

In various embodiments, the method begins with selecting a $C_2$ to $C_{12}$ linear bis-propiolate monomer, a $C_4$ to $C_{20}$ linear dithiol monomer, and an ester containing dithiol monomer. As set forth above, the $C_2$ to $C_{12}$ linear bis-propiolate monomer will comprise two terminal propiolate groups separated by a $C_2$ to $C_5$ (c=2-12) linear alkanediyl ($C_nH_{2n}$) group. The $C_2$ to $C_{12}$ linear bis-propiolate monomer may be any of those disclosed and described above. In some embodiments, the linear bis-propiolate monomer may be, without limitation, 1,2-ethane diyl dipropiolate, 1,3-propane diyl dipropiolate, 1,4-butane diyl dipropiolate, 1,5-pentane diyl dipropiolate, 1,6-hexane diyl dipropiolate, 1,7-heptane diyl dipropiolate, 1,8-octane diyl dipropiolate, 1,9-nonane diyl dipropiolate, 1,10-decane diyl dipropiolate, 1,12-dodecane diyl dipropiolate and combinations thereof. In various embodiments, the linear bis-propiolate will a monomer having the general formula:

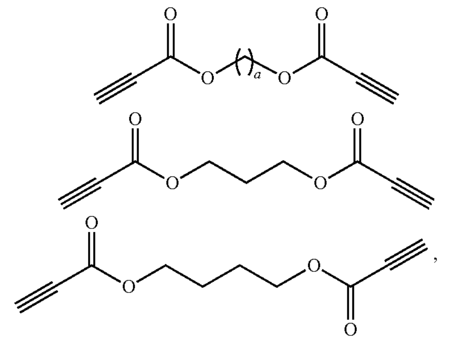

, or

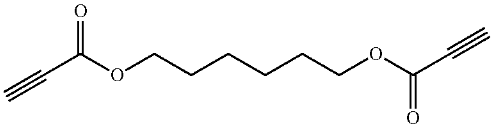

where a is an integer from 1 to 12, and/or any salt, ester, or derivative thereof.

As set forth above, the $C_4$ to $C_{20}$ linear dithiol monomer will comprise two terminal thiol groups separated by a $C_4$ to $C_{20}$ substantially linear hydrocarbon group. In some embodiments, the linear di-thiol monomer will comprise two terminal thiol groups separated by a $C_4$-$C_{20}$ alkyl or aryl group. In some embodiments, the $C_4$ to $C_{20}$ linear dithiol monomer will comprise two terminal thiol groups separated by a linear $C_4$ to $C_{20}$ alkanediyl ($C_nH_{2n}$) group. In various embodiments, the linear $C_4$ to $C_{20}$ alkanediyl ($C_nH_{2n}$) group may be any of those disclosed and described above.

In one or embodiments, the linear di-thiol monomer may be, without limitation, that of propanedithiol, poly(ethylene glycol) dithiol, hexa(ethylene glycol) dithiol, tetra(ethylene glycol) dithiol, 2,2'-(ethylenedioxy)diethanethiol, 1,4-benzenedimethanethiol, 2-mercaptoethyl ether, 1,2-mthanedithiol, 1,4-butanedithiol, 1,6-hexanedithiol, 1,8-octanedithiol, 1,10-decanedithiol, 1,12-dodecanedithiol, 1,14-butadecanedithiol, 1,16-hexadecanedithiol, 1,18-octadecanedithiol, L-(−)-dithiothreitol. In one or more embodiments, the linear di-thiol monomer may have the formula:

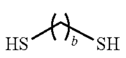

wherein b is an integer from 4 to 20. In one or more embodiments, the linear di-thiol monomer may have a formula selected from:

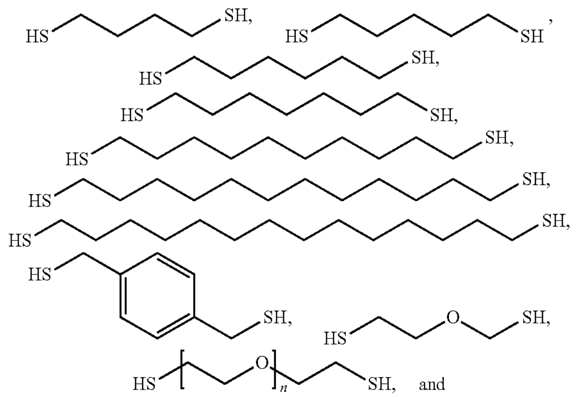

and

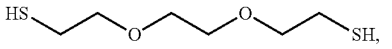

where n is an integer from 2 to 20.

As set forth above, the ester containing dithiol monomer will be a linear dithiol having one or more ester linkages. While these monomers will also have terminal thiol groups as discussed above, it is intended that these monomers have one or more ester linkages to further facilitate degradation of the elastomer. In some embodiments, the ester containing linear dithiol monomer will be a $C_4$ to $C_{14}$ dicarboxylic acid-based dithiol. In some embodiments, the ester containing linear di thiol monomer will be a succinic acid, glutaric acid, or adipic acid-based dithiol.

In various embodiments, the ester containing linear dithiol monomer will have the formula:

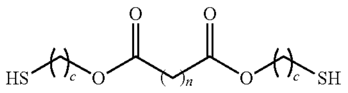

wherein c is an integer from 2 to 5 and n is an integer from 2 to 12. In some of these embodiments, c is an integer from 2 to 4, in other embodiments. from 2 to 3, in other embodiments. from 2 to 5, in other embodiments. from 3 to 5, and in other embodiments. from 4 to 5. In some embodiments, n is an integer from about 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, and in other embodiments, from about 9 to about 12. In some embodiments, c is 3 and n is an integer from 2 to 4.

Next, the ester containing dithiol monomer, a Ca to $C_{20}$ linear dithiol monomer, and a linear bis-propiolate monomer are combined with a suitable reaction solvent or solvent combination in a suitable reaction vessel. In some embodiments, the ester containing dithiol monomer and $C_4$ to $C_{20}$ linear dithiol monomer are added to the vessel first and the linear bis-propiolate monomer then added by quantitative transfer with the solvent.

As will be apparent, the molar ratio of the linear bis-propiolate monomer to the combined dithiol monomers will be 1 to 1. As set forth above, ester containing dithiol monomers have labile ester linkages not present in the $C_4$ to $C_{20}$ linear dithiol monomers that facilitate degradation of the elastomer and by manipulating the ratio of these monomers in the elastomer, it has been found that the degradation properties of the elastomer can be tuned.

In some embodiments, the ester containing dithiol monomers and linear dithiol monomers will be combined at a molar ratio of from about 10:90 to about 100:0. In some embodiments, the ester containing dithiol monomers and linear dithiol monomers will be combined at a molar ratio of from about 10:90 to about 100:0, in other embodiments, from 10:90 to about 80:20, in other embodiments, from 10:90 to about 60:40, in other embodiments, from 10:90 to about 50:50, in other embodiments, from 10:90 to about 40:60, in other embodiments, from 10:90 to about 30:70, in other embodiments, from 20:80 to about 100:0, in other embodiments, from 30:70 to about 100:0, in other embodiments, from 50:50 to about 100:0, in other embodiments, from 60:40 to about 100:0, in other embodiments, from 70:30 to about, 100:0, and in other embodiments, from 80:20 to about 100:0.

Next, because the thiol-yne step growth polymerization reaction that forms the elastomers is exothermic, the temperature of the reaction vessel is preferably reduced to from about −30° C. to about 10° C. before adding an organic base catalyst, which starts the reaction. The reaction vessel may be cooled by any conventional means including, without limitation, ice bath, recirculating chiller, dry ice in acetone, and combinations thereof. In some embodiments, the reaction vessel is cooled to about −20° C.

Further, as set forth above, the thiol-yne step growth polymerization reaction that forms the elastomers creates a series of alkene-thiol linkages between the residues of the various monomers that can be in a cis or a trans configuration with respect to the carbon double bond. It is known that the double bond stereochemistry (% cis) in each thiol-yne step growth polymer was tuned based on solvent polarity and organic base catalyst, which are able to preferentially direct the thiol addition to the cis stereochemistry. For a given organic base catalyst, it has been found that the more polar the reaction solvent or solvent combination used is, the higher the cis % of the resulting elastomer will be. Conversely, the stronger the organic base catalyst (i.e., a higher pKa), the higher the cis % of the resulting elastomer. As set forth above, the biodegradable elastomer compositions of the present invention will have a cis % of 50% or more, and in some embodiments, it may be as high as 95%.

In various embodiments, the reaction solvent or solvent combination will be a highly polar solvent/solvent combination having a dielectric constant of 4 or more and will not react with or degrade the selected monomers. Suitable solvents may include chloroform ($CHCl_3$), N,N-dimethylformamide (DMF), dimethyl sulfoxide (DMSO), N-methylpyrolidone (NMP), and cosolvent combinations thereof. In some embodiments, the reaction solvent will be $CHCl_3$. In some other embodiments, the reaction solvent will be DMF. In still other embodiments, the reaction solvent will be a cosolvent mixture of $CHCl_3$ and DMF.

In one or more embodiments, the polarity of the reaction solvent may be controlled by using a solvent combination containing two or more co-solvents for the monomers having differing polarities and then controlling the ratio of those solvents to obtain the desired polarity. In some embodiments, the solvent combination used may include both polar and non-polar solvents. Suitable polar/non-polar solvent combinations may include, without limitation, chloroform ($CHCl_3$) and N,N-dimethylformamide (DMF), chloroform and N-methylpyrolidone (NMP). It has been found, for example, that by varying the ratio of $CHCl_3$ to DMF used as the reaction solvent, is it possible to vary the cis/trans ratio of the resulting polymer without affecting its molecular weight. That is, a higher percentage of $CHCl_3$ in the reaction solvent combination will give polymer having a lower % cis and a higher percentage of DMF in the reaction solvent combination will give a polymer having approximately the same molecular weight and a higher % cis using the same base catalyst.

In one or more embodiments, the reaction solvent or solvent combination may have a relative polarity of from about 0.2 or more to about 0.4 or less. The values for relative polarity are normalized from measurements of solvent shifts of absorption spectra and were extracted from Christian Reichardt (*Solvents and Solvent Effects in Organic Chemistry*, Wiley-VCH Publishers, 3rd ed., 2003), the disclosure of which is incorporated herein by reference. DMF, for example, has a relative polarity of 0.386 and $CHCl_3$, has a relative polarity of 0.259.

In various embodiments, the organic base catalyst may be any of those set forth above with respect to the biodegradable elastomer composition. As set forth above, the organic base catalyst will be a relatively strong organic base having a pKa of 8 or more capable of catalyzing thiol-yne step-growth polymerization reactions like the ones set forth above. Suitable organic base catalyst will include, without limitation, to 1,8-diazabicyclo[5.4.0]undec-7-ene (DBU) ($pK_a$=13.5), triethylamine ($Et_3N$) ($pK_a$=10.75), triazabicyclodecene (TBD), tetramethyl guanidine (TMG), benzotriazole, dimethylphenylphosphine (DMPP), and combinations thereof. In some embodiments, the reaction solvent will be chloroform and the organic base catalyst will be DBU. In some embodiments, the reaction solvent will be a cosolvent mixture of $CHCl_3$ and DMF and the organic base catalyst is DBU. In some embodiments, the reaction solvent is DMSO and the organic base catalyst is $Et_3N$.

After from about 5 to 60 minutes, the reaction vessel is allowed to warm to ambient temperature and the reaction is allowed to proceed from 1 hour to 120 hours or until it is substantially complete as indicated by a viscosity increase, temperature stabilization or UV-visible spectroscopy for residual monomer. In one or more embodiments, the solution is then stirred or otherwise agitated, for a period of from about 0.5 hours or more to about 10 hours or less. In some embodiments, the solution is then stirred for a period of 1 hour or more. In other embodiments, it may be stirred for a period of 3 hours or more, in other embodiments, 8 hours or more, in other embodiments, 15 hours or more, in other embodiments, 20 hours or more, in other embodiments, 30 hours or more, in other embodiments, 400 hours or more, and in other embodiments, 500 hours or more. In some embodiments, the solution is then stirred for a period of 100 hours or less. In other embodiments, it may be stirred for a period of 80 hours or less, in other embodiments, 60 hours or less, in other embodiments, 72 hours or less, in other embodiments, 48 hours or less, in other embodiments, 36 hours or less, in other embodiments, 24 hours or less, and in other embodiments, 12 hours or less.

At this point, a small excess of the linear bis-propiolate monomer may be dissolved in a suitable solvent and added to the reaction vessel to react with any exposed thiol groups present in the elastomer and prevent or reduce any disulfide coupling and/or UV crosslinking side reactions. The solvent used to dissolve the small excess of the linear bis-propiolate monomer may be the same or different than the reaction solvent described above, but should be a solvent for the small excess of the linear bis-propiolate monomer at the concentrations and reaction conditions used and must not react with or damage the monomers, organic base catalyst, or forming polymer. Suitable solvents may include chloroform ($CHCl_3$), N,N-dimethylformamide (DMF), dimethyl sulfoxide (DMSO), N-methylpyrolidone (NMP), and cosolvent combinations thereof.

In some embodiments, the crude elastomer product is diluted in a solvent, such as chloroform, and a radical inhibitor added to prevent unwanted crosslinking. Suitable radical inhibitors may include, without limitation, butylated hydroxytoluene [2,6-di-tert-butyl-4-methylphenol?] (BHT). The solvent used to dilute the crude elastomer product is not particularly limited and one of ordinary skill in the art will be able to select a suitable solvent without undue experimentation. In various embodiments, any polar solvent for the crude elastomer product and radical inhibitor, which does not react with or otherwise damage the crude elastomer product may be used. In one or more embodiments, the crude elastomer product is diluted in chloroform and BHT is added. The solvent used to dilute the crude elastomer product is not particularly limited and one of ordinary skill in the art will be able to select a suitable solvent without undue experimentation. In various embodiments, any polar solvent for the crude elastomer product and radical inhibitor, which does not react with or otherwise damage the crude elastomer product may be used. In one or more embodiments, the crude elastomer product is diluted in chloroform and BHT is added.

Finally, the biodegradable elastomer composition is collected and purified as is known in the art. In some embodiments, the polymer solution may be precipitated into a nonsolvent, such as diethyl ether and collected by decanting the supernatant and drying it by high vacuum system at room temperature for from about 1 hours to about 24 hours to obtain the biodegradable elastomer composition.

In some embodiments, one or more thiol functionalized end groups may be added to the biodegradable elastomer composition in a subsequent post-polymerisation step as set forth above. In these embodiments, the biodegradable elastomer composition is formed as set forth above, and then re dissolved in a suitable solvent. The thiol functionalized end group is then added, and the solution stirred to permit the thiol functionalized end group to dissolve therein. As will be apparent to those of skill in the art, both the biodegradable elastomer composition and the thiol functionalized end groups should be miscible in the selected solvent at the relevant concentrations. As will be apparent, the particular solvent chosen will depend on the molecular weight of the thiol-yne elastomer material and the characteristics of the particular thiol functionalized end group being used. In one or more embodiments, suitable solvents may include, without limitation, chloroform ($CHCl_3$), N,N-dimethylformamide (DMF), dioxane, methylene chloride ($CH_2Cl_2$), N-methylpyrolidone (NMP), and combinations thereof. Next, a suitable base catalyst is added and the solution stirred for from about 10 hours to about 24 hours. Any of the organic base catalysts described above may be used. In one or more embodiments, the base catalyst will be $Et_3N$.

In a fourth aspect, the present invention includes a method for making the bioresorbable and functionalizable thiol-yne elastomer described above. The bioresorbable and functionalizable thiol-yne elastomers are prepared by thiol-yne step-growth polymerization, using much the same process as described above with respect to the biodegradable elastomer compositions. In this method, however, the additional labile ester groups are being carried by a bis-propiolate monomer rather than by an ester containing dithiol and the ester containing dithiol has been replaced by an alkyne functionalized bis or tris-propiolate monomer.

As set forth above, the ester containing bis-propiolate monomers have labile ester linkages not present in the $C_4$ to $C_{20}$ linear dithiol monomers or the alkyne functionalized bis or tris-propiolate monomers. Accordingly, by altering the ratio of the ester containing bis-propiolate monomers to the alkyne functionalized bis or tris-propiolate monomers, both the degradation and the functionalizability of these elastomers can be tuned, albeit to a lesser extent than the degradable elastomer compositions described above.

In various embodiments, bioresorbable and functionalizable thiol-yne elastomers of the present invention may be prepared using the general method shown in Scheme 3, below.

Scheme 3
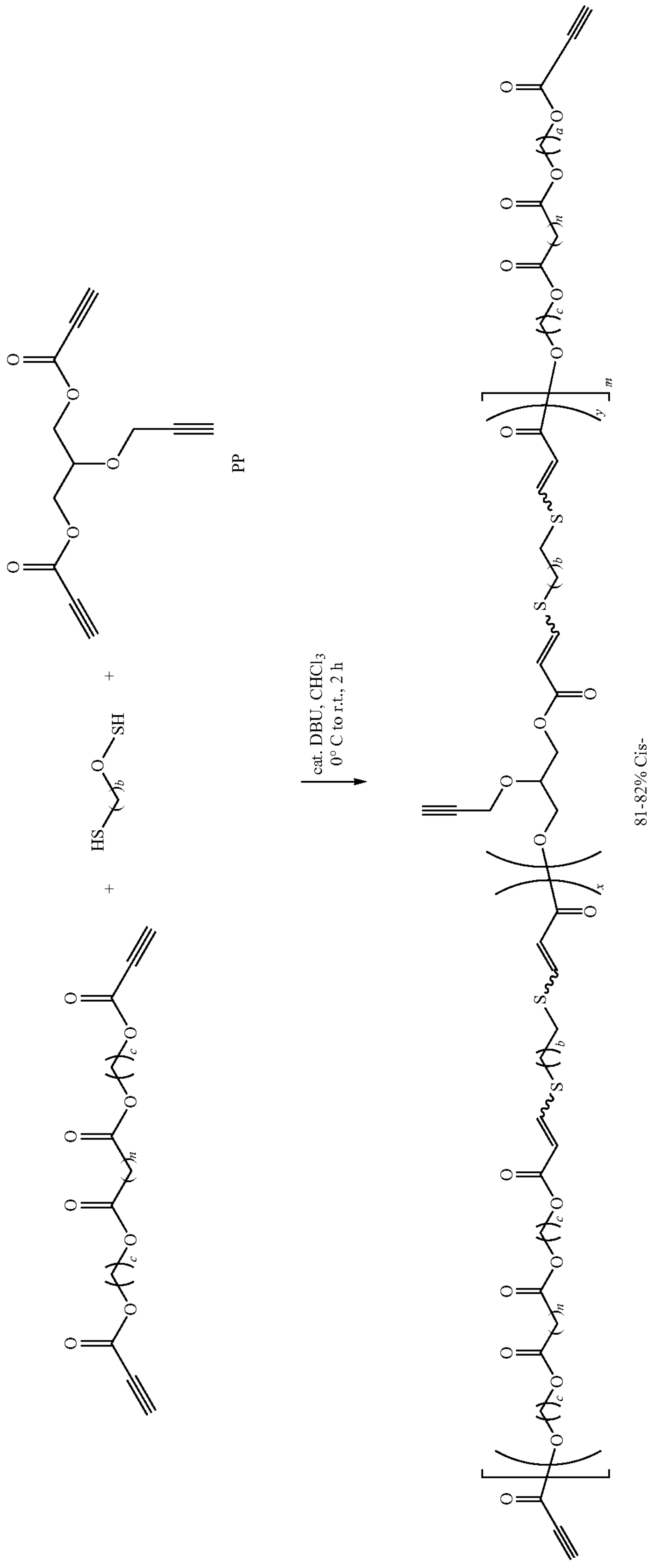

where a, b, c, x, y, m, and n are all as set forth above.

In various embodiments, the ester containing bis-propiolate monomer, $C_4$ to $C_{20}$ dithiol monomer, and the alkyne functionalized bis or tris-propiolate monomers are combined in a suitable reaction vessel with a suitable reaction solvent and an organic base catalyst as set forth above.

In various embodiments, the ester containing linear bis-propiolate monomers will have the following general formula:

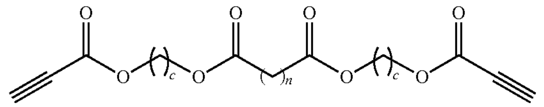

where c is an integer from 2 to 5 and n is an integer from 2 to 12. In some of these embodiments, each c is an integer from 2 to 4, in other embodiments, from about 2 to about 3, in other embodiments, from about 3 to about 5, and in other embodiments, from about 4 to about 5. In some embodiments, c is 2. In some embodiments, c is 3. In some embodiments, c is 4. In some of these embodiments, n is an integer from 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, in other embodiments, from about 9 to about 12, in other embodiments, from about 3 to about 5, and in other embodiments, from about 4 to about 5. In one or more embodiments, n is 2. In other embodiments, n is 3. In yet other embodiments, n is 4.

In one or more of these embodiments, the ester containing linear bis-propiolate monomer will be a succinic acid (n=2), glutaric acid (n=3), or adipic acid (n=4), pimelic (heptanedioic) acid (n=5), suberic (octanedioic) acid (n=6), azelaic (nonanedioic) acid (n=7), sebacic (decanedioic) acid (n=8), undecanedioic acid (n=9), dodecanedioic acid (n=10), brassylic (tridecanedioic) acid (n=11), tetradecanedioic acid (n=12) based bis-propiolate monomer having the formula:

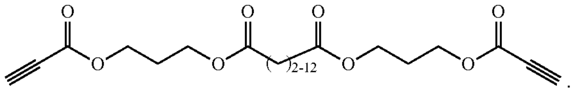

The $C_4$ to $C_{20}$ linear dithiol monomer used to form the bioresorbable and functionalizable thiol-yne elastomers may be any of the $C_4$ to $C_{20}$ linear dithiol monomer described above with respect to the bioresorbable elastomer composition. The alkyne functionalized bis or tris-propiolate monomer is preferably the 2-(prop-2-yn-1-yloxy)propane-1,3-diyl dipropiolate monomer (PP), but the invention is not so limited and other compounds having at least two propiolate functional groups to allow incorporation of the monomer into the elastomer backbone and one or more side chains comprising a chemically active alkyne group may be used. In one or more embodiments, the alkyne functionalized bis or tris-propiolate monomers used will have the formula:

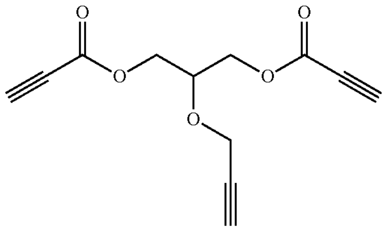

or

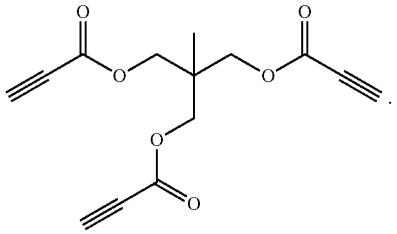

As will be apparent, the molar ratio of the $C_4$ to $C_{20}$ dithiol monomer to the combined propiolate monomers will be about 1 to 1. In some embodiments, the ester containing bis-propiolate monomers and the alkyne functionalized bis or tris-propiolate monomers will be combined at a molar ratio of from about 10:90 to about 100:0. In some embodiments, the ester containing bis-propiolate monomers and the alkyne functionalized bis or tris-propiolate monomers will be combined at a molar ratio of from about 10:90 to about 90:10, in other embodiments, from 10:90 to about 80:20, in other embodiments, from 10:90 to about 60:40, in other embodiments, from 10:90 to about 50:50, in other embodiments, from 10:90 to about 40:60, in other embodiments, from 10:90 to about 30:70, in other embodiments, from 20:80 to about 100:0, in other embodiments, from 30:70 to about 100:0, in other embodiments, from 50:50 to about 100:0, in other embodiments, from 60:40 to about 100:0, in other embodiments, from 70:30 to about, 100:0, and in other embodiments, from 80:20 to about 100:0.

Next, because the thiol-yne step growth polymerization reaction that forms the elastomers is exothermic, the temperature of the reaction vessel is preferably reduced to from about −30° C. to about 10° C. before adding an organic base catalyst, which starts the reaction. Again, the reaction vessel may be cooled by any conventional means including, without limitation, ice bath, recirculating chiller or dry ice in acetone or isopropanol, and combinations thereof.

As set forth above, it is known that the double bond stereochemistry (cis %) in each thiol-yne step growth polymer may be tuned based on solvent polarity and organic base catalyst, which is able to preferentially direct the thiol addition to the cis stereochemistry. As also set forth above, the bioresorbable and functionalizable thiol-yne elastomer of the present invention will have a cis % of 50% or more, and in some embodiments, it may be as high as 95%.

In various embodiments, the reaction solvent will be as set forth above for the bioresorbable elastomer composition. In one or more embodiments, the reaction solvent will be a polar solvent having a dielectric constant of 4 or more, a relative polarity of from about 0.2 or more to about 0.4 or less, and will not react with or degrade the monomers. Suitable solvents may include chloroform ($CHCl_3$), N,N-dimethylformamide (DMF), dimethyl sulfoxide (DMSO), N-methylpyrolidone (NMP), and cosolvent combinations thereof. In some embodiments, the reaction solvent will be $CHCl_3$. In some other embodiments, the reaction solvent will be $CHCl_3$. In still other embodiments, the reaction solvent will be a cosolvent mixture of $CHCl_3$ and DMF.

As set forth above, the polarity of the reaction solvent may be controlled by using a solvent combination containing two or more co-solvents for the monomers having differing polarities and then controlling the ratio of those solvents to obtain the desired polarity. In some embodiments, the solvent combination used may include both polar and non-polar solvents. Suitable polar/non-polar solvent combinations may include, without limitation, chloroform ($CHCl_3$) and N,N-dimethylformamide (DMF), chloroform and N-methylpyrolidone (NMP). It has been found, for example, that by varying the ratio of $CHCl_3$ to DMF used as the reaction solvent, is it possible to vary the cis/trans ratio of the resulting polymer without affecting its molecular weight. That is, a higher percentage of $CHCl_3$ in the reaction solvent combination will give polymer having a lower cis % and a higher percentage of DMF in the reaction solvent combination will give a polymer having approximately the same molecular weight and a higher cis % using the same base catalyst.

In one or more embodiments, the reaction solvent or solvent combination may have a relative polarity of from about 0.2 or more to about 0.4 or less, as set forth above. The values for relative polarity are normalized from measurements of solvent shifts of absorption spectra and were extracted from Christian Reichardt (*Solvents and Solvent Effects in Organic Chemistry*, Wiley-VCH Publishers, 3rd ed., 2003), the disclosure of which is incorporated herein by reference. DMF, for example, has a relative polarity of 0.386 and $CHCl_3$, has a relative polarity of 0.259.

In various embodiments, the organic base catalyst will be a relatively strong organic base having a pKa of 8 or more capable of catalyzing thiol-yne step-growth polymerization reactions like the ones set forth above. Suitable organic base catalyst will include, without limitation, to 1,8-diazabicyclo [5.4.0]undec-7-ene (DBU) ($pK_a$=13.5), triethylamine ($Et_3N$) ($pK_a$=10.75), and combinations thereof. In some embodiments, the reaction solvent will be chloroform and the organic base catalyst will be DBU. In some embodiments, the reaction solvent will be a cosolvent mixture of $CHCl_3$ and DMF and the organic base catalyst is DBU. In some embodiments, the reaction solvent is DMSO and the organic base catalyst is $Et_3N$.

After from about 5 to 60 minutes, the reaction vessel is allowed to cool to ambient temperature and the reaction is allowed to proceed from 1 hour to 120 hours or until it is substantially complete as indicated by a viscosity increase, temperature stabilization or UV-visible spectroscopy for residual monomer. At this point, a small excess of the ester containing linear bis-propiolate monomer may be dissolved in a suitable solvent and added to the reaction vessel to react with any exposed thiol groups present in the elastomer and prevent or reduce any disulfide coupling and/or UV crosslinking side reactions to produce a crude elastomer product. In one or more embodiments, the solvent used for this purpose will be the same as the reaction solvent, but this need not be the case. Any solvent of sufficient polarity to dissolve the small excess of the ester containing linear bis-propiolate monomer and does not force any of the other reagents out of solution may be used, provided that it does not react with or degrade the polymer of other reagents. One of ordinary skill in the art will be able to select a suitable solvent for this purpose without undue experimentation.

In some embodiments, the crude elastomer product is diluted in a solvent, such as chloroform, and a radical inhibitor added to prevent unwanted crosslinking, to arrive at the bioresorbable and functionalizable thiol-yne elastomer. Suitable radical inhibitors may include, without limitation, butylated hydroxytoluene (BHT). The solvent used to dilute the crude elastomer product is not particularly limited and one of ordinary skill in the art will be able to select a suitable solvent without undue experimentation. In various embodiments, any polar solvent for the crude elastomer product and radical inhibitor, which does not react with or otherwise damage the crude elastomer product may be used. In one or more embodiments, the crude elastomer product is diluted in chloroform and BHT is added.

Finally, the bioresorbable and functionalizable thiol-yne elastomer may be collected and purified using any suitable method known in the art for that purpose. In some embodiments, the polymer solution may be precipitated into a nonsolvent, such as diethyl ether, hexane or methanol, and collected by decanting the supernatant and drying it by high vacuum system at room temperature for from about 1 hours to about 24 hours to obtain the final bioresorbable and functionalizable thiol-yne elastomer.

In another aspect, the present invention is directed to the ester containing dithiol monomers for use in forming the biodegradable elastomers described above. As set forth above, these monomers will have two labile ester bonds that are degradable in the presence of bodily fluids and two terminal thiol functional groups capable of thiol-yne step growth polymerization with one or more linear bis-propiolates as described above. In one or more embodiments, suitable ester containing dithiol monomers may be formed from $C_4$-$C_{14}$ dicarboxylic acids and mercapto alcohols as set forth in more detail below.

In various embodiments, the ester containing linear di-thiol monomer will be a linear $C_4$-$C_{14}$ dicarboxylic acid-based dithiol monomer having the general formula:

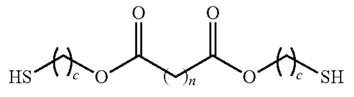

wherein c is an integer from 2 to 5 and n is an integer from 2 to 12. In various embodiments, c and n may be as set forth above. In some of these embodiments, the ester containing linear di-thiol monomer will be a linear $C_4$-$C_{14}$ dicarboxylic acid-based dithiol monomer having the formula:

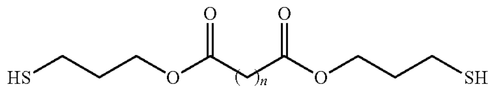

where n is an integer from 2 to 4.

In one or more embodiments, the ester containing linear di-thiol monomer will be a succinic acid based di-thiol monomer having the general formula:

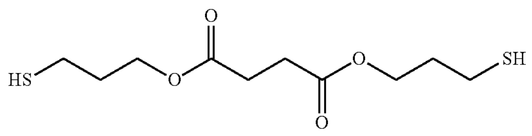

or a salt, ester, and/or derivative thereof.

In some of these embodiments, the ester containing linear di-thiol monomer will be a glutaric acid based di-thiol monomer having the general formula:

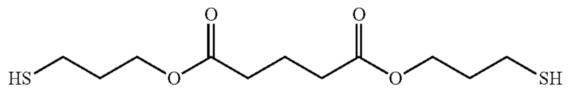

or a salt, ester, and/or derivative thereof.

In some of these embodiments, the ester containing linear di-thiol monomer will be an adipic acid based di-thiol monomer having the general formula:

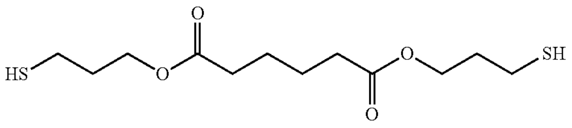

or a salt, ester, and/or derivative thereof.

As mentioned above, the present invention also includes a novel method for making the ester containing dithiol monomers described above. In one or more embodiments, the ester containing dithiol may be made as generally shown in Scheme 4 below:

Scheme 4

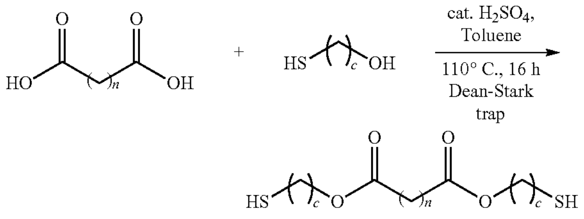

where n is an integer from 2 to 12 and c is an integer from about 1 to 5. In general outline, the method comprises reacting a linear $C_4$-$C_{14}$ dicarboxylic acid (n=2-12) with a $C_1$-$C_5$ mercapto alcohol (c=1-5) in a suitable reaction solvent and with an acid catalyst to form the corresponding ester containing dithiol monomer, as shown in Scheme 4 above. Suitable linear $C_4$-$C_{14}$ dicarboxylic acids would include, without limitation, succinic acid (n=2), glutaric acid (n=3), or adipic acid (n=4), pimelic (heptanedioic) acid (n=5), suberic (octanedioic) acid (n=6), azelaic (nonanedioic) acid (n=7), sebacic (decanedioic) acid (n=8), undecanedioic acid (n=9), dodecanedioic acid (n=10), brassylic (tridecanedioic) acid (n=11), tetradecanedioic acid (n=12), and combinations thereof. However, for known metabolic and resorption pathways, succinic acid (n=2), glutaric acid (n=3), and/or adipic acid (n=4) are preferred. In various embodiments, the $C_1$-$C_5$ mercapto alcohol (c=1-5) will be a linear molecule comprising a thiol group and a hydroxyl group separated by from a $C_1$-$C_5$ linear alkanediyl ($C_nH_{2n}$). Suitable mercapto alcohols may include, without limitation, mercaptomethanol, 2-mercaptoethanol, 3-mercapto-1-propanol, 4-mercapto-1-butanol, 5-mercapto-1-pentanol, and combinations thereof. In one or more embodiments, the $C_1$-$C_5$ mercapto alcohol is 3-mercapto-1-propanol.

The reaction solvent is not particularly limited and any suitable reaction solvent may be used. Suitable reaction solvents will of course, be solvents for the dicarboxylic acid, mercapto alcohol, and acid catalyst being used and may include, without limitation, toluene. One of ordinary skill in the art will be able to select a suitable solvent without undue experimentation.

As set forth above, an acid catalyst is used to drive the esterification. Any suitable acid may be used provided that it has a pKa under 6. Suitable acid catalysts may include, without limitation, sulfuric acid ($H_2SO_4$), hydrochloric, hydrobromic, acetic acid, trifluoro acetic acid, and combinations thereof. One of ordinary skill in the art will be able to select a suitable acid catalyst without undue experimentation.

The selected linear $C_4$-$C_{14}$ dicarboxylic acid, mercapto alcohol, acid catalyst, and reaction solvent are combined in a suitable reaction vessel and heated to reflux temperature (generally about 110° C.) using a Dean-Stark trap or comparable device for from about 6 hours to about 24 hours (generally overnight) to produce the corresponding ester containing dithiol monomer. The reaction is then allowed to cool to ambient temperature, and the collected and purified using any suitable process in the art. In some embodiments, the ester containing dithiol monomer may be extracted one or more times with a saturated base solution to remove any residual acid. In some of these embodiments, the ester containing dithiol monomer may be extracted two or more times with a saturated base solution to remove any residual acid. The organic phase may then be collected, dried over $Na_2SO_4$, filtered and reduced in volume to dryness to produce a crude ester containing dithiol monomer product, which is then collected and further purified. In one or more of these embodiments, the collected crude ester containing dithiol monomer is purified by flash column chromatography on silica gel (EtOAc/hexanes) to collect the 1st fraction and producing the purified ester containing dithiol monomer. In some of these embodiments, the final product was further purified after removal of the solvent by distillation under high vacuum (0.02 Torr, 120° C.) to yield the ester containing dithiol monomer as a purified colorless oil.

In another aspect, the present invention includes the novel ester containing linear bis-propiolate monomers described above. Like the ester containing dithiol monomers described above, these monomers may be formed from linear $C_4$-$C_{14}$ dicarboxylic acids like succinic acid, glutaric acid, or adipic acid and will accordingly contain two additional labile ester bonds that are degradable in the presence of bodily fluids and two terminal propiolate groups, each containing an available alkyne group for polymerization.

In various embodiments, the ester containing linear bis-propiolate monomers of the present invention will be a Ca-Cia dicarboxylic acid-based compound having the general formula:

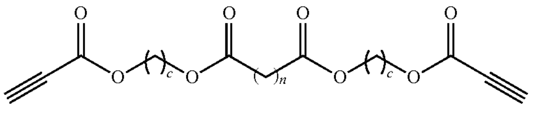

wherein c is an integer from 2 to 5 and n is an integer from 2 to 12, and any and any salts, esters, and derivatives thereof. In some of these embodiments, each c is an integer from 2 to 4, in other embodiments, from about 2 to about 3, in other embodiments, from about 3 to about 5, and in other embodiments, from about 4 to about 5. In some embodiments, c is 2. In some embodiments, c is 3. In some embodiments, c is 4. In some of these embodiments, n is an integer from 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, in other embodiments, from about 9 to about 12, in other embodiments, from about 3 to about 5, and in other embodiments, from about 4 to about 5. In some embodiments, n will be 2, 3, or 4. In one or more embodiments, n is 2. In other embodiments, n is 3. In yet other embodiments, n is 4.

In some embodiments, the ester containing linear bis-propiolate monomers of the present invention will be a succinic acid-based compound having the general formula:

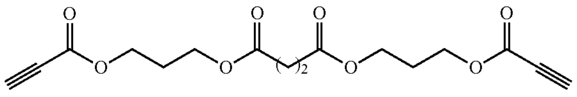

In some embodiments, the ester containing linear bis-propiolate monomers of the present invention will be a glutaric acid-based compound having the general formula:

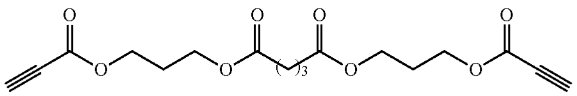

In some embodiments, the ester containing linear bis-propiolate monomers of the present invention will be an adipic acid-based compound having the general formula:

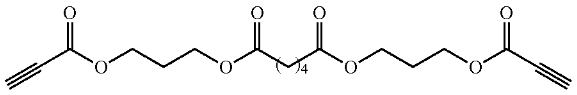

In another aspect, the invention includes a novel and useful bioresorbable di-bromo functionalized intermediate compound for the monomers generated in preparation of the novel ester containing linear bis-propiolate monomers described above. In various embodiments, the bioresorbable di-bromo functionalized intermediate compound facilitates preparation of the ester containing linear bis-propiolate monomers and provides better yields. In addition, the bioresorbable di-bromo functionalized intermediate compound can easily be functionalized at the terminal bromide groups.

In various embodiments, the bioresorbable di-bromo functionalized compounds of the present invention will include $C_4$-$C_{14}$ dicarboxylic acid-based compounds having the general formula:

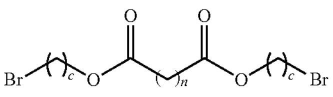

where c is an integer from 2 to 5 and n is an integer from 2 to 12, as well as any salts, esters, and derivatives thereof. The terms c and n may be as set forth above for the ester containing linear bis-propiolate monomers, described above. In some embodiments, n will be 2, 3, or 4.

In some of these embodiments, the bioresorbable di-bromo functionalized intermediate compound of the present invention will include $C_4$-$C_{14}$ dicarboxylic acid-based compounds having the formula:

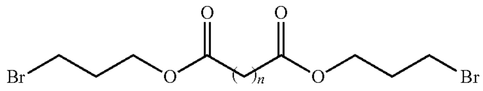

where n is an integer from 2 to 4, and any salts, esters, and/or derivatives thereof. In other embodiments, the bioresorbable di-bromo functionalized intermediate compound of the present invention will include succinic acid-based compounds having the general formula:

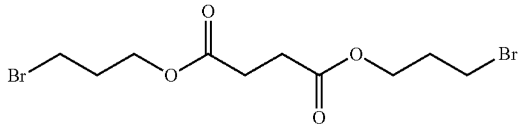

and any salts, esters, and/or derivatives thereof. In still other embodiments, the bioresorbable di-bromo functionalized intermediate compound of the present invention will include glutaric acid-based compounds having the general formula:

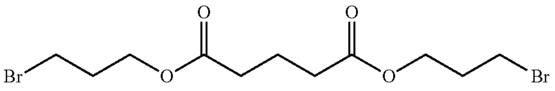

and any salts, esters, and/or derivatives thereof. In some other embodiments, the bioresorbable di-bromo functionalized intermediate compound of the present invention will include adipic acid-based compounds having the general formula:

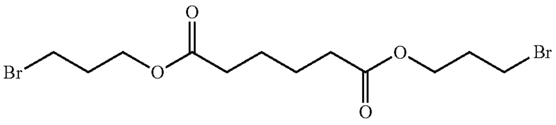

and any salts, esters, and/or derivatives thereof.

In yet another aspect, the present invention includes a method for making the novel ester containing linear bis-propiolate monomers and di-bromo functionalized intermediate compounds described above. The general mechanism for making these compounds is shown in Scheme 5, below.

Scheme 5

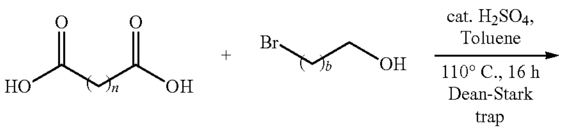

-continued

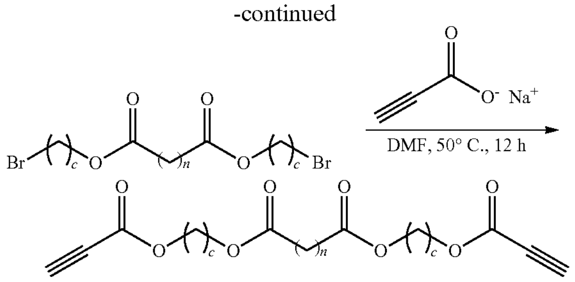

where c and n are as set forth above for the ester containing linear bis-propiolate monomers and di-bromo functionalized intermediate compounds described above and b is an integer from 1 to 4. As can be seen, the first part of this method is very similar to the method used to form the ester containing dithiol monomers described above except that a bromo alcohol is attached to the carboxylic acid rather than a mercapto alcohol. This first reaction forms the bioresorbable di-bromo functionalized intermediate compounds described above. In the second reaction, propiolate functional groups are added to the intermediate via a substitution reaction at the terminal bromine atoms.

In various embodiments, the general method begins by selecting a suitable $C_4$-$C_{14}$ dicarboxylic acid, $C_2$ to $C_5$ linear bromo alcohol, acid catalyst, and reaction solvent and combing them in a suitable reaction vessel. In one or more embodiments, $C_4$-$C_{14}$ dicarboxylic acid, acid catalyst, and reaction solvent may all be as set forth above with respect to the method for forming the ester containing dithiol monomers described above.

In various embodiments, the $C_2$ to $C_5$ linear bromo alcohol will be a linear molecule comprising a terminal bromine atom and a terminal hydroxyl group separated by from a $C_1$-$C_5$ linear alkanediyl ($C_nH_{2n}$) group. Suitable bromo alcohols may include, without limitation, bromomethanol, 2-bromoethanol, 3-bromo-1-propanol, 4-bromo-1-butanol, 5-bromo-1-pentanol, and combinations thereof. In one or more embodiments, the Ct-05 bromo alcohol is 3-bromo-1-propanol.

The selected linear $C_4$-$C_{14}$ dicarboxylic acid, $C_2$ to $C_5$ linear bromo alcohol, acid catalyst, and reaction solvent are then combined in a suitable reaction vessel and heated to reflux temperature (generally about 110° C.) using a Dean-Stark trap or comparable device for from about 6 hours to about 24 hours (generally overnight) to produce corresponding di-bromo functionalized intermediate compound having the general formula:

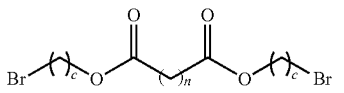

where c is an integer from 2 to 5 and n is an integer from 2 to 12, depending upon which linear $C_4$-$C_{14}$ dicarboxylic acid and $C_2$ to $C_5$ linear bromo alcohol were used for the reaction. Next, the reaction is allowed to cool to ambient temperature, and the di-bromo functionalized intermediate compound collected and purified using any suitable process in the art.

In some embodiments, the di-bromo functionalized intermediate compound may be extracted one or more times with a saturated base solution to remove any residual acid. In some of these embodiments, the di-bromo functionalized intermediate compound may be extracted two or more times with a saturated base solution to remove any residual acid. The organic phase may then be collected, dried over $Na_2SO_4$, filtered and reduced in volume to dryness to produce a crude di-bromo functionalized intermediate product, which is then collected and further purified. In one or more of these embodiments, the collected crude di-bromo functionalized intermediate compound is purified by flash column chromatography on silica gel (EtOAc/hexanes) to collect the 1st fraction and then removing the solvent and producing the purified di-bromo functionalized intermediate compound. In some of these embodiments, the final product is further purified after removal of the solvent by distillation under high vacuum to yield the di-bromo functionalized intermediate compound as a purified pale-yellow color oil.

Next, under a dark hood (to prevent elimination reactions), the di-bromo functionalized intermediate compound and a propiolate salt are dissolved in a second reaction solvent and heated to a reflux temperature (about 110° C.) and stirred for from about 16 hours to about 18 hours to produce a crude ester containing linear bis-propiolate monomer. The second reaction solvent may be the same or different than the reaction solvent used to make the di-bromo functionalized intermediate compound. Suitable solvents may include, without limitation, N,N-dimethylformamide (DMF), toluene, chloroform, and combinations thereof. In some of these embodiments, the solution is heated to a temperature from about 50° C. and stirred for from about 12 hours to produce a crude ester containing linear bis-propiolate monomer.

Next the solution is allowed to cool to ambient temperature and mixed with a saturated solution of $NH_4Cl$ and stirred for from about 1 to about 60 min to reduce the salt and make it easier to purify. In some embodiments, the linear bis-propiolate monomer is extracted one or more times with ethyl acetate and the organic extracts combined (if more than one extraction was performed). In some of these embodiments, the extracted organic solution may be further extracted one or more times with a saturated solution of $NaHCO_3$ to remove excess acid. In these embodiments, the organic layer was combined and dried over anhydrous $Na_2SO_4$, filtered, and concentrated to produce a residue that was further purified by flash column chromatography on silica gel. After removal of the solvent, the product may be dried under high vacuum to yield the final linear bis-propiolate monomer having the general formula:

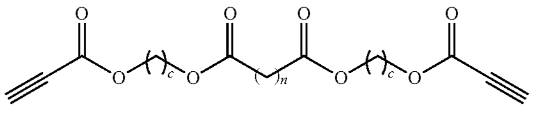

where c is an integer from 2 to 5 and n is an integer from 2 to 12, depending upon which linear $C_4$-$C_{14}$ dicarboxylic acid and $C_2$ to $C_5$ linear bromo alcohol were used.

In still another aspect, the present invention includes the functionalized bioresorbable monomer (termed 2-(prop-2-yn-1-yloxy)propane-1,3-diyl dipropiolate) (PP) used to form the bioresorbable and functionalizable thiol-yne elastomer compositions described above and any salts, esters, and derivatives thereof. These compounds are branched, having two propiolate functional groups for incorporation into the elastomer and a terminal alkyne functional group useful in functionalizing the elastomer as set forth above. This monomer has the general formula:

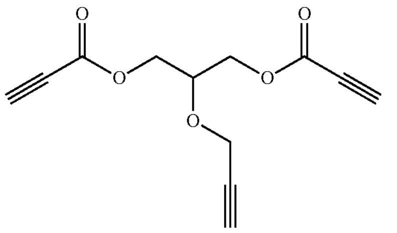

In one or more embodiment, the functionalized bioresorbable monomer 2-(prop-2-yn-1-yloxy)propane-1,3-diyl dipropiolate may be make according to the method set forth in Scheme 6, below.

Scheme 6

Reaction A

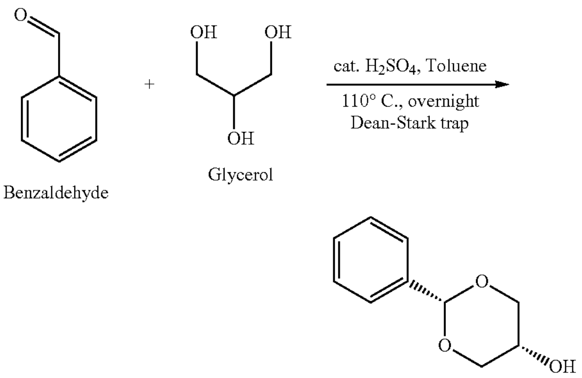

Reaction B

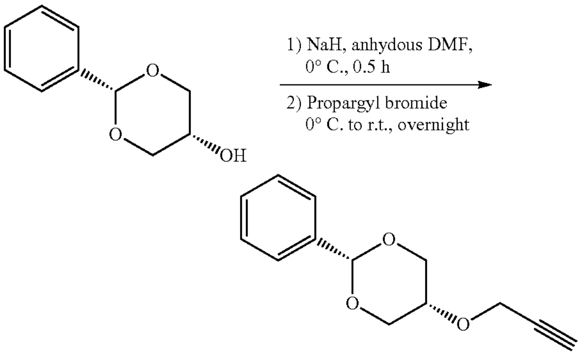

Reaction C

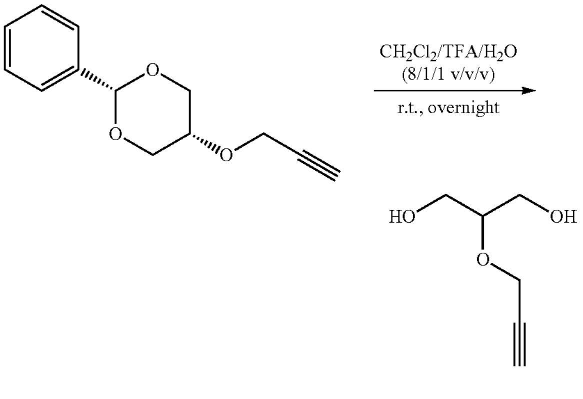

-continued

Reaction D

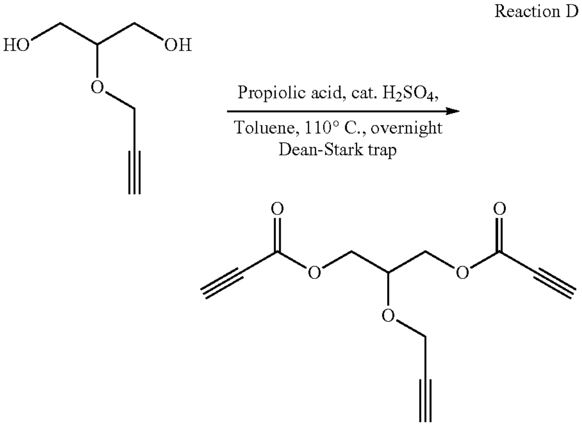

2-(prop-2-yn-1-yloxy)propane-1,3-diyl dipropiolate, PP

Reactions A, B, and C are known and were performed as shown in Crich, D.; Athelstan L. J. Beckwith, A. L. J.; Chen, C.; Yao, Q.; Davison, I. G. E.; Longmore, R. W.; de Parrodi, C. A.; Quintero-Cortes, L.; Sandoval-Ramirez, J. *J. Am. Chem. Soc.* 1995, 117, 8757-8768, the disclosure of which is incorporated herein in its entirety. In step D, propiolic acid (14.21 g, 0.203 mol), 2-(prop-2-ynyloxy)propane-1,3-diol (compound 6) (8.00 g, 0.061 mol), and two drops of sulfuric acid were dissolved in Toluene (150 mL) in 250 mL in a one-neck round-bottom flask, and the mixture was heated to reflux (110° C.) with Dean-Stark trap for overnight. After that, the reaction solution was cooled to room temperature, and extracted with a saturated solution of $NaHCO_3$ (100 mL 3) to remove the excess of propiolic acid. Then the organic phase was collected, dried over $Na_2SO_4$, filtered and reduced in volume to dryness collected. The collected crude product was purified by flash column chromatography on silica gel (EtOAc/hexanes 1:2; $R_f$=0.45). After removal of the solvent, the final product was further purified by distillation under high vacuum (0.02 Torr, 90° C.) to yield the colorless oil (11.00 g, 76.4%). $^1$H NMR (300 MHz, $CDCl_3$) δ 4.40-4.25 (m, 6H), 4.08 (quint, J=6 Hz, 1H), 2.95 (s, 2H), 2.49 (t, J=3 Hz, 2H). $^{13}$C NMR (75 MHz, $CDCl_3$) δ 152.35, 78.95, 75.87, 75.60, 74.27, 73.17, 64.34, 57.88. ESI-MS for $Cl_2H_{10}O_5Na$, m/z theoretical: $[M+Na]^+$=257.04 Da, observed: $[M+Na]^+$=257.0 Da.

In another aspect, the biodegradable elastomer composition described above will further comprise one or more zwitterionic side chains that provide the elastomer with antifouling properties. In various embodiments, the zwitterionic bioresorbable thiol-yne elastomer will have: a polymer backbone comprising a residue of a $C_4$ to $C_{14}$ dicarboxylic acid-based bis-propiolate; the reside of a substantially linear dithiol; and the residue of an alkyne functionalized bis or tris-propiolate, wherein at least 50% of the double bonds are in a cis configuration; and at least one zwitterionic side chain connected to said polymer backbone at the residue of said alkyne functionalized bis or tris-propiolate via a thiol-ene bond, said zwitterionic side chain comprising the residue of a zwitterionic thiol. In some embodiments, biodegradable zwitterionic elastomer composition will contain residues of a linear bis-propiolate monomer, a linear dithiol and the alkyne functionalized bis or tris-propiolate monomer such as 2-(prop-2-yn-1-yloxy)propane-1,3-diyl dipropiolate)(PP), as set forth above, and contain one or more zwitterionic side chains. Any of the linear bis-propiolate monomers described above may be used, but a succinate-based linear bis-propiolate monomer is preferred.

In one or more embodiments, the linear bis-propiolate monomer will have the general formula:

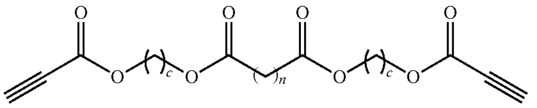

where c is an integer from 2 to 5 and n is an integer from 2 to 12. In one or more embodiment, a succinate-based linear bis-propiolate monomer (n=2) will be used to form the biodegradable elastomer composition. In some of these embodiments, each c will be 3.

In some embodiments, the zwitterionic bioresorbable thiol-yne elastomer wherein the $C_4$ to $C_{14}$ dicarboxylic acid-based bis-propiolate has the formula:

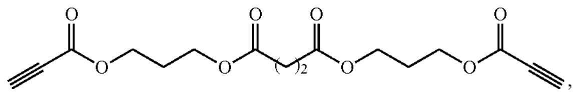

,

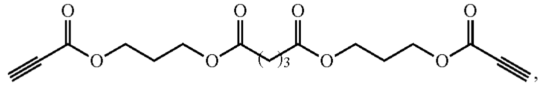

, or

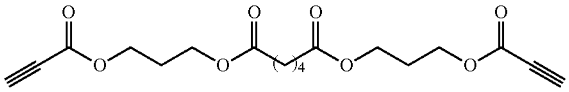

.

Similarly, any of the dithiol compounds described above may be used to form the biodegradable zwitterionic elastomer composition of the present invention. In various embodiments, the linear di-thiol monomer will comprise two terminal thiol groups separated by a $C_4$-$C_{20}$ alkyl, $C_4$-$C_{20}$ alkoxy, or $C_4$-$C_{20}$ aryl group. In one or embodiments, the linear di-thiol monomer may be, without limitation, a linear $C_4$-$C_{20}$ dithiol, poly(ethylene glycol) dithiol, hexa (ethylene glycol) dithiol, tetra(ethylene glycol) dithiol, 2,2'-(ethylenedioxy)diethanethiol, 1,4-benzenedimethanethiol, 2-mercaptoethyl ether, L-(−)-dithiothreitol, or combinations thereof. In one or more embodiments, the linear di-thiol monomer may have the formula:

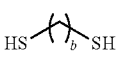

wherein b is an integer from 4 to 20. In some embodiments, the linear dithiol is a $C_4$ to $C_{20}$ linear dithiol.

As set forth above, the alkyne functionalized bis or tris-propiolate monomer is preferably the 2-(prop-2-yn-1-yloxy)propane-1,3-diyl dipropiolate monomer (PP), but the invention is not so limited and other compounds having at least two propiolate functional groups to allow incorporation of the monomer into the elastomer backbone and one or more side chains comprising a chemically active alkyne group may be used. In one or more embodiments, the alkyne functionalized bis or tris-propiolate monomers used will have the formula:

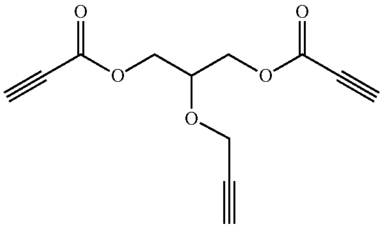

or

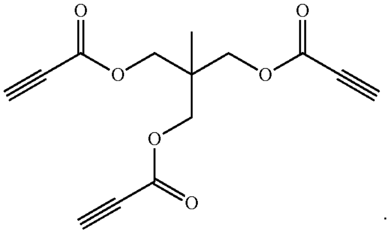

.

As shown in Scheme 3 and described above, the linear bis-propiolate monomer, dithiol monomer, and alkyne functionalized bis or tris-propiolate monomer may be polymerized using thiol-yne reactions to form a biodegradable elastomer intermediate composition having at least three available alkyne functional groups—one at each end and one at each alkyne functionalized bis or tris-propiolate monomer residue. In a second reaction, these elastomer intermediates are reacted with a zwitterionic thiol using another thiol-alkyne "click" reaction as shown in Scheme 1, above (where R is a zwitterionic compound), thereby adding zwitterionic side chains at one or more of the available alkyne groups. In one or more embodiments, zwitterionic bioresorbable thiol-yne elastomer will comprise the thiol-yne step-growth reaction product of a $C_4$ to $C_{14}$ succinic acid, glutaric acid, or adipic acid-based bis-propiolate, a $C_4$ to $C_{20}$ linear dithiol, and 2-(prop-2-yn-1-yloxy)propane-1,3-diyl dipropiolate and a zwitterionic thiol.

The zwitterionic thiol used to form the side chains is not particularly limited, provided it has an available thiol group that is capable of reacting with the available alkyne groups on the elastomer composition using another thiol-alkyne "click" reaction and a zwitterionic functional group. In various embodiments, the zwitterionic thiol used to form the zwitterionic side chains will be a linear hydrocarbon chain of from about 5 to about 100 atoms in length comprising a zwitterionic moiety and a terminal thiol. In some embodiments, the zwitterionic thiol used to form the zwitterionic side chains will be a linear hydrocarbon chain of from about 6 atoms to about 80 atoms, in other embodiments, from about 6 atoms to about 60 atoms, in other embodiments, from about 6 atoms to about 40 atoms, in other embodiments, from about 6 atoms to about 20 atoms, in other embodiments, from about 10 atoms to about 100 atoms, in other embodiments, from about 30 atoms to about 100 atoms, in other embodiments, from about 50 atoms to about 100 atoms, and in other embodiments, from about 70 atoms to about 100 atoms, in length comprising a zwitterionic moiety and a terminal thiol. In some embodiments, the zwitterionic thiol used to form the zwitterionic side chains will be a linear hydrocarbon chain of from about 6 to about 80 atoms in length comprising an ammonium ion and a terminal thiol.

In some embodiments, the zwitterionic functional group may comprise a zwitterionic sulfobetaine, phosphobetaine, or carboxybetaine moiety and a terminal thiol, optionally separated by a spacer. In various embodiments, the spacer may be a linear alkyl, aryl, or alkoxy chain of from about 2 to about 60 atoms in length, optionally comprising an ether, ester or amine group. In various embodiments, the spacer may be a linear alkyl, aryl or alkoxy chain of from about 2 to about 60 atoms in length, optionally comprising an ether, ester or amine group. In some embodiments, the spacer may be a linear alkyl, aryl or alkoxy chain of from about 2 to about 50 in other embodiments, from about 2 atoms to about 30 atoms, in other embodiments, from about 2 atoms to about 20 atoms, in other embodiments, from about 2 atoms to about 10 atoms, in other embodiments, from about 10 atoms to about 60 atoms, in other embodiments, from about 15 atoms to about 60 atoms, in other embodiments, from about 20 atoms to about 60 atoms, in other embodiments, from about 30 atoms to about 60 atoms, and in other embodiments, from about 40 atoms to about 60 atoms in length, optionally comprising an ether, ester or amine group. Here, as well as elsewhere in the specification and claims, individual range values can be combined to form additional non-disclosed ranges. In some embodiments the zwitterion may be 3-((3-((3-mercaptopropanoyl)oxy)propyl) dimethylammonio)propane-1-sulfonate.

In one or more of these embodiments, the zwitterionic thiol has the formula:

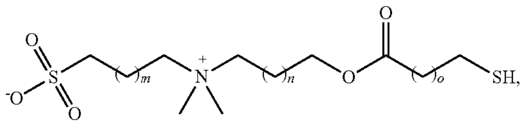

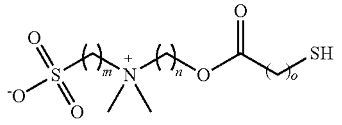

or

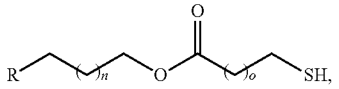

where R comprises a quaternary ammonium compound and a ring opened sultone; and m, n, and o are each an integer from 1 to 20. In some embodiments, m is an integer from about 1 to about 18, in other embodiments, from about 1 to about 15, in other embodiments, from about 1 to about 12, in other embodiments, from about 1 to about 9, in other embodiments, from about 1 to about 6, in other embodiments, from about 5 to about 20, in other embodiments, from about 10 to about 20, in other embodiments, from about 15 to about 20, and in other embodiments, from about 18 to about 20. In some of these embodiments, n is an integer from about 1 to about 18, in other embodiments, from about 1 to about 15, in other embodiments, from about 1 to about 12, in other embodiments, from about 1 to about 9, in other embodiments, from about 1 to about 6, in other embodiments, from about 5 to about 20, in other embodiments, from about 10 to about 20, in other embodiments, from about 15 to about 20, and in other embodiments, from about 18 to about 20. In some of these embodiments, o is an integer from about 1 to about 18, in other embodiments, from about 1 to about 15, in other embodiments, from about 1 to about 12, in other embodiments, from about 1 to about 9, in other embodiments, from about 1 to about 6, in other embodiments, from about 5 to about 20, in other embodiments, from about 10 to about 20, in other embodiments, from about 15 to about 20, and in other embodiments, from about 18 to about 20. Here, as well as elsewhere in the specification and claims, individual range values can be combined to form additional non-disclosed ranges.

In some of these embodiments, the zwitterionic thiol will have the formula:

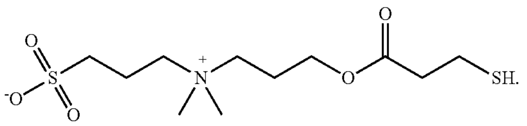

In still other embodiments, the zwitterionic thiol has the formula:

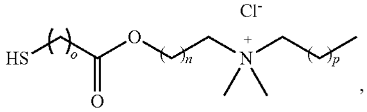
,

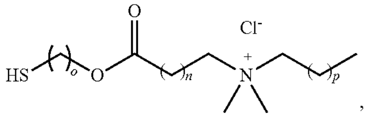
,

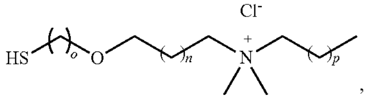
,

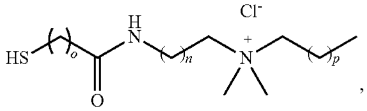
,

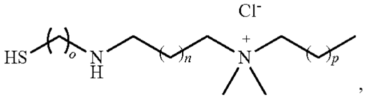
, or

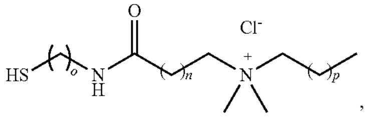
, where o is an integer from 1 to 3, and n is an integer from are each an integer from 1 to 19, and p is an integer from 1 to 18. In some embodiments, o is 2. In some of these embodiments, p is an integer from about 1 to about 17, in other embodiments, from about 1 to about 15, in other embodiments, from about 1 to about 12, in other embodiments, from about 1 to about 9, in other embodiments, from about 1 to about 6, in other embodiments, from about 5 to about 18, in other embodiments, from about 10 to about 18, in other embodiments, from about 13 to about 18, and in other embodiments, from about 15 to about 18.

The zwitterionic thiol may be formed using any conventional method known in the art. One or ordinary skill in the art will be able to form or obtain a suitable zwitterionic thiol without undue experimentation. In some embodiments, the zwitterionic thiol may be formed from a zwitterionic dithiol. In some of these embodiments, the zwitterionic thiol may be formed from a zwitterionic dithiol as shown in Scheme 14 and described in Examples 3 and 5, below.

In various embodiments, the zwitterionic bioresorbable thiol-yne elastomer of the present invention will have the formula:

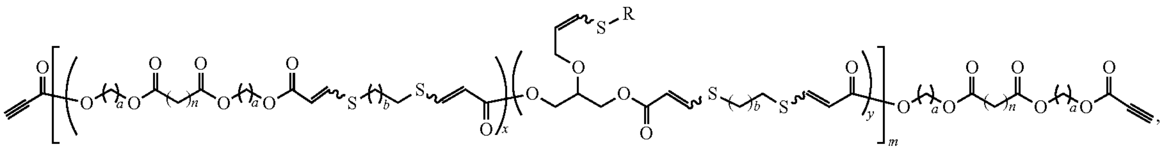

or

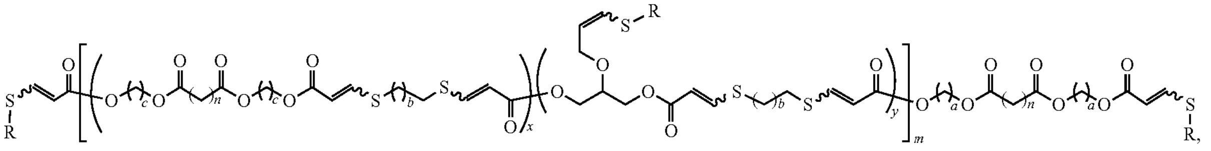

wherein each a is an integer from 2 to 5; each b is an integer from 1 to 19; each n is an integer from 2 to 20; x and y are mole fractions; ~~~ indicates a stereochemically controlled bond that could be in a cis or a trans configuration with respect to the adjacent carbon double bond; m is an integer from 10 to 500; and each R is a zwitterionic group and an optional spacer. In some of these embodiments, each c is an integer from 2 to 4, in other embodiments, from about 2 to about 3, in other embodiments, from about 3 to about 5, and in other embodiments, from about 4 to about 5. In some embodiments, c is 2. In some embodiments, c is 3. In some embodiments, c is 4.

In some of these embodiments, each b is an integer from 1 to 17, in other embodiments, from about 1 to about 15, in other embodiments, from about 1 to about 13, in other embodiments, from about 1 to about 11, in other embodiments, from about 1 to about 9, in other embodiments, from about 1 to about 7, in other embodiments, from about 1 to about 5, in other embodiments, from about 1 to about 3, in other embodiments, from about 2 to about 19, in other embodiments, from about 4 to about 19, in other embodiments, from about 6 to about 19, in other embodiments, from about 8 to about 19, in other embodiments, from about 10 to about 19, in other embodiments, from about 12 to about 19, in other embodiments, from about 14 to about 19, and in other embodiments, from about 16 to about 19. In some embodiments, b is 9. Here, as well as elsewhere in the specification and claims, individual range values can be combined to form additional non-disclosed ranges.

In some embodiments, In some of these embodiments, n is an integer from 2 to 10, in other embodiments, from about 2 to about 8, in other embodiments, from about 2 to about 6, in other embodiments, from about 2 to about 4, in other embodiments, from about 3 to about 12, in other embodiments, from about 5 to about 12, in other embodiments, from about 7 to about 12, in other embodiments, from about 9 to about 12, in other embodiments, from about 3 to about 5, and in other embodiments, from about 4 to about 5. In one or more embodiments, n is 2. In some embodiments, n is 2. In other embodiments, n is 3. In yet other embodiments, n is 4. Here, as well as elsewhere in the specification and claims, individual range values can be combined to form additional non-disclosed ranges.

In various embodiments, x is a mole fraction from about 0.05 to about 0.95. In some embodiments, x is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95. Here, as well as elsewhere in the specification and claims, individual range values can be combined to form additional non-disclosed ranges.

In one or more embodiments, y is a mole fraction from about 0.05 to about 0.95. In some embodiments, y is a mole fraction from about 0.05 to about 0.90, in other embodiments, from about 0.05 to about 0.85, in other embodiments, from about 0.05 to about 0.80, in other embodiments, from about 0.05 to about 0.70, in other embodiments, from about 0.05 to about 0.60, in other embodiments, from about 0.05 to about 0.50, in other embodiments, from about 0.05 to about 0.30, in other embodiments, from about 0.10 to about 0.95, in other embodiments, from about 0.20 to about 0.95, in other embodiments, from about 0.30 to about 0.95, in other embodiments, from about 0.50 to about 0.95, in other embodiments, from about 0.70 to about 0.95, and in other embodiments, from about 0.80 to about 0.95. In some of these embodiments, y is a mole fraction from about 0.20 to about 0.80. Here, as well as elsewhere in the specification and claims, individual range values can be combined to form additional non-disclosed ranges.

In various embodiments, each m is an integer from 10 to 400, in other embodiments, from about 10 to about 300, in other embodiments, from about 10 to about 200, in other embodiments, from about 10 to about 100, in other embodiments, from about 10 to about 50, in other embodiments, from about 50 to about 500, in other embodiments, from about 100 to about 500, in other embodiments, from about 200 to about 500, in other embodiments, from about 300 to about 500, and in other embodiments, from about 400 to about 500. Here, as well as elsewhere in the specification and claims, individual range values can be combined to form additional non-disclosed ranges.

In various embodiments, the biodegradable zwitterionic elastomer composition will contain from about 0.1 to about 10 mol. % zwitterionic side chains. In some embodiments, the biodegradable zwitterionic elastomer composition will contain from about 0.1 to about 9 mol. %, in other embodiments, from about 0.1 mol. % to about 8 mol. %, in other embodiments, from about 0.1 mol. % to about 6 mol. %, in other embodiments, from about 0.1 mol. % to about 4 mol. %, in other embodiments, from about 0.1 mol. % to about 2 mol. %, in other embodiments, from about 1 mol. % to about 10 mol. %, in other embodiments, from about 3 mol. % to about 10 mol. %, in other embodiments, from about 5 mol. % to about 10 mol. %, and in other embodiments, from about 7 mol. % to about 10 mol. % zwitterionic side chains. Here, as well as elsewhere in the specification and claims, individual range values can be combined to form additional non-disclosed ranges.

In various embodiments, the biodegradable zwitterionic elastomer composition is formed by first creating a biodegradable elastomer intermediate having alkyne functional groups as discussed and described above. In various embodiments, In some embodiments, biodegradable elastomer intermediate will contain residues of a linear bis-propiolate monomer, a linear dithiol and the alkyne functionalized bis or tris-propiolate monomer such as 2-(prop-2-yn-1-yloxy)propane-1,3-diyl dipropiolate)(PP), as set forth above. In various embodiments, the biodegradable elastomer intermediate will have the formula.

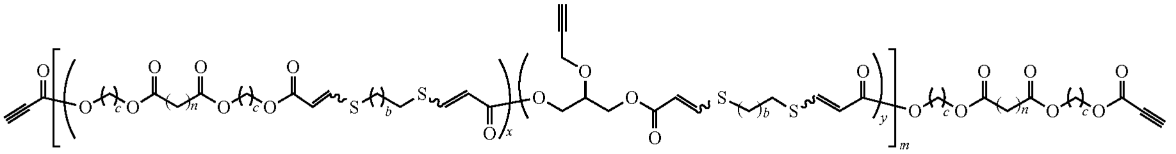

or

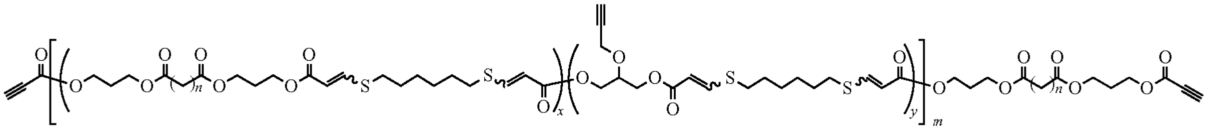

wherein each c is an integer from 2 to 5; each b is an integer from 1 to 19; each n is an integer from 2 to 20; x and y are mole fractions; ∿∿ indicates a stereochemically controlled bond that could be in a cis or a trans configuration with respect to the adjacent carbon double bond; and m is an integer from 10 to 500. In various embodiments, b, c, x, y, n and m may be as set forth above.

As set forth above, the zwitterionic side chains are the added to the polymer chains via thiol-yne click reactions between the alkyne groups on the polymer and the thiol groups on the zwitterionic thiol. (See, e.g., Scheme 1) To add the zwitterionic thiols to the biodegradable elastomer composition, the zwitterionic thiols are dissolved in water or an aqueous solution and a radical photoinitiator, such as lithium phenyl-2,4,6-trimethylbenzoylphosphinate (LAP), which is preferably water soluble. The water soluble radical photoinitiator is not particularly limited provided that it is sufficiently water soluble to dissolve the zwitterionic thiol compounds being used, does not react with any of the other reagents and is capable of initiating a thiol-yne click reaction when exposed to visible or ultraviolet light. In biological applications, the water soluble radical photoinitiator is preferably biocompatible. One of ordinary skill in the art will be able to select a water soluble radical photoinitiator without undue experimentation.

In various embodiments, the concentration of zwitterionic thiols in the water soluble radical photoinitiator solution may be from about 0.5 to 30 wt. percent. In some embodiments, the concentration of zwitterionic thiols in the water soluble radical photoinitiator solution may be from about 0.5 to 28 wt. %, in other embodiments, from about 0.5 wt. % to about 25 wt. %, in other embodiments, from about 0.5 wt. % to about 20 wt. %, in other embodiments, from about 0.5 wt. % to about 15 wt. %, in other embodiments, from about 0.5 wt. % to about 10 wt. %, in other embodiments, from about 0.5 wt. % to about 5 wt. %, in other embodiments, from about 3 wt. % to about 30 wt. %, in other embodiments, from about 10 wt. % to about 30 wt. %, and in other embodiments, from about 20 wt. % to about 30 wt. %. Here, as well as elsewhere in the specification and claims, individual range values can be combined to form additional non-disclosed ranges. Ordinarily, the zwitterionic thiols are used in excess, relative to the number of available alkyne groups on the biodegradable elastomer intermediate immersed in the water soluble radical photoinitiator solution.

After it has dried, the biodegradable elastomer composition is then immersed in the aqueous zwitterionic thiol and photoinitiator solution at ambient temperature and irradiated with electromagnetic radiation having wavelengths in the ultra violet (UV) (λ=100 nm to 400 nm) and/or visible light (λ=380 nm to 700 nm) portion of the spectrum (depending upon the radical initiator used) to attach the zwitterionic thiol compound to the biodegradable elastomer composition. In various embodiments, the solution is irradiated with UV light for from about 30 seconds to about 30 min, depending upon the radical initiator used and the concentration of the zwitterionic thiols in the solution. In some embodiments, the solution is irradiated with UV light for from about 30 seconds to about 30 min, in other embodiments, from about 1 min to about 20 min, in other embodiments, from about 1 min to about 10 min, in other embodiments, from about 1 min to about 5 min, in other embodiments, from about 3 min to about 30 min, in other embodiments, from about 8 min to about 30 min, in other embodiments, from about 15 min to about 30 min, in other embodiments, from about 20 min to about 30 min, and in other embodiments, from about 25 min to about 30 min. Here, as well as elsewhere in the specification and claims, individual range values can be combined to form additional non-disclosed ranges. In some embodiments, the biodegradable elastomer composition is immersed in a bath containing the zwitterionic thiol to be added and LAP at ambient temperature and the irradiated for from about 30 seconds to about 30 min with UV light having a wavelength of 360 nm.

As set forth above (see e.g., Scheme 1), the biodegradable elastomer intermediates described above have chemically active alkyne groups on both the terminal propiolate groups and on the residues of the alkyne functionalized bis or tris-propiolate monomers. With the assistance of the radical initiator, the thiol groups on the zwitterionic thiols react with the alkyne groups on the elastomer intermediate using a thiol-yne click reaction when irradiated, thereby forming the zwitterionic side chains of the zwitterionic elastomer of the present invention.

As will be apparent, the number of zwitterion side chains that will be added will in most cases primarily depend number of the alkyne functionalized bis or tris-propiolate monomers residues in the biodegradable elastomer intermediate, given that the zwitterionic thiols are generally present in excess and the solution will ordinarily be irradiated long enough to drive the reaction to completion. However, the number of zwitterionic side chains on the zwitterionic biodegradable elastomer composition may also be controlled by varying the concentration of zwitterionic thiols in the aqueous zwitterionic thiol and photoinitiator solution. The photoinitiator concentration and the duration and wavelength of the light used to irradiate the solution are also important in embodiments where the number of zwitterion side chains that will be added is controlled by not allowing the reaction to proceed to completion. Finally, it should be noted that the zwitterionic side chains are only added in places where the alkyne groups of the biodegradable elastomer intermediate are available to the aqueous zwitterionic thiol and photoinitiator solution and the UV light irradiation—i.e. at or near the surface of the dried biodegradable elastomer intermediate.

In another aspect, the present invention is directed to an anti-fouling coating comprising the zwitterionic biodegradable elastomer composition described above for use on one or more exterior surfaces of an implantable medical device. Suitable implantable medical devices may include, without limitation, orthopedic implants, vascular implants, pacemakers, implantable defibrillators, implantable composite mesh, hernia mesh and other devices and materials that are implanted in the body. In various embodiments, the anti-fouling coating of the present invention is prepared in much the same way and the biodegradable zwitterionic elastomer compositions described above In these embodiments, a biodegradable elastomer intermediate is prepared as set forth above and then coated onto an external surface of an implantable medical device and allowed to dry. The biodegradable elastomer intermediate may be applied by any suitable method including, but not limited to, solvent coating, a Doctor's blade, spin coating, spray drying, or combinations thereof. The coated implantable medical device is then placed in an aqueous solution containing the zwitterionic thiol to be added and a radical initiator, such as LAP, and irradiated with UV light to form a polymer coating having anti-fouling properties.

In still another aspect, the present invention is directed to a laminated hernia mesh comprising the anti-fouling coating described above for use in the prevention of intra-abdominal adhesions (IAs) after hernia repair surgery. As set forth above, the formation of IAs following abdominal surgery remains a major unmet medical need and leads to serious complications in . . . 5% of cases and can cause small-bowel obstruction, fistula, infection, chronic pain and inflammation, which often require high-risk re-operation with prolonged hospitalization and sometimes leading to chronically debilitated patients.

As will be understood by those of skill in the art, IAs arise from a complex fibrosis process that is induced singly or in combination by surgical trauma, infections, foreign body reaction and persistent inflammation. One method known in the art for reducing AIs involves introducing physical barriers between the mesh and viscera to reduce adhesion. Ideally, such an anti-adhesive mesh barrier should be biocompatible, possess adequate mechanical properties and allow native peritoneum to reform and remodel on the intraperitoneal surface of the mesh. While a macroporous mesh prosthesis, such as a macroporous monofilament polypropylene or polyolefin mesh, appears to be optimal for bio-integration, its use has been found to result in irregular, non-homogeneous peritoneal regeneration, often leading to adhesions. Conversely, a conventional laminar prosthesis, which promotes generation of a linear, organized neoperitoneum, has been found to have the major drawback of slow and incomplete integration with the host. Moreover, known degradable elastomeric coatings are generally not adherent to polypropylene, making it challenging to independently control both the degradation timelines appropriate for tissue remodeling and the mechanical properties of elastomers.

To address these shortcomings, the laminated hernia mesh of the present invention is fabricated asymmetrically with an elastomer coating dominant side and a mesh dominant side (See, FIGS. 57A-D; 58A-C). This approach allows for the composite mesh to bio-integrate on the parietal side and serve as an anti-adhesive barrier on the visceral side. The composite is therefore able to function as an anti-adhesive barrier in combination with the reinforcement function necessary for the herniated or damaged abdominal wall. As will be apparent to those of skill in the art, in abdominal hernia surgery a hernia mesh is generally inserted such that one surface of the laminated mesh is oriented toward the viscera and the other surface is oriented toward the skin.

As will be apparent, the laminated hernia mesh of the present invention will comprise a polymer mesh, coated on one side with the bioresorbable and biodegradable anti-fouling coating described above. Any suitable polymer mesh may be used including, but not limited to, polypropylene mesh, polyolefin mesh, and combinations thereof. In some embodiments, the laminated hernia mesh of the present invention will comprise a macroporous monofilament polypropylene mesh.

Any of the various anti-fouling coatings described above may be used to form the hernia mesh of the present invention. The process for applying the anti-fouling coating may be applied to the hernia mesh or other implantable medical device is not particularly limited, and the anti-fouling coating may be applied in any conventional manner appropriate for the device being coated. In one or more embodiments, the hernia mesh will comprise a macroporous monofilament polypropylene or polyolefin mesh and will be coated as set forth above on one side. (See, FIGS. 57A-E).

In some embodiments, the laminated hernia mesh of the present invention may be prepared as shown in FIGS. 57A-E. In this process, a Doctor's blade apparatus is placed on a suitable substrate such as PTFE and the biodegradable elastomer intermediates is prepared as set forth above and placed in the reservoir of the apparatus as shown in FIG. 57A. The blade is slowly moved backward to form a film on the substrate of a desired thickness. In various embodiments, the film will have a thickness of from about 5 μm to 500 μm. In some embodiments, the film will have a thickness of from about 5 μm to 400 μm, in other embodiments, from about 5 μm to about 300 μm, in other embodiments, from about 5 μm to about 200 μm, in other embodiments, from about 5 μm to about 100 μm, in other embodiments, from about 5 μm to about 50 μm, in other embodiments, from about 25 μm to about 500 μm, in other embodiments, from about 125 μm to about 500 μm, in other embodiments, from about 225 μm to about 500 μm, and in other embodiments, from about 350 μm to about 500 μm. Here, as well as elsewhere in the specification and claims, individual range values can be combined to form additional non-disclosed ranges.

Figure 57E:
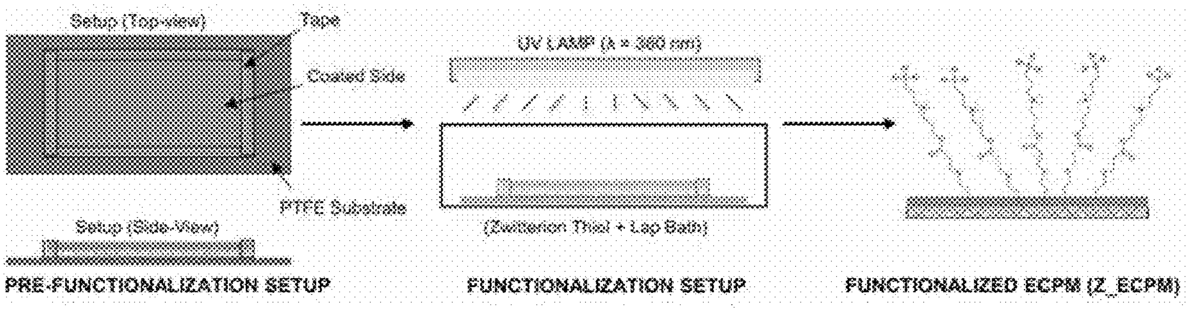

Turning now to FIG. 57B, the selected polypropylene or polyolefin mesh is then placed on top of the film and forced partially into the film by a second sheet of the substrate and optionally a weight. As will be apparent, the mesh should not be pressed so deeply into the polymer film that the upper surface of the mesh is also coated. (See, e.g., FIG. 57D) As can be seen in FIG. 57E, the weight is removed and the mesh, together with the top sheet of substrate, is flipped so that the coated side of the mesh is on top and the uncoated side of the mesh is facing the second sheet (formerly the top sheet) of substrate. The original substrate is then removed to provide a mesh having an upper coated surface. The coated hernia mesh is then allowed to dry and taped to the second sheet (formerly the top sheet) of substrate. The hernia mesh is then placed in an aqueous solution containing a radical initiator, as set forth above, and irradiated with a UV light for from about 30 sec to about 30 min to form the anti fouling laminated hernia mesh of the present invention. In some embodiments, the solution is irradiated with UV light for from about 1 min to about 20 min, in other embodiments, from about 1 min to about 10 min, in other embodiments, from about 1 min to about 5 min, in other embodiments, from about 3 min to about 30 min, in other embodiments, from about 8 min to about 30 min, in other embodiments, from about 15 min to about 30 min, in other embodiments, from about 20 min to about 30 min, and in other embodiments, from about 25 min to about 30 min. Here, as well as elsewhere in the specification and claims, individual range values can be combined to form additional non-disclosed ranges. As can be seen in FIGS. 57C and 58A-C, the laminated hernia mesh of the present invention has a bioerodable anti-fouling coating on just one side.

EXAMPLES

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

Example 1

Bioresorbable Polymers with Tunable Crystallinity for Enhancement of Water Barrier in Wireless Bio-Integrated Medical Electronics Herein, we report and characterize a series of resorbable elastomer compositions with a stereochemically controlled double bonds and labile ester bonds in their backbone. These features provide tunable thermal and mechanical properties of these materials. Significantly, we show the crystalline domain of materials can enhance water barrier performances that could potentially achieve desired lifetime of wireless medical devices.

Materials and Methods

Materials: All commercial reagents and solvents were used as received without further purification except 1,10-decanedithiol. The chloroform-d ($CDCl_3$) was purchased from Cambridge Isotopes Laboratories, Inc (Tewksbury, MA). Diethyl ether ($Et_2O$), isopropyl alcohol (iPrOH), and dichloromethane ($CH_2Cl_2$) were purchased from EMD Millipore (Burlington, MA). Ethyl acetate (EtOAc), sodium sulfate (Na2SO4), sodium bicarbonate ($NaHCO_3$), ammonium chloride (NH4Cl), propiolic acid, sulfuric acid, 1,8-diazabicyclo[5.4.0]undec-7-ene (DBU), hexanes, butylated hydroxytoluene (BHT), succinic acid, 1,3-propanediol (>98%) were purchased from Sigma-Aldrich (Milwaukee, WI). Chloroform ($CHCl_3$) was purchased from VWR Chemicals (99% with amylene as inhibitor) and Fischer Scientific (HPLC grade, 99.5+% with amylene as inhibitor), 3-mercapto-1-propanol (>97%), 1,10-decanedithiol (>98%), were purchased from Tokyo Chemical Industry Ltd (Philadelphia, PA).

Characterization: $^{1}H$ NMR and $^{13}C$ NMR spectra were obtained using a Bruker 500 MHz NMR spectrometer operated at 303 K. All chemical shifts are reported in ppm (S) and referenced to the chemical shifts of residual solvent resonances ($CDCl_3$ 1H: δ=7.26 ppm, $^{13}C$: 8=77.16 ppm). Differential scanning calorimetry (DSC) was performed using a TA Instruments Discovery DSC250 (TA Instruments—Waters L.L.C., New Castle, DE) on sample sizes between 5-10 mg using temperature ramps for a heating rate of 10° C.·min−1 and a cooling rate of 10° C.·min−1 from −30° C. to 130° C. The glass transition temperature ($T_g$), crystalline temperature ($T_c$), and melting temperature ($T_m$) were determined from the midpoint in the second heating cycle of DSC. Thermogravimetric (TGA) analysis was performed using a TA Instruments Discovery TGA550 (TA Instruments—Waters L.L.C, New Castle, DE) on sample sizes of ca. 10 mg using a heating ramp of 20° C.·min−1 from r.t. to 800° C. Size exclusion chromatography (SEC) was performed on all samples using an EcoSEC HLC-8320GPC (Tosoh Bioscience LLC, King of Prussia, PA) equipped with a TSKgel GMHHR-M mixed bed column and refractive index (RI) detector. Molecular masses were calculated using a calibration curve determined from polystyrene standards (PStQuick C and D standards, Tosoh Bioscience, LLC, King of Prussia, PA) as eluent flowing at 0.5 mL·min−1 at 313K, and a sample concentration of 3 mg·mL-1 HPLC grade $CHCl_3$.

Monomer Synthesis 1,3-Propane diyl dipropiolate ($C_{3A}$): The 1,3-Propane diyl dipropiolate ($C_{3A}$) monomer was synthesized as set forth in U.S. Pat. No. 10,954,276 and shown in Scheme 7, below:

Scheme 7. The synthesis of 1,3-propane diyl dipropiolate (C3A).

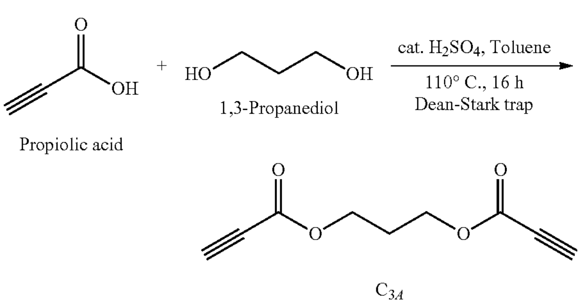

Propiolic acid 1,3-Propanediol $C_{3A}$ 1,3-propanediol (20.00 g, 0.263 mol), propiolic acid (50.00 g, 0.714 mol), and two drops of $H_2SO_4$ were added to a 500 mL one-neck round bottom flask with 200 mL toluene. The mixture was heated to reflux (110° C.) with Dean-Stark trap for overnight. After that, the reaction solution was cooled to room temperature, and extracted with saturated solution of $NaHCO_3$ (100 mL×3) to remove the excess of propiolic acid.

Then the organic phase was collected, dried over $Na_2SO_4$, filtered and reduced in volume to dryness collected. The collected crude product was purified by flash column chromatography on silica gel (EtOAc/hexanes 1:3; $R_f$=0.45) to collect $1^{st}$ fraction. After removal of the solvent, the final product was further purified by distillation under high vacuum (0.02 Torr, 90° C.) to yield the colorless oil (39.80 g, 84.0%). $^1H$ NMR (500 MHz, $CDCl_3$) δ 4.29 (t, J=10 Hz, 4H), 2.91 (s, 2H)), 2.07 (quint, J=10 Hz, 2H).

Bis(3-mercaptopropyl) succinate ($C_{SS}$): The bis(3-mercaptopropyl) succinate ($C_{SS}$) monomer was synthesized as shown in Wandel et al. (Wandel, M. B.; Bell, C. A.; Yu, J.; Arno, M. C.; Dreger, N. Z.; Hsu, Y. H.; Pitto-Barry, A.; Worch, J. C.; Dove, A. P.; Becker, M. L., Concomitant Control of Mechanical Properties and Degradation in Resorbable Elastomers Using Stereochemistry and Stoichiometry for Soft Tissue Engineering. *Nat. Commun.* 2020, 12:446, the disclosure of which is incorporated herein by reference in its entirety) and as set forth in Scheme 8, below:

Scheme 8 The synthesis of Bis(3-mercaptopropyl) succinate (CSS).

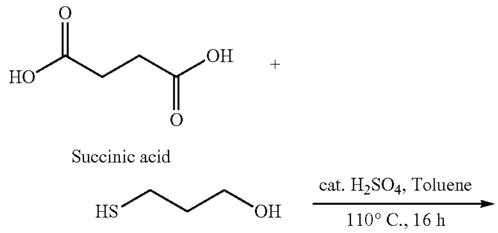

Succinic acid

3-Mercaptopropanol

-continued

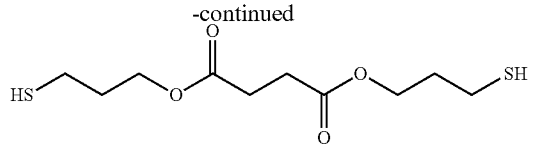

$C_{SS}$

Succinic acid (15.00 g, 0.127 mol), 3-mercapto-1-propanol (25 g, 0.271 mol), and two drops of $H_2SO_4$ were added into 250 mL one-neck round-bottom flask with 180 mL toluene, and the mixture was heated to reflux (110° C.) with Dean-Stark trap for overnight. After that, the reaction solution was cooled to room temperature, and extracted with saturated solution of $NaHCO_3$ (100 mL×3) to remove the residual acid. Then the organic phase was collected, dried over $Na_2SO_4$, filtered and reduced in volume to dryness collected. The collected crude product was purified by flash column chromatography on silica gel (EtOAc/hexanes 2:3; Rf=0.45) to collect 1st fraction. After removal of the solvent, the final product was further purified by distillation under high vacuum (0.02 Torr, 120° C.) to yield the colorless oil (26.70 g, 79.1%). $^1H$ NMR (500 MHz, $CDCl_3$) δ 4.20 (t, J=10 Hz, 4H), 2.62-2.57 (m, 8H), 1.93 (quint, J=10 Hz, 4H), 1.39 (t, J=10 Hz, 2H).

Thiol-yne Step-Growth Polymerization

The biodegradable elastomer composition was prepared via a thiol-yne step-growth (co)polymerization as shown in Scheme 9, below.

Figure 2:
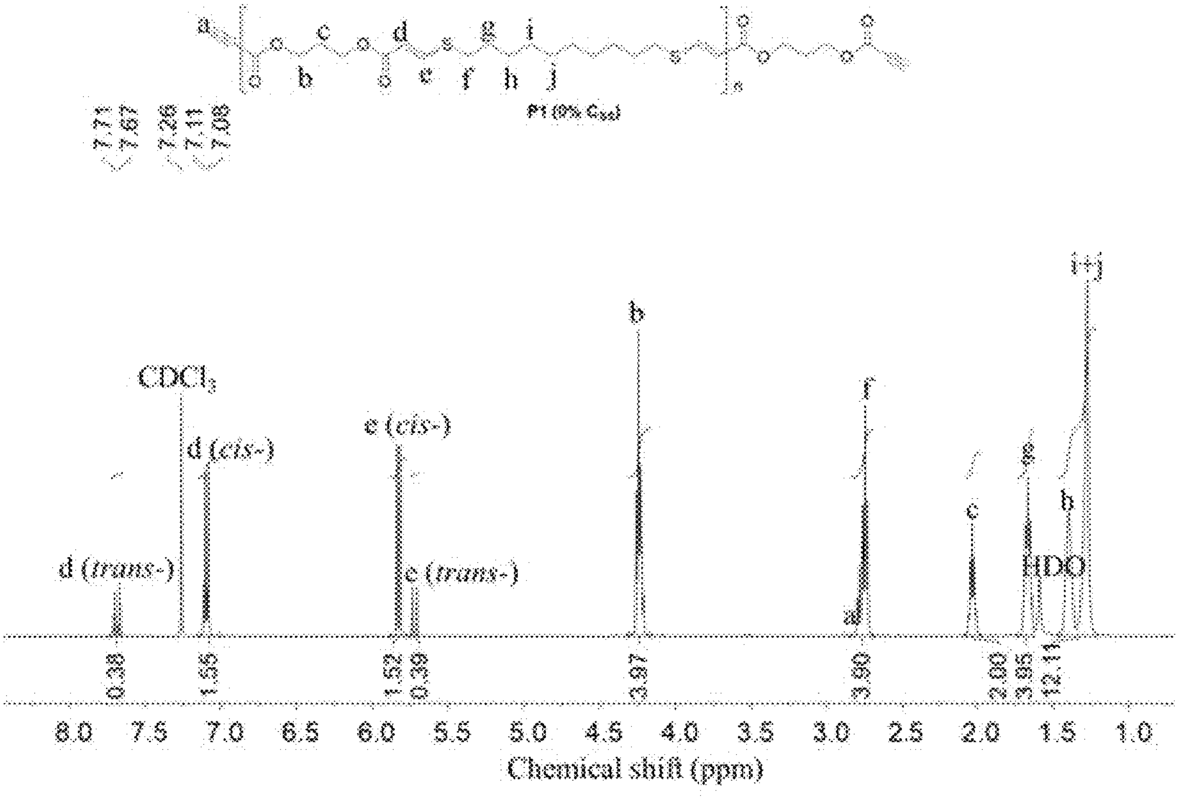
FIG. 2 is the $^1H$ NMR spectrum of P1 (with 0% $C_{SS}$) showing 81% cis content for the thiol-yne step-growth polymer. Cis-content can be calculated by the J coupling constants of the respective resonances. Resonance g, h, i, and j are from the dithiol monomer ($C_{10S}$) and resonance a, b, and c are from the 1,3-propane dipropiolate monomer ($C_{3A}$). The polymer P1 reveals cis %/trans %=81%: 19% in $CHCl_3$ with 1 mol % DBU ($CDCl_3$, 500 MHz).
Figure 3:
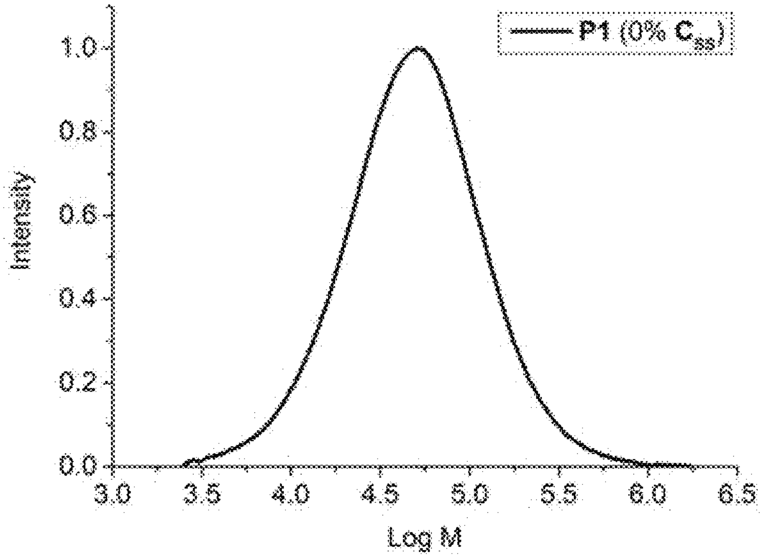
FIG. 3 is the SEC chromatogram of the P1 (81% Cis) thiol-yne step-growth polymer; $M_n$=32.5 kDa, $M_w$=72.8 kDa, $Đ_M$=2.24 (SEC $CHCl_3$, based on PS standards).

Scheme 9. The general thiol-yne step-growth (co)polymerization for 80-81% cis content.
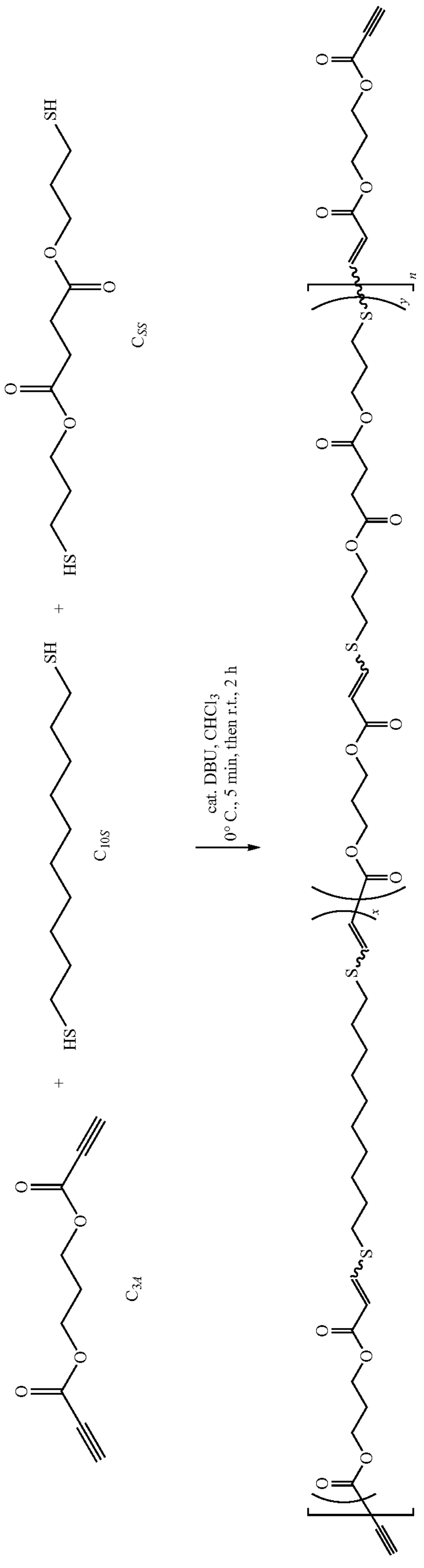
$C_{3A}$ + $C_{10S}$ + $C_{SS}$
P1, y = 0, 0% $C_{SS}$
P2, y = 0.2, 20% $C_{SS}$
P3, y = 0.3, 30% $C_{SS}$
P4, y = 0.4, 40% $C_{SS}$
P5, y = 0.5, 50% $C_{SS}$
P6, y = 0.6, 60% $C_{SS}$ General procedure for thiol-yne step-growth polymerization: 80% cis content of P1 (0% $C_{SS}$) taken as example of thiol-yne step growth polymerization is as follows: 1,3-Propane diyl dipropiolate ($C_{3A}$, 1.56 g, $8.6\times10^{-3}$ mol) and bis(3-mercaptopropyl) succinate and 1,10 decanedithiol ($C_{10s}$) ($C_{10S}$, 1.78 g, 8.6×10−3 mol) were added to a 100 mL round bottom flask with 16 mL $CHCl_3$. The solution was then cooled to −15° C. with stirring for 15 min before DBU (13 μL, $8.6\times10^{-5}$ mol) was added in one portion. Notably, the addition of DBU caused the solvent to bubble due to an exothermic reaction. After 10 min, the reaction was allowed to warm to room temperature. After 1 h, excess of C3A was dissolved in 5 mL $CHCl_3$ and added into reaction solution. After another 0.5 h, the solution was diluted with $CHCl_3$ (20 mL) and BHT (0.14 g, $6.5\times10^{-1}$ mol) was added. The polymer solution was then precipitated into diethyl ether (400 mL) and collected by decanting the supernatant and dried by high vacuum system at room temperature for 24 h to obtain the pale-yellow polymer P1 (3.08 g, 92%). SEC ($CHCl_3$) $M_n$=32.6 kDa, $M_w$=68.6 kDa, $Đ_M$=2.24. $^1$H NMR ($CDCl_3$, 500 MHz) % cis: % trans=81%: 19%. DSC: $T_g$=−6.8° C., $T_c$=61.4° C., $T_d$=112.4° C. TGA: $T_d$=359° C. Tensile tests: $E_0$=65.8±0.6 MPa, $\varepsilon_{break}$=1457±112%, UTS=32.2±3.9 MPa. (See. FIGS. 2-3)

Figure 4:
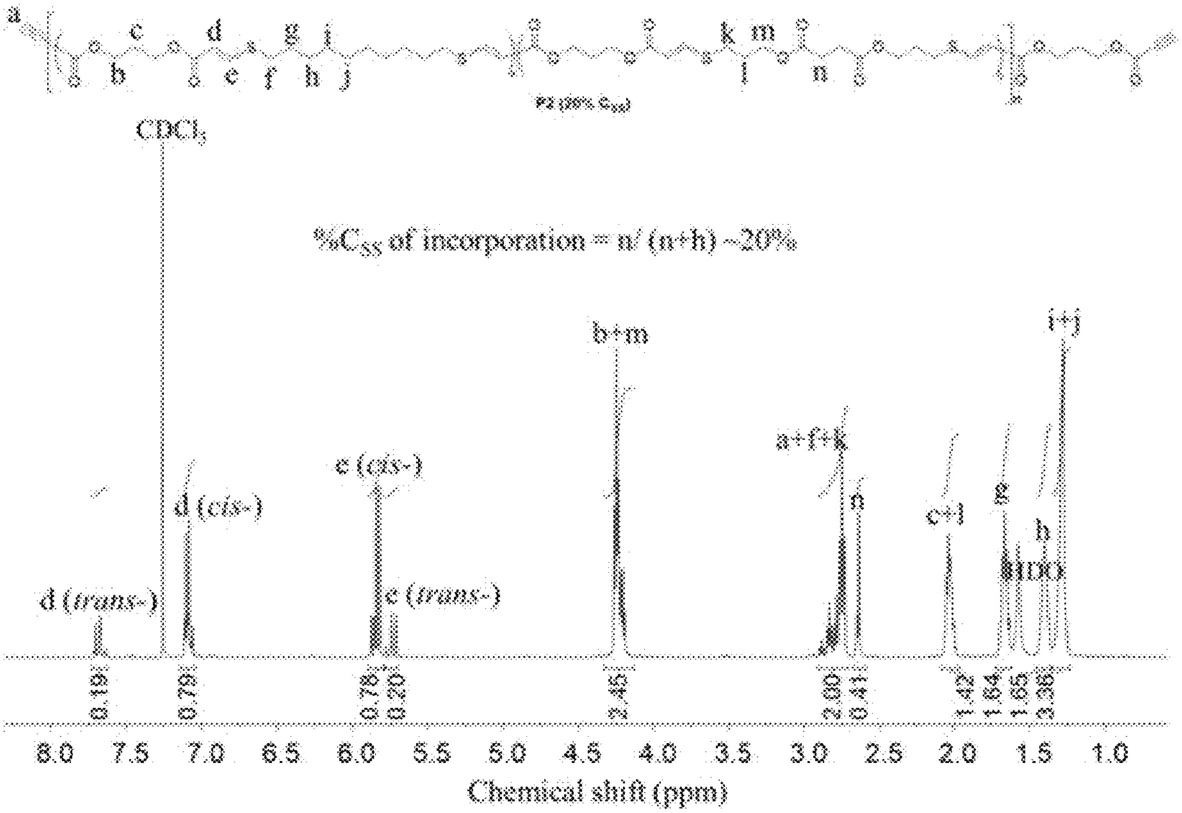
FIG. 4 is the $^1H$ NMR spectrum of P2 (with 20% $C_{SS}$) showing 80% cis content for the thiol-yne step-growth copolymer with 20% incorporation of $C_{SS}$ in $CHCl_3$ with 1 mol % DBU. The ratio of resonance n (from $C_{SS}$) to resonance h (from $C_{3A}$) displays 20%: 80% that affords polymer P2 with 20% incorporation of $C_{SS}$ ($CDCl_3$, 500 MHz).
Figure 5:
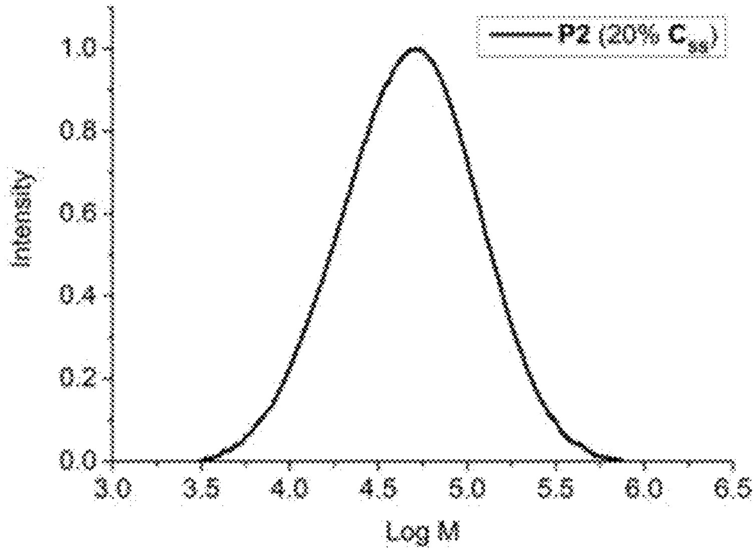
FIG. 5 is the SEC chromatogram of the P2 (80% Cis) thiol-yne step-growth polymer with 20% incorporation of $C_{SS}$; M=32.6 kDa, =68.6 kDa, $Đ_M$=2.10 (SEC $CHCl_3$, based on PS standards).

General procedure for thiol-yne step-growth copolymerization (Different % incorporation of bis(3-mercaptopropyl) succinate, $C_{SS}$): 81% cis content of P2 (20% $C_{SS}$) taken as example of thiol-yne step growth copolymerization is as follows: $C_{SS}$ (0.715 g, $2.68\times10^{-4}$ mol), $C_{3A}$ (2.42 g, 13.4×$10^{-3}$ mol) and $C_{10S}$ (2.21 g, $10.7\times10^{-3}$ mol) were added to a 100 mL round bottom flask with 25 mL $CHCl_3$. The solution was then cooled to −15° C. with stirring for 15 min before DBU (20 μL, $13.4\times10^{-3}$ mol) was added in one portion. Notably, the addition of DBU caused the solvent to bubble due to an exothermic reaction. After 10 min, the reaction was allowed to warm to room temperature. After 1 h, excess of $C_{3A}$ was dissolved in 5 mL $CHCl_3$ and added into reaction solution. After another 0.5 h, the solution was diluted with $CHCl_3$ (25 mL) and BHT (225 mg, $10.22\times10^{-5}$ mol) was added. The polymer solution was then precipitated into diethyl ether (400 mL) and collected by decanting the supernatant and dried by high vacuum system at room temperature for 24 h to obtain the pale-yellow polymer P2 (20% $C_{SS}$, 8.81 g, 90%). SEC ($CHCl_3$, based on PS standards) $M_n$=32.5 kDa, $M_w$=72.8 kDa, $Đ_M$=2.10. DSC: $T_g$=−7.3° C., =30.3° C., $T_m$=99.3° C. TGA: $T_d$=348° C. Tensile tests: $E_0$=57.2±4.4 MPa, $\varepsilon_{break}$=1700±31%, UTS=40.5±2.2 MPa. (See. FIGS. 4-5)

Figure 6:
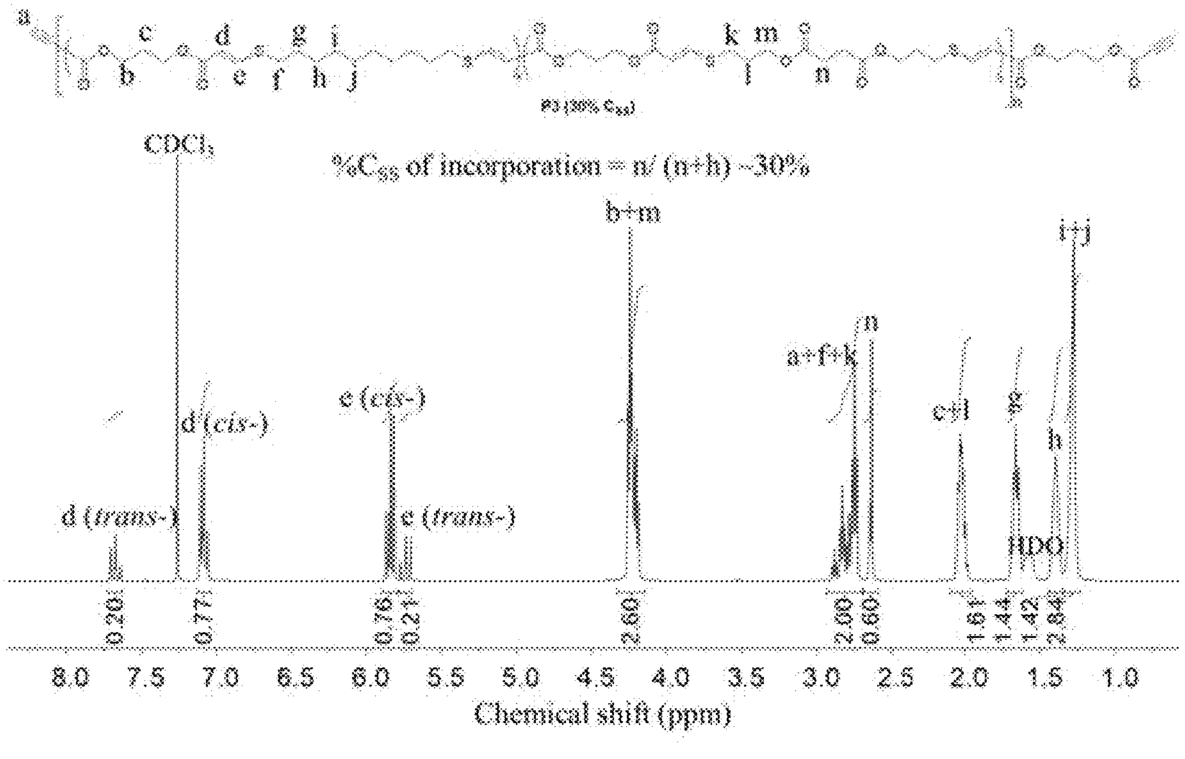
FIG. 6 is the $^1H$ NMR spectrum of P3 (with 30% $C_{SS}$) showing 80% cis content for the thiol-yne step-growth copolymer with 30% incorporation of $C_{SS}$ in $CHCl_3$ with 1 mol % DBU. The ratio of resonance n (from $C_{SS}$) to resonance h (from $C_{3A}$) displays 30%: 70% that affords polymer P3 with 30% incorporation of $C_{SS}$ ($CDCl_3$, 500 MHz).
Figure 7:
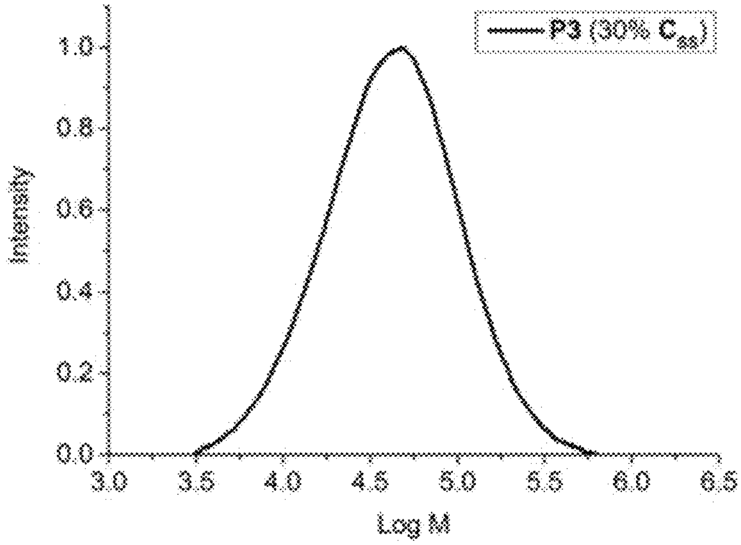
FIG. 7 is the SEC chromatogram of the P3 (80% Cis) thiol-yne step-growth polymer with 30% incorporation of $C_{SS}$; $M_n$=29.1 kDa, $M_w$=60.4 kDa, $Đ_M$=2.08 (SEC $CHCl_3$, based on PS standards).

Copolymerization of P3 (30% $C_{SS}$): The polymer was prepared by the general procedure described above. $^1$H NMR ($CDCl_3$, 500 MHz) % cis~80 with 30% $C_{SS}$ incorporation. SEC ($CHCl_3$) $M_n$=29.1 kDa, $M_w$=60.4 kDa, =2.08. DSC: $T_g$=−7.3° C., $T_T$=18.5° C., $T_m$=88.9° C. TGA: $T_d$=349° C. Tensile tests: $E_0$=40.9±3.5 MPa, $\varepsilon_{break}$=1638±33%, UTS=28.3±1.2 MPa. (See. FIGS. 6-7)

Figure 8:
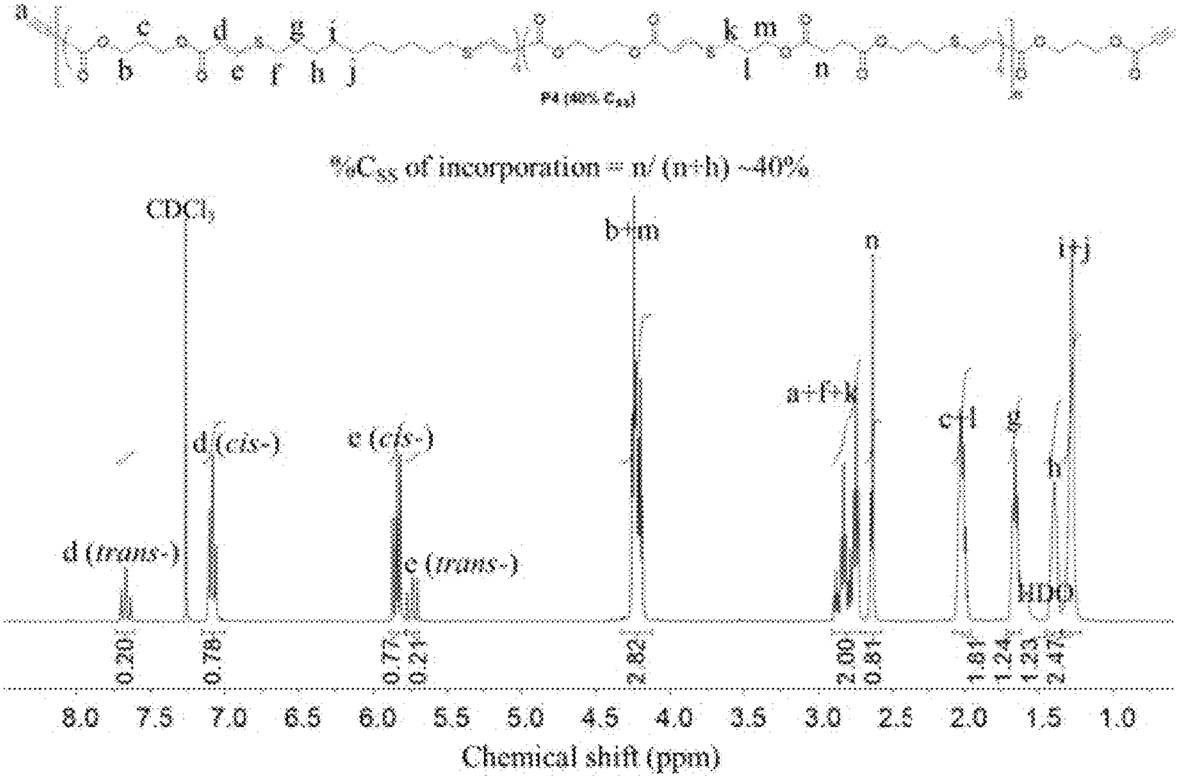
FIG. 8 is the $^1H$ NMR spectrum of P4 (with 40% $C_{SS}$) showing 80% cis content for the thiol-yne step-growth copolymer with 40% incorporation of $C_{SS}$ in $CHCl_3$ with 1 mol % DBU. The ratio of resonance n (from $C_{SS}$) to resonance h (from $C_{3A}$) displays 40%: 60% that affords polymer P4 with 40% incorporation of $C_{SS}$ ($CDCl_3$, 500 MHz).
Figure 9:
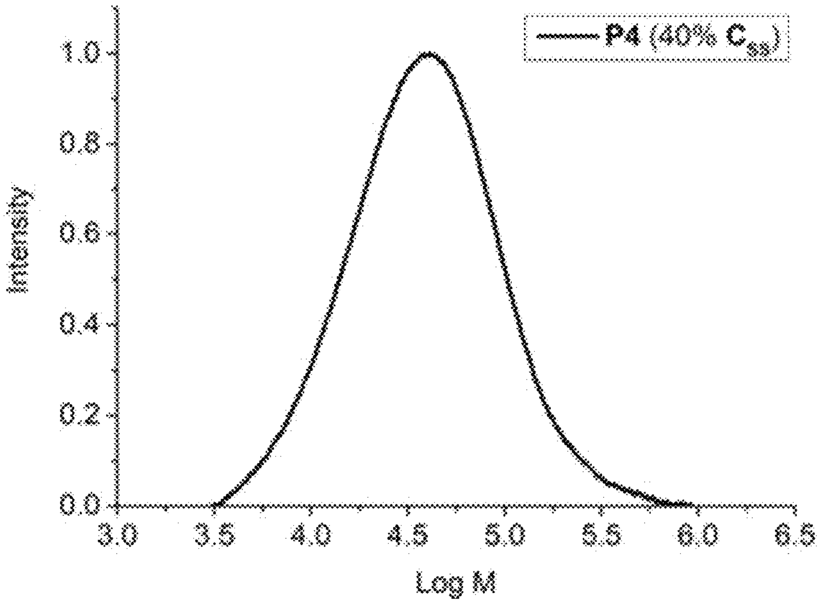
FIG. 9 is the SEC chromatogram of the P4 (80% Cis) thiol-yne step-growth polymer with 40% incorporation of $C_{SS}$; M=26.7 kDa, M=57.0 kDa, $Đ_M$=2.13 (SEC $CHCl_3$, based on PS standards).

Copolymerization of P4 (40% $C_{SS}$): The polymer was prepared by the general procedure described above. $^1$H NMR ($CDCl_3$, 500 MHz) % cis~80 with 40% $C_{SS}$ incorporation. SEC ($CHCl_3$) $M_n$=26.7 kDa, $M_w$=57.0 kDa, $Đ_M$=2.13. DSC: $T_g$=−7.4° C., $T_c$=12.7° C., $T_m$=82.5° C. TGA: $T_d$=349° C. Tensile tests: $E_0$=36.2±2.0 MPa, $\varepsilon_{break}$=2110±50%, UTS=36.2±4.1 MPa. (See. FIGS. 8-9)

Figure 10:
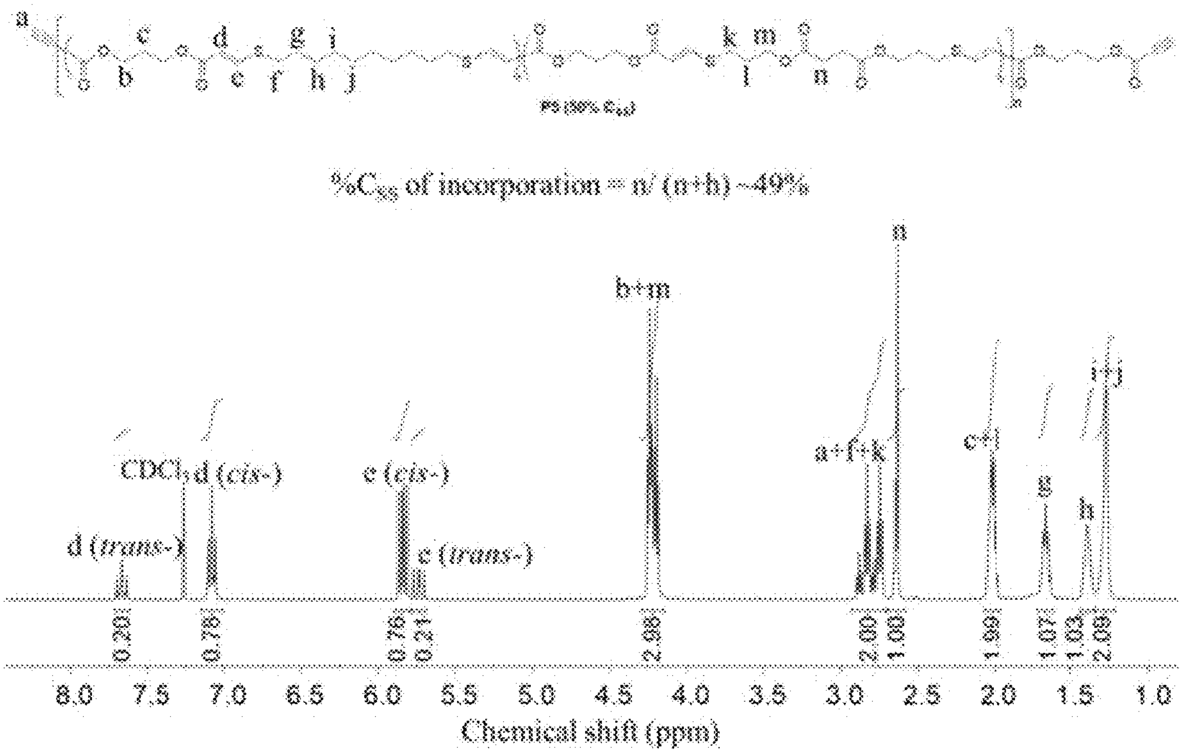
FIG. 10 is the $^1H$ NMR spectrum of P5 (with 50% $C_{SS}$) showing 80% cis content for the thiol-yne step-growth copolymer with 50% incorporation of $C_{SS}$ in $CHCl_3$ with 1 mol % DBU. The ratio of resonance n (from $C_{SS}$) to resonance h (from $C_{3A}$) displays 49%: 51% that affords polymer P5 with 49% incorporation of $C_{SS}$ ($CDCl_3$, 500 MHz).

Copolymerization of P5 (50% $C_{SS}$): The polymer was prepared by the general procedure described above. $^1$H NMR ($CDCl_3$, 500 MHz) % cis~80 with 50% $C_{SS}$ incorporation. SEC ($CHCl_3$) $M_n$=45.4 kDa, $M_w$=94.9 kDa, $Đ_M$=2.09. DSC: $T_g$=−9.7° C., $T_c$=21.5° C., $T_m$=74.2° C. TGA: $T_d$=348° C. Tensile tests: $E_0$=36.2±2.0 MPa, $\varepsilon_{break}$=1943±155%, UTS=37.4±4.5 MPa. (See. FIGS. 10-11)

Figure 13:
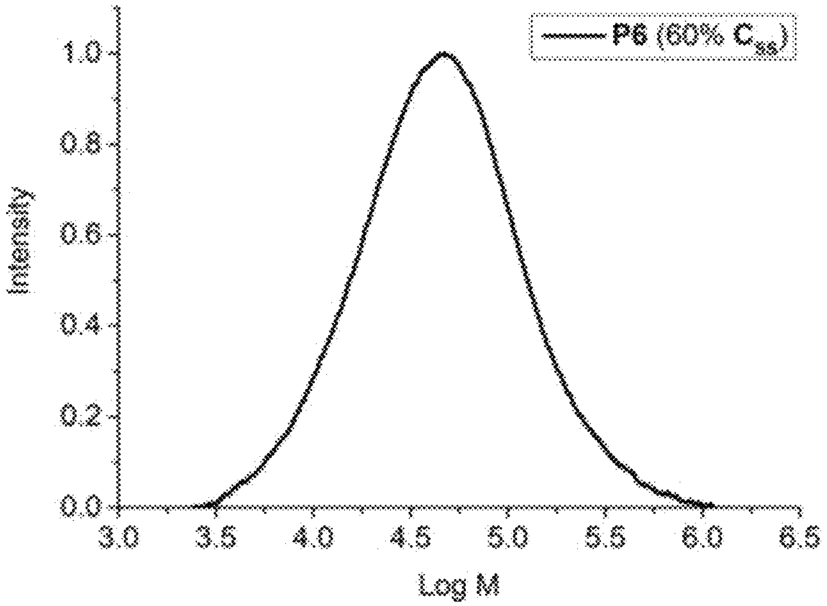
FIG. 13 is the SEC chromatogram of the P6 (80% cis) thiol-yne step-growth polymer with 60% incorporation of $C_{SS}$; $M_n$=29.0 kDa, $M_w$=71.7 kDa, $Đ_M$=2.47 (SEC $CHCl_3$, based on PS standards).

Copolymerization of P6 (60% $C_{SS}$): The polymer was prepared by the general procedure described above. $^1$H NMR ($CDCl_3$, 500 MHz) % cis~80 with 60% $C_{SS}$ incorporation. SEC ($CHCl_3$) $M_n$=29.0 kDa, $M_w$=71.7 kDa, $Đ_M$=2.47. DSC: $T_g$=−12.2° C. TGA: $T_d$=342° C. Tensile tests: $E_0$=12.0±1.4 MPa, =2077±78%, UTS=20.5±0.6 MPa. (See. FIGS. 12-13)

Thermogravimetric Analysis (TGA)

Thermogravimetric analysis was conducted on polymers P1-P6 as outlined above. Comparison of the degradation profiles of P1-P6 demonstrated the stability of P1-P6.

Differential Scanning Calorimetry (DSC)

The glass transition temperature ($T_g$), crystalline temperature (TO, and melting temperature ($T_m$) were determined from the midpoint in the second heating cycle by DSC. The results are shown in Table 1, (below) and are compared in FIGS. 14A-B. As can be seen, the $T_g$ was found to drop with an increase in the % cis of the elastomer.

Mechanical Property Measurements.

Tensile Tests at Different Strain Rates: Thin films of each polymer were fabricated using a heat press machine with manual force (ROSINER product). The machine was preheated to 100° C. Polymer was then added into the 50×50×0.5 mm mold and put into the heat press machine. After 15 minutes of melting, the force was applied by hand for 5 minutes then released. The press process mentioned above was repeated twice to enable removal of air bubbles. Following the press, the mold was cooled before removed. The films were visually inspected to ensure that no bubbles were present. Dumbbell-shaped samples were cut using a custom ASTM Die D-638 Type V. Rates were tested by 1, 2, 3, 5, 10, 20 mm/min. A rate of 10 mm/min was determined to be appropriate. Tensile tests at different stretching velocities were carried out using an Instron 5965 Universal Testing Machine at 75° F. (25° C.). The gauge length was set as 7 mm and the neck dimensions of the specimens were 7.11 mm in length, 1.70 mm in width and 0.50 mm in thickness.

Tensile Tests at 10 mm/min: Dumbbell-shaped samples were prepared using the same method as stated previously. Tensile tests were carried out using Instron 5965 Universal Testing Machine at 75° F. (25° C.). The gauge length was set as 7 mm and the crosshead speed was set as 10 mm/min. The dimensions of the neck of the specimens were 7.11 mm in length, 1.70 mm in width and 0.50 mm in thickness. Modulus was obtained from the slope of the initial linear region. (See FIGS. 15A-F) The reported results are average values from three individual measurements.

TABLE 1

| Molecular masses, thermal and mechanical properties of (co)polymers (P1-P6). | | | | | | | | | | |
|---|---|---|---|---|---|---|---|---|---|---|
| Entry | % of $C_{SS}$ | $M_w$ (kDa) | $Đ_M$ | $T_g$ (° C.) | $T_c$ (° C.) | $T_m$ (° C.) | $T_d$ (° C.) | $E_0$ (MPa) | $c_{break}$ (%) | UTS (MPa) |
| P1 | 0 | 72.8 | 2.24 | −6.8 | 61.4 | 112.4 | 351 | 65.8 ± 0.6 | 1457 ± 112 | 32.2 ± 3.9 |
| P2 | 20 | 68.6 | 2.10 | −7.3 | 30.3 | 99.3 | 348 | 57.2 ± 4.4 | 1700 ± 31 | 40.5 ± 2.2 |
| P3 | 30 | 60.4 | 2.08 | −7.3 | 18.5 | 88.9 | 349 | 40.9 ± 3.5 | 1638 ± 33 | 28.3 ± 1.2 |
| P4 | 40 | 57.0 | 2.13 | −7.4 | 12.7 | 82.5 | 349 | 36.2 ± 2.0 | 2110 ± 50 | 36.2 ± 4.1 |
| P5 | 50 | 94.9 | 2.09 | −9.7 | 21.5 | 74.2 | 348 | 36.2 ± 2.0 | 1943 ± 155 | 37.4 ± 4.5 |
| P6 | 60 | 71.7 | 2.47 | −12.2 | — | — | 342 | 12.0 ± 1.4 | 2077 ± 78 | 20.5 ± 0.6 |

Example 2

Bioresorbable, Thermally and Mechanically Tunable Elastomers with Surface Functionalization as Anti Fouling Template for Hernia Repair I. General Information A. Materials.

All commercial reagents and solvents were used as received without further purification except 1,6-hexanedithiol. The chloroform-d ($CDCl_3$) and was purchased from Cambridge Isotopes Laboratories, Inc (Tewksbury, MA). Diethyl ether ($Et_2O$) and isopropyl alcohol (iPrOH), Dichloromethane ($CH_2Cl_2$) were purchased from EMD Millipore (Burlington, MA). Glycerol, benzaldehyde, Sodium hydride (NaH), propargyl bromide (80%), trifluoroacetic acid (TFA), ethyl acetate (EtOAc), N,N-dimethylformamide (DMF), methanol (MeOH), sodium hydroxide (NaOH), sodium sulfate ($Na_2SO_4$), sodium bicarbonate ($NaHCO_3$), ammonium chloride ($NH_4Cl$), propiolic acid, sulfuric acid, 3-bromo-1-propanol, succinic acid, glutaric acid, adipic acid, 1,8-diazabicyclo[5.4.0]undec-7-ene (DBU), triethylamine ($Et_3N$), hexanes, butylated hydroxytoluene (BHT), were purchased from Sigma-Aldrich (Milwaukee, WI).

B. Characterization $^1H$ NMR and $^{13}C$ NMR spectra were obtained using a Varian Mercury 300 MHz NMR spectrometer operated at 303 K. All chemical shifts are reported in ppm (δ) and referenced to the chemical shifts of residual solvent resonances ($CDCl_3$ $^1H$: δ=7.26 ppm, $^{13}C$: δ=77.16 ppm).

Differential scanning calorimetry (DSC) was performed using a TA Instruments Q200 DSC (TA Instruments—Waters L.L.C., New Castle, DE) on sample sizes between 5-10 mg using temperature ramps for a heating of 10° C.·$min^{-1}$ and a cooling rate of 10° C.·min−1 from −35° C. to 120° C. The glass transition temperature (TO was determined from the midpoint in the second heating cycle of DSC. (See, FIG. 16)

Thermogravimetric (TGA) analysis was performed using a TA Instruments TGA Q50 (TA Instruments—Waters L.L.C, New Castle, DE) on sample sizes of ca. 10 mg using a heating ramp of 20° C.·$min^{-1}$ from r.t. to 750° C.

Size exclusion chromatography (SEC) was performed on all samples using an EcoSEC HLC-8320GPC (Tosoh Bioscience LLC, King of Prussia, PA) equipped with a TSKgel GMHHR-M mixed bed column and refractive index (RI) detector. Molecular masses were calculated using a calibration curve determined from polystyrene standards (PStQuick MP-M standards, Tosoh Bioscience, LLC) with DMF with 0.1 M LiBr as eluent flowing at 1.0 mL·min−1 at 323K, and a sample concentration of 3 mg·mL-1 from DMF.

C. Mechanical Property Measurements.

Tensile Tests at Different Strain Rates: Thin films of each polymer were fabricated using a vacuum compression machine (TMP Technical Machine Products Corp.). The machine was preheated to 100° C. Polymer was then added into the 50×50×0.5 mm mold and put into the compression machine with vacuum on. After 15 minutes of melting, 5 lbs*1000, 10 lbs*1000, 20 lbs*1000 of pressure were applied for 5 minutes, respectively. Following compression, the mold was cooled while maintaining 1000 psi of pressure to prevent wrinkle formation on the film's surface. The films were visually inspected to ensure that no bubbles were present. Dumbbell-shaped samples were cut using a custom ASTM Die D-638 Type V. Rates tested were 0.1, 1, 5, 10, 20 mm/min. A rate of 10 mm/min was determined to be appropriate. Tensile tests at different stretching velocities were carried out using an Instron 5567 Universal Testing Machine at 75° F. (25° C.). The gauge length was set as 7 mm and the neck dimensions of the specimens were 7.11 mm in length, 1.70 mm in width and 0.50 mm in thickness. (See, FIG. 17A-C)

Tensile Tests at 10 mm/min: Dumbbell-shaped samples were prepared using the same method as stated previously. Tensile tests were carried out using Instron 5567 Universal Testing Machine at 75° F. (25° C.). The gauge length was set as 7 mm and the crosshead speed was set as 10 mm/min. The dimensions of the neck of the specimens were 7.11 mm in length, 1.70 mm in width and 0.50 mm in thickness. Modulus was obtained from the slope of the initial linear region. The reported results are average values from three individual measurements. (See, FIGS. 17A-C)

II. Monomer Synthesis

Bis(3-bromopropyl) succinate (compound 1): The bis(3-bromopropyl) succinate (compound 1) was formed as shown in the first reaction of Scheme 10, below.

Scheme 10.
The synthetic route for succinate-, glutarate, and adipate-based dipropiolate monomers (S3, G3, A3).

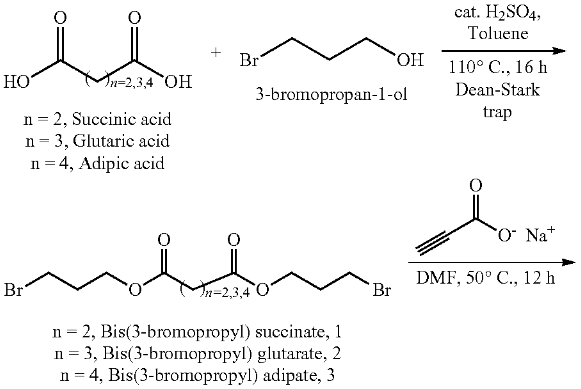

3-bromopropan-1-ol n = 2, Succinic acid
n = 3, Glutaric acid
n = 4, Adipic acid n = 2, Bis(3-bromopropyl) succinate, 1
n = 3, Bis(3-bromopropyl) glutarate, 2
n = 4, Bis(3-bromopropyl) adipate, 3

-continued

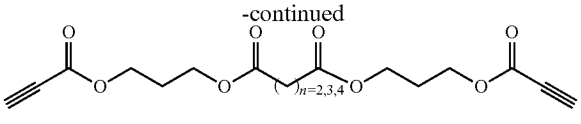

n = 2, Bis(3-propioloyloxy)propyl) succinate, S3
n = 3, Bis(3-propioloyloxy)propyl) glutarate, G3
n = 4, Bis(3-propioloyloxy)propyl) adipate, A3

Succinic acid (5.00 g, 0.042 mol), 3-bromo-1-propanol (13.54 g, 0.097 mol), and two drops of sulfuric acid were dissolved in Toluene (130 mL) in 250 mL one-neck round-bottom flask, and the mixture was heated to reflux (110° C.) with Dean-Stark trap for overnight to produce the bis(3-bromopropyl) succinate (compound 1). After that, the reaction solution was cooled to room temperature, and extracted with saturated solution of $NaHCO_3$ (150 mL×3) to remove the residual acid. Then the organic phase was collected, dried over $Na_2SO_4$, filtered and reduced in volume to dryness collected. The collected crude product was purified by flash column chromatography on silica gel (EtOAc/hexanes 1:3; $R_f$=0.3). After removal of the solvent, the final product was dried under high vacuum to yield the pale-yellow color oil (12.90 g, 84.6%). $^1H$ NMR (300 MHz, $CDCl_3$) δ 4.22 (t, J=6 Hz, 4H), 3.45 (t, J=6 Hz, 4H), 2.62 (s, 4H), 2.16 (quint, J=6 Hz, 4H). $^{13}C$ NMR (75 MHz, $CDCl_3$) δ 172.11, 62.58, 31.75, 29.40, 29.12. ESI-MS for $C_{10}H_{16}Br_2O_4Na$, m/z theoretical: [M+Na]+=382.93 Da, observed: [M+Na]+=382.8 Da. (See, FIGS. 18-19)

Bis(3-bromopropyl) glutarate (compound 2): The synthetic procedure for compound 2 was identical to compound 1, above. The crude product was purified by flash column chromatography on silica gel (EtOAc/hexanes 1:3; $R_f$=0.3) to give the pale-yellow color oil (17.36 g, 87.6%). $^1H$ NMR (300 MHz, $CDCl_3$) δ 4.21 (t, J=6 Hz, 4H), 3.45 (t, J=6 Hz, 4H), 2.38 (t, J=6 Hz, 4H), 2.17 (quint, J=6 Hz, 4H), 1.94 (quint, J=6 Hz, 2H). $^{13}C$ NMR (75 MHz, $CDCl_3$) δ 172.81, 62.30, 33.24, 31.72, 29.51, 20.17. ESI-MS for $C_{11}H_{18}Br_2O_4Na$, m/z theoretical: [M+Na]+=396.94 Da, observed: [M+Na]+=396.9 Da. (See, FIGS. 20-21)

Bis(3-bromopropyl) adipate (compound 3): The synthetic procedure for compound 3 was identical to compound 1, above. The crude product was purified by flash column chromatography on silica gel (EtOAc/hexanes 1:3; $R_f$=0.25) to give the pale-yellow color oil (12.1 g, 90.3%). $^1H$ NMR (300 MHz, $CDCl_3$) δ 4.13 (t, J=6 Hz, 4H), 3.38 (t, J=6 Hz, 4H), 2.26 (t, J=6 Hz, 4H), 2.10 (quint, J=6 Hz, 4H), 1.58 (quint, J=3 Hz, 4H). $^{13}C$ NMR (75 MHz, $CDCl_3$) δ 173.14, 62.13, 33.81, 31.67, 29.54, 24.36. ESI-MS for $C_{12}H_{20}Br_2O_4Na$, m/z theoretical: [M+Na]+=410.96 Da, observed: [M+Na]+=410.9 Da. (See, FIGS. 22-23)

Bis(3-(propioloyloxy)propyl) succinate (compound S3): Compound S3 was made as shown Scheme 10, above. In the dark hood, compound 1 (4.00 g, 0.011 mol) and sodium propiolate (2.55 g, 0.028 mol) were dissolved in DMF (60 mL), then the mixture was heated up to 50° C., and stirred for 12 h. After the reaction was cooled down to room temperature, a saturated solution of $NH_4Cl$ (200 mL) was added to the mixture and stirred for 10 min. The mixture was extracted with ethyl acetate (100 mL×3) and the organic extracts were combined. The extracted organic solution was extracted further with a saturated solution of $NaHCO_3$ (100 mL×3) to remove excess acid. The organic layer was combined and dried over anhydrous $Na_2SO_4$, filtered, and concentrated. The residue was purified by flash column chromatography on silica gel (EtOAc/hexanes 1:2; $R_f$=0.4) twice. After removal of the solvent, the final product was dried under high vacuum to yield the colorless oil (3.58 g, 95.2%).

$^1H$ NMR (300 MHz, $CDCl_3$) δ 4.26 (t, J=6 Hz, 4H), 4.18 (t, J=6 Hz, 4H), 2.92 (s, 2H), 2.62 (s, 4H), 2.01 (quint, J=6 Hz, 4H). $^{13}C$ NMR (75 MHz, $CDCl_3$) δ 172.21, 152.64, 75.17, 74.55, 62.93, 61.13, 29.03, 27.68. ESI-MS for $C_{16}H_{18}O_8Na$, m/z theoretical: [M+Na]+=361.09 Da, observed: [M+Na]+=361.0 Da. (See, FIGS. 24-25)

Bis(3-(propioloyloxy)propyl) glutarate (G3): The synthetic procedure for compound G3 was identical to compound S3, above, except that glutaric acid was used in place of succinic acid. The crude product was purified by flash column chromatography on silica gel (EtOAc/hexanes 1:2; $R_f$=0.25) twice. After removal of the solvent, the final product was dried under high vacuum to yield the colorless oil (8.36 g, 88.7%). $^1H$ NMR (300 MHz, $CDCl_3$) δ 4.25 (t, J=6 Hz, 4H), 4.15 (t, J=6 Hz, 4H), 2.92 (s, 2H), 2.35 (t, J=6 Hz, 4H), 2.04-1.87 (m, 6H). $^{13}C$ NMR (75 MHz, $CDCl_3$) δ 172.79, 152.61, 75.17, 74.55, 62.95, 60.84, 33.17, 27.70, 20.05. ESI-MS for $C_{17}H_{20}O_8Na$, m/z theoretical: [M+Na]+=375.11 Da, observed: [M+Na]+=375.0 Da. (See, FIGS. 26-27)

Bis(3-(propioloyloxy)propyl) adipate (compound A3): The synthetic procedure for compound A3 was identical to that for compound S3, except that, except that adipic acid was used in place of succinic acid. The crude product was purified by flash column chromatography on silica gel (EtOAc/hexanes 1:2; $R_f$=0.45) twice. After removal of the solvent, the final product was dried under high vacuum to yield the colorless oil (4.97 g, 87.5%). $^1H$ NMR (300 MHz, $CDCl_3$) δ 4.27 (t, J=6 Hz, 4H), 4.17 (t, J=6 Hz, 4H), 2.91 (s, 2H), 2.33 (t, J=6 Hz, 4H), 2.01 (quint, J=6 Hz, 4H), 1.65 (quint, J=6 Hz, 4H). $^{13}C$ NMR (75 MHz, $CDCl_3$) δ 173.24, 152.67, 75.15, 74.58, 63.03, 60.79, 33.84, 27.74, 24.38. ESI-MS for $C_{18}H_{22}O_8Na$, m/z theoretical: [M+Na]+=389.12 Da, observed: [M+Na]+=389.0 Da. (See, FIGS. 28-29)

2-(prop-2-yn-1 yloxy)propane-1,3-diyl dipropiolate (compound PP): The 2-(prop-2-yn-1-yloxy)propane-1,3-diyl dipropiolate (PP) was formed as shown in Scheme 11, below. (See, FIGS. 30-31)

The functionalized biodegradable elastomer compositions used in this Example were formed as set forth in Scheme 11, below.

Scheme 11. The general thiol-yne-step-growth polymerization and copolymerization for 81-82% cis- content.
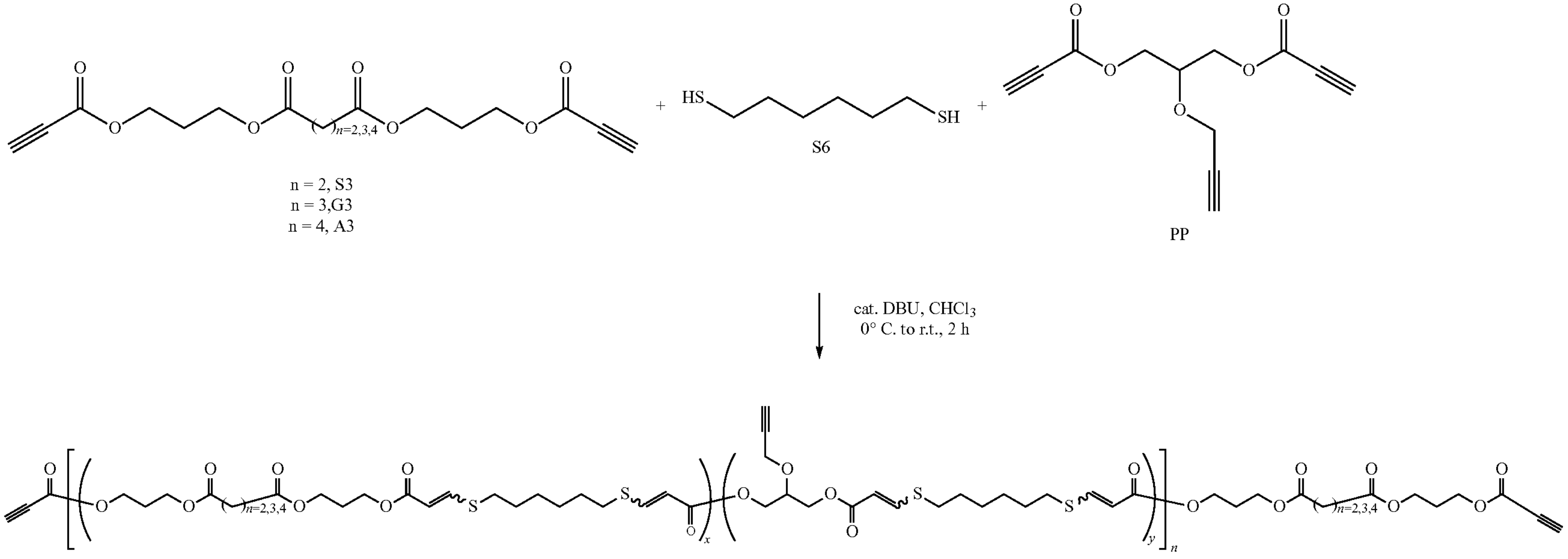
P1, S3S6; n = 2, x = 100%, y = 0%
P2, G3S6; n = 3 x = 100%, y = 0%
P3, A3S6; n = 4, x = 100%, y = 0%
P4, $S3_{0.9}S6PP_{0.1}$; n = 2, x = 90%, y = 10%
P5, $G3_{0.9}S6PP_{0.1}$; n = 3, x = 90%, y = 10%
P6, $A3_{0.9}S6PP_{0.1}$; n = 4, x = 90%, y = 10%

II. General Procedure for Thiol-yne Step-Growth Polymerization

82% cis-content of P1 (S3S6) taken as example of thiol-yne step growth polymerization is as follows: S3 (2.370 g, $7.0\times10^{-3}$ mol) and S6 (1.053 g, $7.0\times10^{-3}$ mol) were added to a 100 mL round bottom flask with 16 mL $CHCl_3$. The solution was then cooled to −15° C. with stirring for 15 min before DBU (10 μL, $7.0\times10^{-5}$ mol) was added in one portion. Notably, the addition of DBU caused the solvent to bubble due to an exothermic reaction. After 10 min, the reaction was allowed to warm to room temperature. After 1 h, excess of S3 was dissolved in 5 mL $CHCl_3$ and added into reaction solution. After another 0.5 h, the solution was diluted with $CHCl_3$ (20 mL) and BHT (0.12 g, $5.0\times10^{-4}$ mol) was added. The polymer solution was then precipitated into diethyl ether (400 mL) and collected by decanting the supernatant and dried by high vacuum system at room temperature for 24 h to obtain the pale-yellow polymer P1 (3.05 g, 89%). SEC (DMF+0.1M Li Br) $M_n$=57.9 kDa, $M_w$=99.8 kDa, $Đ_M$1=1.7. $^1$H NMR ($CDCl_3$, 300 MHz) % cis: % trans=82%: 18%. Similar polymers were made using the above method, but with the G3 and A3 monomers. (See, FIGS. 33-37).

III. General Procedure for Thiol-yne Step-Growth Copolymerization

81% cis-content of P4 ($S3_{0.9}S6PP_{0.1}$) taken as example of thiol-yne step growth copolymerization is as follows: PP (187 mg, $8.0\times10^{-4}$ mol), S3 (2.42 g, $7.2\times10^{-3}$ mol) and S6 (1.20 g, $8.0\times10^{-3}$ mol) were added to a 100 mL round bottom flask with 16 mL $CHCl_3$. The solution was then cooled to −15° C. with stirring for 15 min before DBU (11 μL, $8.0\times10^{-5}$ mol) was added in one portion. Notably, the addition of DBU caused the solvent to bubble due to an exothermic reaction. After 10 min, the reaction was allowed to warm to room temperature. After 1 h, excess of S3 was dissolved in 5 mL $CHCl_3$ and added into reaction solution. After another 0.5 h, the solution was diluted with $CHCl_3$ (20 mL) and BHT (134 mg, $5.0\times10^{4}$ mol) was added. The polymer solution was then precipitated into diethyl ether (400 mL) and collected by decanting the supernatant and dried by high vacuum system at room temperature for 24 h to obtain the pale-yellow polymer P4 ($S3_{0.9}$S6PP0.1, 3.05 g, 88%). SEC (DMF+0.1M LiBr)=41.9 kDa, $M_w$=83.3 kDa, $Đ_M$=2.0. $^1$H NMR ($CDCl_3$, 300 MHz) % cis: % trans=81%: 19% The $^1$H NMR and SEC Chromatogram for $S3_{0.9}$S6P30.1 are attached as FIGS. 39-39 A $^1$H NMR and SEC Chromatogram for $G3_{0.9}S6P3_{0.1}$ are attached as FIG. 41 and a $^1$H NMR for $A3_{0.9}S6P3_{0.1}$ is attached as FIG. 42.

Example 3

Bioresorbable Zwitterionic Elastomer Coated Polypropylene Mesh to Suppress Adhesion in Hernia Repair Surgeries As set forth above, intraperitoneal adhesions are common and serious complications post hernia repair surgery. Inflammatory response and protein deposition on an injured cecum are the main factors resulting in the formation of adhesion. In our current study, we propose use of bioresorbable zwitterionic elastomer coated polypropylene mesh to suppress adhesions. The availability and performance of zwitterionic functional groups on the surface was confirmed by quartz crystal microbalance (QCM) measurements and X-ray Photoelectron Spectroscopy (XPS). Zwitterionic treated elastomer exhibited reduced fibrinogen adsorption in vitro when compared to unfunctionalized control polymer.

1. Materials and Methods.

1.1 Materials

All commercial reagents and solvents were used as received without further purification except 1,6-hexanedithiol. The chloroform-d ($CDCl_3$) and was purchased from Cambridge Isotopes Laboratories, Inc (Tewksbury, MA). Diethyl ether (Et2O) and isopropyl alcohol (iPrOH), Dichloromethane ($CH_2Cl_2$) were purchased from EMD Millipore (Burlington, MA). Glycerol, benzaldehyde, Sodium hydride (NaH), propargyl bromide (80%), trifluoroacetic acid (TFA), ethyl acetate (EtOAc), N,N-dimethylformamide (DMF), methanol (MeOH), sodium hydroxide (NaOH), sodium sulfate (Na2SO4), sodium bicarbonate ($NaHCO_3$), ammonium chloride (NH4Cl), propiolic acid, sulfuric acid, 3-bromo-1-propanol, succinic acid, 1,8-diazabicyclo[5.4.0]undec-7-ene (DBU), triethylamine (Et3N), hexanes, butylated hydroxytoluene (BHT), were purchased from Sigma-Aldrich (Milwaukee, WI).

1.2 Synthesis of Bis(3-bromopropyl) succinate (1).

Succinic acid (5.00 g, 0.042 mol), 3-bromo-1-propanol (13.54 g, 0.097 mol), and two drops of sulfuric acid were dissolved in Toluene (130 mL) in 250 mL one-neck round-bottom flask, and the mixture was heated to reflux (110° C.) with Dean-Stark trap for overnight. After that, the reaction solution was cooled to room temperature, and extracted with saturated solution of $NaHCO_3$ (150 mL×3) to remove the residual acid. Then the organic phase was collected, dried over $Na_2SO_4$, filtered and reduced in volume to dryness collected. The collected crude product was purified by flash column chromatography on silica gel (EtOAc/hexanes 1:3; $R_f$=0.3). After removal of the solvent, the final product was dried under high vacuum to yield the pale-yellow color oil (12.90 g, 84.6%). $^1$H NMR (300 MHz, $CDCl_3$) δ 4.22 (t, J=6 Hz, 4H), 3.45 (t, J=6 Hz, 4H), 2.62 (s, 4H), 2.16 (quint, J=6 Hz, 4H). $^{13}$C NMR (75 MHz, $CDCl_3$) δ 172.11, 62.58, 31.75, 29.40, 29.12. ESI-MS for $C_{10}H_{16}Br_2O_4Na$, m/z theoretical: $[M+Na]^+$=382.93 Da, observed: $[M+Na]^+$=382.8 Da. See, Scheme 12, below.

1.3 Synthesis of Bis(3-(propioloyloxy)propyl) succinate (S3).

In one or more embodiments, the succinic acid-based bis propiolate monomer used in this Example (bis(3-(propioloyloxy)propyl) succinate) (designated the S3 monomer for this Example) may be synthesized as shown in Scheme 12, below.

Scheme 12.

The synthetic route for succinate-based dipropiolate monomers (S3).

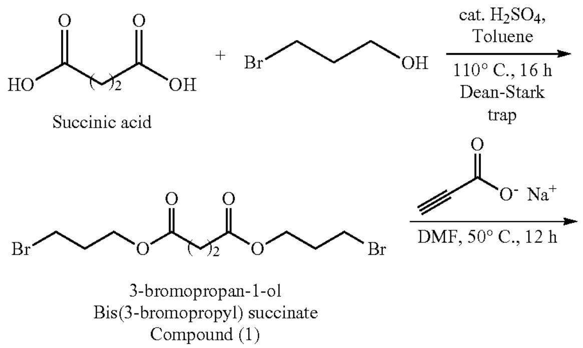

Succinic acid 3-bromopropan-1-ol

Bis(3-bromopropyl) succinate

Compound (1)

-continued

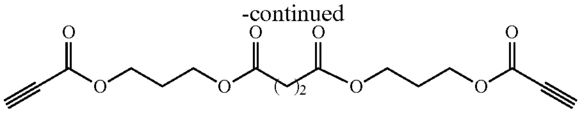

Bis(3-propioloyloxy)propyl) succinate
S3 Monomer

In the dark hood, compound 1 (4.00 g, 0.011 mol) and sodium propiolate (2.55 g, 0.028 mol) were dissolved in DMF (60 mL), then the mixture was heated up to 50° C., and stirred for 12 h. After the reaction was cooled down to room temperature, a saturated solution of $NH_4Cl$ (200 mL) was added to the mixture and stirred for 10 min. The mixture was extracted with ethyl acetate (100 mL×3) and the organic extracts were combined. The extracted organic solution was extracted further with a saturated solution of $NaHCO_3$ (100 mL×3) to remove excess acid. The organic layer was combined and dried over anhydrous $Na_2SO_4$, filtered, and concentrated. The residue was purified by flash column chromatography on silica gel (EtOAc/hexanes 1:2; $R_f$=0.4) twice. After removal of the solvent, the final product was dried under high vacuum to yield the colorless oil (3.58 g, 95.2%). $^1H$ NMR (300 MHz, $CDCl_3$) δ 4.26 (t, J=6 Hz, 4H), 4.18 (t, J=6 Hz, 4H), 2.92 (s, 2H), 2.62 (s, 4H), 2.01 (quint, J=6 Hz, 4H). $^{13}C$ NMR (75 MHz, $CDCl_3$) δ 172.21, 152.64, 75.17, 74.55, 62.93, 61.13, 29.03, 27.68. ESI-MS for $C_{16}H_{18}O_8Na$, m/z theoretical: $[M+Na]^+$=361.09 Da, observed: $[M+Na]^+$=361.0 Da.

1.4: Synthesis of 2-(prop-2-yn-1-yloxy)propane-1,3-diyl dipropiolate (P3)

The general mechanism for making the 2-(prop-2-yn-1-yloxy)propane-1,3-diyl dipropiolate (P3) monomer used in this Example is shown in Scheme 6, above. Propiolic acid (14.21 g, 0.203 mol), 2-(prop-2-ynyloxy)propane-1,3-diol (compound 6 in Scheme 6, above). (8.00 g, 0.061 mol), and two drops of sulfuric acid were dissolved in Toluene (150 mL) in 250 mL one-neck round-bottom flask, and the mixture was heated to reflux (110° C.) with Dean-Stark trap for overnight. After that, the reaction solution was cooled to room temperature, and extracted with saturated solution of $NaHCO_3$ (100 mL×3) to remove the excess of propiolic acid. Then the organic phase was collected, dried over $Na_2SO_4$, filtered and reduced in volume to dryness collected. The collected crude product was purified by flash column chromatography on silica gel (EtOAc/hexanes 1:2; $R_f$=0.45). After removal of the solvent, the final product was further purified by distillation under high vacuum (0.02 Torr, 90° C.) to yield the colorless oil (11.00 g, 76.4%). $^1H$ NMR (300 MHz, $CDCl_3$) δ 4.40-4.25 (m, 6H), 4.08 (quint, J=6 Hz, 1H), 2.95 (s, 2H), 2.49 (t, J=3 Hz, 2H). $^{13}C$ NMR (75 MHz, $CDCl_3$) δ 152.35, 78.95, 75.87, 75.60, 74.27, 73.17, 64.34, 57.88. ESI-MS for $C_{12}H_{10}O_5Na$, m/z theoretical: $[M+Na]^+$=257.04 Da, observed: $[M+Na]^+$=257.0 Da.

1.5 Thiol-yne Step-Growth Polymerization

82% cis-content of P1 (S3S6) taken as example of thiol-yne step growth polymerization is as follows: S3 (2.370 g, 7.0×10−3 mol) and S6 (1.053 g, 7.0×10−3 mol) were added to a 100 mL round bottom flask with 16 mL $CHCl_3$. The solution was then cooled to −15° C. with stirring for 15 min before DBU (10 μL, $7.0\times10^{-5}$ mol) was added in one portion. Notably, the addition of DBU caused the solvent to bubble due to an exothermic reaction. After 10 min, the reaction was allowed to warm to room temperature. After 1 h, excess of S3 was dissolved in 5 mL $CHCl_3$ and added into reaction solution. After another 0.5 h, the solution was diluted with $CHCl_3$ (20 mL) and BHT (0.12 g, $5.0\times10^{-4}$ mol) was added. The polymer solution was then precipitated into diethyl ether (400 mL) and collected by decanting the supernatant and dried by high vacuum system at room temperature for 24 h to obtain the pale-yellow polymer P1 (3.05 g, 89%). SEC (DMF+0.1M LiBr) $M_n$=57.9 kDa, $M_w$=99.8 kDa, $Đ_M$=1.7. $^1H$ NMR ($CDCl_3$, 300 MHz) % cis: % trans=82%: 18%.

1.6 Thiol-yne Step-Growth Copolymerization (Incorporation of Functional Monomer, P3 (PP)).

The general mechanism for making the functionalizable and biodegradable thiol-yne elastomer used in this Example is shown in Scheme 13, below.

Scheme 13. The general thiol-yne-step-growth polymerization and copolymerization for 81-82% cis- content.
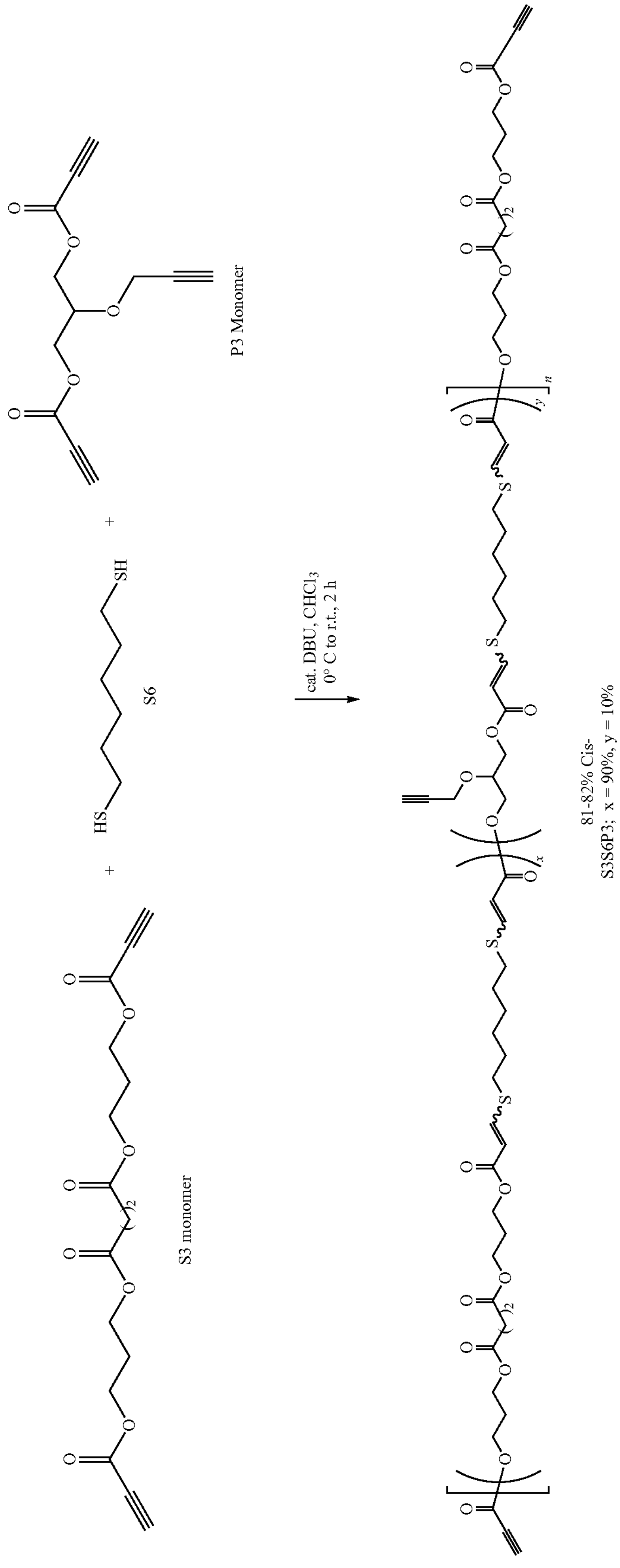
S3 monomer
S6
P3 Monomer
81-82% Cis-
S3S6P3; x = 90%, y = 10%

81% cis-content of Polymer $S3_{0.9}S6P3_{0.1}$ taken as example of thiol-yne step growth copolymerization is as follows: P3 (187 mg, $8.0\times10^{4}$ mol), S3 (2.42 g, $7.2\times10^{-3}$ mol) and S6 (1.20 g, $8.0\times10^{-3}$ mol) were added to a 100 mL round bottom flask with 16 mL $CHCl_3$. The solution was then cooled to −15° C. with stirring for 15 min before DBU (11 μL, $8.0\times10^{-3}$ mol) was added in one portion. Notably, the addition of DBU caused the solvent to bubble due to an exothermic reaction. After 10 min, the reaction was allowed to warm to room temperature. After 1 h, excess of S3 was dissolved in 5 mL $CHCl_3$ and added into reaction solution. After another 0.5 h, the solution was diluted with $CHCl_3$ (20 mL) and BHT (134 mg, $5.0\times10^{-4}$ mol) was added. The polymer solution was then precipitated into diethyl ether (400 mL) and collected by decanting the supernatant and dried by high vacuum system at room temperature for 24 h to obtain the pale-yellow polymer $S3_{0.9}$S6P30.1, 3.05 g, 88%. SEC (DMF+0.1M LiBr) $M_n$=41.9 kDa, $M_w$=83.3 kDa, $Đ_M$=2.0. $^1$H NMR ($CDCl_3$, 300 MHz) % cis: % trans=81%: 19%.

1.7 Synthesis of Zwitterion Thiol (3-((3-((3-mercaptopropanoyl)oxy)propyl) dimethylammonio)propane-1-sulfonate).

The synthesis of zwitterion thiol was carried out as set forth in Nikam, S.; Chen, P.; Nettleton, K.; Hsu, Y.; Becker, M., Zwitterion Surface-functionalized Thermoplastic Polyurethane for Antifouling Catheter Applications. *Biomacromolecules* 2020 and/or U.S. Application Publication No. US-2019/0106525 A1, the disclosures of which are incorporated herein by reference in their entirety. The general mechanism is shown in Scheme 14, below.

referenced to the chemical shifts of residual solvent resonances ($CDCl_3$ $^1$H: δ=7.26 ppm, $^{13}$C: δ=77.16 ppm).

1.9 Thermal Characterization.

Differential scanning calorimetry (DSC) was performed using a TA Instruments Q200 DSC (TA Instruments—Waters L.L.C., New Castle, DE) on sample sizes between 5-10 mg using temperature ramps for a heating of 10° C.·min$^{-1}$ and a cooling rate of 10° C.·min$^{-1}$ from −35° C. to 120° C. The glass transition temperature ($T_g$) was determined from the midpoint in the second heating cycle of DSC. The $T_g$ for copolymers P1-P6 are compared in Table 1, above.

Thermogravimetric (TGA) analysis was performed on copolymers P1-P6 using a TA Instruments TGA Q50 (TA Instruments—Waters L.L.C, New Castle, DE) on sample sizes of ca. 10 mg using a heating ramp of 20° C.·min$^{-1}$ from r.t. to 750° C. A comparison of the degradation profiles for copolymers P1-P6 indicate that the polymers are stable.

1.10 Size Exclusion Chromatography.

Size exclusion chromatography (SEC) was performed on all samples using an EcoSEC HLC-8320GPC (Tosoh Bioscience LLC, King of Prussia, PA) equipped with a TSKgel $GMH_{HR}$-M mixed bed column and refractive index (RI) detector. Molecular masses were calculated using a calibration curve determined from polystyrene standards (PStQuick MP-M standards, Tosoh Bioscience, LLC) with DMF with 0.1 M LiBr as eluent flowing at 1.0 mL·min$^{-1}$ at 323K, and a sample concentration of 3 mg·mL$^{-1}$ from DMF.

1.11 Mechanical Property Measurements.

A.11.1 Uniaxial Tensile Test.

Scheme 14 Synthetic scheme for the 3-((3-((3-mercaptopropanoyl)oxy)propyl)dimethylammonio)propane-1-sulfonate (zwitterion thiol).

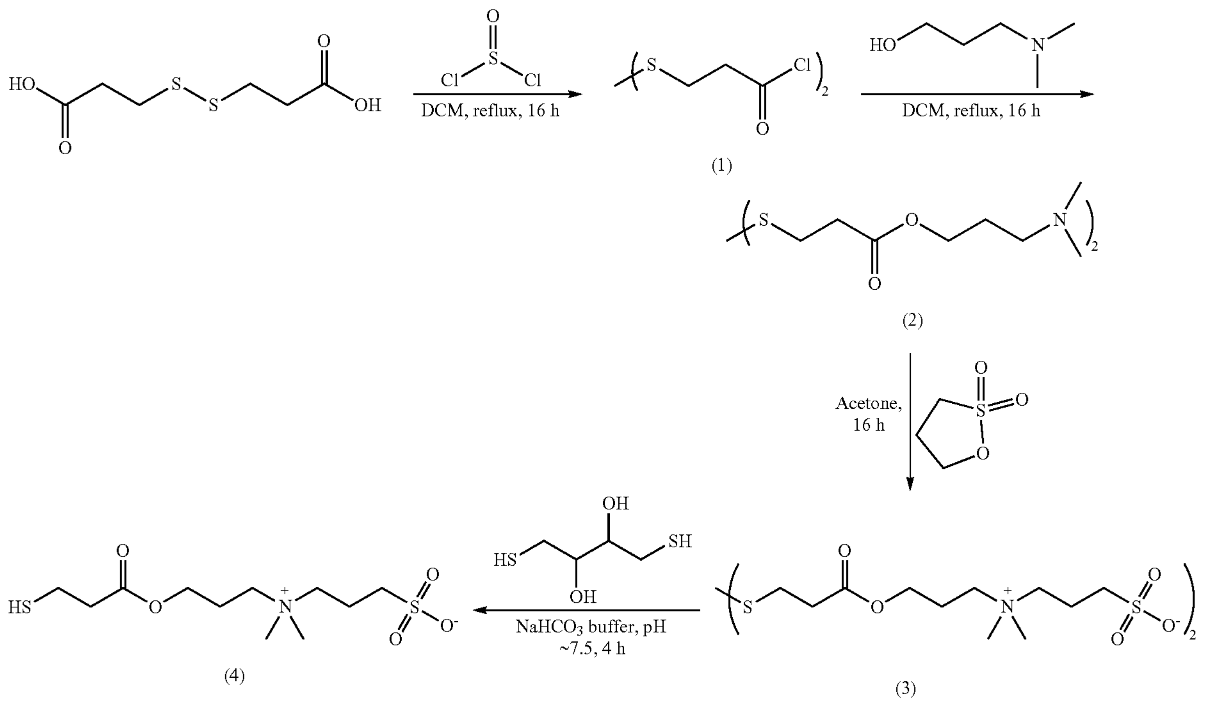

(1)

(2)

(3)

(4)

1.8 Chemical Structure Characterization.

$^1$H NMR and $^{13}$C NMR spectra were obtained using a Varian Mercury 300 MHz NMR spectrometer operated at 303 K. All chemical shifts are reported in ppm (d) and For polymer measurements samples were fabricated using a vacuum compression machine (TMP Technical Machine Products Corp.). The films were visually inspected to ensure that no bubbles were present. Dumbbell-shaped samples were cut using a custom ASTM Die D-638 Type V. Rates tested were 0.1, 1, 5, 10, 20 mm/min. A rate of 10 mm/min was determined to be appropriate. Tensile tests at different stretching velocities were carried out using an Instron 5567 Universal Testing Machine at 75° F. (25° C.). The gauge length was set as 7 mm and the neck dimensions of the specimens were 7.11 mm in length, 1.70 mm in width and 0.50 mm in thickness. Coated mesh samples were fabricated using a solution casting setup. Both, polypropylene mesh and uncoated mesh samples were then cut in strips of dimension 2.5 cm×7.5 cm. The gauge height for each sample was set to 2 inch and measurements were carried out at rate of 25 mm/min. Stress vs. strain cures for S3S6 and S3S6P3 are attached as FIGS. 43A-B.

A.11.2 Cyclic Tensile Testing/Fatigue Testing.

For fatigue testing, cyclic tensile testing was performed on coated and uncoated mesh samples. The test was carried out in maximum force mode which was set to 50 N/cm, at a rate of 25 mm/min. The cycle count was set to 20 cycles.

1.12 In Vitro Degradation.

The in vitro degradation measurements are based on ASTM standard F1635-16 "in vitro degradation testing of hydrolytically degradable polymer resins and fabricated forms for surgical implants"0.60 Films of each polymer were molded using a hot compression machine. The testing samples with dimensions of 4 mm circular discs were placed in 1×PBS and 5M NaOH at physiologic temperature (37° C.). At specified intervals, the samples are removed, dried, weighed. The mass percent changes are recorded. After being weighed and tested, the samples are not returned to the physiological solution and are retired from the study. The results are the average values of three individual measurements for each material at each time point. (See FIGS. 44A-B).

1.13 Surface Functionalization of S3S6P3 Elastomer with Zwitterion.

The S3S6P3 samples were submerged in an aqueous solution containing zwitterion thiol, (1 mL, 10.0 mM) and LAP (5.0 mM) for 30 min. The solution was purged under argon for 30 min prior to the functionalization reaction. The samples were then irradiated with UV lamps ($\lambda$=365 nm, $I_{total}$=1.2 mW/$cm^2$) for 30 min. Following UV treatment, the zwitterion thiol/LAP solution was discarded, and the samples were rinsed with 10% EtOH (5 mL 3×) and immersed in DI water for 15 min. The samples were dried with argon and placed under vacuum for 48 h prior to further analysis. The samples from this group were marked as 'Zwitterion Functionalized Coating'.

Samples for the physical adsorption control studies were performed in parallel, but without UV irradiation. The samples from this group were marked as 'Physical Adsorption Control'. As a control for surface changes from the UV irradiation process, S3S6P3 samples without zwitterion thiol, were submerged in 1 mL of DI water. After presoaking for 30 min and UV irradiated for 30 min, samples were rinsed in a similar fashion and placed under vacuum for 48 h before further analysis. The samples from this group were marked as 'Unfunctionalized Control'.

1.14 Quartz Crystal Microbalance with Dissipation (QCM-D).

The protein adsorption profiles for the Zwitterion Functionalized Coating, Physical Adsorption Control and Unfunctionalized Control were determined by Quartz Crystal Microbalance with dissipation (QCM-D, Q-sense E4 operator, Biolin Scientific AB, Sweden). When additional mass is adsorbed onto the surface of the QCM sensor, the resonance frequency of the sensor system decreases proportional to the increased mass. The mass change on the QCM sensor surface can be calculated based on the Sauerbrey equation.

$$\Delta m = -C\left(\frac{\Delta f}{n}\right). \quad \text{Equation 1}$$

Here, Δm is the mass change of the sensor surface, C is a constant which is 0.177 mg·$Hz^{-1}$·$m^{-2}$, Δf is the frequency change, and n is the overtone number. In this experiment, $SiO_2$ QCM sensor (QSX303, $SiO_2$ sensor, 5 MHz resonant frequency) was cleaned following the standard protocols, and spin coated according to spin coating section. The blank sensor ($SiO_2$ surface) was also tested along with other sample groups.

A 1 mg/mL fibrinogen solution in 1×PBS was prepared as the QCM testing solution. Samples were placed in individual QCM chambers and a flat baseline was obtained by pumping 1×PBS at 0.15 mL/min (37° C.). Before changing to the fibrinogen solution, the measurement was reset to zero the baseline. Once the frequency was stabilized under the fibrinogen solution, the flowing solution was changed back to 1×PBS to wash any loosely attached fibrinogen on the sample surface until a final stable frequency change was obtained. Each sample group was tested in quadruplicate. The frequency change of the seventh overtone was recorded and used to analyze fibrinogen adsorption and calculate the mass change (Δm). Annealed films on QCM chips were treated as a thin homogeneous layer for mass calculations. Limitations from viscoelastic effects in response to the hydrated polymer film layer were not considered in mass calculations. The mass and frequency change due to adsorbed fibrinogen removed by 1×PBS flush were thus reported.

1.15 X-Ray Photoelectron Spectroscopy (XPS). X-Ray Photoelectron Spectroscopy (XPS).

XPS was utilized to quantify the functionalization of the polymer coating surface with zwitterionic groups. XPS measurements were performed on a VersaProbe II Scanning XPS Microprobe from Physical Electronics, under ultrahigh vacuum conditions (2.0 μPa). Automated dual beam charge neutralization was used during the analysis of the samples. The spectra were collected using a monochromatic (A1 Kα) X-ray beam (E=1486.6 eV) over a 100 μm×1400 μm probing area with a beam power of 100 W and dwell time of 100 ms. Survey scans (0-700 eV) were recorded with the analyzer pass energy of 117.4 eV. High-resolution N1s spectra (395-405 eV) were obtained with pass energy of 23.5 eV and the high-resolution S2p spectra (160-172 eV) were obtained with pass energy of 27 eV. Data analysis of high-resolution spectra was performed using Casa XPS software. (See FIGS. 45A-C).

1.16 In Vivo Biocompatibility Pilot Study.

1.16.1 IACUC.

Animal experiments were conducted after approval from Institutional Animal Care and Use Committee (IACUC) at Duke University (A168-20-08).

1.16.2 Implantation.

The study was aimed at looking for in vivo compatibility of our S3S6P3 elastomeric polymer. Additionally, we wanted to study its degradation behavior and analyze effects of thickness and functionalization on its degradability and overall immune response. All rats (with equal female:male ratio) received an anesthetic drug cocktail (ketamine, xylazine, acepromazine, 29.6:5.95:0.53 mg/kg respectively)

prior to the surgery. Isoflurane (2.0% in 100% oxygen) was additionally administered to each rat through a nose-cone throughout the surgical procedure to maintain anesthetized state. Four dorsal incisions (1 cm in length) equidistance apart from the spine were created using scalpel. Hemostats were then used to tunnel and create a subcutaneous pocket followed by elastomer film with tweezers. The incisions are then closed with Michel clips. Post anesthesia, monitoring and treatments.

The free-standing S3S6P3 elastomer films used for these experiments were fabricated using solution casting with two different thickness 75 μm and 150 μm. These films were either functionalized or kept unfunctionalized before implantation.

1.16.3 Tissue Collection and Processing.

At preset timepoints, animals were euthanized by intraperitoneal injection (1 mL) of Fatal-Plus (pentobarbital) after sedation with 2% isoflurane in oxygen. Functional elastomer samples and surrounding tissue was collected post-mortem, fixed in a 10% neutral buffered formalin (NBF), and then embedded in paraffin wax for processing. Embedded samples were sectioned (5 μm thick) and placed on microscope slides. All slides were stained with hematoxylin and eosin (H&E) and then fixed in a DPX histology mount. Each slide was assessed for inflammatory cell infiltrate based on a modified scoring system outlined by the International Organization for Standardization (ISO 10993-6) by a board-certified veterinary pathologist. The numbers of inflammatory cells were estimated by light microscopy (400×) and a score was assigned for each inflammatory cell type.

1.17 Rabbit Hernia Adhesion Model Pilot Study.

1.17.1 Justification

This study was designed to evaluate the ease of implantation and potential efficacy of a laminated mesh material in relation to reducing potential for adhesion formation in the rabbit abdominal hernia adhesion model. The number of animals, data collection time points and parameters for measurement were chosen based on the minimum required to meet the objectives of the study.

1.17.2 IACUC Compliance/Pain Control

The protocol was approved by the Powered Research IACUC. According to the IACUC and facility SOPs, cage-side examination were done at least every 12 hours for signs of overt discomfort such as hunched posture, not eating or lack of output. If these conditions persist for 12 hours, then the rabbits were euthanized humanely.

1.17.3 Device Implantation (Day 0):

On day of surgical procedure, all animals were anesthetized with a combination of ketamine hydrochloride (50-80 mg/kg), xylazine hydrochloride (5-10 mg/kg) and acepromazine (0.5-1 mg/kg) along with a single dose of glycopyrrolate (0.01 mg/kg, SC). All animals received buprenorphine (0.1-0.3 mg/kg, SC) at time of sedation. Anesthesia may be maintained with isoflurane in oxygen (0.5-5.0%). All animals received a single dose of enrofloxacin (Baytril) (5 mg/kg, IV) as a prophylactic antibiotic. Animals may be intubated and ventilated for the duration of the surgical procedure if required. Following anesthetic induction, the ventral surface of each animal was clipped free of hair and cleansed with a minimum of three alternating wipes of chlorohexidine scrub and 70% isopropyl alcohol. Animals were taken to the surgical suite and aseptically prepared for the surgical procedure including surgical site preparation with alternating wipes of chlorohexidine scrub and 70% isopropyl alcohol, followed by placement of 3M™ Ioban™ drape or similar. A paramedian laparotomy was performed as follows, an 8 cm midline incision was made along the linea alba through the fascia and peritoneum, taking care not to injure the underlying viscera. Lateral cuts were made at the superior and inferior ends of the incision and resulting muscle flaps excised to create a 5 cm×8 cm spanning hernia defect. The large cecum was abraded with a scalpel and sterile dry gauze and allowed to desiccate for 15 minutes to promote adhesion formation. A laminated mesh (7×10 cm) was placed so that the anti-adhesive laminate faces viscera and non-laminated mesh faces the skin. Each implant was secured with 3-0 PDS sutures. 0.5% bupivacaine was infused locally at the incision site immediately post-closure. Skin incisions were closed with interrupted 3-0 Vicryl or similar absorbable suture and skin glue. Animals received a second dose of buprenorphine (0.1-0.3 mg/kg, SC) in the venting following the surgical procedure. Animals received meloxicam (0.2 mg/kg SC) SID for two days post surgical procedure.

1.17.4 Euthanasia/Tissue Collection and Processing

On Day 28, animals were be tranquilized with 50/10 mg/kg IM of ketamine/xylazine and euthanized with an overdose of sodium pentobarbital administered IV, followed by auscultation to ensure death. Immediately after euthanasia, overall performance of laminate mesh was grossly evaluated, including adhesion formation and tissue ingrowth. Adhesion characteristics, including the location, shape (band or string), anatomical structures involved, and appearance of the mesh surface were noted. The defect was visually divided into quadrants and the extent covered by adhesions was estimated and given a score according to the following scale: no adhesions=0, =<25% of the defect=1, 26-50% of the defect=2, 51-75% of the defect=3, and >75% of the defect 4. In addition to the qualitative, visual examination of adhesions, a digital image of the defect was captured using a digital camera. Following inspection, the entire defect area was carefully excised from each animal and was fixed in 10% Neutral buffered formalin. Samples were embedded in paraffin and sections 5 mm thick sections may be cut and stained with hematoxylin and eosin.

1.17.5 Animal Monitoring:

Body Weights: Animals were weighed prior to dosing, weekly and at time of necropsy. Mortality/Morbidity: Animals were assessed for mortality or morbidity twice daily, morning and afternoon.

Cage Side Clinical Observations: Animals underwent once daily cage side clinical observations with particular attention paid to the incision site. Any abnormal or adverse findings were directly reported to the Study Director. Clinical observations were recorded.

Incision Site Checks: Animals underwent daily incision site checks at time of cage side clinical observations for the first 14 days of the study or until the incision sites are noted to be healed and healthy. Incision sites were documented noting erythema, edema, or any dehiscence.

1.17.6 Histopathological Assessment of Tissue Sections:

Three rabbit abdominal wall specimens bearing mesh implants fixed in 10% neutral-buffered formalin, arrived at Duke for macroscopic and microscopic examination. The specimens were examined, photographed, and trimmed for subsequent processing and microtomy. Routine processing to paraffin and microtomy at 5 microns, was performed to create transverse sections for H&E assessment. Histopathologic assessment of sections from the three mesh implants was performed by a board-certified veterinary pathologist (Jeffrey Everitt, D.V.M., DACVP, FIATP) experienced in toxicologic and implant pathology. Scoring on the uncoated mesh was conducted by averaging scored matrix parameters of six non-overlapping fields along four transverse sections of the mesh implant. Inflammatory cell populations were assessed at 400×. Other parameters were scored at 200× magnification. For uncoated mesh it was possible to score using this semi-quantitative approach but it was not possible to score meshes coated functionalized and unfunctionalized meshes in this manner due to the artifact of tissue separation from the mesh. For that reason, the assessment in this preliminary study of the meshes is compared by qualitative pathology assessment. Further optimization of processing and embedment procedures is underway prior to future pathology studies with the laminate meshes.

2. Results and Discussion.

In this study, base catalyzed thiol-yne step growth polymerization was used to synthesize biodegradable elastomer with functional handle S3S6P3 with 10% incorporation of functional monomer P3. Successful synthesis of the precursors, monomers and polymers was confirmed by $^{1}$N-NMR and $^{13}$C-NMR spectrometry. Thermal and mechanical properties for these polymers were determined and are summarized in Table 2, below.

TABLE 2

Summary of polymer mechanical and thermal properties

| Polymer | $M_n$ (kDa) | $M_w$ (kDa) | $Đ_M$ | $T_g$ (° C.) | $T_d$ (° C.) | Modulus (MPa) | UTS (MPa) | Strain at Break (%) |
|---|---|---|---|---|---|---|---|---|
| S3S6 | 59.3 | 108.7 | 1.8 | −13 | 356 | 10.7 ± 4.1 | 2.3 ± 0.7 | 1987 ± 29 |
| S3S6P3 | 41.9 | 83.3 | 2.0 | −23 | 351 | 13.3 ± 3.1 | 9.3 ± 2.2 | 1961 ± 58 |

3.1 Mechanical Properties of Coated and Uncoated Mesh.

3.1.1 Tensile Test.

The mechanical properties of S3S6P3 elastomer coated v/s uncoated polypropylene mesh were not significantly different (FIG. 46, 47A-B). The mechanical properties of elastomer coated mesh was dictated by the mechanical properties of the mesh and therefore doesn't significantly affect the properties of the base mesh.

3.1.2 Cyclic Tensile Test/Fatigue Testing.

Hernia repair materials must also possess the mechanical properties necessary to withstand cyclic stresses placed on the abdominal wall from activities like coughing, laughing, running, jumping etc. It has been established that repair materials must have the capacity to withstand tensile stresses on the order of 50 N/cm when used in hernia repair applications to repair or replace the abdominal wall. To derive these theoretical stresses, it is assumed that an obese male abdomen has a circumference of 1.0 m and an intra-abdominal pressure of 30 kPa is exerted when jumping. The strain developed at physiologically relevant loads is also an important factor to consider. At these stress levels the strain (or "stretching") experienced by human anterior abdominal is approximately 10% to 30%. Materials that stretch less than 10% to 30% can be predicted to stretch less than the native human abdominal wall tissue under physiologic loads and could therefore result in more foreign body sensation or discomfort than materials with strains in the physiologic range. Meanwhile, materials that stretch more than 10% to 30% could result in bulging or hernia recurrence.

The elastomer coated polypropylene mesh under consideration here is able to withstand 50 N/cm (20 cycles) without any cracks or fracture. Additionally, the coated mesh undergoes about 18.6% to 22.5% strain which is in the appropriate deformation range to avoid discomfort and prevent hernia recurrence.

3.2 Protein Adsorption with Quartz Crystal Microbalance.

Proteins adsorbed on hernia mesh surface can provide binding sites and a suitable micro-environment for intraperitoneal adhesions to occur. With fewer protein molecules adhered, the surface would be less suitable for intraperitoneal adhesions. The protein adhesion resistance of the elastomer sample groups was characterized by Quartz Crystal Microbalance (QCM-D). Since, fibrinogen is likely to be one of the first proteins to interact with the implant, it was used in protein adhesion testing using QCM. The QCM characterization with fibrinogen solution would therefore simulate the in vivo conditions to test material. The frequency monitored at $5^{th}$, $7^{th}$ and $9^{th}$ overtone was collected and used to calculate the mass change using the Sauerbrey equation (based on Qtool program, Biolin). The initial adsorbed mass (FIG. 45D), and irreversibly adsorbed mass (FIG. 45E), are shown.

An initial drop-in frequency was observed for all elastomer groups, which is indicative of the adsorption of fibrinogen to their surfaces (See, FIGS. 45A-C). After the adsorption reached equilibrium, unbound fibrinogen was washed from the surface by switching flow solution to PBS, which resulted in frequency recovery.

It was hypothesized that the anti-fouling ability of zwitterionic materials are correlated with a hydration layer tightly bound to the surface. Water molecules in the hydration layer are held together strongly due to ionic solvation by zwitterionic materials. Hydration layer forms a physical and energetic barrier to prevent protein adsorption on the surface. Expulsion of water molecules from surface and protein therefore becomes the mandatory step to facilitate protein adsorption by reducing free energy barrier arising from dehydration entropic effects. It is expected that a tight hydration layer is formed from the functionalization of the zwitterion-SH to the elastomer coating surface which helps prevents adhesion of competing protein molecules like fibrinogen.

3.3 X-Ray Photoelectron Spectroscopy (XPS). X-Ray Photoelectron Spectroscopy (XPS).

XPS was performed to characterize the surface composition of the elastomeric coating surface after functionalization. XPS is able to analyze up to 10 nm in depth which is ideal for surface functionalization characterization methods. The zwitterion thiol presents unique quaternary nitrogen ($NR_4^+$) and sulfonate ($SO_3^-$) moieties which are distinct from polymer repeat units. Therefore, the most convincing evidence to indicate successful surface functionalization was analysis of high-resolution spectra in N1s and S2p regions (FIG. 48A-F) Analysis of N1s region showed that the Zwitterion-functionalized coating had a distinct nitrogen peak (FIG. 48C) when compared to no peaks observed for the Physical-control and Unfunctionalized-control samples (FIG. 48A-B). The peak (~400.5 eV) correlates to the quaternary ammonium ($NR_4^+$) from the chemically tethered Zwitterion. Additionally, two distinct sulfur peaks were observed for the Zwitterion-functionalized coating (FIG. 48F), the S-C sulfur (~164 eV) seen at lower energy than the sulfonate ($SO_3^-$, ~168 eV). This again was expected as the stability of the sulfonate sulfur is greater, requiring greater energy to displace the S2p electrons. This distinct sulfonate peak in the S2p region was not observed for the Physical-control (FIG. 48E) and Unfunctionalized-control (FIG. 48D). The results suggest the efficacy of washing steps in removing physically adsorbed zwitterion thiol from the coating surface, as no zwitterionic moieties were detected on control samples. The XPS results confirmed the presence of chemically tethered zwitterion moieties on Elastomer coating surface after surface-functionalization process.

The atomic composition of elastomer coating surface for the experimental groups (Table 3) was determined from XPS survey scans.

TABLE 3

Atomic composition of elastomer coating groups as characterized by XPS.

| Groups | Elemental Composition (Atomic %) C | O | S | N | $SO_3^-$ relative to S (%) |
|---|---|---|---|---|---|
| Unfunctionalized Control | 71.7 | 21.5 | 6.8 | 0 | 0 |
| Phys-Control | 72.8 | 20.4 | 6.8 | 0 | 0 |
| Zwitterionic Group | 69 | 20.8 | 8.4 | 2.2 | 8.9% |

As predicted from results of high resolution N1s and S2p scans, Nitrogen is absent from surface of Physical-control and Unfunctionalized-control samples. Similarly, higher percentage of Sulfur was expected from Zwitterion functionalized coating owing to presence of Sulfur atoms in Zwitterion thiol. The composition of Sulfur from $SO_3^-$ is ~8.97% of total sulfur present which is close to its theoretical composition of 8.34%.

3.4 In Vivo Biocompatibility Pilot Study.

Results from our previous studies confirm that thiol-yne based polyester elastomers display lack of in vitro cytotoxicity and show enhanced cellular activity. Based on this, we moved forward with evaluation of S3S6P3 for in vim compatibility in a rat model. Notably, no gross inflammation or heightened immune response, was evident from macroscopic images of the samples taken at each timepoint. H&E slides were semi-quantitatively analyzed as per modified ISO-10993-6 (Annex E) for cellularity, lymphocytes, neutrophils, macrophages, multinucleated giant cells, and encapsulation at the 2, 4, and 10-week time points (see, Table 4).

TABLE 4

Scoring for tissue sections from rat subcutaneous implant study (n = 4 implants, per group).

| Groups | Timepoint | Cellularity | Lymphocytes | Neutrophils | Giant Cells | Macrophages | Encapsulation |
|---|---|---|---|---|---|---|---|
| PTFE | 2-Week | 2 | 1 | 1.5 | 0 | 1.5 | 1.25 |
| | 4-Week | 1 | 1.5 | 0.5 | 0 | 1.25 | 3.25 |
| | 10-Week | 1 | 1.25 | 1 | 0 | 1.75 | 2.25 |
| Unfunctionalized | 2-Week | 2.75 | 1.75 | 1.5 | 0.25 | 2.5 | 2 |
| (75 um) | 4-Week | 2.75 | 1.75 | 1 | 0.5 | 2.75 | 3 |
| | 10-Week | 2.25 | 1.5 | 0.5 | 1 | 2.25 | 3.5 |
| Unfunctionalized | 2-Week | 2.75 | 2 | 1.25 | 0.75 | 2.75 | 2.25 |
| (150 um) | 4-Week | 2.5 | 2 | 0.75 | 0.75 | 2.5 | 2.5 |
| | 10-Week | 2 | 1.25 | 0.75 | 0 | 1.5 | 3 |
| Functionalized | 2-Week | 2.5 | 2 | 1.5 | 0.75 | 2 | 3.5 |
| (75 um) | 4-Week | 2.5 | 1.75 | 1.50 | 1.00 | 2.75 | 2.67 |
| | 10-Week | 2.25 | 1.5 | 1 | 1 | 2.5 | 3.5 |
| Functionalized | 2-Week | 2.5 | 1.75 | 1.25 | 0.5 | 2.25 | 2.75 |
| (150 um) | 4-Week | 2.25 | 1.5 | 0.75 | 0.75 | 2.25 | 2.25 |
| | 10-Week | 1.25 | 1 | 0.5 | 0.25 | 1.25 | 3 |

The elastomer film groups showed immune responses very similar to the PTFE control group across all scoring criterions. The cellularity and presence of lymphoid cells and therefore the bioreactivity towards implanted films decreased over 2-week to 10-week timepoint. Very few multinucleated giant cells were found surrounding the implants and there was no evidence of necrosis, even at extended timepoints. Multinucleated giant cells attempt to encapsulate portions of the foreign body that have broken away and the absence of multinucleated giant cells shows a limited foreign body response over the period of the experiment. Presence of macrophages indicate a robust inflammatory response that is expected to occur during the degradation, resorption, and remodeling process. Concurrently, the elastomer groups showed good encapsulation and tissue ingrowth over the period of study. The absence of a clear trend could be attributed to encapsulation and synchronous degradation of elastomer leading to the variation in tissue ingrowth. The analysis revealed that no correlation was found between thickness of elastomer film and the scores from histological analysis. In a similar fashion, the functionalization did not seem to influence immune response toward elastomer film implants. Our results suggest that these materials are non-toxic, exhibit limited immunogenic and inflammatory response and the bio-reactivity toward these materials decrease over time.

3.5 Rabbit Hernia Adhesion Model Pilot Study.

The animal group with uncoated mesh had significant adhesions involving the omentum and a significant portion of the cecum. The Non-functionalized coated mesh group had very little adhesions, but some were present, and the Functionalized animal group had complete absence of adhesions.

The pathological analysis noted correlation between the microscopic and macroscopic findings. The fibrous adhesions noted macroscopically in uncoated control mesh were confirmed microscopically. These adhesions were extensive and fibrous in nature composed of collagen and fibrocytes (FIG. 49A-C)). The control mesh differed significantly from the coated mesh in having significant ingrowth of mesenchymal tissue into the full thickness of the mesh implant. Microscopically coated meshes, the fibrous encapsulation of the implant was the only aspect that could be adequately assessed for enumeration of inflammatory cells, fibrosis, and cellular composition. For the uncoated mesh, sections transverse sections of mesh present revealed a mild to moderate foreign body response with relatively few giant cells noted (0-2 per high power field). Occasional punctate areas of necrosis were found adjacent to the polypropylene fibers. Most of the cellular inflammatory response consisted of mononuclear cells, primarily macrophages, although clusters of admixed lymphocytes were present as well. Small numbers of polymorphonuclear leukocytes were scattered within foci of foreign body reaction surrounding fibers in some fields, but this finding was not prominent in any of the sections. Ingrowth of mesenchymal tissue was present and extends into the center of pores between fibers (FIG. 49B), although the fibrosis that circumscribes fibers was generally mild in severity. Fibrous encapsulation of the implant was present in all fields and is relatively paucicellular with few inflammatory cells present.

For the coated mesh implants, all transverse sections of mesh from both coated implants showed significant artifact of handling and processing with separation of tissue from the mesh. The artifact was noted as a wide space with the remains of mesh coating present curled in the space where the mesh resided (FIGS. 50A-B). Nonetheless, evaluation of the interface of the encapsulating connective tissue and the inflammatory reaction surrounding the space of the mesh could be performed. Along most of the visible mesh area there is limited inflammatory cell infiltrate and minimal foreign body giant cells noted, implying excellent bioreactivity. Although bioreactivity was excellent and certainly adhesions within the peritoneum were greatly diminished in coated unfunctionalized and completely absent in functionalized mesh, there was also limited bio-incorporation of the mesh implant. Limited ingrowth of connective tissue was present into the mesh space. The mesenchymal proliferation that was present consisted of small connective tissue nobs that extended into the widened spaces where the mesh and coating remains existed. Mild to moderately thick encapsulation of the mesh was present outlining the space the mesh resided. The polypropylene extraction during tissue processing and issues of trim and processing in conjunction only allowed evaluation of the inflammatory and angiogenic responses in the encapsulation of the mesh and not in the implant itself (FIG. 50C).

In conclusion, distinct differences with respect to visceral adhesions were present between the control uncoated polypropylene mesh, and the coated meshes. Adhesions were completely lacking in the functionalized coated mesh. All three meshes had limited foreign body reactivity. It appeared that in functionalized coated mesh, inflammation in the peripheral encapsulation is slightly greater on the abdominal wall facing side versus that of the viscera.

Example 4

Concomitant Control of Mechanical Properties and Degradation in Resorbable Elastomer-Like Materials Using Stereochemistry and Stoichiometry for Soft Tissue Engineering

Methods and Materials

Materials: The following chemicals were used as received: acetone (Sigma-Aldrich, 99.0%), chloroform ($CHCl_3$: VWR Chemicals, 99%), d-chloroform ($CDCl_3$: Apollo, >99%), 1,8-diazabicyclo[5.4.0]undec-7-ene (DBU: Sigma-Aldrich, 98%), diethyl ether ($Et_2O$: Sigma-Aldrich, >99.8%), N,N dimethylformamide (DMF: Fisher Scientific, LR grade), 2,6-di-tert-butyl-4-methylphenol (BHT: Alfa Aesar, 99%), ethyl acetate (EtOAc: Fisher Scientific, LR grade), hexane (Hex: VWR Chemicals, 99%), magnesium sulfate ($MgSO_4$: anhydrous, Fisher Scientific, LR grade), 3-mercapto-1-propanol (Tokyo Chemical Industry Ltd. UK, 96%), 1,3-propanediol (Sigma-Aldrich, 98%), propiolic acid (Acros Organics, 98%), silica gel ($SiO_2$: Apollo Scientific, 40-63 micron), sodium chloride (NaCl: Fisher Scientific, >99%), sodium hydrogen carbonate ($NaHCO_3$: Fisher Scientific, >99%), sulfuric acid (Fisher Scientific, >95%), triethylamine ($Et_3N$: Fisher Scientific, LR grade). 1,6-hexanedithiol (Sigma-Aldrich, >97%) was vacuum distilled prior to use and stored in Young's tapped ampoules under N2. Poly(L-lactic acid) (PLLA) (Ingeo™ Biopolymer 3100HP) was ordered from NatureWorks.

Statistics: Results are reported as mean±standard deviation. One-way analysis of variance (ANOVA) with Tukey's post-hoc was performed with a 95% confidence Molecular Structure and Thermal Characterization Size exclusion chromatography (SEC) analyses were performed on a system composed of a Varian 390-LC-Multi detector using a Varian Polymer Laboratories guard column (PLGel 5 μM, 50 k 7.5 mm), two mixed D Varian Polymer Laboratories columns (PLGel 5 μM, 300×7.5 mm) and a PLAST RT autosampler. Detection was conducted using a differential refractive index (RI) detector. The analyses were performed in $CHCl_3$ at 40° C. and containing 0.5% w/w $Et_3N$ at a flow rate of 1.0 mL/min. Linear polystyrene (PS) ($162\text{-}2.4\times10^5$ $g\cdot mol^{-1}$) standards were used to calibrate the system. EcoSEC HLC-8320 GPC (Tosoh Bioscience LLC, King of Prussia, PA) equipped with a TSKgel GMHHR-M mixed bed column and refractive index (RI) detector was performed to analyze poly(bis(4-(propioloyloxy) but-2-yn-1-yl)-3,3'-(hexane-1,6-diylbis(sulfanediyl))). Molecular mass was calculated using a calibration curve determined from polystyrene standards (PStQuick MP-M standards, Tosoh Bioscience, LLC) with DMF with 0.1 M LiBr as eluent flowing at 1.0 $mL\cdot min^{-1}$ at 323K, and a sample concentration of 3 $mg\cdot mL^{-1}$ Nuclear magnetic resonance ($^1H$, $^{13}C$) spectra were recorded in $CDCl_3$ on a Bruker DPX-400 spectrometer at 298 K. Chemical shifts are reported as (5 in parts per million (ppm) and referenced to the chemical shift of the residual solvent resonances ($CDCl_3$'H: δ=7.26 ppm, $^{13}C$: δ=77.16 ppm). The resonance multiplicities are described as s (singlet), d (doublet), t (triplet), q (quartet) or m (multiplet).

Thermogravimetric analysis (TGA) (Q500, TA Instruments, New Castle, DE) was performed over a temperature range from 0 to 600° C. at a heating rate of 10° C./min. A 5% loss in mass was used to determine the onset temperature of degradation ($T_d$).

Differential scanning calorimetry (DSC) (Q2000, TA Instruments, New Castle, DE) was used with a temperature range from −20 to 200° C. and a scanning rate of 10° C./min in a heating/cooling/heating mode to determine glass transition temperatures ($T_g$) of polymers obtained during the second heating cycle.

Monomer Synthesis

Propane-1,3-diyl dipropiolate ($C_{3A}$, 1): 1,3-propanediol (20.00 g, 0.263 mol) was added to a 1 L single neck round bottom flask. To this was added toluene (100 mL) and benzene (100 mL). Two drops of $H_2SO_4$ were added and the solution was allowed to stir at room temperature for 5 min before adding propiolic acid (50.00 g, 0.714 mol). A Dean-Stark apparatus with condenser was fitted and the reaction was then refluxed for 16 h at 120° C. or until the required amount of water was collected. The solution was then cooled to room temperature and solvent extracted with saturated $NaHCO_3$ solution (2×200 mL) to remove any residual acids. The organic phase was then collected, dried over $MgSO_4$, filtered and reduced in volume to dryness. The product was then purified on silica gel isocratically using 4:1 hexane/EtOAc and collecting the 1' fraction. After removal of the solvent, the final product was further purified by distillation under high vacuum at 160° C. to yield colorless oil that slightly crystallised on sitting (24.63 g, 52% yield). Rr (3:2 Hex/EtOAc)=0.43; Melting point: 25° C.; $^1H$ NMR (500 MHz, $CDCl_3$) δ 4.30 (t, $^3J_{HH}$=6.2 Hz, 4H), 2.88 (s, 2H), 2.19-1.96 (m, 2H); $^{13}C$ NMR (125 MHz, $CDCl_3$) δ 152.6, 75.3, 74.5, 62.6, 27.5; ESI-MS Calcd for $C_9H_8O_4Na$ (M+Na): 203.0, Found: 203.0; Anal Calcd for $C_9H_8O_4$: C 60.00; H 4.48%. Found: C 59.70; H 4.41%.

Bis(3-mercaptopropyl) succinate (2): 3-mercaptopropanol (7.30 g, 0.079 mol) was added to a 250 mL single neck round bottom flask. To this was added toluene (60 mL) and benzene (60 mL). Two drops of $H_2SO_4$ were added and the solution was allowed to stir at room temperature for 5 min before adding succinic acid (4.40 g, 0.037 mol). A Dean-Stark apparatus with condenser was fitted and the reaction was then refluxed for 16 h at 120° C. or until the required amount of water was collected. The solution was then cooled to room temperature and solvent removed by vacuum transfer. The product was resolubilized in $CHCl_3$ (100 mL) and extracted with saturated $NaHCO_3$ solution (2×200 mL) to remove any residual acids. The organic phase was then collected, dried over $MgSO_4$, filtered and reduced in volume to dryness. The product was then purified on silica gel isocratically using 3:2 hexane/EtOAc and collecting the 1' fraction. After removal of the solvent, the final product was further purified by distillation under high vacuum (0.15 Torr) at 220° C. to yield colorless oil (7.8 g, 79% yield). $R_f$ (3:2 Hex/EtOAc)=0.4; $^1H$ NMR (400 MHz, $CDCl_3$) δ 4.21 (t, $^3J_{HH}$=6.2 Hz, 4H), 2.62 (s, 4H), 2.58 (q, $^3J_{HH}$=6.6 Hz, 4H), 1.40 (t, $^3J_{HH}$=8.1 Hz, 2H); $^{13}C$ NMR (100 MHz, $CDCl_3$) δ 172.3, 62.9, 32.9, 29.2, 21.2; ESI-MS Calcd for $C_{10}H_{18}O_4S_2Na^+$ (M+$Na^+$): 289.1, Found: 289.0; Anal Calcd for $C_{10}H_{18}O_4S_2$: C 45.09; H 6.81%. Found: C 59.70; H 4.41%.

Sodium propiolate: Sodium propiolate was synthesized according to the procedure described by Bonnesen et al. (see, Chaudhuri, O. et al. Hydrogels with tunable stress relaxation regulate stem cell fate and activity. *Nature Materials* 15, 326-334 (2016), the disclosure of which is incorporated herein by reference in its entirety). Sodium hydroxide (0.645 g, 0.016 mol) was dissolved in methanol (50 mL) in a 250 mL round-bottom flask and protected from light. The solution was cooled to 0° C. for 10 min. Then propionic acid (1.00 mL, 0.016 mol) was added with stirring. The solution was allowed to warm to ambient temperature and stirred for additional 2 h. The solvent was then removed by rotary evaporation. A white solid product was formed and dried under high vacuum to yield 3 (1.44 g, 97%). The product should be stored in the dark due to light sensitivities. $^1H$ NMR (300 MHz, $CD_3OD$) δ 2.95 (s, $^1H$). $^{13}C$ NMR (75 MHz, $CD_3OD$) δ 160.64, 81.83, 69.12.

General Procedure for Thiol-Yne Step Growth Polymerization.

An example of the thiol-yne step growth polymerization is as follows: 1,6-hexanedithiol (0.73 g, $4.9\times10^{-3}$ mol) and 2 (0.32 g, $1.2\times10^{-3}$ mol) were added to a 20 mL scintillation vial. Propane-1,3-diyl dipropiolate (1.10 g, $6.1\times10^{-3}$ mol) was added to the solution by quantitative transfer with $CHCl_3$ (12 mL). The solution was then cooled to −15° C. with stirring for 15 min before DBU (9 μL, $6.0\times10^{-5}$ mol) was added. The addition of DBU produced an exotherm causing the solvent to bubble. After 2 min of stirring, the reaction was then allowed to warm to room temperature and continued to stir, during which time the solution became very viscous. After 1 h, the solution was diluted with $CHCl_3$ (8 mL). The polymer solution was then precipitated into 1:1 diethyl ether/acetone (200 mL) and collected by decanting the supernatant. The polymer was then redissolved in $CHCl_3$ (20 mL) and reprecipitated into 1:1 diethyl ether/acetone (200 mL). The polymer was again redissolved in $CHCl_3$ (20 mL) and 100 mg BHT (5% w/w) was added. The final solution was then precipitated into n-hexane (200 mL), collected by decanting the supernatant, and dried in vacuo at room temperature for 24 h. SEC ($CHCl_3$+0.5% $Et_3N$) $M_n$=35.2 kDa, $M_w$, =110.8 kDa, $M_p$=106.9 kDa, $Đ_M$=3.15. $^1H$ NMR ($CDCl_3$, 400 MHz) % incorporation of 2=18.7%; % cis=79%.

Variation of Molecular Mass

The molecular mass of the thiol-yne step growth polymers was varied by changing the amount of dithiol in relation to the dialkyne such that the dialkyne was always in excess. Monomer ratios were determined using the extended Carothers equation for one monomer in excess (assuming p→100%). (See, Chaudhuri, O. et al. Hydrogels with tunable stress relaxation regulate stem cell fate and activity. *Nature Materials* 15, 326-334 (2016), the disclosure of which is incorporated herein by reference in its entirety.

Mechanical Testing

Destructive tensile tests were performed to determine the effects of altered cis-alkene and succinate incorporation on Young's Modulus (E) and ultimate strain ($\varepsilon_U$). Samples (n=3) were prepared using vacuum film compression (Technical Machine Products, Cleveland, OH) to press films measuring 50 mm×50 mm×0.5 mm. Polymer was preheated at 120° C. for 15 minutes, and then compressed at 10,000 lbs of pressure for 4 minutes before cooling rapidly under vacuum. Tensile bars were cut using a custom-made dog bone shaped die cutter and were pulled at several rates to determine the rate at which equilibrium modulus of all samples could be obtained. Rates tested were 0.1, 1, 5, 10 and 20 mm/min. A rate of 10 mm/min was determined to be appropriate. Samples were tested in an INSTRON™ (5567) equipped with a 100 N load cell. The results were recorded using BLUEHILL™ 3 software (INSTRON™, Norwood, MA). The modulus values quoted are a from the tangent of the initial yield point at low strain where it exists or over the 2-10°4 strain regime. The results are the average values of 5 (n=5) individual measurements for each material.

Accelerated In Vitro Degradation Studies:

A film in 0.5 mm thickness of each elastomer was prepared from vacuum film compression using the same method as stated above. Discs with 4 mm in diameter were cut from the film and placed in 5 M NaOH solution in the incubator (37° C., 5% $CO_2$ humidified atmosphere) for up to 200 days. The films absorbed, swell, degraded and the 5 M NaOH solution was changed every week to ensure the degradation process. At specified intervals, the samples were removed, dried and weighed. The results of mass changes are the average values of four (n=4) individual samples for each material at each time point.

Biological Reagents:

Human mesenchymal stem cells (hMSCs) were ordered from Lonza and used at passage 4 following manufacturer protocols. Standard MC3T3 fibroblasts were obtained from Riken and used at passage 6 following manufacturer protocols. The following reagents were used as received for cell culture and assessment of cellular activity: α-MEM, penicillin (10,000 U/mL)/streptomycin (10,0004 mL) (pen/strep), fetal bovine serum (FBS), trypan blue, and the LIVE/DEAD™ assay kit were ordered from Life Technologies; trypsin-ethylene diamine tetraacetic acid (EDTA), Dulbecco's phosphate buffered saline (PBS), 1,4-piperazinediethanesulfonic acid (PIPES), polyethylene glycol (PEG, 8000 kDa), paraformaldehyde, TRITON™ X-100, sodium borohydride, donkey serum, and secondary donkey anti-mouse IgG-488 antibody were ordered from Fisher Scientific; ethylene glycol-bis(2-aminoethylether)-N,N,N',N'-tetraacetic acid (EGTA), and mouse monoclonal primary anti-vinculin antibody were purchased from Sigma Aldrich; Rhodamine phalloidin was ordered from VWR; 4',6-diamidino-2-phenylindole (DAPI) nuclear stain and the PrestoBlue™ metabolic assay were ordered from Life Technologies Invitrogen™.

Ketamine HCl (KETAVED™, 100 mg/mL), Xylazine (AnaSed™, 20 mg/mL), Acepromazine Maleate (PROMACE™, 10 mg/mL), Buprenorphine (Buprenex, 0.3 mg/mL), sodium pentobarbital (BEUTHANASIA™-D); Povidone-iodine solution (Vetadine); Modified Masson's Trichrome staining kit was ordered from Scytek Laboratories, Inc.; goat polyclonal primary anti-CD206 (C-20) antibody was ordered from SantaCruz Biotechnology; Mayer's Hematoxylin, Eosin Y, mouse monoclonal primary anti-CD68/SR-D1 (KP1) antibody, rabbit monoclonal primary anti-CCR7 (Y59) antibody, Sodium Citrate Dihydrate, DPX Mountant, TRIZMA™ base (Tris(hydroxymethyl)aminomethane) (Acros Organics, 99.85%), Sodium Chloride (NaCl, Acros Organics), and TWEEN™ 20 (Polyethylene glycol sorbitan monolaurate, Acros Organics) were ordered from Fisher Scientific; VECTASHIELD HardSet Mounting Medium was ordered from Vector Laboratories; donkey anti-mouse ALEXA FLUOR™ IgG-350 secondary antibody (polyclonal, 2 mg/mL), donkey anti-goat ALEXA FLUOR™ IgG-488 secondary antibody (polyclonal, 2 mg/mL), donkey anti-rabbit ALEXA FLUOR™ IgG-546 secondary antibody (polyclonal, 2 mg/mL) and TRIS-HCl were ordered from Life Technologies INVITROGEN™.

In Vitro Characterization of Cellular Responses to Degradable Elastomers Sample Preparation and Cell Culture Samples for cell culture studies (n=5) were prepared by spin coating a solution of 0.4 wt % polymer in $CHCl_3$ on a glass coverslip (1 min. at 1000 rpm). Films were spin-coated onto silicon wafers and glass coverslips to determine thickness by ellipsometry on a variable angle spectroscopic ellipsometer (VASE, M-2000 UV-visible-NIR [240-1700 nm] J. A. Woollam Co., Inc.). Angles used were 55-70 degrees in 5 degree increments, and the Cauchy Layer model was used to determine sample thickness, with all samples measuring ca. 60 nm. Spin-coated glass coverslips were then placed into 12 well plates for ethylene oxide (EtO) sterilization, using 0.5 cc/L EtO at room temperature and 35% humidity for 12 hours with an Anprolene benchtop sterilizer (Anderson Products, Inc., Haw River, NC), followed by a 48 hour purge.

Human Mesenchymal Stem Cells (hMSCs) and MC3T3 fibroblasts were expanded according to the manufacturer's protocol and cultured in α-MEM supplemented with 10% FBS and 1% pen/strep in incubators maintained at 37° C. with 5% $CO_2$. Media was changed every day for the duration of culture.

Cell Viability

Cell viability was assessed using a LIVE/DEAD™ assay kit. hMSCs (passage 4) and MC3T3 cells (passage 7) were seeded on spin coated coverslips (n=5) at 4000 cells/cm$^2$. After 24 hours the medium was removed and cells were stained using a Live/Dead™ assay kit with 4 μM calcein AM (acetoxymethyl ester) and 2 μM ethidium homodimer-1 in PBS, and incubated in the dark at room temperature for 15 minutes before imaging using an Olympus IX81 inverted fluorescent microscope equipped with a Hamamatsu Orca $R^2$ fluorescent camera and Olympus CELLSENS™ Dimension imaging software under TRITC (wavelength=556/563 nm excitation/emission) and FITC (wavelength=490/525 nm excitation/emission) channels to obtain 10 images at 10× magnification of each specimen. Live and dead cells were counted using NIH ImageJ. The number of live cells was divided by the total number of cells on each specimen to obtain a percentage of cell viability.

Cell Proliferation

Cell proliferation of hMSCs seeded on spin-coated glass slides (n=4, 1000 cells/cm$^2$) was evaluated by metabolic activity using a PRESTOBLUE™ Assay following the supplier's protocol. Metabolic activity was analyzed at 24 hours, 3 days and 7 days of culture. A standard curve was prepared by seeding cell suspensions at known concentrations into 12 well plates at least 6 hours before the experiment to allow full attachment. Ten descending concentrations of cells obtained by serial dilution and one blank were included in the standard curve. After removing the medium, 1.5 mL of PRESTOBLUE™ solution (10% in cell culture medium) was added to each well, followed by incubation at 37° C. for 2-4 hours. Sample fluorescence was read when the fluorescence from the standard curve gave a linear fit. 100 μL of solution was taken from each well and placed in triplicate into a 96-well plate. The fluorescence intensity (FI) was detected in a BIOTEK™ SYNERGY™ MX Microplate Reader at wavelengths of 570 nm for excitation and 615 nm for emission. The standard curve was fit with a linear relationship by plotting FI vs cell number, with a coefficient of determination ($R^2$) above 0.99. The cell number was approximated using the obtained equation.

Cell Seeding onto GRGDS Functionalized Polymer Thin Films

Mouse calvarial stem cells (MC3T3-E1, Passage 10) were cultured using MEM a (Gibco, Life Technologies, Waltham, MA, USA) supplied with 10 vol % FBS, 100 units/mL penicillin, and 100 μg/mL streptomycin at 37° C. and 5% $CO_2$. Cells were subcultured every 3 days with a 0.25% (w/v) trypsin and 0.5% (w/v) EDTA solution. Polymer films were sterilized by UV irradiation for 15 minutes, washed 3 times with PBS, and soaked with MEM a for 2 h prior to cell seeding. Cells were seeded onto polymer thin films at 25,000 cells/cm$^2$ (n=4).

In Vivo Characterization of Tissue Responses to Degradable Elastomers:

Elastomer samples were prepared using vacuum film compression (Technical Machine Products Corporation) to press 0.5 mm thick films at 110° C. under 2,000 lbs of pressure for one hour. PLLA samples were pressed at 200° C. for ten minutes under 10,000 lbs of pressure, ten minutes under 15,000 lbs of pressure, and 10 minutes under 20,000 lbs of pressure. Elastomer samples all swelled after compression to be approximately 1 mm thick. PLLA films maintained 0.5 mm thickness. After cooling, films were cut into 8 mm diameter discs and placed into 12 well plates for ethylene oxide (EtO) sterilization. Two weeks prior to surgery, samples were sterilized with a dose of approximately 0.5 cc/L EtO at room temperature and 35% humidity for 12 hours using an Anprolene benchtop sterilizer (Anderson Products, Inc.) followed by a 48 hour purge.

Animals were handled and cared for in accordance with protocols that were approved by the University of Akron Institutional Animal Care and Use Committee. Female Sprague-Dawley rats (Harlan Laboratories) aged 60-80 days and weighing approximately 200-224 g were given one week to acclimate to the facility before performing surgeries. General anesthesia was induced using a cocktail of ketamine (29.6 mg/kg), xylazine (5.95 mg/kg) and acepromazine (0.53 mg/kg). Prior to surgery rats were also given 0.02 mg/kg Buprenorphine, which was administered again every 12 hours as needed. The back was shaved and disinfected using several washes with povidone-iodine solution and sterile alcohol wipes. Four 1 cm incisions were made, each 1 cm away from the spine with at least 2 cm separating each incision to avoid sample crossover. A subcutaneous pocket was created using curved hemostats to tunnel into the fascia space anterior to the incision. Each polymer implant was placed into a pocket, and the incision was closed using Michel clips. An βr=6 for each polymer sample type was implanted per time point, with an βr=12 for the PLLA control to have one control sample per rat as a direct comparison. The samples were randomized so that analyses could be performed to check for interactions between samples implanted within the same animal. Samples were implanted for 1 month, 2 months and 4 months.

Animals were euthanized using a fatal dose of sodium pentobarbital (0.5 cc per rat) at their respective time points. A midline incision was made along the spine of the rat and between each sample. Each sample was isolated, exposed, and photographed to observe macroscopic inflammation before being removed and fixed in 4% paraformaldehyde overnight. After fixation samples were rinsed for 15 minutes in distilled water three times, followed by three 15-minute rinses in 70% ethanol. Samples were then processed into wax overnight using a tissue processor (Leica ASP300 S, Leica Biosystems) before embedding in paraffin wax for sectioning.

Histology Staining and Imaging

Sections (8 to 14 μm thick) were stained for brightfield imaging with hematoxylin and eosin (H&E), and modified Masson's trichrome. All images were taken with a VS 120-S6-W automated microscope equipped with both a CCD color camera and a fluorescence Hamamatsu Orca-Flash4.0 fluorescence camera using DAPI (ex/em=350/470 nm), FITC (ex/em=490/525 nm) and TRITC (ex/em=556/563 nm) filters. Brightfield images were analyzed for inflammatory markers including granuloma thickness, and qualitatively assessed for general inflammation compared to PLLA control samples. H&E slides were also analyzed under 400×light microscopy for a number of inflammatory cells by a board-certified veterinary pathologist utilizing a modified scoring system designed by the International Organization for Standardization (ISO 10993-6). Scoring was based on a scale from 0-4 (0=none; 1=Rare, 1-5 Minimal; 2=5-10, Mild; 3=Heavy Infiltrate, Moderate; 4=Packed, Severe). The Macrophage analysis from immunofluorescent images included qualitative assessment of cells located within the inflammatory region surrounding the implants where CD68 was a positive indicator of a macrophage, CCR7 indicated primarily M1 expression, and CD206 indicated M2 expression. Samples that showed tissue infiltration into the polymer space were stained with picrosirius red to observe collagen deposition and orientation. Images were taken using an Olympus IX70 microscope equipped with a camera at 40× magnification under brightfield and polarized light conditions using Olympus MICROSUITE™ imaging software.

Swelling Tests

A film (0.5 mm thickness) of each elastomer was prepared from vacuum film compression using the same method as stated above. Discs (4 mm) were cut from the film and placed in 1×PBS in the incubator (37° C., 5% $CO_2$ humidified atmosphere) for up to 32 days. The swelling behavior of the elastomers were determined by tracking the wet and dry mass of the disc samples (n=3) at each time point.

As set forth above, biological tissues are highly viscoelastic and dynamic—qualities lacking in the synthetic degradable materials that are routinely available and applied to regenerative medicine. Efforts have been directed towards obtaining materials that possess the elastic properties of natural rubber and while synthetic surrogates such as cis-1,4-polyisoprene, cis-1,4-polybutadiene and analogues are available, each of these materials lack degradable units that facilitate resorption and lack the physical chemical or topological properties necessary to recapitulate a wide variety of tissues. In addition, anionic or metallocene-based polymerization synthesis methodologies are functional group intolerant making the incorporation of bioactive groups pre- or post-polymerization that facilitate specific cellular interactions challenging.

In order to translate these elastomer-like systems into regenerative medicine applications, a new series of polymers have been developed that incorporates degradable succinate-based monomer units. By altering the stoichiometry of succinate incorporation, the degradation rate of the material can be tuned precisely while retaining control over the mechanical properties by maintaining the cis/trans stereochemistry of the double bond (FIG. 1). This structural control enables the independent tuning of mechanical and degradative properties and thus overcomes a major hurdle in biomaterials. Furthermore, because of the highly hydrophobic nature of the material, they exhibit surface erosion behavior (See, FIG. 51A-D). In turn, these materials displayed excellent in vitro cell viability and were implanted in vivo to assess degradation and the inflammatory response over 4 months in a subcutaneous rat model.

Succinic acid is found naturally within the body and can be metabolized by the Krebs cycle. (See, Benit, P. et al. Unsuspected task for an old team: Succinate, fumarate and other Krebs cycle acids in metabolic remodeling. *Biochimica et Biophysica Acta—Bioenergetics* 1837, 1330-1337 (2014), the disclosure of which is incorporated herein by reference in its entirety). As such, it provided the ideal building block from which to introduce non-conjugated esters into the elastomer structure with which to influence biodegradation rates. Creation of a series of materials using a nucleophilic thiol-yne polymerization methodology was undertaken to target high cis-content at comparable molar mass ($M_w$=100-150 kDa) using propane-1,3-diyl dipropiolate ($C_{3A}$, 1) in combination with equimolar dithiols composed from mixtures of 1,6-hexanedithiol ($C_{6S}$) and the succinate-derived dithiol monomer bis(3-mercaptopropyl) succinate (2) (Table 5).

TABLE 5

Polymerization conditions and characterization of all thiol-yne step growth polymers.

| Entry | % feed of 2 | % incorporation | Monomer ratio[a] | Solvent | Base | Time (h) | % cis[b] | $M_n$ (kDa) | $M_w$ (kDa) | $Đ_M$ |
|---|---|---|---|---|---|---|---|---|---|---|
| 1 | 0 | 0 | 0.9965 | $CHCl_3$ | DBU | 1 | 80 | 26.4 | 147.5 | 5.60 |
| 2 | 9.0 | 9.0 | 0.9920 | $CHCl_3$ | DBU | 1 | 80 | 29.7 | 111.2 | 3.74 |
| 3 | 19.9 | 18.7 | 0.9922 | $CHCl_3$ | DBU | 1 | 79 | 35.2 | 110.8 | 3.15 |
| 4 | 50.5 | 49.4 | 0.9895 | $CHCl_3$ | DBU | 1 | 79 | 52.5 | 123.7 | 2.36 |
| 5 | 100 | 100 | 0.9870 | $CHCl_3$ | DBU | 1 | 79 | 35.9 | 112.2 | 3.12 |
| 6 | 19.8 | 19.0 | 0.9920 | DMF | $Et_3N$ | 16 | 72 | 43.0 | 127.3 | 2.96 |
| 7 | 0 | 0 | 0.9920 | $CHCl_3$/ DMF (7:3) | $Et_3N$ | 16 | 62 | 37.0 | 110.8 | 3.00 |
| 8 | 11.2 | 8.7 | 0.9959 | $CHCl_3$/ DMF (7:3) | $Et_3N$ | 16 | 62 | 34.2 | 117.1 | 3.42 |
| 9 | 19.6 | 18.3 | 0.9920 | $CHCl_3$/ DMF (7:3) | $Et_3N$ | 16 | 61 | 35.3 | 107.8 | 3.05 |
| 10[c] | 0 | 0 | 0.9950 | $CHCl_3$ | DBU | 1 | 80 | 24.7 | 35.4 | 1.46 |

[a]An excess of the dialkyne monomer was used to reduce any disulfide coupling and UV crosslinking side reactions

[b]Determined by comparison of $^1H$ NMR integration of cis peaks at 7.10 ppm and trans peaks at 7.70 ppm

[c]Synthesis conditions for poly(bis(4-(propioloyloxy)but-2-yn-1-yl) 3,3'-(hexane-1,6-diylbis(sulfanediyl)))

The ability to significantly influence mechanical properties by simply altering the cis:trans ratio by judicious choice of polymerization catalyst and solvent enables the manipulation of the materials' mechanical properties without changing the fundamental composition of the copolymer and thus affecting its degradation behavior. In order to demonstrate this, a series of materials were synthesized at constant ratio of $C_{6s}$ and succinate-based monomer, 2, (9%) while varying the cis:trans ratio between 62 and 80% which represents more than an order of magnitude change in elastic modulus of the material. The stoichiometric ratio of 2:3 and the °% cis is determined easily from the splitting of the vinyl proton doublets at δ=5.7 and 7.7 ppm (trans, 15 Hz) and δ=5.8 and 7.1 ppm (cis, 9 Hz), respectively, in the $^1H$ NMR spectra of the polymers in solution (FIG. 1).

Uniaxial tensile testing revealed that increasing the incorporation of the succinate-based monomer 2 led to decreased ultimate tensile strength and Young's modulus and increased elongation at break (FIG. 52B, Table 6). This behavior is consistent with a more elastic material that is expected from the interruption of crystallinity through the introduction of ester groups into the main chain that disrupt chain packing and increase chain mobility. These findings were confirmed via differential scanning calorimetry (DSC) which showed that increasing cis % without altered succinate content increased the glass transition temperature in line with results from previous work. (See, e.g., Worch, J. C. et al. Elastomeric polyamide biomaterials with stereochemically tuneable mechanical properties and shape memory. *Nat Commun* 11, 3250 (2020) and Bell, C. A. et al. Independent Control of Elastomer Properties through Stereocontrolled Synthesis. *Angew Chem Int FA Engl* 55, 13076-13080, doi:10.1002/anie.201606750 (2016), the disclosures of which are incorporated herein by reference in their entirety). Significantly, the materials exhibit high thermal stability, and the onset of degradation temperatures exceeds 350° C. These traits are critical for thermal processing and fabrication.

TABLE 6

SEC, thermal and mechanical characterization of the degradable elastomers synthesized by step-growth polymerization incorporating 2.

| % cis[a] | % incorporation of 2 | $M_n$ (kDa) | $M_w$ (kDa) | $Đ_M$ | $T_g$ (° C.) | $T_m$ (° C.) | E (MPa) | $\varepsilon_{break}$ (%) | UTS (MPa) |
|---|---|---|---|---|---|---|---|---|---|
| 80 | 9.0 | 29.7 | 111.2 | 3.74 | 1.7 | 71.4 | 33.1 ± 3.3 | 1457 ± 312 | 34.9 ± 8.7 |
| 79 | 18.7 | 35.2 | 110.8 | 3.15 | −0.7 | 50.0 | 21.1 ± 0.7 | 1750 ± 163 | 30.1 ± 5.5 |
| 79 | 49.4 | 52.5 | 123.7 | 2.36 | −0.6 | — | 2.2 ± 0.4 | 2161 ± 158 | 18.9 ± 3.1 |
| 78 | 58.4 | 57.8 | 155.6 | 2.69 | −2.7 | — | 1.8 ± 0.4 | 3154 ± 330 | 14.6 ± 1.3 |
| 78 | 79.1 | 29.2 | 132.7 | 4.55 | −2.3 | — | 1.9 ± 0.2 | 2805 ± 149 | 10.9 ± 0.3 |
| 79 | 100 | 35.9 | 112.2 | 3.12 | −5.1 | — | 1.6 ± 0.2 | 2245 ± 1135 | 0.8 ± 0.4 |
| 62 | 8.7 | 34.2 | 117.1 | 3.42 | −8.1 | — | 2.1 ± 0.3 | 1088 ± 320 | 8.9 ± 3.5 |
| 80 | 9.0 | 29.7 | 111.2 | 3.74 | 1.7 | 71.4 | 33.1 ± 3.3 | 1457 ± 312 | 34.9 ± 8.7 |
| 79 | 49.4 | 52.5 | 123.7 | 2.36 | −0.6 | — | 2.2 ± 0.4 | 2161 ± 158 | 18.9 ± 3.1 |
| 72 | 19.0 | 43.0 | 127.3 | 2.96 | −0.2 | 49.4 | 3.2 ± 0.7 | 2158 ± 247 | 17.6 ± 3.9 |

[a]Determined by comparison of $^1H$ NMR spectroscopy integration of cis peaks at 5.8 ppm and 7.1 ppm and trans peaks at 5.7 ppm and 7.7 ppm.

An in vitro investigation of the hydrolytic swelling and degradation behavior showed the polymers to be chemically stable with no visible degradation in PBS at ambient temperature over a 1-month period. In order to accelerate the hydrolytic degradation process, the samples were incubated in 5 M KOH (aq) solution at ambient temperature. The data show that the materials with increased succinate-based monomer, 2, yielded faster rates of degradation. Importantly, the mass loss profiles are nearly linear in nature and show no evidence of accelerated degradation as a result of acidosis and swelling via bulk erosion. The dimensions of the materials were noted to decrease concomitantly with time which is highly indicative of a surface erosion mechanism. SEM analysis of test substrates (FIG. 51A-D) exposed to accelerated degradation conditions indicates uniform degradation and pitting that confirms surface erosion as the most prevalent degradation process. Taken together, these observations demonstrate that, unlike any other degradable biomaterials, the mechanical and degradation properties of these elastomer-like polymers can be controlled independently. This is a distinct difference from known polyesters. To demonstrate the potential, by careful control over double bond stereochemistry and succinate monomer (2) content, materials were prepared that displayed comparable degradation rates but markedly different mechanical properties and vice versa (comparable mechanical properties with markedly different degradation rates. (FIGS. 52A-B). The control over each of these properties will be critical to future applications where designers will need to engineer subtle changes without returning to new synthetic methods.

To investigate the potential for use in biomaterial applications, cell viability, spreading and proliferation assays were used as an initial method to determine the cellular responses to the elastomer-like polymers. Human mesenchymal stem cells (hMSCs) and MC3T3 cells were cultured on glass slides spin-coated with each material variant or on the control polymer, poly(L-lactide), PLLA. Cell viability was found to be higher than 95% on all samples using a Live/Dead™ assay. Cell adhesion and spreading was assessed by staining F-actin, vinculin-labeled focal adhesion contacts, and cell nuclei and revealed that the hMSCs adopted an elongated and spindle-like shape on all samples. Cell proliferation was measured with a PrestoBlue™ metabolic assay, after 24 h, 3 days and 7 days of incubation. After 7 days the population of cells on each sample increased approximately 5 times the original concentration. (See, FIGS. 53A-B).

The lack of cytotoxicity and enhanced cellular activity confirmed that the thiol-yne stereoelastomer materials could be implanted in vivo for tissue compatibility studies. Elastomeric discs possessing various cis content and succinate stoichiometry were implanted subcutaneously for 4 months to observe the degradation behavior and tissue inflammatory responses in vivo. FIGS. 54A-C, 55A-C show the results of subcutaneous in vivo degradation of poly(L-lactic acid) (PLLA), 80% cis/50% succinate and 80% cis/100% succinate elastomeric discs, evaluated over a 4-month timeframe. Surgical procedures with subcutaneous implantation involved a small incision, polymer disc insertion, and incision closure with Michel-clips. Four samples were implanted per animal. Following extraction, the implants can be visualized in the host tissue using Hematoxylin and Eosin (H&E) and Masson's Trichrome staining. (FIGS. 54A-C, 55A-C). Significantly, no gross inflammation, which would appear as a dense calcified capsule, was evident from macroscopic images of the samples taken at each timepoint (FIG. 55B). Sections stained with hematoxylin and eosin (H&E) were analyzed for inflammatory responses in the form of fibrous capsule formation. Sections stained with H&E were also assessed for inflammatory cell infiltration. Fibrous encapsulation occurred as expected, and the granuloma grew thicker over 4 months of incubation with no significant difference compared to PLLA (FIG. 54A-C). The granuloma was less than 200 μm thick for all samples, which has previously been reported as acceptable in terms of tissue compatibility for long-term implants. This is indicative of the tunable degradation profiles from varied succinate content as increasing implant degradation rates are known to correlate with greater cellular remodeling processes.

As seen, there are almost no macroscopic indications of an inflammatory response. (FIG. 54A-C) Whole-mount cross-section images showing thick fibrous encapsulation surrounding PLLA after 4 months of incubation in vivo are observed. Similar behavior to PLLA is observed for 80% cis/50% succinate at 1- and 4-months implantation. Alternatively, the early stages of cellular infiltration are noticed in 80% cis/100% succinate after only 1 month (I). After 2- and 4-months, noticeable shrinking/resorption of the polymer was seen with continued cellular infiltration. (See FIG. 55A-C). Degradation after 4 months is nearly complete with cells, deposited collagen and tissue fully encompassing the polymer area. Blood vessel sprouts and multinucleated giant cells are noticeable throughout the polymer space that has been resorbed. Trichome images show collagen deposition and immunohistochemistry staining macrophages for pro-inflammatory (M1), non-activated (M0) and anti-inflammatory (M2) macrophages show degradation induced inflammation and remodeling. Inset scale bar=200 mm. Shown micrographs are representative of histology specimens (n=4) from each of six independent implants (n=6) for each material. (See FIG. 55A-C)

The H&E slides were quantitatively analyzed for neutrophils, lymphocytes, plasma cells, single macrophages, multinucleated giant cells, and necrosis at the 1, 2, and 4-month time points following a subcutaneous rat implant model. (See FIG. 54A-C) Additionally, each slide was assessed for inflammatory cell infiltrate based on a modified scoring system outlined by the International Organization for Standardization (ISO 10993-6 Annex E) by a board-certified veterinary pathologist. The numbers of inflammatory cells were estimated in a 400/field using light microscopy images, and a score was assigned for each inflammatory cell type as denoted in Table 6. The most severely affected region of the evaluated tissue was utilized to assign a score. The severity of necrosis was judged by the percentage of the fibrous capsule exhibiting evidence of necrosis (pyknosis, karyorrhexis, or karyolysis) not including any inflammatory cell infiltrate. Comparisons were made between elastomers with the 80% cis content and containing a range of % succinate content (FIG. 56). A striking difference was apparent between elastomers with lower succinate content from 10-50% compared to the 100% succinate-containing elastomer after only one month, and increasingly over 4 months (FIG. 56).

Full tissue infiltration into the polymer space occurred as the 80% cis/100% succinate polymer degraded (FIG. 55A-C). This was noted by an increase in the total number of inflammatory cells into the capsule space with a total score of 8.6±1.5, 9.1±1.2, and 10.9±1.9 for 1, 2, and 4-months respectively. This was noticeably greater than all other materials which elicited total scores ranging between 4.3±1.2-4.9±1.8, 3.8±1.4-4.7±1.7, and 2.6±1.3-4.0±2.0 for 1, 2, and 4-months respectively. For reference, medical-grade polypropylene has scored around 7.5 in a similar recent study. See, Dreger, N. Z. et al. Preclinical in Vitro and in Vivo Assessment of Linear and Branched I-Valine-Based Poly(ester urea)s for Soft Tissue Applications. ACS Biomaterials Science & Engineering 4, 1346-1356, doi:10.1021/acsbiomaterials.7b00920 (2018), the disclosure of which is incorporated herein by reference in its entirety. While used widely in the clinic, this value would be noted as a persistent low level inflammatory response. In each of the materials above, the reported values are 30-50% less than polypropylene.

Very few multinucleated giant cells were found surrounding the implants and there was no evidence of necrosis, even at extended timepoints. The only samples with a few multinucleated giant cells were the 80% cis/50% succinate and 80% cis/100% succinate elastomers, where giant cells were found infiltrating degraded polymer areas. Multinucleated giant cells attempt to encapsulate portions of the foreign body that have broken away as well as releasing factors that degrade extracellular matrix and cause damage and degradation of the implanted material, and thus are regarded as an obstacle for clinical translation of biomaterials. The absence of multinucleated giant cells shows a limited foreign body response over the period of the experiment. Macrophage staining of 4 month 80c100s polymer shows evidence of a robust inflammatory response that is expected to occur during the degradation, resorption and remodeling process. CD68 was used as a pan-macrophage (M0) marker, CCR7 was used to indicate classically activated macrophages (M1), and CD206 was used to indicate the presence of alternatively activated macrophages (M2). Non-specific control staining shows subtle autofluorescence of the stereoelastomers inhibits quantitative analysis of macrophage presence. The presence of M2 macrophages indicates that a transition to a remodeling phase is likely occurring. Trichrome staining shows no evidence of capsule formation in the stereoelastomer samples while a thicker layer of collagen deposition surrounds the PLLA implant. The semi-crystalline PLLA control material in this study is likely not degrading quickly compared to previous literature reports of amorphous PDLLA where multinucleated giant cell numbers were extremely high. The surface chemistry differences imparted by the crystalline domains of the materials play an important role in the amount and conformation of protein absorption, and this subsequently affects the process of multinucleated giant cell formation.

Picrosirius red (PSR) staining is a commonly used histological technique to visualize collagen in paraffin-embedded tissue sections. PSR stained collagen appears red in optical microscopy. However, it is largely unknown that PSR stained collagen also shows a red fluorescence, whereas live cells have a distinct green autofluorescence. Picrosirius Red staining of 80cis:100suc elastomers after 1 month and 4 months of subcutaneous incubation shows Picrosirius Red staining at the edge of the degrading stereoelastomers (1 month) and throughout the site formerly occupied by the degraded 80cis100suc materials after 4 months of subcutaneous incubation. Collagen deposition and maturation occurred throughout the polymer space with different orientations representing both mature and developing collagen through the center of the polymer area. This clearly shows that collagen deposition and maturation occurred throughout the space formerly occupied by the polymer.

These results, along with a decrease in size of the 80% cis/100% succinate, shows that tissue remodeling and near complete polymer resorption occurs over a 4-month time frame (FIGS. 54A-C, 55A-C). Remodeling of the degraded polymer over 4 months is comparable to that seen in poly(glycerol succinate) materials after 9 weeks of implantation, suggesting that this material is suitable for tissue regeneration, particularly for situations where the polymer must endure beyond 2 months to provide appropriate mechanical load reinforcement. Future studies for these materials will observe the effects of degradation and associated inflammation for the slower degrading variants. Many recent findings have noted the importance of fine-tuning degradation rates to match regeneration rates for optimal tissue growth and mechanical reinforcement as needed throughout healing. Significantly, this study has shown significant tissue growth into non-functionalized bulk implants where inflammation and granuloma formation was limited. The versatility in the synthesis of these elastomer-like polymers with controlled variability of mechanical properties and degradation rates marks significant progress in the field of degradable biomaterials.

Complex biological tissues are highly viscoelastic and dynamic. Efforts to repair or replace cartilage, tendon, muscle, and vasculature using materials that facilitate repair and regeneration have been ongoing for decades. However, materials that possess the mechanical, chemical and resorption characteristics necessary to recapitulate these tissues have been difficult to mimic using synthetic resorbable biomaterials. As set forth above, the thiol-yne step growth polymers of the present involve a series of resorbable elastomer-like materials that are compositionally identical and possess varying ratios of cis:trans double bonds in the backbone. These features afford concomitant control over the mechanical and surface eroding degradation properties of these materials. It has been shown that materials can be functionalized post-polymerization with bioactive species and enhance cell adhesion. Furthermore, an in vivo rat model demonstrates that degradation and resorption are dependent on succinate stoichiometry in the elastomers and the results show limited inflammation highlighting their potential for use in soft tissue regeneration and drug delivery.

In summary, it has been found that the highly tunable and resorbable elastomer-like polymers of the present invention afford concomitant control of mechanical and degradation properties. These materials have shown excellent cellular responses in vitro and possess limited inflammatory responses in vivo. Most importantly, the variants containing 100% succinate incorporation were capable of degrading in vim over a period of four months and were replaced with mature and developing tissues. These responses show that these materials are non-toxic and further, will provide a new developmental platform for regeneration of tissues with varied mechanical and degradation requirements. Future studies on these materials will include optimization of material properties, control/inhibition of crosslinking, post-polymerization functionalization with bioactive species and assessment of mechanical properties throughout degradation.

Example 5

Analysis of Bioresorbable Polymer Coated Composite Hernia Mesh for Reduction of Intraperitoneal Adhesions In order to evaluate and further reduce the present invention to practice, a succinate based dipropiolate co-monomer (S3) and a propargyl derivatized dipropiolate co-monomer (P3) were utilized to synthesize a series of stereo-complex polyester elastomers (SCPE) with variations in cis/trans stereochemistry, denoted propargyl derivatized thiol-yne elastomer (P-TYE). The P-TYE elastomer coating was surface functionalized with zwitterions via a thiol-yne click reaction to suppress protein adsorption and adhesions. A composite polypropylene-based hernia mesh according to the present invention was synthesized, fabricated and characterized in detailed. The mechanical performance of the composite mesh was characterized with uniaxial and dynamic tensile testing. The anti-adhesive performance was measured using Quartz Crystal Microbalance (QCM) and challenged with fibrinogen.

The elastomer tissue response during degradation was assessed in an immunocompetent murine subcutaneous implantation model. A three month in vivo spanning abdominal hernia defect study in rabbits followed to evaluate the performance of the P-TYE film to facilitate neoperitoneal formation over time while preventing adhesions compared to polypropylene mesh control. The model further assessed if surface functionalization or the elastomer coatings with zwitterion reduces inflammation and prevents adhesions more than unfunctionalized coating alone.

Materials

Unless noted otherwise, all commercial reagents and solvents were used as received without further purification. Chloroform-d ($CDCl_3$) was purchased from Cambridge Isotopes Laboratories, Inc (Tewksbury, MA). Diethyl ether ($Et_2O$), isopropyl alcohol (iPrOH), and dichloromethane ($CH_2Cl_2$) were purchased from EMD Millipore (Burlington, MA). Glycerol, benzaldehyde, sodium hydride (NaH), propargyl bromide (80%), trifluoroacetic acid (TFA), ethyl acetate (EtOAc), N,N-dimethylformamide (DMF), methanol (MeOH), sodium hydroxide (NaOH), sodium sulfate ($Na_2SO_4$), sodium bicarbonate ($NaHCO_3$), ammonium chloride ($NH_4Cl$), propiolic acid, sulfuric acid, 3-bromo-1-propanol, succinic acid, 1,8-di azabicyclo[5.4.0]undec-7-ene (DBU), triethylamine ($Et_3N$), hexanes, butylated hydroxytoluene (BHT), were purchased from Sigma-Aldrich (Milwaukee, WI) at the highest purity unless specified above.

Methods

Proton ($^1$H) and carbon ($^{13}$C) nuclear magnetic resonance (NMR) spectra were obtained using a Varian Mercury NMR spectrometer (300 MHz) operated at 303 K. The chemical shifts are reported in ppm (δ) and referenced to the chemical shifts of residual solvent resonances ($CDCl_3$ $^1$H: δ=7.26 ppm, $^{13}$C: 6=77.16 ppm). Differential scanning calorimetry (DSC) was performed using a TA Instruments Q250 DSC (TA Instruments—Waters L.L.C., New Castle, DE) on samples (5-10 mg) using temperature ramps for a heating of 10° C.·min$^{-1}$ and a cooling rate of 10° C.·min$^{-1}$ from −35° C. to 120° C. Theglass transition temperature ($T_5$) was determined from the midpoint in the second heating cycle of DSC. Thermogravimetric (TGA) analysis was performed using a TA Instruments TGA Q550 (TA Instruments—Waters L.L.C, New Castle, DE) on sample (~10 mg) using a heating ramp of 20° C.·min$^{-1}$ from ambient temperature to 750° C. Size exclusion chromatography (SEC) was performed on all samples using an EcoSEC HLC-8320GPC (Tosoh Bioscience LLC, King of Prussia, PA) equipped with a TSKgel GMHHR-M mixed bed column and refractive index (RI) detector. Molecular masses and molecular mass distributions were calculated using a calibration curve determined from NIST-certified polystyrene standards (PStQuick MP-M standards, Tosoh Bioscience, LLC) with DMF with 0.1 M LiBr as eluent flowing at 1.0 mL·min$^{-1}$ at 323K, and a sample concentration of 3 mg·mL$^{-1}$ in DMF.

1.1 Synthesis of Bis(3-Bromopropyl) Succinate (1).

Succinic acid (5.000 g, 0.042 mol), 3-bromo-1-propanol (13.540 g, 0.097 mol) and two drops of sulfuric acid were dissolved in toluene (130 mL) in 250 mL one-neck round-bottom flask. The mixture was then heated to reflux (110° C.) with Dean-Stark trap overnight (Scheme 12, above). The reaction mixture was cooled to ambient temperature, and extracted with saturated solution of $NaHCO_3$ (150 mL×3) to remove any residual acid. The organic phase was collected, dried over $Na_2SO_4$, filtered, reduced in volume to dryness and collected. The collected crude product was purified by flash column chromatography on silica gel (EtOAc/hexanes 1:3; $R_f$=0.3). After removal of the solvent, the final product was dried under high vacuum to yield the pale-yellow color oil (12.90 g, 84.6%). $^1$H NMR (300 MHz, $CDCl_3$) δ 4.22 (t, J=6 Hz, 4H), 3.45 (t, J=6 Hz, 4H), 2.62 (s, 4H), 2.16 (quint, J=6 Hz, 4H). $^{13}$C NMR (75 MHz, $CDCl_3$) δ 172.11, 62.58, 31.75, 29.40, 29.12. ESI-MS for $C_{10}H_{16}Br_2O_4Na$, m/z, theoretical: $[M+Na]^+$=382.93 Da, observed: $[M+Na]^+$=382.8 Da.

1.2 Synthesis of bis(3-(propioloyloxy)propyl) succinate (S3).

In a dark hood, bis(3-bromopropyl) succinate, 1 (4.000 g, 0.011 mol) and sodium propiolate (2.550 g, 0.028 mol) were dissolved in DMF (60 mL). The mixture was heated to 50° C. and stirred for 12 h under inert atmosphere. After the reaction cooled to ambient temperature, a saturated solution of $NH_4Cl$ (200 mL) was added to the mixture and stirred for 10 min. The mixture was then extracted with ethylacetate (100 mL×3) and the organic extracts were combined and washed with a saturated solution of $NaHCO_3$ (100 mL×3) to remove excess acid. The organic layer was separated and dried over anhydrous $Na_2SO_4$, filtered, and concentrated. The residue was purified by flash column chromatography on silica gel (EtOAc/hexanes 1:2; $R_f$=0.4) twice. After removal of the solvent, the final product was dried under high vacuum to yield a colorless oil (3.58 g, 95.2%). $^1$H NMR (300 MHz, $CDCl_3$) δ 4.26 (t, J=6 Hz, 4H), 4.18 (t, J=6 Hz, 4H), 2.92 (s, 2H), 2.62 (s, 4H), 2.01 (quint, J=6 Hz, 4H). $^{13}$C NMR (75 MHz, $CDCl_3$) δ 172.21, 152.64, 75.17, 74.55, 62.93, 61.13, 29.03, 27.68. ESI-MS for $C_{16}H_{18}O_8Na$, m/z theoretical: $[M+Na]^+$=361.09 Da, observed: $[M+Na]^+$=361.0 Da.

1.3 Synthesis of 2-(prop-2-yn-1-yloxy)propane-1,3-diyl dipropiolate (P3).

Propiolic acid (14.210 g, 0.203 mol), 2-(prop-2-yn-1-yloxy)propane-1,3-diol (8.000 g, 0.061 mol), and two drops of sulfuric acid were dissolved in toluene (150 mL) in 250 mL one-neck round-bottom flask. The solution was then heated to reflux (110° C.) with a Dean-Stark trap overnight (Scheme 6). The reaction solution was cooled to ambient temperature and extracted with a saturated solution of $NaHCO_3$ (100 mL×3) to remove the excess propiolic acid. The organic phase was collected, dried over $Na_2SO_4$, filtered, reduced in volume to dryness and collected. The collected crude product was purified by flash column chromatography on silica gel (EtOAc/hexanes 1:2; $R_f$=0.45). After removal of the solvent, the final product was further purified by distillation under high vacuum (0.02 Torr, 90° C.) to yield a colorless oil (WOO 0.00 g, 76.4%). $^1$H NMR (300 MHz, $CDCl_3$) δ 4.40-4.25 (m, 6H), 4.08 (quint, J=6 Hz, 1H), 2.95 (s, 2H), 2.49 (t, 0.1=3 Hz, 2H). $^{13}$C NMR (75 MHz, $CDCl_3$) δ 152.35, 78.95, 75.87, 75.60, 74.27, 73.17, 64.34, 57.88. ESI-MS for $C_{12}H_{10}O_5Na$, m/z theoretical: $[M+Na]^+$=257.04 Da, observed: $[M+Na]^+$=257.0 Da.

1.4 Polymerization of Propargyl Derivatized Thiol-Yne Elastomer (P-TYE).

The thiol-yne step growth copolymerization for propargyl derivatized thiol-yne elastomer (or P-TYE for simplicity) was setup as follows: P3 (187 mg, 8.0×10$^{-4}$ mol, 0.1 eq), S3 (2.42 g, 7.2×10$^{-3}$ mol, 0.9) and S6 (1.20 g, 8.0×10$^{-3}$ mol, 1.0 eq) were added to a 100 mL round bottom flask with $CHCl_3$ (16 mL) (See, Scheme 15).

Scheme 15 The degradable elastomer synthetic scheme.
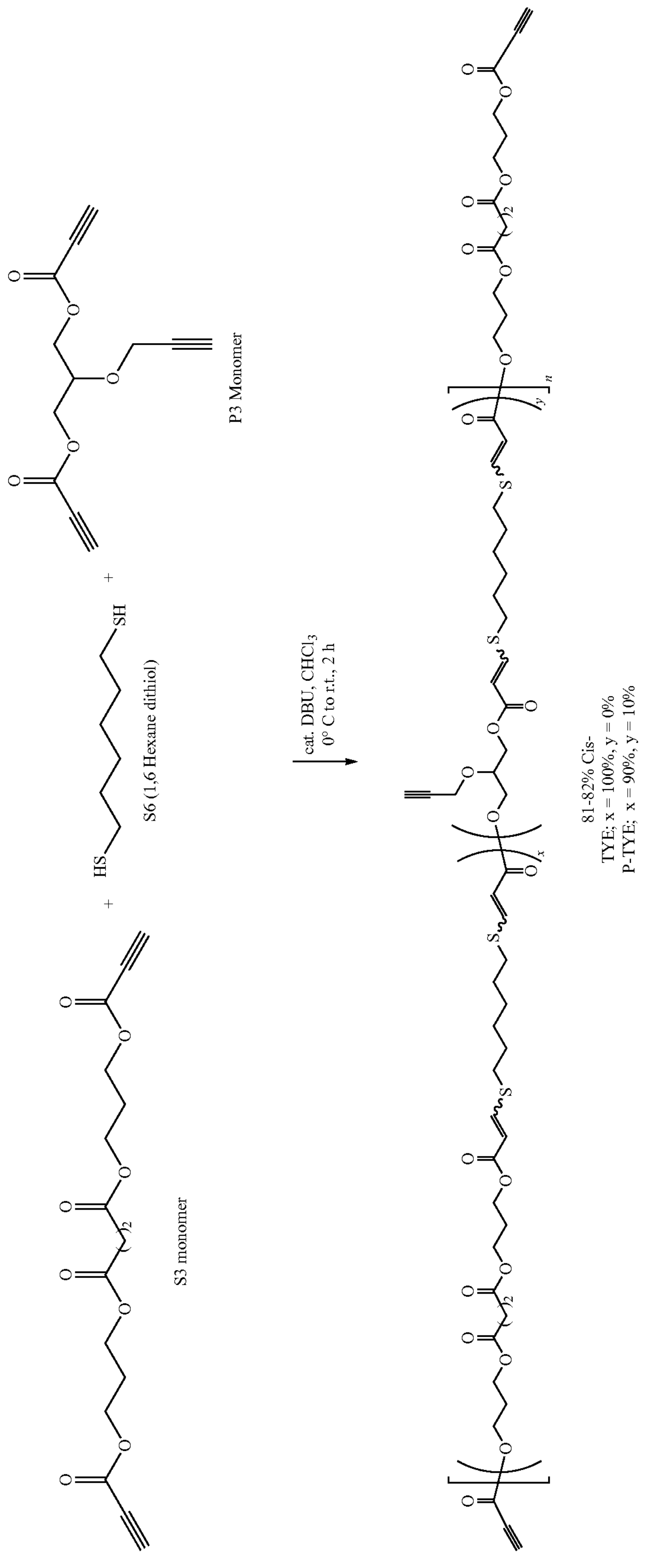
S3 monomer
S6 (1,6 Hexane dithiol)
P3 Monomer The solution was cooled to −15° C. and stirred for 15 min before DBU (11 μL, $8.0\times10^{-5}$ mol) was added in one portion. Notably, the addition of DBU caused the solvent to bubble due to a vigorous exothermic reaction. After 10 min, the reaction was allowed to warm to ambient temperature. After 1 h, excess of S3 was dissolved in 5 mL $CHCl_3$ and added into reaction solution. After another 0.5 h, the solution was diluted with $CHCl_3$ (20 mL) and BHT (134 mg, $5.0\times10^{4}$ mol) was added for radical suppression and to limit interchain crosslinking. The polymer solution was then precipitated into diethyl ether (400 mL) and collected by decanting the supernatant and dried by high vacuum system at room temperature for 24 h to obtain the pale-yellow polymer P-TYE, 3.05 g, 88%. SEC (DMF+0.1M LiBr) $M_n$=41.9 kDa, $M_w$=83.3 kDa, $Đ_M$=2.0, $T_g$=−23° C. $^1$H NMR ($CDCl_3$, 300 MHz) % cis: % trans=81%: 19%. The elastomers were synthesized using organo-based catalyzed stereocontrolled nucleophilic thiol-yne addition. The stoichiometry of the propargyl functionalized chain extender, P3 affords the tailoring of the number of reactive handles that are available for post-coating functionalizing of the composite mesh with zwitterion species.

1.5 Synthesis of Zwitterionic Thiol.

Synthesis of Zwitterion thiol was performed following previously published procedures (Scheme 14). (See, Nikam, S.; Chen, P.; Nettleton, K.; Hsu, Y.; Becker, M., Zwitterion Surface-functionalized Thermoplastic Polyurethane for Antifouling Catheter Applications. *Biomacromolecules* 2020, the disclosure of which is incorporated herein by reference in its entirety.)$^1$H NMR (300 MHz, $D_2O$) δ=4.33 (t, $^3J_{H\text{-}H}$=5.8 Hz, 2H), 3.63-3.51 (m, 4H), 3.21 (s, $^3J_{H\text{-}H}$=19.8 Hz, 6H), 3.07 (q, $^3J_{H\text{-}H}$=6.9 Hz, 4H), 2.94 (t, $^3J_{H\text{-}H}$=6.4 Hz, 2H), 2.29 (tt, $^3J_{H\text{-}H}$=15.5, 7.9 Hz, 4H). $^{13}$C NMR (75 MHz, $D_2O$) δ=174.29, 62.31, 61.70, 61.33, 50.76, 47.23, 37.91, 21.69, 19.02, 18.18.

1.6 In Vitro Degradation Measurements.

The in vitro degradation measurements were performed based on ASTM standard F1635-16. Films of each polymer were molded using a compression molding machine (TMP Technical Machine Products Corp.). The testing samples with dimensions of 4 mm circular discs were placed in 1×PBS and 5M NaOH at physiologic temperature (37° C.). At specified intervals, the samples were removed, dried, weighed. The mass percent changes were recorded. After being weighed and tested, the samples were not returned to the physiological solution and were retired from the study. The results were the average values of four individual measurements for each material at each time point.

1.7 Elastomer-Coated Composite Mesh (ECPM) Fabrication.

A solution casting approach was used to fabricate the elastomer-coated polypropylene composite mesh (FIGS. 57A-E; 58A-C). A 25 wt. % solution of P-TYE was prepared in $CHCl_3$. The PTFE release substrate was film-coated with an 800 μm thick elastomer film with EZ Coater EC-200 (ChemInstruments, Fairfield, Ohio). After waiting for several minutes, the hernia mesh (T-Line™ Hernia Mesh, Deep Blue Medical Advances, Inc., Durham, NC) was gently place on the film. After several minutes, a second PTFE release substrate was placed on the top of the mesh and held in place with a metal plate. After compression with the plate for about 30 sec the plate was removed, and the PTFE release substrate was peeled off gently. This procedure removed excess resin from the mesh's macroporous structure and ensured that the final fabricated composite substrate had a mesh dominant side (polypropylene) and an elastomer dominant coating side (FIGS. 57A-E; 58A-C). This resulted in an elastomer-coated composite polypropylene mesh (labelled as ECPM), with elastomer coating thickness of 200 μm. Finally, after 48-72 h the mesh was peeled from the base PTFE substrate to get a free-standing ECPM mesh. Half of the ECPM mesh were further subjected to zwitterion functionalization using procedure described in Section 1.10, below, to yield Z-ECPM.

Mechanical Testing.

1.8 Uniaxial Tensile Measurements.

Thin films of each polymer were molded using a vacuum compression machine (TMP Technical Machine Products Corp.). The machine was preheated to 130° C. The polymer was then added into a 50×50×0.5 mm mold and put into a compression machine with vacuum on. Following compression, the mold was cooled while maintaining pressure to prevent wrinkle formation on the film's surface. The films were visually inspected to ensure that no bubbles were present. Dumbbell-shaped samples were cut using a custom ASTM Die D-638 Type V. A rate of 10 mm/min was determined to be appropriate after testing our samples at 0.1, 1, 5, 10, 20 mm/min. Tensile tests at different stretching velocities were carried out using an Instron 5567 Universal Testing Machine at 25° C. The gauge length was set to 7 mm, the crosshead speed was set to 10 mm/min and the neck dimensions of the specimens were 7.11 mm in length, 1.70 mm in width and 0.50 mm in thickness. Coated mesh samples were fabricated using as described in section 2.8. Both composite mesh and uncoated mesh samples were then cut in strips (machine direction) of dimension 2.5 cm×7.5 cm. The gauge length was set to 2 inch and measurements were carried out at rate of 25 mm/min.

1.9 Cyclic Tensile Measurements.

For fatigue testing, cyclic tensile testing was performed on composite and uncoated mesh samples. The test was carried out in maximum force mode, where force was set to the maximum physiological abdominal tension of 50 N/cm, at a rate of 25 mm/min. The cycle count was set to 20 to 1000 cycles.

1.10 Zwitterion Functionalization of Propargyl Derivatized Thiol-Yne Elastomer (Z-TYE).

For surface functionalization of P-TYE, the respective elastomeric substrates were submerged in an aqueous solution containing zwitterion thiol, (1.00 mL, 10.0 mM) and lithium phenyl-2,4,6-trimethylbenzoylphosphinate (LAP) (5.0 mM) for 30 min. An illustration of the functionalization process in depicted in FIGS. 57A-E. The solution was purged under nitrogen for 10 min prior to being irradiated with UV lamps (λ=365 nm, $I_{total}$=1.2 mW/cm$^2$) for 50 min. Following UV irradiation, the samples were rinsed with 10% EtOH (5 mL 3×) and immersed in DI water for 15 min. The zwitterion functionalized elastomer samples (Z-TYE) were dried with nitrogen and placed under vacuum for 48 h prior to analysis. Substrates exposed to physically adsorbed zwitterion controls were performed in parallel, but without UV irradiation. The samples from this group were marked as Phys-Control P-TYE. As a control for surface changes from the UV irradiation process, P-TYE samples were submerged in DI water. After pre-soaking for 30 min and UV irradiated for 30 min, samples were rinsed in a similar fashion and placed under vacuum for 48 h before further analysis. For functionalizing the coated mesh, it was taped on the mesh side with PTFE film, exposing only the coating side (FIGS. 57A-E). This setup prevents the reagent bath from coming in contact with mesh side and thus allowing functionalizing only on the coating side. The zwitterion functionalized composite mesh was labelled Z-ECPM.

1.11 Protein Adsorption Measurements.

The protein adsorption profiles for the zwitterion-functionalized elastomer, the physical adsorption control and the unfunctionalized control substrates were determined by Quartz Crystal Microbalance with dissipation (QCM-D, Q-sense E4 operator, Biolin Scientific AB, Sweden). When additional mass is adsorbed onto the surface of the QCM sensor, the resonance frequency of the sensor system decreases proportional to the increased mass. The mass change on the QCM sensor surface can be calculated based on the Sauerbrey equation.

$$\Delta m = -C\left(\frac{\Delta f}{n}\right). \quad \text{Equation 1}$$

(See, e.g., Sauerbrey, G., Verwendung von Schwingquarzen zur Wägung dünner Schichten and zur Mikrowägung. *Zeitschrift für physik* 1959, 155 (2), 206-222, and Liu, G.; Zhang, G., Basic principles of QCM-D. In *QCM-D Studies on Polymer Behavior at Interfaces*, Springer: 2013; pp 1-8, the disclosures of which are incorporated herein by reference in their entirety. Here Δm is the mass change of the sensor surface, C is a constant which is 0.177 mg $Hz^{-1}$ $m^{-2}$, Δf is the frequency change, and n is the overtone number. In this experiment, $SiO_2$ QCM sensor (QSX303, $SiO_2$ sensor, 5 MHz resonant frequency) were used. In this experiment, the $SiO_2$ QCM sensors (QSX303, $SiO_2$ sensor, 5 MHz resonant frequency) were cleaned by following standard protocols and coated with P-TYE using spin-coating.

First, a flat baseline was obtained by pumping 1×PBS at 0.25 mL/min (37° C.). Before changing to the fibrinogen (1 mg/mL) solution, the measurement was reset to zero the baseline. Once the frequency was stabilized under the fibrinogen solution, the flowing solution was changed back to 1×PBS to wash any loosely attached fibrinogen on the sample surface until a final stable frequency change was obtained. For statistical purposes, each sample group was tested repeatedly (n=6). Annealed elastomer samples on QCM chips were treated as a thin homogeneous layer for mass calculations. Limitations from viscoelastic effects in response to the hydrated polymer film layer were not considered in mass calculations as P-TYE elastomer has negligible water absorption characteristics over this time scale. The mass and frequency change due to adsorbed fibrinogen removed by 1×PBS flush were thus reported. The frequency monitored at $5^{th}$, $7^{th}$ and $9^{th}$ overtone was collected and used to calculate the mass change (Δm) using the Sauerbrey equation. (See, Nikam, S.; Chen, P.; Nettleton, K.; Hsu, Y.; Becker, M., Zwitterion Surface-functionalized Thermoplastic Polyurethane for Antifouling Catheter Applications. *Biomacromolecules* 2020. Sauerbrey, G., Verwendung von Schwingquarzen zur Wagung dinner Schichten and zur Mikrowägung. *Zeitschrift für physik* 1959, 155 (2), 206-222, and Liu, G.; Zhang, G., Basic principles of QCM-D. In *QCM-D Studies on Polymer Behavior at Interfaces*, Springer: 2013; pp 1-8, the disclosures of which are incorporated herein by reference in their entirety.)

X-ray Photoelectron Spectroscopy (XPS).

XPS was utilized to quantify the functionalization of the Z-TYE coating on the composite mesh with zwitterion molecules. XPS measurements were performed on a VersaProbe 11 Scanning XPS Microprobe from Physical Electronics, under ultrahigh vacuum conditions (2.0 μPa). Automated dual beam charge neutralization was used during the analysis of the samples. The spectra were collected using a monochromatic (A1 Kα) X-ray beam (E=1486.6 eV) over a 100 μm×1400 μm probing area with a beam power of 100 W and dwell time of 100 ms. Survey scans (0-700 eV) were recorded with the analyzer pass energy of 117.4 eV. Survey spectra, High-resolution N1s spectra (395-405 eV) were obtained with pass energy of 23.5 eV and the high-resolution S2p spectra (160-172 eV) were obtained with pass energy of 27 eV. Data analysis of high-resolution spectra was performed using Casa XPS software.

Murine Subcutaneous Implantation Model.

Sample Preparation.

Polymer solutions (20% wt/wt) in chloroform were prepared. Films with thickness 250 μm and 500 μm were fabricated on a PTFE substrate using solution casting with an EZ Coater EC-200 (Chem Instruments). The solution casting formed a uniform film on the substrate that was air dried at ambient temperature for 24 h before vacuum drying for 48 h. Sample discs (8 mm diameter) were punched out from films using disposable biopsy punches. The samples were sterilized with EtO (ethylene oxide) before implantation.

Implantation and Tissue Processing.

The protocol for this study was reviewed and approved by Duke Institutional Animal Care and Use Committee (IACUC). All rats received an anesthetic drug cocktail (ketamine, xylazine, acepromazine, 29.6:5.95:0.53 mg/kg respectively) prior to the surgery. Isoflurane (2.0%) was additionally administered to each rat through a nose-cone throughout the surgical procedure to maintain anesthetized state. Four dorsal incisions (1 cm in length) equidistance apart from the spine were created using scalpel under aseptic technique. Hemostats were then used to tunnel and create a subcutaneous pocket followed by implantation of polymer discs with tweezers. The incisions were then closed with Michel clips. Analgesics and antibiotics were administered per IACUC recommendations. Cage side clinical observations were performed regularly with particular attention paid to the incision site. At preset timepoints, animals were euthanized by intraperitoneal injection (1 mL) of pentobarbital after sedation with 2% isoflurane in oxygen followed by a bilateral thoracotomy. Elastomer disc samples and surrounding tissue were collected en bloc, fixed in a 10% neutral buffered formalin (NBF), and then embedded in paraffin wax for processing. Embedded samples were sectioned (5 μm thick) and placed on microscope slides. All slides were stained with hematoxylin and eosin (H&E) and then fixed in a DPX histology mount. Each slide was assessed for inflammatory cell infiltrate based on a modified scoring system (Table 11, below) outlined by the International Organization for Standardization (ISO 10993-6 Annex E (2017)) by a board-certified veterinary pathologist. The numbers of inflammatory cells were identified by light microscopy (400×) and a score was assigned for each inflammatory cell type by a board-certified pathologist.

Rabbit Cecal Scarification Model for Adhesions.

All procedures and animal handling were performed in accordance with IACUC approval (Study #21-DEE-002). New Zealand White female rabbits (Envigo, 5 months, 2.1-6.6 kg at arrival) were used for the model. Males were not used because of their aggressive nature and sex is not considered a determinant of IAs. A power analysis assuming a significance level of 0.05 and power of 0.80 determined a minimum sample size of 7 per group to detect a 10% reduction in adhesions and inflammation between three groups based on means and standard deviation (2±0.1) seen by Hooker et al 1999.[35] For this study, eight animals per group were used to account for potential losses. Animals were randomly assigned based to one of three groups and surgically implanted with either uncoated polypropylene mesh (PPM), unfunctionalized elastomer-coated mesh (ECPM) or Zwitterion functionalized composite mesh (Z-ECPM). The 84-day timepoint allows for investigation of longer-term effects of adhesion and evaluate the performance of the P-TYE and the zwitterion functionalization film to facilitate neo-peritoneal formation over time while preventing adhesions compared to polypropylene mesh control.

Mesh Implantation.

Following anesthetic induction, the ventral surface of each rabbit was clipped free of hair and aseptically prepared for the surgical procedure including surgical site preparation with a minimum of three alternating wipes of chlorohexidine scrub and 70% isopropyl alcohol, followed by placement of 3M™ Ioban™ drape. A paramedian laparotomy was performed with an 8 cm midline incision along the linea alba through the fascia and peritoneum, taking care not to injure the underlying viscera. Lateral cuts were made at the superior and inferior ends of the incision and resulting muscle flaps excised to create a 5 cm×8 cm spanning hernia defect (FIG. 79A-D). The cecum was abraded with a scalpel and sterile dry gauze and allowed to desiccate for 15 minutes to promote adhesion formation. The assigned mesh (7×10 cm) was placed so that the elastomer dominant side faced viscera and polypropylene dominant side faced anteriorly. Each implant was secured with sutures (3-0 PDS, Ethicon, Raritan, NJ). Bupivacaine (0.5%, SC) was administered at the incision site immediately post-closure. Skin incisions were closed with interrupted sutures (3-0 Vircyl, Ethicon, Raritan, NJ) and skin glue (VetBond, 3M, St. Paul, MN). Animals received a second dose of buprenorphine (0.1-0.3 mg/kg, SC) in the venting following the surgical procedure. Animals received meloxicam (0.2 mg/kg, SC) once a day for two days post-surgery as additional analgesic.

Euthanasia/Tissue Collection/Macroscopic Evaluation and Histologic Preparation.

On Day 84, animals were tranquilized with ketamine/xylazine (50/10 mg/kg, intramuscularly) and humanely euthanized with an overdose of sodium pentobarbital administered intravenously followed by auscultation. Immediately after euthanasia, a necropsy was conducted and abdominal viscera and body wall containing mesh implants were carefully evaluated. Macroscopic appearance of the mesh surface was documented, adhesions were scored, and evaluation of the draining mesenteric lymph nodes was made. Adhesions were documented including the location, shape (band or string), adhesion tenacity, and anatomical structures involved. The defect was visually divided into quadrants and the extent covered by adhesions was evaluated and given a score (no adhesions=0, <25% of the defect=1, 26-50% of the defect=2, 51-75% of the defect=3, and >75% of the defect 4). Tenacity of adhesions was also scored (No adhesions=0, adhesion tore with minimal effort=1, adhesion tore with moderate effort=2, adhesion tore with sharp dissection=3). In addition to the qualitative, visual examination of adhesions, digital images of the defect were captured using a digital camera.

Following inspection, the entire defect area was carefully excised en bloc from each animal and fixed in 10% NBF. Two 5 mm thick cross-sectional samples from each mesh, spanning from the sutured edge to the central portion, were prepared for histologic processing. Samples were processed routinely for paraffin embedment, sectioned at 5 μm prior to staining with hematoxylin and eosin (H&E) and Masson's Trichrome. In addition, mesenteric lymph nodes were collected from each animal for evaluation by pathologist. Semi-quantitative grading of the two sections of each paraffin-embedded mesh slide was performed according to a modified scoring system outlined by the International Organization for Standardization (ISO 10993-6 Annex E) by a board certified veterinary pathologist. Criteria for grading can be found in the supplementary information. Inflammatory cell numbers were enumerated in five non-overlapping regions of interest at 400× and features of angiogenesis, fibrosis and encapsulation were assessed similarly at 200×.

Results and Discussion 3.1 Design and Synthesis of Resorbable Elastomers.

The biomaterials community has struggled to develop degradable elastomeric systems that afford independent control of degradation and mechanical properties. Elastomeric systems generally rely on the formation of a covalently crosslinked network to alter mechanical properties and increase toughness. However, this approach reduces the degradability of the system. An alternative synthesis approach for independent control of degradation and mechanical properties is modeled after natural rubber, where the elastomeric properties are derived from the stereochemistry of the alkene and Van Der Waals forces resulting from interchain packing within the polymer backbone. A series of polyester-based stereo-elastomers that possess mechanical properties that are tuned by altering the cis:trans ratio of double bonds in the polymer backbone have been reported. The degradation rates are tuned by manipulating the stoichiometry of the succinate-based comonomer. See, e.g., Wandel, M. B.; Bell, C. A.; Yu, J.; Arno, M. C.; Dreger, N. Z.; Hsu, Y.-H.; Pitto-Barry, A.; Worch, J. C.; Dove, A. P.; Becker, M. L., Concomitant control of mechanical properties and degradation in resorbable elastomer-like materials using stereochemistry and stoichiometry for soft tissue engineering. *Nature Communications* 2021, 12 (1), 1-13, the disclosure of which is incorporated herein by reference in its entirety. The elastomers were synthesized using an organo-based catalyzed nucleophilic thiol-yne addition where the stereochemistry of the addition is directed by the solvent influenced equilibria between the organobase with the activated alkyne. (See, e.g., Bell, C. A.; Yu, J.; Barker, I. A.; Truong, V. X.; Cao, Z.; Dobrinyin, A. V.; Becker, M. L.; Dove, A. P., Independent control of elastomer properties through stereocontrolled synthesis. *Angewandte Chemie* 2016, 128 (42), 13270-13274 and Stubbs, C. J.; Worch, J. C.; Prydderch, H.; Becker, M. L.; Dove, A. P., Unsaturated Poly (ester-urethanes) with Stereochemically Dependent Thermomechanical Properties. Macromolecules 2019, 53 (1), 174-181, the disclosures of which are incorporated herein by reference in their entirety). This decoupling of mechanical properties and degradation allowed for the first time the rational design and use of these biomaterials with independent control of these properties.

For the P-TYE stereo-complex polyester elastomer system, additional ester linkages were introduced within the succinate-based monomer S3 (Schemes 12) to target faster degradation timelines compared to previous systems. (See, Wandel, M. B.; Bell, C. A.; Yu, J.; Arno, M. C.; Dreger, N. Z.; Hsu, Y.-H.; Pitto-Barry, A.; Worch, J. C.; Dove, A. P.; Becker, M. L., Concomitant control of mechanical properties and degradation in resorbable elastomer-like materials using stereochemistry and stoichiometry for soft tissue engineering. *Nature Communications* 2021, 12 (1), 1-13; Bell, C. A.; Yu, J.; Barker, I. A.; Truong, V. X.; Cao, Z.; Dobrinyin, A. V.; Becker, M. L.; Dove, A. P., Independent control of elastomer properties through stereocontrolled synthesis. *Angewandte Chemie* 2016, 128 (42), 13270-13274, the disclosure of which is incorporated herein by reference in its entirety.) A linear 1,6 hexanedithiol (S6) was used as a comonomers (See, Schemes 3, 11, 13, 15). In addition, a propargyl functionalized chain extender, 2-(prop-2-yn-1-yloxy)propane-1,3-diyl dipropiolate (P3, Scheme 6), was introduced to allow covalent tethering of zwitterionic molecules post-polymerization and post-coating of the mesh. The synthesis of the precursors, monomers and polymers were confirmed by $^1$H NMR and $^{13}$C NMR spectrometry (FIGS. 68-74). The alkyne from propargyl ether functionality on P3 monomer does not participate in the thiol-yne polymerization which propagates via Michael-addition. For this reason, we do not observe any crosslinking during the synthesis of the P-TYE elastomer. To quench any radical species BHT is added to the reaction mixture at the end of the polymerization. Since the zwitterion functionalization is carried out post-fabrication, only the propargyl groups on the surface participate in the reaction. The propargyl groups in the bulk of the elastomer coating are non-accessible and therefore do not participate in radical thiol-yne reaction during the modification step. Thermal and mechanical properties for P-TYE were determined and are summarized in Table 7. The P-TYE SCPE exhibited a high strain at break of 1961±58%, along with a tensile modulus of 13.3±3.1 MPa and an ultimate tensile strength (UTS) of 9.3±2.2 MPa.

TABLE 7

Summary of thermal and mechanical properties of alkyne-derivatized stereo-elastomers.

| Polymer | % P3 | % Cis | $M_n$ (kDa) | $M_w$ (kDa) | $Đ_M$ | $T_g$ (° C.) | $T_d$ (° C.) | Modulus (MPa) | (MPa) | Break (%) |
|---|---|---|---|---|---|---|---|---|---|---|
| TYE | 0 | 82 | 49.3 | 88.7 | 1.8 | −13 | 356 | 10.7 ± 4.1 | 2.3 ± 0.7 | 1987 ± 29 |
| P-TYE | 10 | 81 | 41.9 | 83.3 | 2.0 | −23 | 351 | 13.3 ± 3.1 | 9.3 ± 2.2 | 1961 ± 58 |

Fabrication of Elastomer Coated Composite Mesh (ECPM).

The composite mesh is fabricated asymmetrically with an elastomer coating dominant side and a mesh dominant side (FIGS. 57B-E; 58A-C). This approach allows for the composite mesh to bio-integrate on the parietal side and serve as an anti-adhesive barrier on the visceral side. The composite is therefore able to function as an anti-adhesive barrier in combination with the reinforcement function necessary for the herniated or damaged abdominal wall.

The topology of the barrier surface significantly affects the formation of adhesions and neo-peritoneum regeneration. A macroporous prosthesis is optimal for bio-integration but results in irregular, non-homogeneous peritoneal regeneration and often leads to adhesions. Conversely, a laminar prosthesis, which promotes generation of a linear, organized neo-peritoneum has the major drawback of slow and incomplete integration with host. Therefore, it is believed that an ideal anti-adhesive peritoneal interface could be achieved by using a composite mesh approach.

In Vitro Degradation.

Figure 59C:
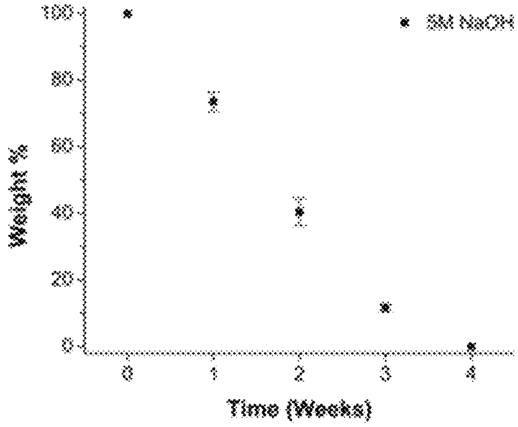
Figure 59D:
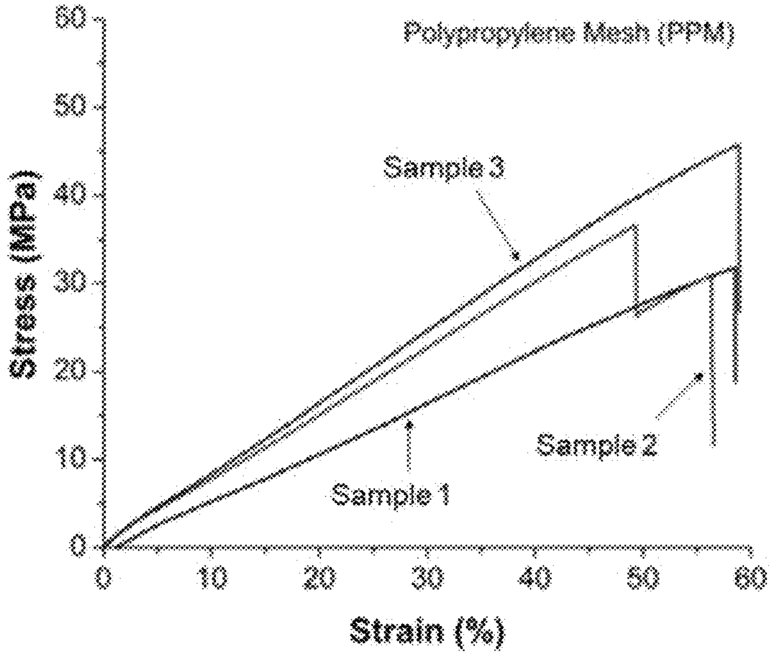

An in vitro investigation of the hydrolytic swelling and degradation behavior of previously synthesized stereo-elastomers which lack the succinate-based comonomer found them to be chemically stable with no visible degradation in PBS at ambient temperature over a 30-day period. See, e.g., Wandel, M. B.; Bell, C. A.; Yu, J.; Arno, M. C.; Dreger, N. Z.; Hsu, Y.-H.; Pitto-Barry, A.; Worch, J. C.; Dove, A. P.; Becker, M. L., Concomitant control of mechanical properties and degradation in resorbable elastomer-like materials using stereochemistry and stoichiometry for soft tissue engineering. *Nature Communications* 2021, 12 (1), 1-13, and 22. Bell, C. A.; Yu, J.; Barker, I. A.; Truong, V. X.; Cao, Z.; Dobrinyin, A. V.; Becker, M. L.; Dove, A. P., Independent control of elastomer properties through stereocontrolled synthesis. *Angewandte Chemie* 2016, 128 (42), 13270-13274, the disclosures of which are incorporated herein by reference in their entirety. To accelerate the hydrolytic degradation process, we altered the reaction stoichiometry to introduce additional (~80%) ester linkages using bis(3-(propioloyloxy)propyl) succinate, S3. The resulting copolymer was shown to degrade about 4% by mass in 4 weeks under 1×PBS incubation at 37° C. (FIG. 59B) Thus, by further introducing additional degradable linkages (ca. ester linkages) the degradation rate of the elastomer was tuned while retaining control over the mechanical properties by maintaining the cis/trans stereochemistry of the double bond. This strategy yielded even faster degradation rates under accelerated conditions (5M NaOH) (FIG. 59C). The thiol-yne elastomers were found to exhibit surface erosion degradation behavior due to their hydrophobicity. The mass loss profiles were nearly linear in nature as a function of time.

Mechanical Testing.

Figure 59E:
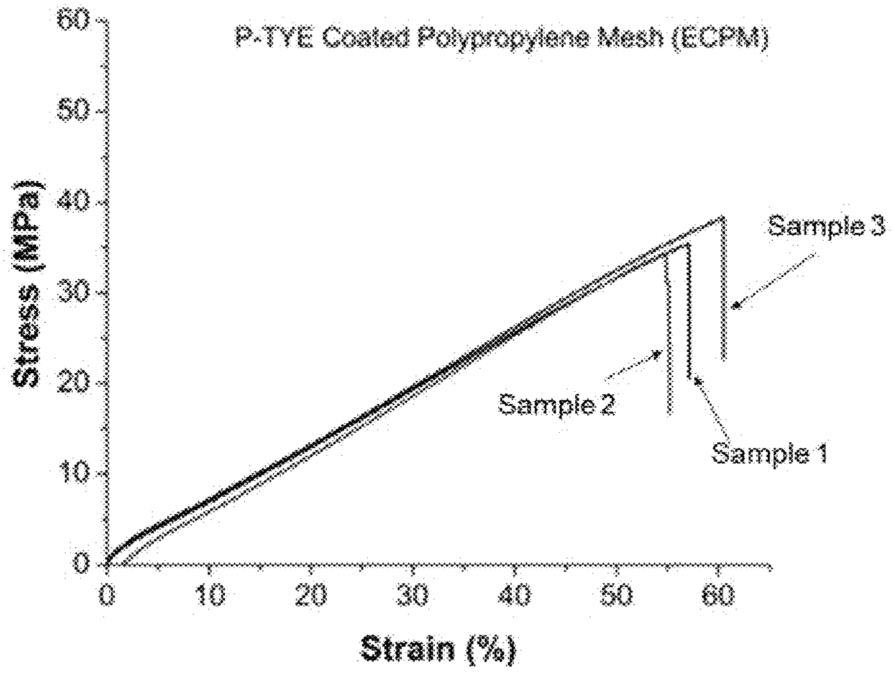

The mechanical properties (FIG. 59E, Table 8) of P-TYE elastomer-coated mesh, ECPM (64.2±3.3 MPa, 55.4±3.0%, 34.1±4.0 MPa; modulus, strain at break, and UTS, respectively) were not significantly different when compared to uncoated hernia mesh, PPM (71.2±9.9 MPa, 53.4±6.2%, 37.6±5.8 MPa) (FIG. 59E).

TABLE 8

Mechanical properties of mesh groups.

| Polymer | Modulus (MPa) | UTS (MPa) | Strain at Break (%) |
|---|---|---|---|
| PPM Mesh | 71.2 ± 9.9 | 37.6 ± 5.8 | 53.4 ± 6.2 |
| ECPM | 64.2 ± 3.3 | 34.1 ± 4.0 | 55.4 ± 3.0 |

This indicates that mechanical properties of elastomer-coated mesh are dictated by the mesh and not polymer. This is ideal as the hernia mesh had already been optimized for its mechanical matching to the abdominal wall and coating with P-TYE elastomer should not interfere with these important properties.

Figure 59F:
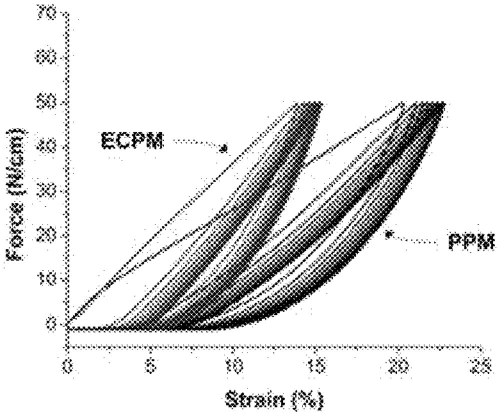

In addition to uniaxial tensile strength, hernia mesh must also possess mechanical properties to withstand cyclic stresses placed on the abdominal wall from activities like coughing, laughing, running, jumping etc. It has been established that repair materials should withstand tensile stresses on the order of 50 N/cm. (See, e.g., Deeken, C. R.; Abdo, M. S.; Frisella, M. M.; Matthews, B. D., Physicomechanical evaluation of polypropylene, polyester, and polytetrafluoroethylene meshes for inguinal hernia repair. *Journal of the Δmerican College of Surgeons* 2011, 212 (1), 68-79, Cobb, W. S.; Burns, J. M.; Kercher, K. W.; Matthews, B. D.; Norton, H. J.; Heniford, B. T., Normal intraabdominal pressure in healthy adults. *Journal of Surgical Research* 2005, 129 (2), 231-235, and Klosterhalfen, B.; Junge, K.; Klinge, U., The lightweight and large porous mesh concept for hernia repair. *Expert review of medical devices* 2005, 2 (1), 103-11, the disclosures of which are incorporated herein by reference in their entirety). The ECPM was able to withstand 50 N/cm (20 cycles) without failure of the mesh of the elastomer coating (FIG. 59F). Further topographical analysis with SEM confirmed absence of any cracks or micro-fractures in the coating (FIG. 59A-B). Additionally, the coated mesh underwent about 18.6% to 22.5% strain, which is in the appropriate deformation range of 10% to 30% to avoid discomfort and prevent hernia recurrence. We also compared performance of ECPM with commercial products (FIG. 60A-B). The Covidien™ and CQUR™ underwent failure during first cycle, whereas Ventralight™ and ECPM withstood 50 N/cm (20 cycles) of cyclic strain with ECPM undergoing significantly lower strain, least deformation and no signs of delamination. While the lower strain and non-failure of mesh could be attributed to T-Line™ mesh, which forms the base for the ECPM mesh, the non-delamination was a result of superior elastomeric properties of P-TYE compared to other coating materials.

Zwitterion Functionalization.

Immobilizing zwitterions on surfaces to create an anti-adhesive layer is a common synthetic strategy. Zwitterionic materials are correlated with a hydration layer tightly bound to the surface which forms a physical and energetic barrier that prevents protein adsorption on the surface. It is postulated that a tight hydration layer is formed from the functionalization of the zwitterion-SH to the elastomer coating surface which helps prevents adhesion of competing protein molecules like fibrinogen. The post-coating functionalization of the composite mesh was carried out using a radical initiated thiol-yne reaction, FIG. 57E. The propargyl functionality within P3 chain extender undergoes a thiol-yne addition to add the first zwitterion molecule and further undergoes a thiol-ene addition to add a second zwitterion molecule. A control functionalization procedure in the absence of UV treatment was also performed in parallel to account for any physically adsorbed zwitterion (phys-control P-TYE). Sequential washing steps were performed to remove physically adsorbed zwitterion thiol molecules that were not chemically tethered to the mesh.

3.2 X-ray Photoelectron Spectroscopy.

XPS was used to quantify the surface composition of the elastomeric coating surface after functionalization. The zwitterion thiol presents unique quaternary functionalized nitrogen ($NR_4^+$) and sulfonate ($SO_3^-$) moieties which are chemically distinct from atoms present in the polymer backbone. Therefore, the most definitive evidence to indicate surface functionalization was analysis of the high-resolution spectra in N1 s and S2p regions (FIGS. 60A-F). Analysis of N1s region showed that the functionalized Z-TYE stereo-elastomer coating had a distinct nitrogen peak (FIG. 60C) when compared to no observed peaks for the Phys-control P-TYE and unfunctionalized P-TYE stereo-elastomer samples (FIGS. 60A-B). The peak (~400.5 eV) correlates to the quaternary ammonium ($NR_4$+) species from the chemically tethered zwitterion. Additionally, a distinct sulfur peak was observed for the Z-TYE (FIG. 60F), sulfonate sulfur ($SO_3^-$, ~168 eV). This distinct sulfonate peak in the S2p region was not observed in either the Phys-control P-TYE (FIG. 60E) and P-TYE (FIG. 60D) elastomer substrates. The XPS results confirmed the presence of chemically tethered zwitterion moieties on the elastomer coating surfaces after the zwitterion functionalization process.

The atomic composition of elastomer coating surface for the experimental groups (Table 9) was determined from XPS survey scans.

TABLE 9

Atomic composition of elastomer coating groups as characterized by XPS.

| Groups | Elemental Composition (Atomic %) C | O | S | N | $SO_3^-$ relative to S (%) |
|---|---|---|---|---|---|
| P-TYE | 71.7 | 21.5 | 6.8 | 0 | 0 |
| Phys-Control P-TYE | 72.8 | 20.4 | 6.8 | 0 | 0 |
| Z-TYE | 69 | 20.8 | 8.4 | 2.2 | 8.9% |

As predicted from results of high resolution N1s and S2p scans, Nitrogen was absent from surface of Phys-adsorption and Unfunctionalized-control samples. Similarly, higher percentage of Sulfur was expected from Zwitterion functionalized coating owing to presence of Sulfur atoms in Zwitterion thiol. The composition of Sulfur from $SO_3^-$ was found to be ~8.9±2.4% of total sulfur present which is close to its theoretical composition of ~8.3%.

Protein Adsorption with Quartz Crystal Microbalance (QCM).

Proteins adsorbed on mesh surface are thought to provide binding sites and a suitable micro-environment for IAs to occur. A key to preventing IAs is to suppress the quantity of fibrinogen attachment and subsequent migration of fibroblasts which serve to promote re-mesothelialization. The QCM characterization serves as a surrogate model for in vivo conditions to test the anti-fouling properties of elastomer coating in the presence of fibrinogen. An initial drop-in frequency was observed for all elastomer groups, which is indicative of the adsorption of fibrinogen to their surfaces (FIGS. 61A-C). After the adsorption reached equilibrium, unbound fibrinogen was washed from the surface by switching flow solution to PBS, which results in frequency recovery. The initial adsorbed mass (FIG. 61D), and irreversibly adsorbed mass (FIG. 61E), are shown. The phys-control P-TYE and unfunctionalized elastomer control, P-TYE had significantly higher initial (1124±261 ng/cm$^2$ and 1165±266 ng/cm$^2$, respectively) and final adsorbed mass (848±228 ng/cm$^2$ and 865±160 ng/cm$^2$, respectively) of fibrinogen when compared to Z-TYE, the zwitterion-functionalized coating surfaces (444±377 ng/cm$^2$ and 239±219 ng/cm$^2$). The lower final adsorbed mass indicates that the zwitterion functionalization suppressed irreversible fibrinogen adsorption by ~73%.

Murine Subcutaneous Implantation Model

We performed in vivo compatibility study in a murine subcutaneous implantation model to evaluate the tissue response to the P-TYE stereo-elastomer system. The elastomer discs were fabricated with two different thicknesses (250 μm and 500 μm) and were implanted subcutaneously for 10 weeks to observe their degradation behavior and tissue inflammatory responses in vivo prior to analysis in the rabbit cecal abrasion model. Individual slides were assessed for cell presence and a semi-quantitative score was assigned at the tissue-material interfacial region (Table 10) based upon ISO 10993-6 standards as assessor metrics. Comparisons to PTFE controls indicated that our elastomeric polyesters are biocompatible. PTFE is widely used either as coating or to fabricate medical devices and was therefore deemed as a suitable control for this experiment.

TABLE 10

ISO scoring for assessment of the immune response from each of the composite mesh samples based on modified ISO 10993-6.

| Polymer | PTFE | | | P-TYE (250 μm) | | | P-TYE (500 μm) | | |
|---|---|---|---|---|---|---|---|---|---|
| Week | 2-week | 4-week | 10-week | 2-week | 4-week | 10-week | 2-week | 4-week | 10-week |
| Lymphocytes | 1 | 1.5 | 2.5 | 1.75 | 1.75 | 1.5 | 2 | 2 | 1.25 |
| Neutrophils | 1.5 | 0.5 | 1 | 1.5 | 1 | 0.5 | 1.25 | 0.75 | 0.75 |
| Giant Cells | 0 | 0 | 0 | 0.25 | 0.5 | 1 | 0.75 | 0.75 | 0 |
| Macrophages | 1.5 | 1.25 | 1.75 | 2.5 | 2.75 | 2.25 | 2.75 | 2.5 | 1.5 |

| Polymer | Z-TYE (250 μm) | | | Z-TYE (500 μm) | | |
|---|---|---|---|---|---|---|
| Week | 2-week | 4-week | 10-week | 2-week | 4-week | 10-week |
| Lymphocytes | 2 | 1.75 | 1.5 | 1.75 | 1.5 | 3 |
| Neutrophils | 1.5 | 1.5 | 1 | 1.25 | 0.75 | 0.5 |
| Giant Cells | 0.75 | 1 | 1 | 0.5 | 0.75 | 0.25 |
| Macrophages | 2 | 2.75 | 2.5 | 2.25 | 2.25 | 1.25 |

Scoring was performed with, 0 = absent, 1 = minimal, 2 = mild, 3 = moderate, 4 = severe, as the scale (n = 4)

The elastomer discs in each group degraded over the duration of the study. At each time point, PTFE control had the least cellularity in the wall of the encapsulating tissue at the elastomer-tissue interface. Across all elastomer groups, fibrous capsule formation was found to be limited and uncalcified. This indicated that no severe inflammatory response occurred towards the elastomeric material and is within the range of an accepted response for an implantable material (FIG. 62A-D).

The presence of neutrophils and macrophages was highest at the 2-week time point in all groups as expected and diminished at 10-weeks across all groups. No marked difference in tissue response were observed for unfunctionalized P-TYE or zwitterion functionalized Z-TYE discs when compared at same thickness. Similarly, no major differences were noted in cellularity or capsule thickness within the P-TYE and Z-TYE disc groups at different thickness. The morphologic appearance of the encapsulating tissue was similar across all groups. There was also no evidence of immunogenicity as no aggregates of lymphoid cells were noted to build up over time and absence of lymphoid cell cuffing surrounding blood vessels. No evidence of necrosis was noted and multinucleated giant cells were either sparse or lacking in the capsule walls further indicating the biostability and biocompatibility of our stereo-elastomer. Notably, the zwitterion functionalization did not impact the tissue response towards the elastomer. Significant tissue penetration into the elastomer discs suggests a lack of significant quantities of acidic byproducts during degradation.

Rabbit Cecal Abrasion Hernia Adhesion Model.

An in vivo spanning hernia defect study was undertaken to evaluate the ability for the Z-ECPM composite mesh to suppress intraperitoneal adhesions compared to uncoated polypropylene mesh controls (PPM), and to assess if zwitterion functionalized surfaces reduce inflammation. Inflammation and neo-peritoneal formation were observable by 84 days in all subjects. All rabbits survived the implant surgeries and there were no surgical complications or abnormal weight changes (weight=2.9-4.0 kg at time of necropsy) within the cohorts.

Macroscopic Pathology Observations.

Gross necropsy showed consistency of findings within each of the three composite mesh types. Broad multifocal to locally widespread and extensive, robust fibrous adhesions were noted between the peritoneal surfaces within the PPM group and abdominal organs including omentum, cecum, and colon (FIG. 63A). All eight animals implanted with PPM mesh developed significant fibrous adhesions. Animals implanted with unfunctionalized elastomer-coated composite mesh (ECPM) had occasional (5/8 animals) small focal clusters of fibrous adhesions between serosal surfaces of the cecum, colon, omentum, and the peritoneal mesh surface (FIG. 63B). The Z-ECPM (zwitterion functionalized elastomer-coated meshes) were generally devoid of fibrous adhesions on the peritoneal surfaces with very small areas noted in 3/8 animals (FIG. 63C). In all three mesh groups, occasional focal adhesions were noted associated with suture material along the surgical borders.

A significant reduction in extent of adhesions was seen with both ECPM and Z-ECPM mesh populations relative to PPM (85% and 94% respectively) mesh. Adhesion tenacity reduction was also seen with both ECPM and Z-ECPM cohorts relative to PPM (73% and 90% respectively). Scores outlining the extent and tenacity of adhesions are shown in FIG. 64. Average tenacity scores were ~60% lower in the zwitterionic Z-ECPM group compared to unfunctionalized ECPM group, but differences failed to reach significance due to large standard deviations. Another reason for lack of significant difference is occasional focal adhesions along the surgical borders which constituted a large portion of adhesion observations for Z-ECPM group.

Microscopic Histopathology Findings.

Semi-quantitative ISO scoring (Table 11) of histopathology parameters revealed significant differences in inflammation and tissue responses between the meshes (FIGS. 65-67).

TABLE 11

| H&E slide modified scoring scale based on ISO 10993-6 Annex E. | Score |
|---|---|
| Adhesions | |
| Extent (% Area of Mesh Surface Involved in Adhesions) | |
| No adhesions | 0 |
| 25-Jan | 1 |
| 26-50 | 2 |
| 51-75 | 3 |
| 76-100 | 4 |

TABLE 11-continued

| H&E slide modified scoring scale based on ISO 10993-6 Annex E. | Score |
|---|---|
| Tenacity (Strength of Adhesion) | |
| No adhesions | 0 |
| Adhesion tore with minimal effort | 1 |
| Adhesion tore with moderate effort | 2 |
| Adhesion tore with sharp dissection | 3 |
| Inflammation | |
| Polymorphonuclear Leukocytes, Lymphocytes/Plasma Cells, Macrophages, and Giant Cells | |
| Absent | 0 |
| Rare (1 to 5 per high powered (400x) field) | 1 |
| Mild (5 to 10 per high powered (400x) field) | 2 |
| Heavy infiltrate (preservation of local architecture) | 3 |
| Packed with effacement of regional architecture | 4 |
| Necrosis and Mineralization | |
| Absent | 0 |
| Minimal (focal, nearly imperceptible) | 1 |
| Mild (focally extensive, inconspicuous) | 2 |
| Moderate (multifocal or locally extensive, readily apparent) | 3 |
| Severe (regionally extensive, overwhelming with effacement of regional architecture) | 4 |
| Bioincorporation | |
| Host Connective Tissue Ingrowth | |
| Absent | 0 |
| Deposition peripheral to mesh | 1 |
| Deposition around individual mesh fibers without bridging across interstices | 2 |
| Deposition within mesh interstices and between mesh fibers | 3 |
| Deposition diffusely expands and distorts implant | 4 |
| Inflammatory Cell Infiltration | |
| Absent | 0 |
| Peripheral contact with no mesh infiltration | 1 |
| Peripheral mesh infiltration | 2 |
| Deep penetration into mesh center | 3 |
| Cells diffusely expand and distort implant | 4 |
| Neovascularization | |
| Absent | 0 |
| Minimal capillary proliferation (focal, 1 to 3 buds) | 1 |
| Groups of 4 to 7 capillaries with supporting fibroblastic structures | 2 |
| Broad band of capillaries with supporting structures | 3 |
| Extensive band of capillaries with supporting fibroblastic structures | 4 |
| Fibrosis | |
| Extent of Fibrosis | |
| Absent | 0 |
| Minimal (narrow band, approximately 1 to 2 cell layers thick) | 1 |
| Thin, localized band (~10 cell layers thick) | 2 |
| Moderately thick, contiguous band | 3 |
| Extensive (thick zone with effacement of local architecture) | 4 |
| Mesh Encapsulation | |
| Absent | 0 |
| Minimal (<25% of periphery) | 1 |
| Mild (25 to 50% of periphery) | 2 |
| Moderate (50 to 75% of periphery) | 3 |
| Extensive (75 to 100% of periphery) | 4 |

Criteria for grading can be found in the supplementary information. Uncoated polypropylene mesh, PPM had slightly reduced inflammation scores relative to the two laminated meshes and there was significantly greater tissue ingrowth (fibrosis and angiogenesis) into the body of the mesh (FIG. 65). This is likely due to the degradation of the elastomer coating. Differences in inflammatory scores between the uncoated and laminated meshes were primarily due to increased numbers of polymorphonuclear leukocytes and lymphoid cells. In the two coated mesh groups there was flocculent material noted on the peritoneal side of the mesh believed to be degradation byproducts of the elastomer coating. Inflammatory cell infiltrates-primarily lymphocytes and macrophages-were noted in these areas above the polypropylene fibers. No differences were noted in foreign-body giant cells, necrosis, or foci of mineralization between the experimental groups.

All three mesh cohorts showed encapsulation of the mesh within mesenchymal tissue, ingrowth of blood vessels and fibrous connective tissue into the body of the mesh (FIGS. 63A-L). The inflammation subtotal and tissue response subtotal summarize scoring for all parameters in FIG. 65 and FIG. 66 respectively. The fibrinolytic system plays a central role in healing of the damaged peritoneal tissue as well as the adhesion formation. The fibrinolytic system is stimulated by persistent inflammation and promotes a great amount of fibrin secretion, which assists in wound healing. However, the presence of a large quantity of fibrin also corresponds to the formation of excess fibrosis between the material surface and the peritoneal cavity, which results in postsurgical adhesion. The extent of fibrosis was significantly lower for Z-ECPM and ECPM compared to PPM group with Z-ECPM having the most profound effect. This is likely attributed to the coated mesh providing a physical barrier for suppressing non-specific protein adsorption and preventing excess fibrosis between the cecum and abdominal wall. The zwitterion functionalization suppresses fibrin deposition and consequently fibrosis to a greater extent. This provides explanation for significantly lower extent and tenacity of adhesions exhibited by Z-ECPM and ECPM groups compared to PPM even though the degradable elastomer-coated groups lead to a slightly higher inflammation score.

The zwitterion functionalization in Z-ECPM significantly suppressed host connective tissue ingrowth, neovascularization and inflammatory cell infiltration compared to both PPM and ECPM (FIG. 66), which is an expected collateral effect of employing an anti-fouling barrier. The Z-ECPM mesh did not impede healing as indicated by consistent mesh encapsulation and tissue ingrowth (FIG. 63F, 63I, 63L). The peritoneal surface of the mesh implants had a flattened mesothelial cell lining along the entirety of the implant (FIG. 63E, 63F, 63H, 63K, 63L) forming a mature neo-peritoneum. Images of histology sections captured at higher magnification are shown in FIG. 63G-I. No abnormalities were present in mesenteric draining lymph nodes from any of the twenty-four mesh-bearing rabbits and no differences were noted between the three experimental groups.

CONCLUSIONS

Intraperitoneal adhesions remain a major complication related to abdominal surgeries. To address this challenge, a composite mesh with a degradable elastomeric anti-adhesive barrier has been developed. Mechanical testing demonstrates that the degradable coating on the composite mesh does not delaminate under cyclic fatigue testing under conditions that exceed what would be experienced in vivo. The mesh was surface functionalized with zwitterion molecules post-coating to make the film anti-fouling. Zwitterion functionalization reduced fibrinogen adsorption in vitro by ~73%. The elastomer also exhibited excellent biocompatibility in vivo. The zwitterion functionalized composite mesh significantly reduced IAs in an 84-day rabbit hernia adhesion model over controls. The zwitterionic composite mesh reduced extent and tenacity of IAs by 94% and 90% respectively with respect to uncoated commercially available polypropylene mesh. This is significant as most FDA approved composite meshes having coatings do fracture. The anti-adhesive degradable coating leads to slower bio-incorporation and a slight increase in inflammation, which could be addressed with an elastomer that degrades more quickly. This could be achieved with a modified P-TYE, as the thiol-yne approach for synthesizing elastomers allows for tunable degradation rate without severely compromising the mechanical properties.

Overall, the composite mesh suppresses IAs formation in a rigorous rabbit model by providing an elastomeric anti-adhesive barrier which dampens protein fouling and fibrosis. It undergoes deformation under stress that matches abdominal wall The composite mesh is an excellent candidate to address the urgent need to reduce IAs in ventral hernia repair and the coating could be possibly employed in other medical application, where adhesions present challenges.

In light of the foregoing, it should be appreciated that the present invention significantly advances the art by providing a biodegradable thiol-yne elastomer that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. One skilled in the art will readily appreciate that the present disclosure is well adapted to carry out the objects and obtain the ends and advantages mentioned, as well as those inherent therein. The scope of the invention shall be appreciated from the claims that follow.

What is claimed is:

1. A zwitterionic bioresorbable thiol-yne elastomer for biomaterial applications having:

a polymer backbone comprising a residue of a $C_4$ to $C_{20}$ dicarboxylic acid-based bis-propiolate, a residue of a substantially linear dithiol;, and a residue of a bis or tris-propiolate with an additional alkyne functional group connected by stereochemically directed double bonds, wherein at least 50% of the double bonds are in a cis configuration; and at least one zwitterionic side chain connected to said polymer backbone at a residue of said bis or tris-propiolate via a thiol-ene bond, said zwitterionic side chain comprising a residue of a zwitterionic thiol.

2. The zwitterionic bioresorbable thiol-yne elastomer of claim 1 wherein the $C_4$ to $C_{20}$ dicarboxylic acid-based bis-propiolate has the formula:

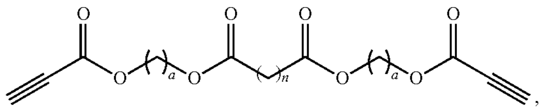
,

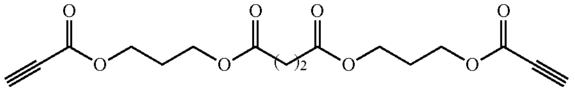
,

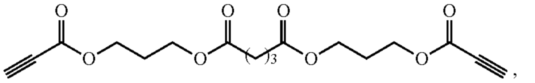
, or

-continued

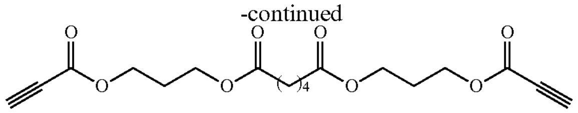

wherein a is an integer from 2 to 5 and n is an integer from 2 to 12.

3. The zwitterionic bioresorbable thiol-yne elastomer composition of claim 1 wherein the bis or tris-propiolate with an additional alkyne functional group has the formula:

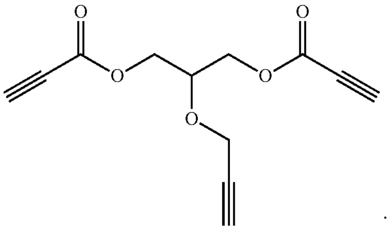 [SMILES: C#CCOC(COC(=O)C#C)COC(=O)C#C]
.

4. The zwitterionic bioresorbable thiol-yne elastomer composition of claim 1 wherein the bis or tris-propiolate with an additional alkyne functional group monomer is 2-(prop-2-yn-1-yloxy) propane-1,3-diyl dipropiolate.

5. The zwitterionic bioresorbable thiol-yne elastomer of claim 1 wherein the substantially linear dithiol is a $C_4$ to $C_{20}$ linear dithiol.

6. The zwitterionic bioresorbable thiol-yne elastomer of claim 1 comprising a thiol-yne step-growth reaction product of a $C_4$ to $C_{14}$ succinic acid, glutaric acid, or adipic acid-based bis-propiolate, a $C_4$ to $C_{20}$ linear dithiol, and 2-(prop-2-yn-1-yloxy) propane-1,3-diyl dipropiolate.

7. The zwitterionic bioresorbable thiol-yne elastomer of claim 1 wherein said zwitterionic side chains comprise a linear hydrocarbon chain of from about 6 to about 70 atoms in length comprising an ammonium ion.

8. The zwitterionic bioresorbable thiol-yne elastomer of claim 1 wherein said zwitterionic thiol comprises a zwitterionic functional group and a terminal thiol group.

9. The zwitterionic bioresorbable thiol-yne elastomer of claim 8 wherein the zwitterionic functional group comprises an ammonium ion or a sulfonic acid.

10. The zwitterionic bioresorbable thiol-yne elastomer of claim 8 wherein the zwitterionic functional group comprises a zwitterionic sulfobetaine, phosphobetaine, or carboxy-betaine moiety.

11. The zwitterionic bioresorbable thiol-yne elastomer of claim 1 wherein said zwitterionic side chains comprise a residue of 3-((3-((3-mercaptopropanoyl) oxy) propyl) dimethylammonio) propane-1-sulfonate.

12. The zwitterionic bioresorbable thiol-yne elastomer of claim 1 wherein said zwitterionic side chains comprise a residue of a zwitterionic thiol having the formula:

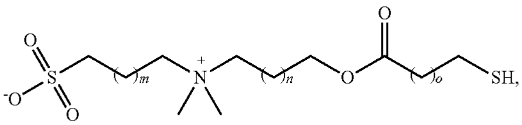
,

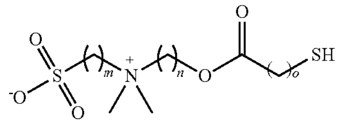

or

-continued

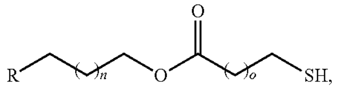

where R comprises a quaternary ammonium compound and a ring opened sultone; and m, n, and o are each an integer from 1 to 20.

13. The zwitterionic bioresorbable thiol-yne elastomer of claim 1 wherein said zwitterionic side chains comprise a residue of a zwitterionic thiol having the formula:

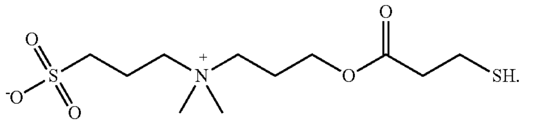

14. The zwitterionic bioresorbable thiol-yne elastomer of claim 1 having the formula:

E) irradiate the mixture with UV light to produce the zwitterionic bioresorbable thiol-yne elastomer.

16. The method of claim 15, wherein step C further comprises collecting and purifying the bioresorbable and functionalizable thiol-yne elastomer intermediate.

17. The method of claim 15, wherein the method further comprises diluting the mixture of step C with a suitable solvent or solvent combination and adding one or more radical inhibitors to prevent unwanted side reactions before said steps of collecting and purifying.

18. The method of claim 15 wherein said linear $C_4$ to $C_{20}$ dicarboxylic acid-based bis-propiolate has the formula:

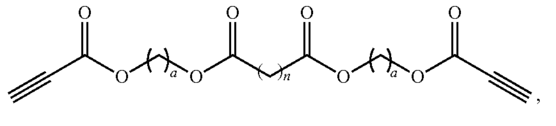

wherein a is an integer from 2 to 5 and n is an integer from 2 to 12.

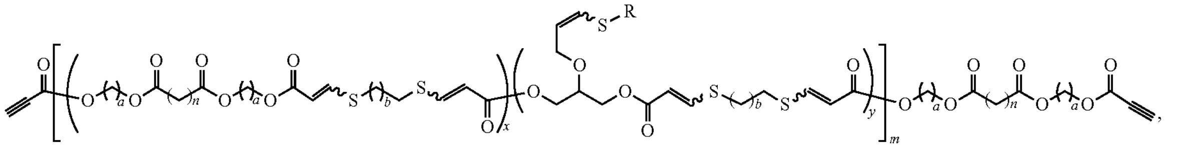

or

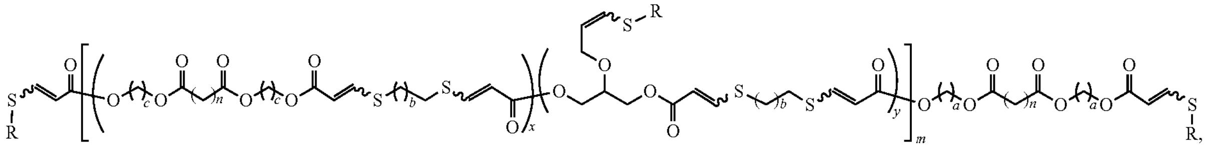

wherein each a is an integer from 2 to 5; each b is an integer from 1 to 19; each c is an integer from 2 to 20; each n is an integer from 2 to 20; x and y are mole fractions; ∿∿ indicates a stereochemically controlled bond that could be in a cis or a trans configuration with respect to the adjacent carbon double bond; m is an integer from 10 to 500; and R is a zwitterionic group.

15. A method for making the zwitterionic bioresorbable thiol-yne elastomer according to claim 1 comprising:

A) combining a linear $C_4$ to $C_{20}$ dicarboxylic acid-based bis-propiolate, a $C_4$ to $C_{20}$ linear dithiol, and 2-(prop-2-yn-1-yloxy) propane-1,3-diyl dipropiolate with a suitable reaction solvent or solvent combination in a suitable reaction vessel;

B) cooling the combination of step A to a temperature of from about from about −30° C. to about 10° C., adding an organic base catalyst, and allowing the reaction to continue for from about 1 min to 120 about min to produce a crude bioresorbable and functionalizable thiol-yne elastomer intermediate;

C) adding a second quantity of said linear $C_4$ to $C_{20}$ dicarboxylic acid-based bis-propiolate to the reaction vessel to react with any available thiol groups in the crude polymer and produce the bioresorbable and functionalizable thiol-yne elastomer intermediate;

D) adding the bioresorbable and functionalizable thiol-yne elastomer intermediate to an aqueous solution containing a zwitterionic thiol to and a radical initiator; and

19. The method of claim 15 wherein said suitable reaction solvent or solvent combination is a polar solvent having a dielectric constant of 4 or more.

20. The method of claim 15 wherein said reaction solvent or solvent combination is a polar solvent having a relative polarity of from about 0.2 or more to about 0.4 or less.

21. The method of claim 15 wherein said organic base catalyst is selected from a group consisting of 1,8-diazabicyclo[5.4.0] undec-7-ene (DBU), trimethylamine ($Et_3N$), triazabicyclodecene (TBD), tetramethyl guanidine (TMG), benzotriazole, dimethylphenylphosphine (DMPP), and combinations thereof.

22. The method of claim 15 wherein said reaction solvent or solvent combination is selected from a group consisting of chloroform ($CHCl_3$), N,N-dimethylformamide (DMF), dimethyl sulfoxide (DMSO), N-methylpyrolidone (NMP), $CHCl_3$/DMF) mixtures, $CHCl_3$/NMP mixtures and cosolvent combinations thereof.

23. The method of claims of claim 15 wherein said bioresorbable and functionalizable thiol-yne elastomer intermediate has the formula:

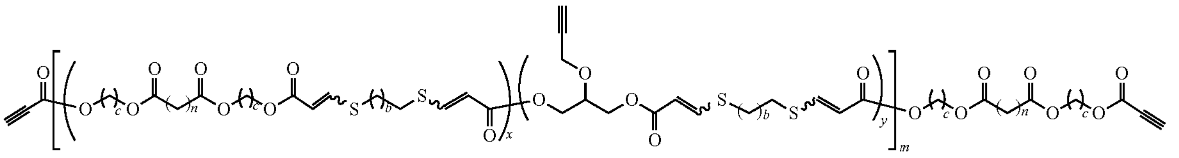

or

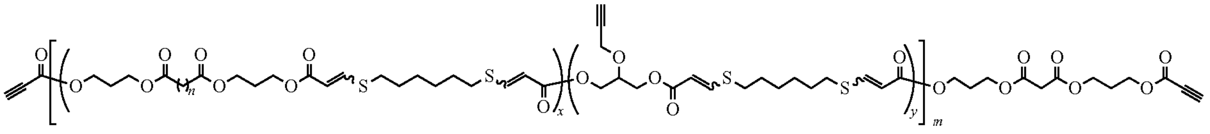

wherein each a is an integer from 2 to 5; each b is an integer from 1 to 19; each n is an integer from 2 to 20; x and y are mole fractions; ∿ indicates a stereochemically controlled bond that could be in a cis or a trans configuration with respect to the adjacent carbon double bond; and m is an integer from 10 to 500.

24. An anti-fouling polymer coating comprising the zwitterionic bioresorbable thiol-yne elastomer of claim 1.

25. A macroporous composite mesh prosthesis comprising the anti-fouling polymer coating of claim 24.

26. The macroporous composite mesh prosthesis of claim 25 comprising a microporous bioresorbable polymer mesh having a first side and a second side, wherein only one of said first and second side comprises the anti-fouling polymer coating.

27. The macroporous composite mesh prosthesis of claim 25 wherein said macroporous composite mesh prosthesis comprises a hernia mesh for use in treating abdominal hernias, having a visceral side comprising said anti-fouling polymer coating and a second side facing away from said visceral side.

28. A method of making the hernia mesh for use in treating abdominal hernias of claim 27 comprising:

A). fabricating or obtaining a suitable microporous hernia mesh sized to fit over an abdominal hernia;

B). preparing a zwitterionic bioresorbable thiol-yne elastomer having:

a polymer backbone comprising a residue of $C_4$ to $C_{20}$ dicarboxylic acid-based bis-propiolate monomer; a residue of a substantially linear dithiol; and a residue of a bis or tris-propiolate monomer with an additional alkyne functional group connected by stereochemically directed double bonds, wherein at least 50% of the double bonds are in a cis configuration; and at least one zwitterionic side chain connected to said polymer backbone at the residue of said bis or tris-propiolate via a thiol-ene bond, said zwitterionic side chain comprising the residue of a zwitterionic thiol;

C). coating one side of said microporous hernia mesh with said zwitterionic bioresorbable thiol-yne elastomer;

D). immersing the coated microporous hernia mesh in an aqueous solution containing a zwitterionic thiol and a radical initiator, E). exposing the zwitterionic bioresorbable thiol-yne elastomer to ultraviolet light to form a microporous hernia mesh having a zwitterionic bioresorbable thiol-yne elastomer coating on one side of said microporous hernia mesh.

* * * * *